US010168826B2

(12) United States Patent
Bernstein et al.

(10) Patent No.: US 10,168,826 B2
(45) Date of Patent: Jan. 1, 2019

(54) DEVICE, METHOD, AND GRAPHICAL USER INTERFACE FOR TRANSITIONING BETWEEN DISPLAY STATES IN RESPONSE TO A GESTURE

(71) Applicant: Apple Inc., Cupertino, CA (US)

(72) Inventors: Jeffrey Traer Bernstein, San Francisco, CA (US); Julian Missig, Redwood City, CA (US); Avi E. Cieplinski, San Francisco, CA (US); Matthew I. Brown, San Francisco, CA (US); May-Li Khoe, San Francisco, CA (US); Nicholas Zambetti, Largo, FL (US); Bianca C. Costanzo, Berlin (DE); David J. Hart, San Francisco, CA (US); B. Michael Victor, Castro Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/482,618

(22) Filed: Apr. 7, 2017

(65) Prior Publication Data
US 2017/0212673 A1 Jul. 27, 2017

Related U.S. Application Data

(63) Continuation of application No. 14/536,203, filed on Nov. 7, 2014, now Pat. No. 9,619,076, which is a
(Continued)

(51) Int. Cl.
*G09G 3/3258* (2016.01)
*G09G 3/3266* (2016.01)
(Continued)

(52) U.S. Cl.
CPC .......... *G06F 3/0416* (2013.01); *G06F 3/016* (2013.01); *G06F 3/0482* (2013.01);
(Continued)

(58) Field of Classification Search
CPC ...... G06F 3/0416; G06F 3/016; G06F 3/0482; G06F 3/04817; G06F 3/0483; G06F 3/04883; G06F 2203/04105
See application file for complete search history.

(56) References Cited

U.S. PATENT DOCUMENTS

| 4,864,520 A | 9/1989 | Setoguchi et al. |
| 5,184,120 A | 2/1993 | Schultz |

(Continued)

FOREIGN PATENT DOCUMENTS

| AU | 2016100649 A4 | 6/2016 |
| CN | 1808362 A | 7/2006 |

(Continued)

OTHER PUBLICATIONS

Anonymous, "Google Android 5.0 Release Date, Specs and Editors Hands On Review—CNET", http://www.cnet.com/products/google-an-android-5-0-lollipop/, Mar. 12, 2015, 10 pages.
(Continued)

*Primary Examiner* — Andrew Sasinowski
(74) *Attorney, Agent, or Firm* — Morgan, Lewis & Bockius LLP

(57) ABSTRACT

An electronic device displays a user interface in a first display state. The device detects a first portion of a gesture on a touch-sensitive surface, including detecting intensity of a respective contact of the gesture. In response to detecting the first portion of the gesture, the device displays an intermediate display state between the first display state and a second display state. In response to detecting the end of the gesture: if intensity of the respective contact had reached a
(Continued)

predefined intensity threshold prior to the end of the gesture, the device displays the second display state; otherwise, the device redisplays the first display state. After displaying an animated transition between a first display state and a second state, the device, optionally, detects an increase of the contact intensity. In response, the device displays a continuation of the animation in accordance with the increasing intensity of the respective contact.

27 Claims, 121 Drawing Sheets

Related U.S. Application Data continuation of application No. PCT/US2013/040093, filed on May 8, 2013.

(60) Provisional application No. 61/778,265, filed on Mar. 12, 2013, provisional application No. 61/747,278, filed on Dec. 29, 2012, provisional application No. 61/688,227, filed on May 9, 2012.

(51) Int. Cl.
  G09G 3/3233  (2016.01)
  G09G 3/3291  (2016.01)
  G06F 3/041   (2006.01)
  G06F 3/0488  (2013.01)
  G06F 3/0481  (2013.01)
  G06F 3/0482  (2013.01)
  G06F 3/0483  (2013.01)
  G06F 3/01    (2006.01)

(52) U.S. Cl.
  CPC ........ G06F 3/0483 (2013.01); G06F 3/04817 (2013.01); G06F 3/04883 (2013.01); G06F 2203/04105 (2013.01)

(56) References Cited

U.S. PATENT DOCUMENTS

| | | |
|---|---|---|
| 5,374,787 A | 12/1994 | Miller et al. |
| 5,428,730 A | 6/1995 | Baker et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,710,896 A | 1/1998 | Seidl |
| 5,717,438 A | 2/1998 | Kim et al. |
| 5,793,360 A | 8/1998 | Fleck et al. |
| 5,793,377 A | 8/1998 | Moore |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,825,352 A | 10/1998 | Bisset et al. |
| 5,844,560 A | 12/1998 | Crutcher et al. |
| 5,872,922 A | 2/1999 | Hogan et al. |
| 5,946,647 A | 8/1999 | Miller et al. |
| 6,002,397 A | 12/1999 | Jaaskelainen, Jr. |
| 6,031,989 A | 2/2000 | Cordell |
| 6,088,019 A | 7/2000 | Rosenberg |
| 6,088,027 A | 7/2000 | Konar et al. |
| 6,111,575 A | 8/2000 | Martinez et al. |
| 6,121,960 A | 9/2000 | Carroll et al. |
| 6,208,329 B1 | 3/2001 | Ballare |
| 6,208,340 B1 | 3/2001 | Amin et al. |
| 6,219,034 B1 | 4/2001 | Elbing et al. |
| 6,243,080 B1 | 6/2001 | Molne |
| 6,252,594 B1 | 6/2001 | Xia et al. |
| 6,396,523 B1 | 5/2002 | Segal et al. |
| 6,429,846 B2 | 8/2002 | Rosenberg et al. |
| 6,448,977 B1 | 9/2002 | Braun et al. |
| 6,459,442 B1 | 10/2002 | Edwards et al. |
| 6,489,978 B1 | 12/2002 | Gong et al. |
| 6,512,530 B1 | 1/2003 | Rzepkowski et al. |
| 6,563,487 B2 | 5/2003 | Martin et al. |
| 6,567,102 B2 | 5/2003 | Kung |
| 6,583,798 B1 | 6/2003 | Hoek et al. |
| 6,590,568 B1 | 7/2003 | Astala et al. |
| 6,661,438 B1 | 12/2003 | Shiraishi et al. |
| 6,735,307 B1 | 5/2004 | Volckers |
| 6,750,890 B1 | 6/2004 | Sugimoto |
| 6,822,635 B2 | 11/2004 | Shahoian et al. |
| 6,906,697 B2 | 6/2005 | Rosenberg |
| 6,919,927 B1 | 7/2005 | Hyodo |
| 7,138,983 B2 | 11/2006 | Wakai et al. |
| 7,312,791 B2 | 12/2007 | Hoshino et al. |
| 7,411,575 B2 | 8/2008 | Hill et al. |
| 7,471,284 B2 | 12/2008 | Bathiche et al. |
| 7,479,949 B2 | 1/2009 | Jobs et al. |
| 7,533,352 B2 | 5/2009 | Chew et al. |
| 7,552,397 B2 | 6/2009 | Holecek et al. |
| 7,577,530 B2 | 8/2009 | Vignalou-Marche |
| 7,614,008 B2 | 11/2009 | Ording |
| 7,619,616 B2 | 11/2009 | Rimas Ribikauskas et al. |
| 7,629,966 B2 | 12/2009 | Anson |
| 7,656,413 B2 | 2/2010 | Khan et al. |
| 7,683,889 B2 | 3/2010 | Rimas Ribikauskas et al. |
| 7,743,348 B2 | 6/2010 | Robbins et al. |
| 7,760,187 B2 | 7/2010 | Kennedy |
| 7,787,026 B1 | 8/2010 | Flory et al. |
| 7,797,642 B1 | 9/2010 | Karam et al. |
| 7,801,950 B2 | 9/2010 | Eisenstadt et al. |
| 7,812,826 B2 | 10/2010 | Ording et al. |
| 7,890,862 B2 | 2/2011 | Kompe et al. |
| 7,903,090 B2 | 3/2011 | Soss et al. |
| 7,952,566 B2 | 5/2011 | Poupyrev et al. |
| 7,956,847 B2 | 6/2011 | Christie |
| 7,973,778 B2 | 7/2011 | Chen |
| 8,040,142 B1 | 10/2011 | Bokma et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,271,900 B2 | 9/2012 | Walizaka et al. |
| 8,325,398 B2 | 12/2012 | Satomi et al. |
| 8,363,020 B2 | 1/2013 | Li et al. |
| 8,390,583 B2 | 3/2013 | Forutanpour et al. |
| 8,423,089 B2 | 4/2013 | Song et al. |
| 8,446,376 B2 | 5/2013 | Levy et al. |
| 8,453,057 B2 | 5/2013 | Stallings et al. |
| 8,456,431 B2 | 6/2013 | Victor |
| 8,466,889 B2 | 6/2013 | Tong et al. |
| 8,482,535 B2 | 7/2013 | Pryor |
| 8,504,946 B2 | 8/2013 | Williamson et al. |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,698,765 B1 | 4/2014 | Keller |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,816,989 B2 | 8/2014 | Nicholson et al. |
| 8,854,316 B2 | 10/2014 | Shenfield |
| 8,872,729 B2 | 10/2014 | Lyons et al. |

(56) References Cited

U.S. PATENT DOCUMENTS

| | | |
|---|---|---|
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,046,999 B1 | 6/2015 | Teller et al. |
| 9,052,925 B2 | 6/2015 | Chaudhri |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,104,260 B2 | 8/2015 | Marsden et al. |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,244,606 B2 | 1/2016 | Kocienda et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 | 4/2017 | Brown et al. |
| 9,619,076 B2 | 4/2017 | Bernstein et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015064 A1 | 2/2002 | Robotham et al. |
| 2002/0109678 A1 | 8/2002 | Marmolin et al. |
| 2002/0140680 A1 | 10/2002 | Lu |
| 2002/0140740 A1 | 10/2002 | Chen |
| 2002/0180763 A1 | 12/2002 | Kung |
| 2002/0186257 A1 | 12/2002 | Cadiz et al. |
| 2003/0001869 A1 | 1/2003 | Nissen |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0122779 A1 | 7/2003 | Martin et al. |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0174399 A1 | 9/2004 | Wu et al. |
| 2004/0219969 A1 | 11/2004 | Casey et al. |
| 2004/0267877 A1 | 12/2004 | Shiparo et al. |
| 2005/0012723 A1 | 1/2005 | Pallakoff |
| 2005/0039141 A1 | 2/2005 | Burke et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0134578 A1 | 6/2005 | Chambers et al. |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0022955 A1 | 2/2006 | Kennedy |
| 2006/0022956 A1 | 2/2006 | Lengeling et al. |
| 2006/0026536 A1 | 2/2006 | Hotelling et al. |
| 2006/0031776 A1 | 2/2006 | Glein et al. |
| 2006/0036971 A1 | 2/2006 | Mendel et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0024595 A1 | 2/2007 | Baker et al. |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0120835 A1 | 5/2007 | Sato |
| 2007/0124699 A1 | 5/2007 | Michaels |
| 2007/0152959 A1 | 7/2007 | Peters |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |

(56) References Cited

U.S. PATENT DOCUMENTS

| | | |
|---|---|---|
| 2007/0294295 A1 | 12/2007 | Finkelstein et al. |
| 2007/0299923 A1 | 12/2007 | Skelly et al. |
| 2008/0001924 A1 | 1/2008 | dos los Reyes et al. |
| 2008/0010610 A1 | 1/2008 | Lim et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307359 A1 | 12/2008 | Louch et al. |
| 2008/0317378 A1 | 12/2008 | Steinberg et al. |
| 2008/0320419 A1 | 12/2008 | Matas et al. |
| 2009/0007017 A1 | 1/2009 | Anzures et al. |
| 2009/0037846 A1 | 2/2009 | Spalink et al. |
| 2009/0046110 A1 | 2/2009 | Sadler et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0075738 A1 | 3/2009 | Pearce |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167704 A1 | 7/2009 | Terlizzi et al. |
| 2009/0169061 A1 | 7/2009 | Anderson et al. |
| 2009/0187824 A1 | 7/2009 | Hinckley et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293009 A1 | 11/2009 | Meserth et al. |
| 2009/0295739 A1 | 12/2009 | Nagara |
| 2009/0303187 A1 | 12/2009 | Pallakoff |
| 2009/0307633 A1 | 12/2009 | Haughey, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088639 A1 | 4/2010 | Yach et al. |
| 2010/0110082 A1 | 5/2010 | Myrick et al. |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235733 A1 | 9/2010 | Drislane et al. |
| 2010/0235746 A1 | 9/2010 | Anzures |
| 2010/0240415 A1 | 9/2010 | Kim et al. |
| 2010/0251168 A1 | 9/2010 | Fujita et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0035145 A1 | 2/2011 | Yamasaki |
| 2011/0050576 A1 | 3/2011 | Forutanpour et al. |
| 2011/0050588 A1 | 3/2011 | Li et al. |
| 2011/0050591 A1 | 3/2011 | Kim et al. |

(56) References Cited

U.S. PATENT DOCUMENTS

| | | |
|---|---|---|
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1* | 3/2011 | Ikeda .................... G06F 3/0414 702/155 |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0102340 A1 | 5/2011 | Martin et al. |
| 2011/0102829 A1 | 5/2011 | Jourdan |
| 2011/0107272 A1 | 5/2011 | Aguilar |
| 2011/0116716 A1 | 5/2011 | Kwon et al. |
| 2011/0119610 A1 | 5/2011 | Hackborn et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167369 A1 | 7/2011 | van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1* | 7/2011 | Aono ...................... G06F 3/016 345/173 |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0263298 A1 | 10/2011 | Park |
| 2011/0267530 A1 | 11/2011 | Chun |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1* | 11/2011 | Yaksick ............... G06F 3/04883 345/173 |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1 | 12/2011 | Ryu et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1* | 4/2012 | Kano .................... G06F 3/04817 715/764 |
| 2012/0089942 A1 | 4/2012 | Gammon |
| 2012/0089951 A1 | 4/2012 | Cassidy |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0236037 A1 | 9/2012 | Lessing et al. |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |

(56) References Cited

U.S. PATENT DOCUMENTS

| | | |
|---|---|---|
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2012/0311504 A1 | 12/2012 | van Os et al. |
| 2013/0002561 A1 | 1/2013 | Wakasa |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0050143 A1 | 2/2013 | Kim et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0074003 A1 | 3/2013 | Dolenc |
| 2013/0077804 A1 | 3/2013 | Glebe et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0102366 A1 | 4/2013 | Teng et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0125039 A1 | 5/2013 | Murata |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222333 A1 | 8/2013 | Miles et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0305184 A1 | 11/2013 | Kim et al. |
| 2013/0307792 A1 | 11/2013 | Andres et al. |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0335373 A1 | 12/2013 | Tomiyasu |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0068475 A1 | 3/2014 | Li et al. |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0139456 A1 | 5/2014 | Wigdor et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0229888 A1 | 8/2014 | Ko et al. |
| 2014/0237408 A1 | 8/2014 | Ohlsson et al. |

(56) References Cited

U.S. PATENT DOCUMENTS

| | | |
|---|---|---|
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304646 A1 | 10/2014 | Rossman |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0361982 A1 | 12/2014 | Shaffer |
| 2014/0365945 A1 | 12/2014 | Karunamuni et al. |
| 2014/0365956 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046039 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0124699 A1 | 5/2017 | Lane |
| 2017/0139565 A1 | 5/2017 | Choi |
| 2018/0024681 A1 | 1/2018 | Bernstein et al. |
| 2018/0188920 A1 | 7/2018 | Bernstein et al. |

FOREIGN PATENT DOCUMENTS

| | | |
|---|---|---|
| CN | 101118469 A | 2/2008 |
| CN | 101202866 A | 6/2008 |
| CN | 101222704 A | 7/2008 |
| CN | 101241397 A | 8/2008 |
| CN | 101320303 A | 12/2008 |
| CN | 100524183 | 8/2009 |
| CN | 101593077 A | 12/2009 |
| CN | 101650615 A | 2/2010 |

(56) References Cited

FOREIGN PATENT DOCUMENTS

| | | |
|---|---|---|
| CN | 101809526 A | 8/2010 |
| CN | 102004593 A | 4/2011 |
| CN | 102112946 A | 6/2011 |
| CN | 102160021 A | 8/2011 |
| CN | 102214038 A | 10/2011 |
| CN | 102349038 A | 2/2012 |
| CN | 102385478 A | 3/2012 |
| CN | 102438092 A | 5/2012 |
| CN | 102483677 A | 5/2012 |
| CN | 102646013 A | 8/2012 |
| CN | 102662573 A | 9/2012 |
| CN | 102841677 A | 12/2012 |
| CN | 103097992 A | 5/2013 |
| CN | 103186345 A | 7/2013 |
| CN | 103518176 A | 1/2014 |
| DE | 100 59 906 A1 | 6/2002 |
| EP | 0 859 307 A1 | 3/1998 |
| EP | 0 880 090 A2 | 11/1998 |
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | 58-182746 | 10/1983 |
| JP | H06-161647 A | 6/1994 |
| JP | H07-98769 A | 4/1995 |
| JP | H07-104915 | 4/1995 |
| JP | H07-151512 A | 6/1995 |
| JP | H09-269883 A | 10/1997 |
| JP | H09-330175 A | 12/1997 |
| JP | H11-203044 A | 7/1999 |
| JP | 2001-202192 A | 7/2001 |
| JP | 2001-306207 A | 11/2001 |
| JP | 2002-149312 A | 5/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2005-031786 A | 2/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2006-185443 A | 7/2006 |
| JP | 2007-116384 A | 5/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-516348 A | 5/2008 |
| JP | 2008-146453 A | 6/2008 |
| JP | 2008-537615 | 9/2008 |
| JP | 2008-305174 A | 12/2008 |
| JP | 2009-500761 A | 1/2009 |
| JP | 2009-110243 A | 5/2009 |
| JP | 2009-129171 A | 6/2009 |
| JP | 2009-211704 A | 9/2009 |
| JP | 2009-217543 A | 9/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-197848 A | 10/2011 |
| JP | 2011-221640 A | 11/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2010 0133246 A | 12/2010 |
| KR | 2011 0086501 A | 7/2011 |
| KR | 20120103670 A | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| RU | 2007145218 A | 7/2009 |
| WO | WO 2005/106637 A2 | 11/2005 |

(56) References Cited

FOREIGN PATENT DOCUMENTS

| WO | WO 2006/013485 A2 | 2/2006 |
|---|---|---|
| WO | WO 2006/042309 A1 | 4/2006 |
| WO | WO 2006/094308 A2 | 9/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2010/122813 A1 | 10/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/108190 A1 | 9/2011 |
| WO | WO 2011/115187 A1 | 9/2011 |
| WO | WO 2011/121375 A1 | 10/2011 |
| WO | WO 2012/021417 A1 | 2/2012 |
| WO | WO 2012/037664 | 3/2012 |
| WO | WO 2012/096804 A2 | 7/2012 |
| WO | WO 2012/108213 A1 | 8/2012 |
| WO | WO 2012/114760 A1 | 8/2012 |
| WO | WO 2012/150540 A2 | 11/2012 |
| WO | WO 2012/153555 A1 | 11/2012 |
| WO | WO 2013/169299 A1 | 11/2013 |
| WO | WO 2013/169300 A1 | 11/2013 |
| WO | WO 2013/169302 A1 | 11/2013 |
| WO | WO 2013/169845 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

YouTube, "Recentz—Recent Apps in a Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Office Action, dated Sep. 25, 2017, received in U.S. Appl. No. 14/536,644, 29 pages.
Office Action, dated Oct. 19, 2017, received in U.S. Appl. No. 14/608,926, 14 pages.
Office Action, dated Aug. 22, 2017, received in Korean Patent Application No. 2017-7018250, which corresponds with U.S. Appl. No. 14/608,926, 2 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Notice of Allowance, dated Sep. 20, 2017, received in U.S. Appl. No. 14/536,141, 10 pages.
Office Action, dated Oct. 25, 2017, received in Chinese Patent Application No. 201380035977.0, which corresponds with U.S. Appl. No. 14/536,203, 5 pages.
Notice of Allowance, dated Oct. 30, 2017, received in Korean Patent Application No. 2016-7033834, which correponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Notice of Allowance, dated Nov. 9, 2017, received in U.S. Appl. No. 14/536,267, 8 pages.
Office Action, dated Sep. 13, 2017, received in European Patent Application No. 16177863.4, which corresponds with U.S. Appl. No. 14/536,267, 6 pages.
Notice of Allowance, dated Sep. 1, 2017, received in Korean Patent Application No. 2016-7029533, which corresponds with U.S. Appl. No. 14/536,267, 4 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Notice of Allowance, dated Sep. 19, 2017, received in Chinese Patent Application No. 201380068399.0, which corresponds with U.S. Appl. No. 14/608,985, 3 pages.
Summons, dated Oct. 6, 2017, received in European Patent Application No. 13811032.5, which corresponds with U.S. Appl. No. 14/608,985, 6 pages.
Notice of Allowance, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated Sep. 1, 2017, received in Australian Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Patent, dated Aug. 18, 2017, received in Japanese Patent Application No. 2016558214, which corresponds with U.S. Appl. No. 14/866,511, 3 pages.

(56) References Cited

OTHER PUBLICATIONS

Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Final Office Action, dated Nov. 15, 2017, received in U.S. Appl. No. 14/856,519, 31 pages.
Office Action, dated Sep. 22, 2017, received in Japanese Patent Application No. 2017-029201, which corresponds with U.S. Appl. No. 14/857,636 8 pages.
Final Office Action, dated Oct. 11, 2017, received in U.S. Appl. No. 14/857,700, 13 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Sep. 1, 2017, received in U.S. Appl. No. 14/870,754, 22 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Sep. 1, 2017, received in U.S. Appl. No. 14/870,988, 14 pages.
Office Action, dated Oct. 16, 2017, received in Australian Patent Application No. 2016203040, which corresponds with U.S. Appl. No. 14/871,227, 5 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Office Action, dated Aug. 29, 2017, received in Korean Patent Application No. 2017-7014536, which corresponds with U.S. Appl. No. 15/081,771, 5 pages.
Notice of Allowance, dated Oct. 20, 2017, received in U.S. Appl. No. 15/136,782, 9 pages.
Notice of Allowance, dated Jul. 6, 2017, received in U.S. Appl. No. 15/231,745, 18 pages.
Patent, dated Oct. 30, 2017, received in Danish Patent Application No. 201670593, which corresponds with U.S. Appl. No. 15/231,745, 3 pages.
Office Action, dated Oct. 16, 2017, received in Danish Patent Application No. 201770710, 10 pages.
Office Action, dated Aug. 30, 2017, received in U.S. Appl. No. 15/655,749, 22 pages.
Office Action, dated Oct. 31, 2017, received in U.S. Appl. No. 15/723,069, 7 pages.
Extended European Search Report, dated Oct. 17, 2017, received in European Patent Application No. 17184437.6, Which corresponds with U.S. Appl. No. 14/868,078, 8 pages.
Extended European Search Report, dated Oct. 10, 2017, received in European Patent Application No. 17188507.2, which corresponds with U.S. Appl. No. 14/866,361, 9 pages.
Extended European Search Report, dated Sep. 11, 2017, received in European Patent Application No. 17163309.2, which corresponds with U.S. Appl. No. 14/866,987, 8 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Sood, "MultitaskingGestures", http://cydia.saurik.com/package/org.thebigboxx.multitaskinggestures/, Mar. 3, 2014, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "Multitasking Gestures: Zephyr Like Gestures on iOS", https://www.youtube.com/watch?v=Jcod-f7Lw0I, Jan. 27, 2014, 3 pages.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated May 15, 2017, received in Australian Patent Application No. 2016216580, which corresponds with U.S. Appl. No. 14/536,426, 3 pages.
Final Office Action, dated Aug. 25, 2017, received in U.S. Appl. No. 14/536,464, 30 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Patent, dated May 26, 2017, received in European Patent Application No. 13724102.2, which corresponds with U.S. Appl. No. 14/536,646, 1 page.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Notice of Allowance, dated May 12, 2017, received in U.S. Appl. No. 14/608,942, 10 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.

(56) References Cited

OTHER PUBLICATIONS

Office Action, dated Jun. 23, 2017, received in Japanese Patent Application No. 2016173113, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Office Action, dated Jun. 12, 2017, received in Danish Patent Application No. 201500582, which corresponds with U.S. Appl. No. 14/863,432, 5 pages.
Grant, dated Jul. 21, 2016, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.

Office Action, dated Jun. 15, 2017, received in Danish Patent Application No. 201500595, which corresponds with U.S. Appl. No. 14/871,236, 4 pages.
Office Action, dated Aug. 4, 2017, received in Japanese Patent Application No. 2016-533201, which corresponds with U.S. Appl. No. 14/871,227, 6 pages.
Office Action, dated Apr. 20, 2017, received in Chinese Patent Application No. 201621044346.2, which corresponds with U.S. Appl. No. 14/871,462, 3 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Final Office Action, dated Aug. 18, 2017, received in U.S. Appl. No. 14/869,873, 20 pages.
Final Office Action, dated Jun. 2, 2017, received in U.S. Appl. No. 15/081,771, 17 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 1717226.3, which corresponds with U.S. Appl. No. 14/871,336, 9 pages.
Office Action, dated Mar. 15, 2017, received in U.S. Appl. No. 14/535,671, 13 pages.
Office Action, dated Dec. 18, 2015, received in Australian Patent Application No. 2013368440, which corresponds with U.S. Appl. No. 14/536,426, 3 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.

(56) References Cited

OTHER PUBLICATIONS

Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Office Action, dated Apr. 5, 2016, received in Korean Patent Application No. 10-2015-7018851, which corresponds with U.S. Appl. No. 14/536,426, 7 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 18, 2015, received in Australian Patent Application No. 2015101231, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Mar. 4, 2016, received in Japanese Patent Application No. 2015-511644, which corresponds with U.S. Appl. No. 14/536,426, 3 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Office Action, dated May 4, 2017, received in Chinese Patent Application No. 201380068414.1, which corresponds with U.S. Appl. No. 14/608,926, 5 pages.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.

Office Action, dated Nov. 11, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Office Action, dated May 12, 2016, received in Korean Patent Application No. 10-2015-7018853, which corresponds with U.S. Appl. No. 14/608,926, 4 pages.
Notice of Allowance, dated Mar. 31, 2017, received in Korean Patent Application No. 2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Notice of Allowance, dated Jan. 4, 2017, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Office Action, dated Aug. 27, 2015, received in Australian Patent Application No. 2013259614, which corresponds with U.S. Appl. No. 14/536,141, 4 pages.
Notice of Allowance, dated Aug. 15, 2016, received in Australian Patent Application No. 2013259614, which corresponds with U.S. Appl. No. 14/536,141, 1 page.
Office Action, dated Jan. 7, 2016, received in European Patent Application No. 13726053.5, which corresponds with U.S. Appl. No. 14/536,141, 10 pages.
Office Action, dated Aug. 31, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Office Action, dated Jan. 29, 2016, received in Australian Patent Application No. 2013368443, which corresponds with U.S. Appl. No. 14/608,942, 3 pages.

(56) References Cited

OTHER PUBLICATIONS

Notice of Allowance, dated Mar. 11, 2016, received in Australian Patent Application No. 2013368443, which corresponds with U.S. Appl. No. 14/608,942, 2 pages.

Certificate of Grant, dated Jul. 7, 2016, received in Australian Patent Application No. 2013368443, which corresponds with U.S. Appl. No. 14/608,942, 3 pages.

Office Action, dated Mar. 29, 2017, received in Australian patent Application No. 2016201303, which corresponds with U.S. Appl. No. 14/608,942, 3 pages.

Office Action, dated Oct. 7, 2016, received in European Patent Application No. 13798464.7, which corresponds with U.S. Appl. No. 14/608,942, 7 pages.

Office Action, dated Jul. 4, 2016, received in Japanese Patent Application No. 2015-549393, which corresponds with U.S. Appl. No. 14/608,942, 4 pages.

Office Action, dated Apr. 5, 2016, received in Korean Patent Application No. 2015-7018448, which corresponds with U.S. Appl. No. 14/608,942, 6 pages.

Office Action, dated Feb. 24, 2017, received in Korean Patent Application No. 2015-7018448, which corresponds with U.S. Appl. No. 14/608,942, 4 pages.

Office Action, dated Aug. 1, 2016, received in U.S. Appl. No. 14/536,203, 14 pages.

Notice of Allowance, dated Feb. 1, 2017, received in U.S. Appl. No. 14/536,203, 9 pages.

Office Action, dated Jul. 9, 2015, received in Australian Patent Application No. 2013259630, which corresponds with U.S. Appl. No. 14/536,203, 3 pages.

Notice of Allowance, dated Jun. 15, 2016, received in Australian Patent Application No. 2013259630, which corresponds with U.S. Appl. No. 14/536,203, 3 pages.

Certificate of Grant, dated Oct. 21, 2016, received in Australian Patent Application No. 2013259630, which corresponds with U.S. Appl. No. 14/536,203, 3 pages.

Office Action, dated Nov. 11, 2015, received in European Patent Application No. 13724104.8, which corresponds with U.S. Appl. No. 14/536,203, 5 pages.

Office Action, dated May 31, 2016, received in European Patent Application No. 13724104.8, which corresponds with U.S. Appl. No. 14/536,203, 5 pages.

Office Action, dated Feb. 15, 2016, received in Japanese Patent Application No. 2015-511650, which corresponds with U.S. Appl. No. 14/536,203, 5 pages.

Notice of Allowance, dated Aug. 5, 2016, received in Japanese Patent Application No. 2015-511650, which corresponds with U.S. Appl. No. 14/536,203, 4 pages.

Certificate of Patent, dated Sep. 9, 2016, received in Japanese Patent Application No. 2015-511650, which corresponds with U.S. Appl. No. 14/536,203, 3 pages.

Office Action, dated Dec. 4, 2015, received in Korean Patent Application No. 2014-7034520, which corresponds with U.S. Appl. No. 14/536,203, 4 pages.

Notice of Allowance, dated Sep. 1, 2016, received in Korean Patent Application No. 2014-7034520, which corresponds with U.S. Appl. No. 14/536,203, 5 pages.

Office Action, dated Feb. 6, 2017, received in Korean Patent Application No. 2016-7033834, which corresponds with U.S. Appl. No. 14/536,203, 4 pages.

Office Action, dated Jul. 22, 2016, received in European Office Action No. 13798465.4, which corresponds with U.S. Appl. No. 14/608,965, 8 pages.

Office Action, dated Oct. 20, 2016, received in U.S. Appl. No. 14/536,247, 10 pages.

Final Office Action, dated Mar. 24, 2017, received in U.S. Appl. No. 14/536,247, 14 pages.

Office Action, dated Mar. 24, 2017, received in U.S. Appl. No. 14/536,267, 12 pages.

Office Action, dated Aug. 10, 2015, received in Australian Patent Application No. 2013259637, which corresponds with U.S. Appl. No. 14/536,267, 3 pages.

Notice of Allowance, dated Jun. 28, 2016, received in Australian Patent Application No. 2013259637, which corresponds with U.S. Appl. No. 14/536,267, 3 pages.

Certificate of Grant, dated Oct. 21, 2016, received in Australian Patent Application No. 2013259637, which corresponds with U.S. Appl. No. 14/536,267, 3 pages.

Office Action, dated Mar. 24, 2017, received in Australian Patent Application No. 2016204411, which corresponds with U.S. Appl. No. 14/536,267, 3 pages.

Office Action, dated Dec. 9, 2016, received in Chinese Patent Application No. 2016120601564130, which corresponds with U.S. Appl. No. 14/536,267, 4 pages.

Office Action, dated Jan. 29, 2016, received in Japanese Patent Application No. 2015-511652, which corresponds with U.S. Appl. No. 14/536,267, 3 pages.

Notice of Allowance, dated Sep. 26, 2016, received in Japanese Patent Application No. 2015-511652, which corresponds with U.S. Appl. No. 14/536,267, 5 pages.

Office Action, dated Mar. 3, 2017, received in Japanese Patent Application No. 2016-125839, which corresponds with U.S. Appl. No. 14/536,267, 6 pages.

Office Action, dated Dec. 4, 2015, received in Korean Patent Application No. 2014-7034530, which corresponds with U.S. Appl. No. 14/536,267, 3 pages.

Notice of Allowance, dated Sep. 1, 2016, received in Korean Patent Application No. 2014-7034530, which corresponds with U.S. Appl. No. 14/536,267, 3 pages.

Office Action, dated Jan. 5, 2017, received in Korean Patent Application No. 2016-7029533, which corresponds with U.S. Appl. No. 14/536,267, 2 pages.

Office Action, dated Apr. 7, 2017, received in U.S. Appl. No. 14/536,291, 11 pages.

Office Action, dated Aug. 18, 2015, received in Australian Patent Application No. 2013259642, which corresponds with U.S. Appl. No. 14/536,291, 3 pages.

Office Action, dated Jul. 25, 2016, received in Australian Patent Application No. 2013259642, which corresponds with U.S. Appl. No. 14/536,291, 3 pages.

Office Action, dated Aug. 10, 2016, received in Australian Patent Application No. 2013259642, which corresponds with U.S. Appl. No. 14/536,291, 4 pages.

Innovation Patent, dated Sep. 1, 2016, received in Australian Patent Application No. 2016101481, which corresponds with U.S. Appl. No. 14/536,291, 1 page.

Office Action, dated Sep. 29, 2016, received in Australian Patent Application No. 2016101481, which corresponds with U.S. Appl. No. 14/536,291, 3 pages.

Office Action, dated Jan. 7, 2016, received in European Patent Application No. 13724107.1, which corresponds with U.S. Appl. No. 14/536,291, 11 pages.

Office Action, dated Aug. 22, 2016, received in European Patent Application No. 13724107.1, which corresponds with U.S. Appl. No. 14/536,291, 7 pages.

Office Action, dated Mar. 23, 2017, received in European Patent Application No. 13724107.1, which corresponds with U.S. Appl. No. 14/536,291, 8 pages.

Office Action, dated Mar. 8, 2016, received in Japanese Paten Application No. 2015-511655, which corresponds with U.S. Appl. No. 14/536,291, 4 pages.

Final Office Action, dated Dec. 22, 2016, received in Japanese Patent Application No. 2015-511655, which corresponds with U.S. Appl. No. 14/536,291, 3 pages.

Office Action, dated Jan. 15, 2016, received in Australian Patent Application No. 2013368445, which corresponds with U.S. Appl. No. 14/608,985, 3 pages.

Notice of Allowance, dated Jan. 18, 2017, received in Australian Patent Application No. 2013368445, which corresponds with U. S. Appl. No. 14/608,985, 3 pages.

(56) References Cited

OTHER PUBLICATIONS

Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Office Action, dated Apr. 25, 2016, received in Japanese Patent Application No. 2015-550384, which corresponds with U.S. Appl. No. 14/608,985, 4 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Office Action, dated Mar. 31, 2016, received in U.S. Appl. No. 14/864,737, 17 pages.
Notice of Allowance, dated Feb. 27, 2017, received in U.S. Appl. No. 14/864,737, 9 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14,866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Danish Patent Application No. 201500588, which corresponds with U.S. Appl. No. 14/868,078, 9 pages.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Office Action, dated Aug. 19, 2016, received in U.S. Appl. No. 14/291,880, 19 pages.
Notice of Allowance, dated Jan. 10, 2017, received in U.S. Appl. No. 14/291,880, 8 pages.

(56) References Cited

OTHER PUBLICATIONS

Patent, dated Aug. 8, 2016, received in Australian Patent Application 2016100653, corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Notice of Allowance, dated Apr. 27, 2017, received in U.S. Appl. No. 16/866,489, 27 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Apr. 13, 2017, received in U.S. Appl. No. 14/866,992, 34 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated May 2, 2017, received in U.S. Appl. No. 14/856,517, 34 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Office Action, dated Mar. 31, 2017, received in U.S. Appl. No. 14/857,700, 14 pages.
Office Action, dated Jan. 25, 2016, received in U.S. Appl. No. 14,864,580, 29 pages.
Notice of Allowance, dated May 23, 2016, received in U.S. Appl. No. 14/864,580, 9 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action (Search Report), dated Apr. 8, 2016, received in Danish Patent Application No. 201500584, which corresponds with U.S. Appl. No. 14/864,580, 9 pages.
Office Action, dated Oct. 7, 2016, received in Danish Patent Application No. 201500584, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Office Action, dated Apr. 19, 2016, received in U.S. Appl. No. 14/864,627, 9 pages.
Notice of Allowance, dated Jan. 31, 2017, received in U.S. Appl. No. 14/864,627, 7 pages.
Office Action (Search Report), dated Apr. 8, 2016, received in Danish Patent Application No. 201500585, which corresponds with U.S. Appl. No. 14/864,627, 9 pages.
Office Action, dated Oct. 7, 2016, received in Danish Patent Application No. 201500584, which corresponds with U.S. Appl. No. 14/864,627, 3 pages.
Office Action, dated May 4, 2017, received in Danish Patent Application No. 201500585, which corresponds with U.S. Appl. No. 14/864,627, 4 pages.

(56) References Cited

OTHER PUBLICATIONS

Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Certificate of Examination, dated Dec. 8, 2016, received in Australian Patent Application No. 2016100292, which corresponds with U.S. Appl. No. 14/866,361, 1 page.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action (Search Report), dated Apr. 7, 2016, received in Danish Patent Application No. 201500579, which corresponds with U.S. Appl. No. 14/866,361, 10 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action and Search Report, dated Mar. 22, 2016, received in Danish Patent Application No. 201500587, which corresponds with U.S. Appl. No. 14/866,987, 8 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Office Action, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Certificate of Exam, dated Jul. 21, 2016, received in Australian Patent Application No. 2016100652, which corresponds with U.S. Appl. No. 14/866,989, 1 page.
Office Action and Search Report, dated Apr. 1, 2016, received in Danish Patent Application No. 201500589, which corresponds with U.S. Appl. No. 14/866,989, 8 pages.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action (Search Report), dated Apr. 8, 2016, received in Danish Patent Application No. 201500595, which corresponds with U.S. Appl. No. 14/871,236, 12 pages.
Office Action and Search Report, dated May 26, 2016, received in Danish Patent Application No. 201500595, which corresponds with U.S. Appl. No. 14/871,236, 14 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action and Search Report, dated Apr. 6, 2016, received in Danish Patent Application No. 201500596, which corresponds with U.S. Appl. No. 14/870,882, 7 pages.
Office Action and Search Report, dated Jun. 9, 2016, received in Danish Patent Application No. 201500596, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Intention to Grant, dated Apr. 7, 2016, received in Danish Patent Application No. 201500597, which corresponds with U.S. Appl. No. 14/871,227, 7 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Mar. 24, 2017, received in Japanese Patent Application No. 2016-533201, which corresponds with U.S. Appl. No. 14/871,227, 6 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action (Search Report), dated Apr. 18, 2016, received in Danish Patent Application No. 201500601, which corresponds with U.S. Appl. No. 14/871,336, 8 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Innovation Patent, dated Aug. 25, 2016, received in Australian Patent Application No. 2016101435, which corresponds with U.S. Appl. No. 14/871,462, 1 page.

(56) References Cited

OTHER PUBLICATIONS

Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Intention to Grant, dated Apr. 18, 2016, received in Danish Patent Application No. 201500600, which corresponds with U.S. Appl. No. 14/871,462, 7 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Office Action, dated Apr. 29, 2016, received in U.S. Appl. No. 14/867,823, 28 pages.
Final Office Action, dated Sep. 28, 2016, received in U.S. Appl. No. 14/867,823, 31 pages.
Office Action and Search Report, dated Mar. 18, 2016, received in Danish Patent Application No. 201500594, which corresponds with U.S. Appl. No. 14/867,823, 10 pages.
Office Action, dated Sep. 7, 2016, received in Danish Patent Application No. 201500594, which corresponds with U.S. Appl. No. 14/867,823, 4 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, dated Mar. 21, 2016, received in Danish Patent Application No. 201500598, which corresponds with U.S. Appl. No. 14/867,892, 9 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action (Search Report), dated Mar. 18, 2016, received in Danish Patent Application No. 201500581, which corresponds with U.S. Appl. No. 14/867,990, 9 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Final Office Action, dated May 1, 2017, received in U.S. Appl. No. 15/136,782, 18 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action and Search Report, dated Oct. 12, 2016, received in Danish Patent Application No. 201670593, which corresponds with U.S. Appl. No. 15/231,745, 7 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.

(56) References Cited

OTHER PUBLICATIONS

International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Extended European Search Report, dated Oct. 7, 2016, received in European Patent Application No. 16177863.4, which corresponds with U.S. Appl. No. 14/536,267, 12 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.

International Preliminary Report on Patentability, dated Jun. 30, 2015, received in International Patent Application No. PCT/US2013/069489, which corresponds with U.S. Appl. No. 14/609,006, 10 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Azundris, "A Fire in the Sky," http://web.archive.org/web/20140722062639/http://blog.azundrix.com/archives/168-A-fire-in-the-sky.html, Jul. 22, 2014, 8 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.

(56) References Cited

OTHER PUBLICATIONS

Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Boring, "The Fat Thumb: Using the Thumb's Contact Size for Single-Handed Mobile Interaction", https://www.youtube.com/watch?v=E9vGU5R8nsc&feature=youtu.be, Jun. 14, 2012, 2 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gestures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
Gurman, "Force Touch on iPhone 6S Revealed: Expect Shortcuts, Faster Actions, iOS", 9To5Mac Aug. 10, 2015, 31 pages.
IBM et al., "Pressure-Sensitive Icons", IBM Technical Disclosure Bulletin, vol. 33, No. 1B, Jun. 1, 1990, 3 pages.
ICIMS Recruiting Software, "Blackberry Playbook Review," http://www.tested.com/tech.tablets/5749-blackberry-playbook-review/, 2015, 11 pages.
IPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kost, "LR3—Deselect All Images But One", Julieanne Kost's Blog, blogs.adobe.com/jkost/2011/12/lr3-deselect-all-images-but-one.html, Dec. 22, 2011, 1 page.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Lumia—How to Personalize Your Start Screen", https://www.youtube.com/watch?v=6GI5Z3TrSEs, Nov. 11, 2014, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics The Sandpaper System for Synthesizing Texture for a Force-Feedback Display," Massachusetts Institute of Technology, Jun. 1978, 217 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floarting Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
O'Hara, et al., "Pressure-Sensitive Icons", ip.com Journal, ip.com Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technologies Pre-Event Buffer & Fail Safe Feature," http://www.policeone.com/police-products/police-technology/mobile-computures/videos/595587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/201005013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interast Group on Design, Nov. 23, 2009, ACM Press. vol. 411, 8 pages.

(56) References Cited

OTHER PUBLICATIONS

Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Rekimoto, et al., "SmartPad: A Finger-Sensing Keypad for Mobile Interaction", CHI 2003, Ft. Lauderdale, Florida, ACM 1-58113-637—Apr. 5-10, 2003, 2 pages.
Roth et al., "Bezel Swipe: Conflict-Free Scrolling and Miltiple Selection on Mobile Touch Screen Devices," Chi 2009, Boston, Massachusetts, USA, Apr. 4-9, 2009, 4 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
Wilson, et al., "Augmenting Tactile Interaction with Pressure-Based Input", School of Computing Science, Glasgow, UK, Nov. 15-17, 2011, 2 pages.
YouTube, "Blackberry Playbook bezel interaction," https://www.youtube.com/watch?v=YGkzFqnOwXI, Jan. 10, 2011, 2 pages.
Zylom, "House Secrets", http://game.zylom.com/servlet/Entry?g=38&s=19521&nocache=1438641323066, Aug. 3, 2015, 1 page.
Easton-Ellett, "Three Free Cydia Utilities to Remove iOS Notification Badges", http://www.ijailbreak.com/cydia/three-free-cydia-utilies-to-remove-ios-notification-badges, Apr. 14, 2012, 2 pages.
IPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mandi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Office Action, dated Mar. 9, 2008, received in European Patent Application No. 13795391.5, which corresponds with U.S. Appl. No. 14/536,426, 4 pages.
Notice of Allowance, dated May 16, 2018, received in U.S. Appl. No. 14/536,367, 5 pages.
Office Action, dated May 8, 2018, received in Australian Patent Application No. 2016216580, which corresponds with U.S. Appl. No. 14/536,426, 5 pages.
Notice of Allowance, dated May 10, 2018, received in Chinese Patent Application No. 201380035982.1, which corresponds with U.S. Appl. No. 14/536,426, 2 pages.
Intention to Grant, dated Mar. 9, 2018, received in European Patent Application No. 15183980.0, which corresponds with U.S. Appl. No. 14/536,426, 5 pages.
Final Office Action, dated May 3, 2018, received in U.S. Appl. No. 14/536,644, 28 pages.
Certificate of Grant, dated May 3, 2018, received n Australian Patent Application No. 2016201451, which corresponds with U.S. Appl. No. 14/608,926, 1 page.
Patent, dated May 4, 2018, received in Chinese Patent Application No. 201380068414.1, which corresponds with U.S. Appl. No. 14/608,926, 4 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Apr. 4, 2018, received in Chinese Patent Application No. 201380035977.0, which corresponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.
Oral Proceedings, dated Mar. 7, 2018, received in European Office Action No. 13798465.4, which corresponds with U.S. Appl. No. 14/608,965, 5 pages.
Patent, dated Apr. 20, 2018, received in Chinese Patent Application No. 201380035968.1, which corresponds with U.S. Appl. No. 14/536,267, 4 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Notice of Allowance, dated May 18, 2018, received in U.S. Appl. No. 14/866,159, 8 pages.
Notice of Allowance, dated Mar. 21, 2018, received in Danish Patent Application No. 201500574, which corresponds with U.S. Appl. No. 14/866,159, 2 pages.
Office Action, dated Apr. 25, 2018, received in European Patent Application No. 16708916.8, which corresponds with U.S. Appl. No. 14/868,078, 6 pages.
Notice of Allowance, dated Apr. 24, 2018, received in Danish Patent Application No. 201500592, which corresponds with U.S. Appl. No. 14/869,899, 2 pages.

(56) References Cited

OTHER PUBLICATIONS

Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Office Action, dated Mar. 13, 2018, received in U.S. Appl. No. 15/009,688, 10 pages.
Notice of Allowance, dated May 2, 2018, received in U.S. Appl. No. 14/856,519, 10 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Notice of Allowance, dated Mar. 16, 2018, received in Danish Patent Application No. 201500579, which corresponds with U.S. Appl. No. 14/866,361, 2 pages.
Office Action, dated May 7, 2018, received in European Patent Application No. 16189421.7, which corresponds with U.S. Appl. No. 14/866,987, 5 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Patent, dated Mar. 9, 2018, received in Japanese Patent Application No. 2016233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.
Final Office Action, dated Mar. 9, 2018, received in U.S. Appl. No. 14/870,754, 19 pages.
Final Office Action, dated Apr. 20, 2018, received in U.S. Appl. No. 14/870,882, 7 pages.
Final Office Action, dated Mar. 15, 2018, received in U.S. Appl. No. 14/871,336, 23 pages.
Office Action, dated Apr. 2, 2018, received in Japanese Patent Application No. 2018020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Notice of Allowance, dated Mar. 30, 3018, received in U.S. Appl. No. 14/867,990, 5 pages.
Office Action, dated Apr. 19, 2018, received in U.S. Appl. No. 14/869,703, 19 pages.
Office Action, dated May 4, 2018, received in Australian Patent Application No. 2018202855, which corresponds with U.S. Appl. No. 15/136,782, 3 pages.
Notice of Allowance, dated Mar. 19, 2018, received in Danish Patent Application No. 201770190, which corresponds with U.S. Appl. No. 15/136,782, 2 pages.
Office Action, dated Apr. 11, 2018, received in Danish Patent Application No. 201670591, which corresponds with U.S. Appl. No. 15/231,745, 3 pages.
Notice of Allowance, dated Mar. 27, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Apr. 23, 2018, received in U.S. Appl. No. 15/499,691, 29 pages.
Final Office Action, dated May 10, 2018, received in U.S. Appl. No. 15/655,749, 19 pages.
Extended European Search Report, dated Mar. 2, 2018, received in European Patent Application No. 17206374.5, which corresponds with U.S. Appl. No. 15/272,343, 11 pages.
MacKenzie et al., "The Tactile Touchpad", Chi '97 Extended Abstracts on Human Factors in Computing Systems Looking to the Future, Chi '97, Mar. 22, 1997, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Android Lollipop Lock-Screen Notification Tips", https://www.youtube.com/watch?v=LZTxHBOwzIU, Nov. 13, 2014, 3 pages.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671, 21 pages.
Final Office Action, dated Feb. 22, 2018, received in U.S. Appl. No. 14/608,895, 20 pages.
Final Office Action, dated Feb. 26, 2018, received in U.S. Appl. No. 14/536,235, 13 pages.
Notice of Allowance, dated Nov. 30, 2017, received in U.S. Appl No. 14/536,367, 9 pages.
Certificate of Grant, dated Nov. 10, 2017, received in Hong Kong Patent Application No. 15107535.0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Office Action, dated Feb. 12, 2018, received in U.S. Appl. No. 14/536,464, 33 pages.
Notice of Acceptance, dated Dec. 20, 2017, received in Australian Patent Application No. 2016201451, which corresponds with U.S. Appl. No. 14/608,926, 3 pages.
Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Notice of Allowance, dated Dec. 29, 2017, received in Korean Patent Application No. 2017-7018250, which corresponds with U.S. Appl. No. 14/608,926, 3 pages.
Office Action, dated Feb. 2, 2018, received in Chinese Patent Application No. 201380035893.7, which corresponds with U.S. Appl. No. 14/536,141, 5 pages.
Notice of Allowance, dated Feb. 28, 2018, received in U.S. Appl. No. 14/536,166, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Notice of Allowance, dated Nov. 22, 2017, received in U.S. Appl. No. 14/536,247, 6 pages.
Notice of Acceptance, dated Feb. 27, 2018, received in Australian Patent Application No. 2016204411, which corresponds with U.S. Appl. No. 14/536,267, 3 pages.
Notice of Allowance, dated Jan. 29, 2018, received in Chinese Patent Application No. 201380035968.1, which corresponds with U.S. Appl. No. 14/536,267, 3 pages.

(56) References Cited

OTHER PUBLICATIONS

Office Action, dated Jan. 25, 2018, received in European Patent Application No. 13724106.3, which corresponds with U.S. Appl. No. 14/536,267, 5 pages.

Notice of Allowance, dated Nov. 17, 2017, received in Japanese Patent Application No. 2016-125839, which corresponds with U.S. Appl. No. 14/536,267, 5 pages.

Patent, dated Dec. 1, 2017, received in Korean Patent Application No. 2016-7029533, which corresponds with U.S. Appl. No. 14/536,267, 2 pages.

Notice of Allowance, dated Dec. 1, 2017, received in U.S. Appl. No. 14/536,291, 19 pages.

Patent, dated Dec. 8, 2017, received in Chinese Patent Application No. 201380068399.0, which corresponds with U.S. Appl. No. 14/608,985, 4 pages.

Patent, dated Dec. 19, 2017, received in Korean Patent Application No. 2015-7019984, which corresponds with U.S. Appl. No. 14/608,985, 3 pages.

Office Action, dated Feb. 14, 2018, received in Korean Patent Application No. 2017-7030129, which corresponds with U.S. Appl. No. 14/864,737, 17 pages.

Patent, Nov. 16, 2017, received in Dutch Patent Application No. 2016375, which corresponds with U.S. Appl. No. 14/866,981, 2 pages.

Office Action, dated Dec. 15, 2017, received in U.S. Appl. No. 14/866,159, 35 pages.

Office Action, dated Jan. 10, 2018, received in Danish Patent Application No. 201500574, which corresponds with U.S. Appl. No. 14/866,159, 2 pages.

Certificate of Grant, dated Jan. 3, 2018, received in Australian Patent Application No. 2016229421, which corresponds with U.S. Appl. No. 14/868,078, 1 page.

Office Action, dated Nov. 24, 2017, received in European Patent Application No. 16727900.9, which corresponds with U.S. Appl. No. 14/866,511, 5 pages.

Office Action, dated Jan. 29, 2018, received in Danish Patent Application No. 201500592, which corresponds with U.S. Appl. No. 14/869,899, 2 pages.

Office Action, dated Dec. 14, 2017, received in Danish Patent Application No. 201670594, which corresponds with U.S. Appl. No. 14/869,899, 3 pages.

Office Action, dated Jan. 29, 2018, received in U.S. Appl. No. 14/866,992, 44 pages.

Office Action, dated Jan. 19, 2018, received in Australian Patent Application No. 201761478, which corresponds with U.S. Appl. No. 14/866,992, 6 pages.

Office Action, dated Feb. 12, 2018, received in U.S. Appl. No. 15/009,661, 36 pages.

Office Action, dated Jan. 18, 2018, received in U.S. Appl. No. 15/009,676, 21 pages.

Notice of Allowance, dated Jan. 31, 2018, received in U.S. Appl. No. 14/856,519, 9 pages.

Final Office Action, dated Nov. 16, 2017, received in U.S. Appl. No. 14/856,520, 41 pages.

Notice of Allowance, dated Feb. 9, 2018, received in U.S. Appl. No. 14/856,522, 9 pages.

Office Action, dated Nov. 30, 2017, received in U.S. Appl. No. 14/857,636, 19 pages.

Office Action, dated Jan. 17, 2018, received in Australian Patent Application No. 2017202816, which corresponds with U.S. Appl. No. 14/857,636, 3 pages.

Office Action, dated Dec. 1, 2017, received in U.S. Appl. No. 14/857,663, 15 pages.

Notice of Allowance, dated Feb. 12, 2018, received in U.S. Appl. No. 14/857,700, 13 pages.

Office Action, dated Dec. 15, 2017, received in Danish Patent Application No. 201500584, which corresponds with U.S. Appl. No. 14/864,580, 4 pages.

Office Action, dated Dec. 15, 2017, received in Danish Patent Application No. 201500585, which corresponds with U.S. Appl. No. 14/864,627, 5 pages.

Office Action, dated Jan. 4, 2018, received in Danish Patent Application No. 201500579, which corresponds with U.S. Appl. No. 14/866,361, 2 pages.

Office Action, dated Jan. 22, 2018, received in U.S. Appl. No. 14/866,987, 22 pages.

Office Action, dated Nov. 29, 2017, received in U.S. Appl. No. 14/866,989, 31 pages.

Office Action, dated Feb. 26, 2018, received in Australian Patent Application No. 2017201079, which corresponds with U.S. Appl. No. 14/866,989, 6 pages.

Notice of Allowance, dated Feb. 5, 2018, received in Japanese Patent Application No. 2016-233450, which corresponds with U.S. Appl. No. 14/866,989, 5 pages.

Office Action, dated Jan. 29, 2018, received in Danish Patent Application No. 201500595, which corresponds with U.S. Appl. No. 14/871,236, 2 pages.

Patent, dated Jan. 29, 2018, received in Danish Patent Application No. 201500596, which corresponds with U.S. Appl. No. 14/870,882, 4 pages.

Final Office Action, dated Feb. 16, 2018, received in U.S. Appl. No. 14/870,988, 18 pages.

Office Action, dated Nov. 22, 2017, received in U.S. Appl. No. 14/871,227, 24 pages.

Notice of Allowance, dated Jan. 4, 2018, received in Japanese Patent Application No. 2016-533201, which corresponds with U.S. Appl. No. 14/871,227, 4 pages.

Patent, dated Feb. 9, 2018, received in Japanese Patent Application No. 2016-533201, which corresponds with U.S. Appl. No. 14/871,227, 4 pages.

Office Action, dated Feb. 20, 2018, received in Korean Patent Application No. 2016-7019816 with corresponds with U.S. Appl. No. 14/871,227, 8 pages.

Patent, dated Oct. 30, 2017, Danish Patent Application No. 201500601, which corresponds with U.S. Appl. No. 14/871,336, 5 pages.

Office Action, dated Nov. 13, 2017, received in Japanese Patent Application No. 2016-183289, which corresponds with U.S. Appl. No. 14/871,462, 5 pages.

Final Office Action, dated Nov. 29, 2017, received in U.S. Appl. No. 14/867,823, 47 pages.

Office Action, dated Jan. 23, 2018, received in Danish Patent Application No. 201500594, which corresponds with U.S. Appl. No. 14/867,823, 8 pages.

Final Office Action, dated Dec. 14, 2017, received in U.S. Appl. No. 14/867,892, 53 pages.

Notice of Allowance, dated Jan. 26, 2018, received in Danish Patent Application No. 201500598, which corresponds with U.S. Appl. No. 14/867,892, 2 pages.

Office Action, dated Feb. 28, 2018, received in U.S. Appl. No. 14/869,261, 26 pages.

Office Action, dated Jan. 23, 2018, received in U.S. Appl. No. 14/869,855, 24 pages.

Office Action, dated Jan. 18, 2018, received in U.S. Appl. No. 14/869,873, 25 pages.

Office Action, dated Jan. 11, 2018, received in U.S. Appl. No. 14/869,997, 17 pages.

Notice of Allowance, dated Jan. 17, 2018, received in U.S. Appl. No. 14/867,990, 12 pages.

Office Action, dated Feb. 19, 2018, received in Danish Patent Application No. 201500581, which corresponds with U.S. Appl. No. 14/867,990, 4 pages.

Office Action, dated Dec. 12, 2017, received in U.S. Appl. No. 15/009,668, 32 pages.

Notice of Allowance, dated Dec. 4, 2017, received in U.S. Appl. No. 15/081,771, 10 pages.

Office Action, dated Feb. 1, 2018, received in Australian Patent Application No. 2017202058, which corresponds with U.S. Appl. No. 15/081,771, 4 pages.

Office Action, dated Jan. 26, 2018, received in Japanese Patent Application No. 2017-086460, which corresponds with U.S. Appl. No. 15/081,771, 6 pages.

(56) References Cited

OTHER PUBLICATIONS

Office Action, dated Jan. 8, 2018, received in Danish Patent Application No. 201770190, which corresponds with U.S. Appl. No. 15/136,782, 2 pages.
Office Action, dated Feb. 22, 2018, received in Danish Patent Application No. 201670587, which corresponds with U.S. Appl. No. 15/231,745, 4 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Office Action, dated Feb. 7, 2018, received in Danish Patent Application No. 201770709, 2 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Oh, et al., "Moving Objects with 2D Input Devices in CAD Systems and Destop Virtual Environments", Proceedings of Graphics Interface 2005, 8 pages, May 2005.
Stewart, et al., "Characteristics of Pressure-Based Input for Mobile Devices", Proceedings of the SIGCHI Conference on Human Factors in Computing Systems, Apr. 2010, 10 pages.
Notice of Allowance, dated Jun. 26, 2018, received in U.S. Appl. No. 14/608,895, 9 pages.
Intention to Grant, dated Jul. 6, 2018, received in European Patent Application No. 13795391.5, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Final Office Action, dated Jun. 22, 2018, received in U.S. Appl. No. 14/536,464, 32 pages.
Final Office Action, dated Jun. 6, 2018, received in U.S. Appl. No. 14/608,926, 19 pages.
Patent, dated Apr. 27, 2018, received in Japanese Patent Application No. 2017-024234, which corresponds with U.S. Appl. No. 14/608,926, 3 pages.
Notice of Allowance, dated Aug. 9, 2018, received in U.S. Appl. No. 14/536,646, 5 pages.
Notice of Acceptance, dated Jul. 19, 2018, received in Australian Patent Application No. 2016262773, which corresponds with U.S. Appl. No. 14/536,141, 3 pages.
Certificate of Grant, dated Jul. 5, 2018, received in Australian patent Application No. 2016201303, which corresponds with U.S. Appl. No. 14/608,942, 4 pages.
Notice of Acceptance, dated Jul. 19, 2018, received in Australian Patent Application No. 2016238917, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office Action, dated Jul. 2, 2018, received in U.S. Appl. No. 14/608,965, 16 pages.
Office action, dated Aug. 1, 2018, received in Chinese Patent Application No. 201380074060.1, which corresponds with U.S. Appl. No. 14/608,965, 5 pages.
Notice of Allowance, dated Jun. 1, 2018, received in U.S. Appl. No. 14/536,267, 5 pages.
Certificate of Grant, dated Jun. 28, 2018, received in Australian Patent Application No. 2016204411, which corresponds with U.S. Appl. No. 14/536,267, 4 pages.
Office Action, dated Jun. 13, 2018, received in Chinese Patent Application No. 201810332044.2, which corresponds with U.S. Appl. No. 14/536,267, 2 pages.
Intention to Grant, dated Jun. 27, 2018, received in European Patent Application No. 13724106.3, which corresponds with U.S. Appl. No. 14/536,267, 5 pages.
Notice of Allowance, dated Mar. 20, 2018, received in U.S. Appl. No. 14/536,291, 5 pages.
Notice of Acceptance, dated Jul. 19, 2018, received in Australian Patent Application No. 2016216658, which corresponds with U.S. Appl. No. 14/536,291, 3 pages.
Office Action, dated Jun. 29, 2018, received in Japanese Patent Application No. 2017-083027, which corresponds with U.S. Appl. No. 14/536,291, 5 pages.
Notice of Allowance, dated Apr. 20, 2018, received in U.S. Appl. No. 14/608,985, 5 pages.
Certificate of Grant, dated Jun. 29, 2018, received in Hong Kong Patent Application No. 15112851.6, which corresponds with U.S. Appl. No. 14/608,985, 2 pages.
Final Office Action, dated Aug. 7, 2018, received in U.S. Appl. No. 14/536,648, 14 pages.
Notice of Acceptance, dated Jul. 19, 2018, received in Australian Patent Application No. 2016247194, which corresponds with U.S. Appl. No. 14/536,648, 3 pages.
Grant Certificate, dated Apr. 25, 2018, received in European Patent Application No. 16710871.1, which corresponds with U.S. Appl. No. 14/864,737, 2 pages.
Office Action, dated Jun. 5, 2018, received in Chinese Patent Application No. 201610137839.9, which corresponds with U.S. Appl. No. 14/866,159, 11 pages.
Patent, dated May 22, 2018, received in Danish Patent Application No. 201500574, which corresponds with U.S. Appl. No. 14/866,159, 2 pages.
Notice of Allowance, dated May 24, 2018, received in U.S. Appl. No. 14/868,078, 6 pages.
Office Action, dated May 24, 2018, received in European Patent Application No. 16727900.9, which corresponds with U.S. Appl. No. 14/866,511, 7 pages.
Patent, dated May 28, 2018, received in Danish Patent Application No. 201500592, which corresponds with U.S. Appl. No. 14/869,899, 2 pages.
Notice of Allowance, dated Aug. 3, 2018, received in U.S. Appl. No. 15/009,676, 6 pages.
Notice of Allowance, dated Jun. 29, 2018, received in U.S. Appl. No. 14/856,517, 11 pages.
Office Action, dated Jun. 25, 2018, received in Japanese Patent Application No. 2017-029201, which corresponds with U.S. Appl. No. 14/857,636, 4 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Final Office Action, dated Jul. 3, 2018, received in U.S. Appl. No. 14/866,989, 17 pages.
Patent, dated Jun. 18, 2018, received in Danish Patent Application No. 201500595, which corresponds with U.S. Appl. No. 14/871,236, 3 pages.

(56) References Cited

OTHER PUBLICATIONS

Office Action, dated Jul. 19, 2018, received in Russian Patent Application No. 2017131408, which corresponds with U.S. Appl. No. 14/871,236, 8 pages.
Notice of Allowance, dated Jul. 2, 2018, received in U.S. Appl. No. 14/870,754, 9 pages.
Notice of Allowance, dated Jul. 12, 2018, received in U.S. Appl. No. 14/870,882, 5 pages.
Notice of Allowance, dated Jun. 11, 2018, received in U.S. Appl. No. 14/871,227, 11 pages.
Notice of Allowance, dated Aug. 7, 2018, received in U.S. Appl. No. 14/867,823, 8 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.
Notice of Allowance, dated Jul. 30, 2018, received in U.S. Appl. No. 14/869,873, 8 pages.
Final Office Action, dated Jul. 3, 2018, received in U.S. Appl. No. 15/009,668, 19 pages.
Notice of Allowance, dated Jun. 28, 2018, received in Korean Patent Application No. 2017-7014536, which corresponds with U.S. Appl. No. 15/081,771, 4 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018-062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Certificate of Grant, dated Jun. 28, 2018, received in Australian Patent Application No. 2018200705, which corresponds with U.S. Appl. No. 15/272,327, 4 pages.
Notice of Allowance, dated Jul. 30, 2018, received in Japanese Patent Application No. 2018-506989, which corresponds with U.S. Appl. No. 15/272,327, 4 pages.
Certificate of Grant, dated Jun. 28, 2018, received in Australian Patent Application No. 2016304832, which corresponds with U.S. Appl. No. 15/272,345, 4 pages.
Extended European Search Report, dated Jul. 30, 2018, received in European Patent Application No. 18180503.7, which corresponds with U.S. Appl. No. 14/536,426, 7 pages.
International Preliminary Report on Patentability, dated Sep. 12, 2017, received in International Patent Application No. PCT/US2016/021400, which corresponds with U.S. Appl. No. 14/869,899, 39 pages.
International Preliminary Report on Patentability, dated Feb. 13, 2018, received in International Patent Application No. PCT/US2016/046407, which corresponds with U.S. Appl. No. 15/009,688, 20 pages.
Extended European Search Report, dated Aug. 2, 2018, received in European Patent Application No. 18168941.5, which corresponds with U.S. Appl. No. 14/871,236, 11 pages.
Extended European Search Report, dated May 30, 2018, received in European Patent Application No. 18155939.4, which corresponds with U.S. Appl. No. 15/272,327, 8 pages.
Notice of Allowance, dated Sep. 5, 2018, received in U.S. Appl. No. 14/535,671, 5 pages.
Notice of Allowance, dated Aug. 15, 2018, received in U.S. Appl. No. 14/536,235, 5 pages.
Final Office Action, dated Aug. 28, 2018, received in U.S. Appl. No. 14/866,992, 52 pages.
Final Office Action, dated Sep. 19, 2018, received in U.S. Appl. No. 15/009,661, 28 pages.
Notice of Allowance, dated Aug. 16, 2018, received in U.S. Appl. No. 14/857,636, 5 pages.
Notice of Allowance, dated Aug. 16, 2018, received in U.S. Appl. No. 14/857,663, 5 pages.
Notice of Allowance, dated Aug. 27, 2018, received in U.S. Appl. No. 14/870,988, 11 pages.
Office Action, dated Sep. 7, 2018, received in U.S. Appl. No. 14/869,997, 23 pages.
Anonymous, "Android—What Should Status Bar Toggle Button Behavior Be?", https://ux.stackechange.com/questions/34814, Jan. 15, 2015, 2 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
YouTube, "How to Use 3D Touch Multitasking on iPhone", https://www.youtube.com/watch?v=kDq05uRdrCg, Sep. 29, 2015, 1 page.
Patent, dated Aug. 17, 2018, received in Chinese Patent Application No. 201380035982.1, which corresponds with U.S. Appl. No. 14/536,426, 4 pages.
Notice of Allowance, dated Aug. 8, 2018, received in Chinese Patent Application No. 201510566550.4, which corresponds with U.S. Appl. No. 14/536,426, 3 pages.
Intention to Grant, dated Aug. 14, 2018, received in European Patent Application No. 15183980.0, which corresponds with U.S. Appl. No. 14/536,426, 5 pages.
Notice of Allowance, dated Aug. 31, 2018, received in Chinese Patent Application No. 201380035893.7, which corresponds with U.S. Appl. No. 14/536,141, 6 pages.
Office Action, dated Aug. 13, 2018, received in Japanese Patent Application No. 2017-141953, which corresponds with U.S. Appl. No. 14/536,141, 6 pages.
Office Action, dated Aug. 24, 2018, received in Japanese Patent Application No. 2017-113598, which corresponds with U.S. Appl. No. 14/609,042, 6 pages.
Office Action, dated Sep. 11, 2018, received in Chinese Patent Application No. 201610159295.6, which corresponds with U.S. Appl. No. 14/864,737, 6 pages.
Office Action, dated Aug. 20, 2018, received in Chinese Patent Application No. 01610130348.1, which corresponds with U.S. Appl. No. 14/868,078, 6 pages.
Notice of Acceptance, dated Aug. 23, 2018, received in Australian Patent Application No. 2018204611, which corresponds with U.S. Appl. No. 14/869,899, 3 pages.
Office Action, dated Aug. 31, 2018, received in Australian Patent Application No. 2016276030, which corresponds with U.S. Appl. No. 14/864,601, 3 pages.
Extended European Search Report, dated Aug. 17, 2018, received in European Patent Application No. 18175195.9, which corresponds with U.S. Appl. No. 14/869,899, 13 pages.
Extended European Search Report, dated Aug. 24, 2018, received in European Patent Application No. 18171453.6, which corresponds with U.S. Appl. No. 15/136,782, 9 pages.

* cited by examiner

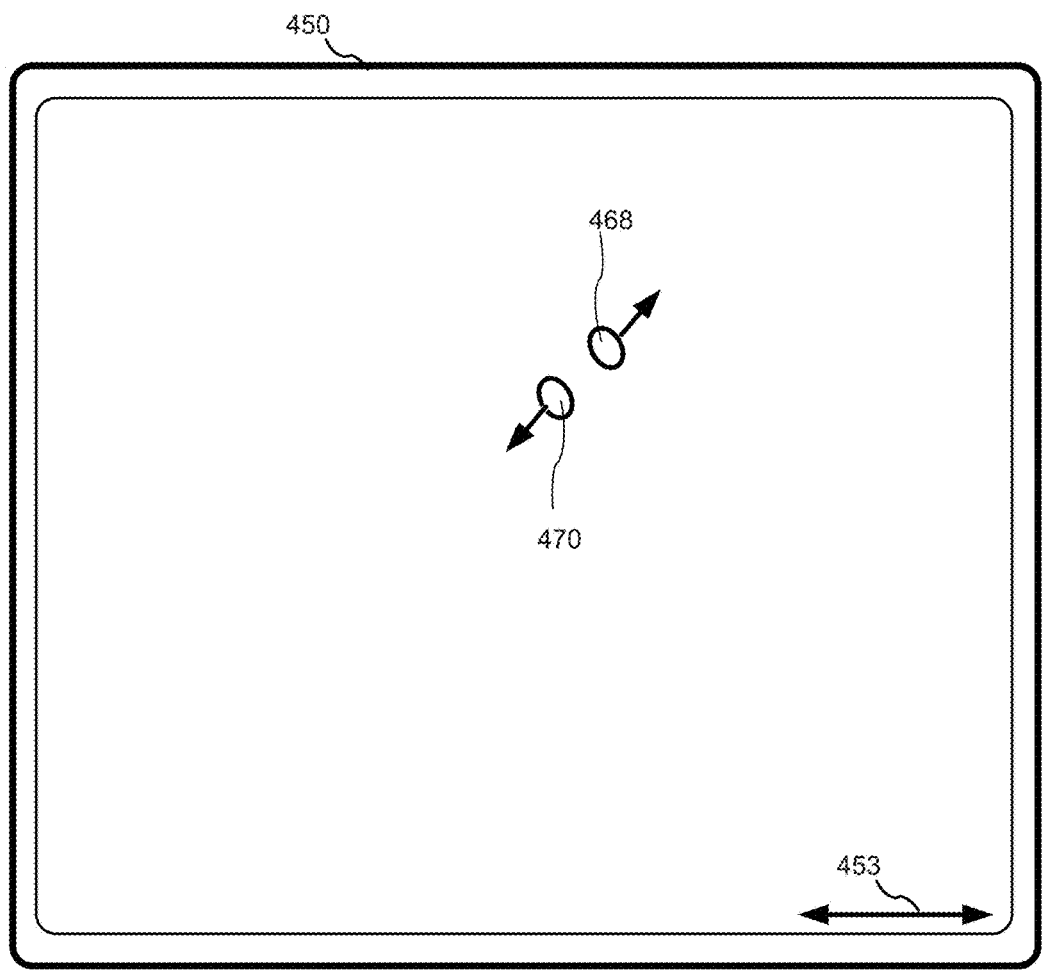
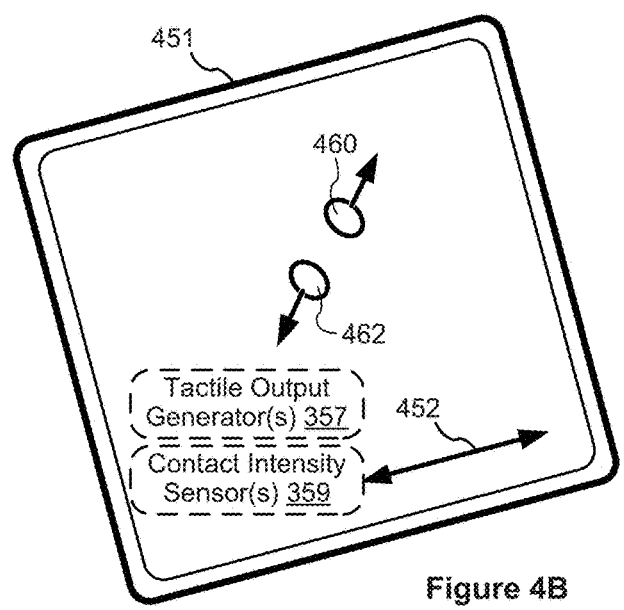
Figure 4B

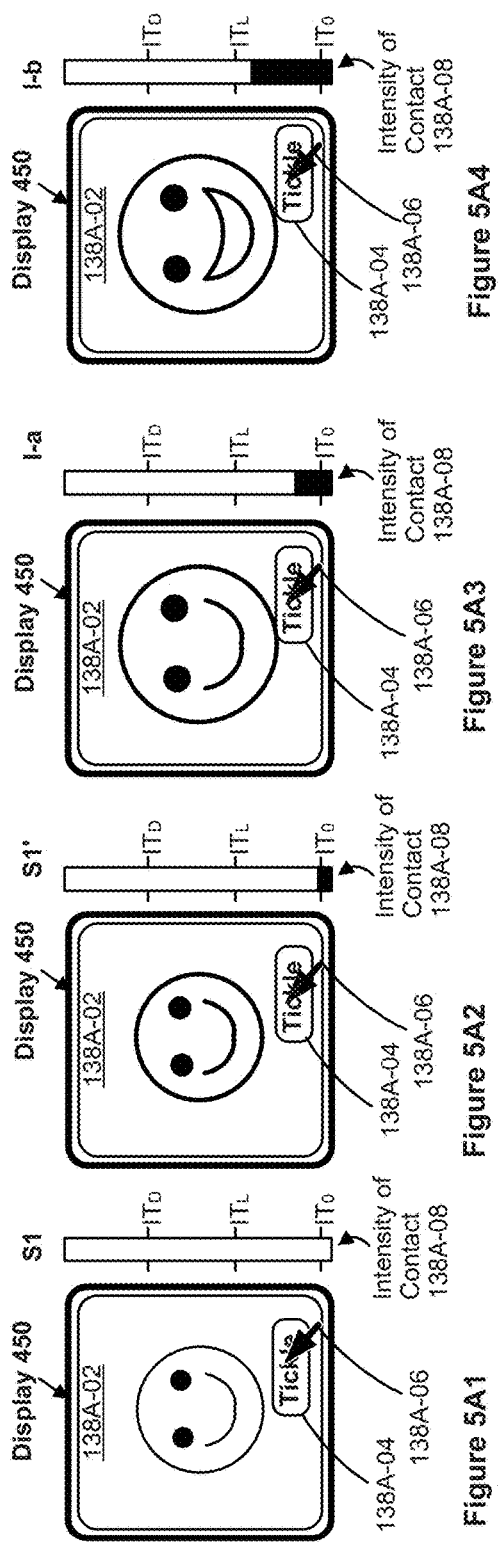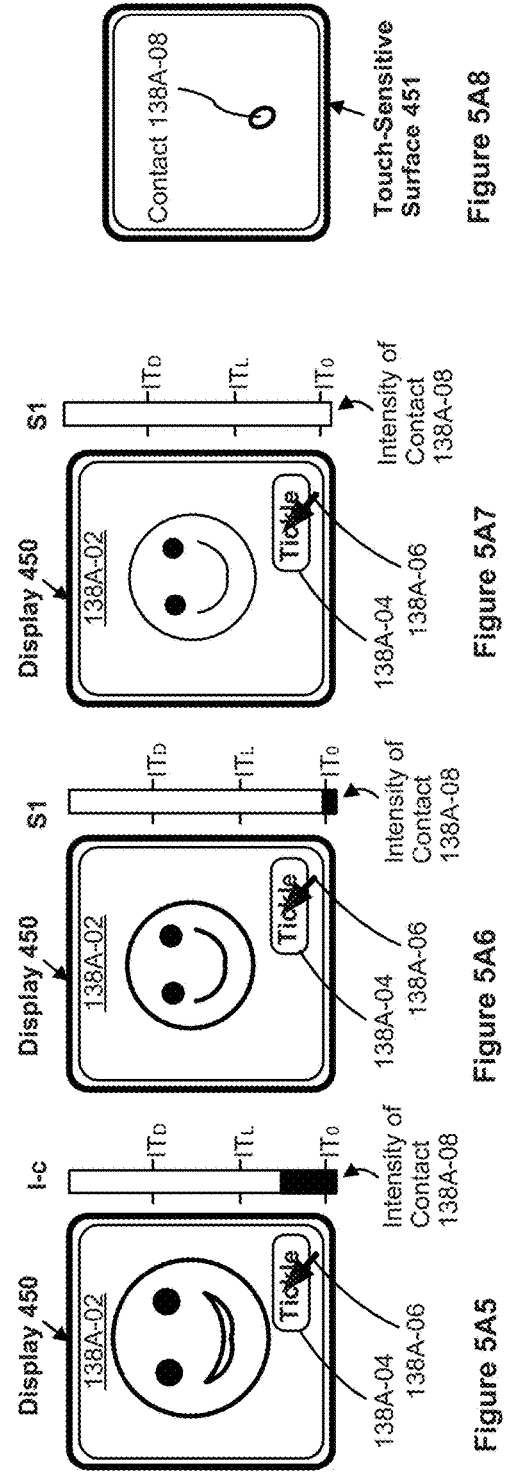

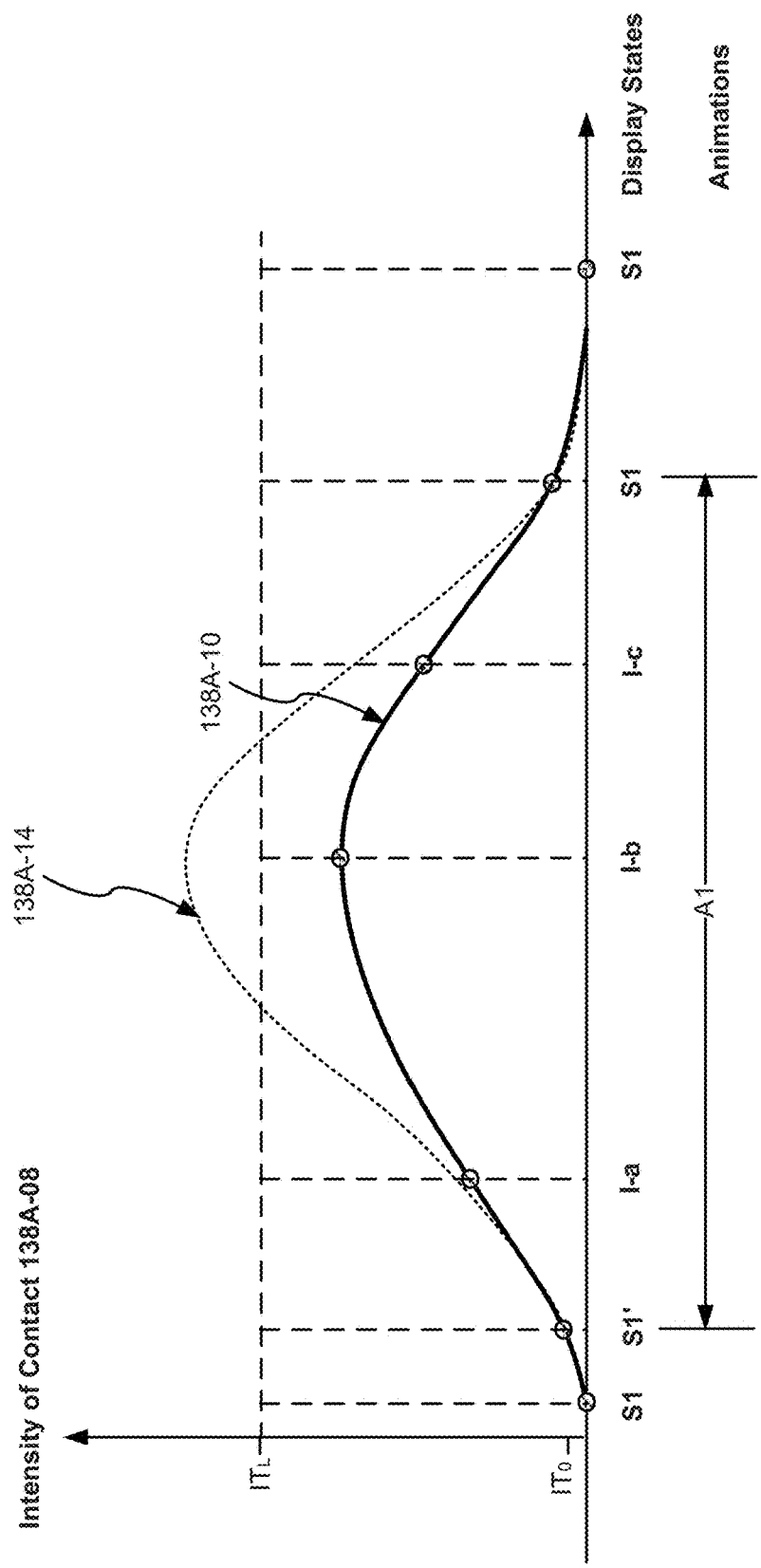

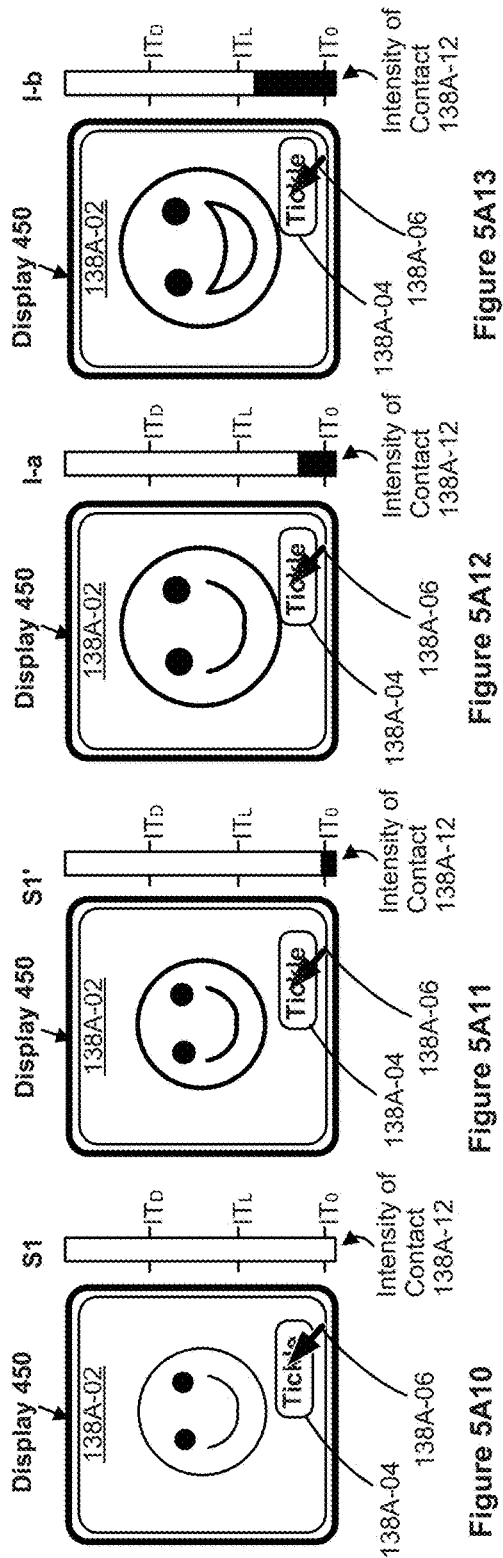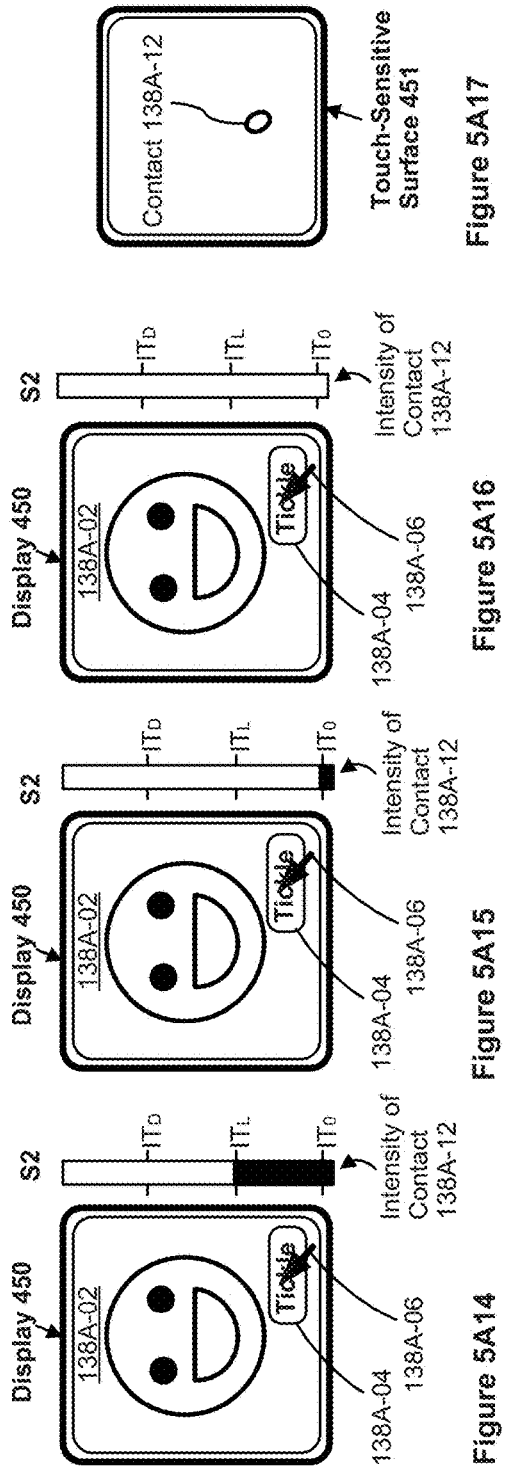

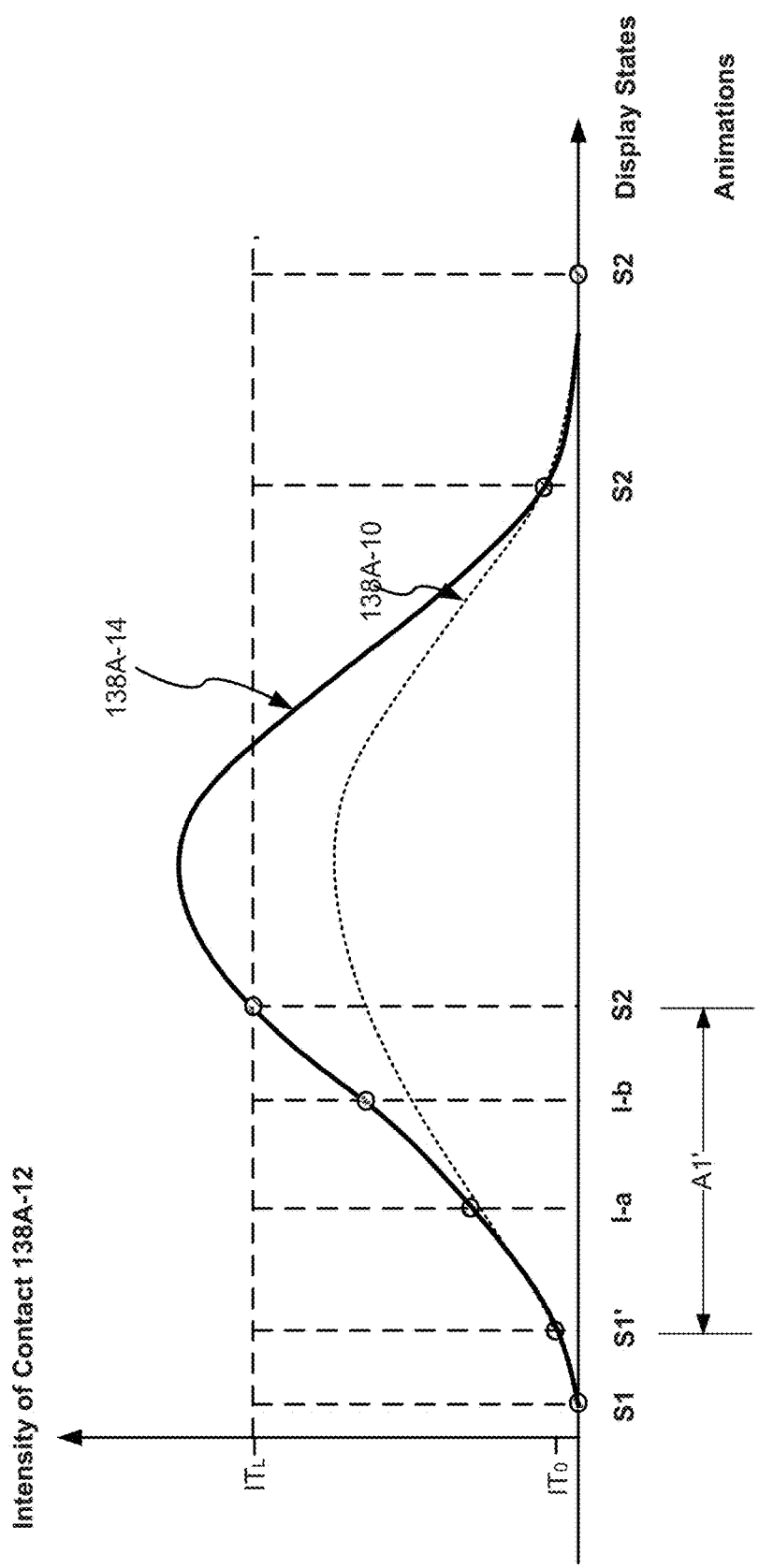
Figure 5A18

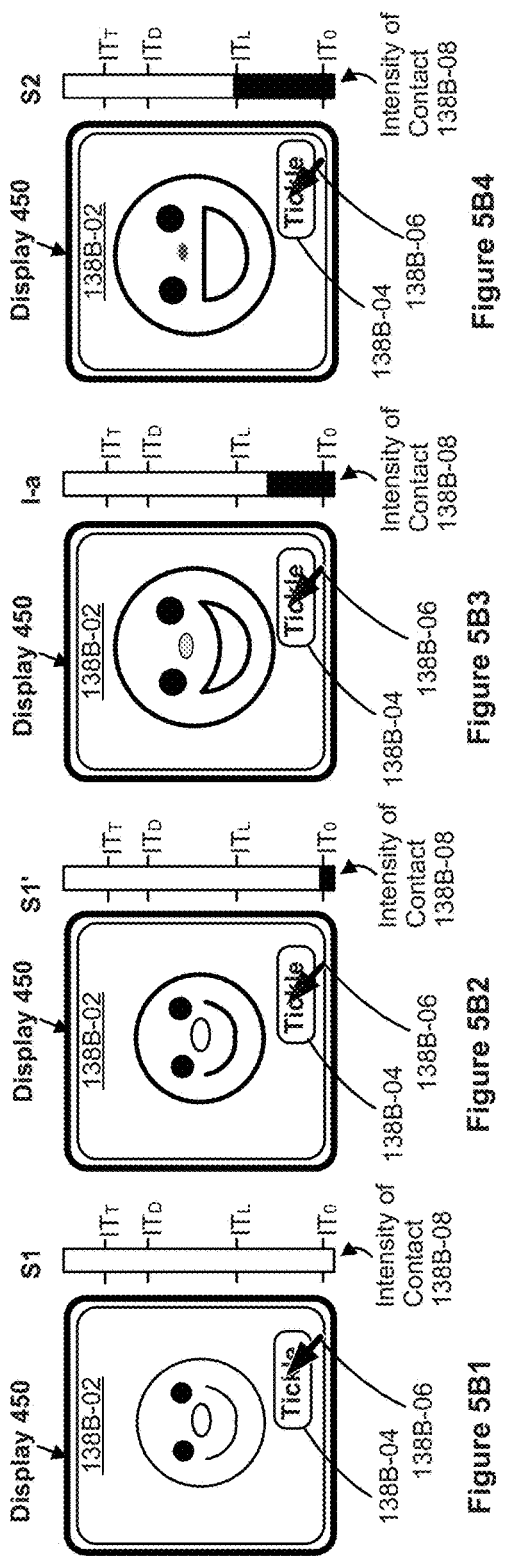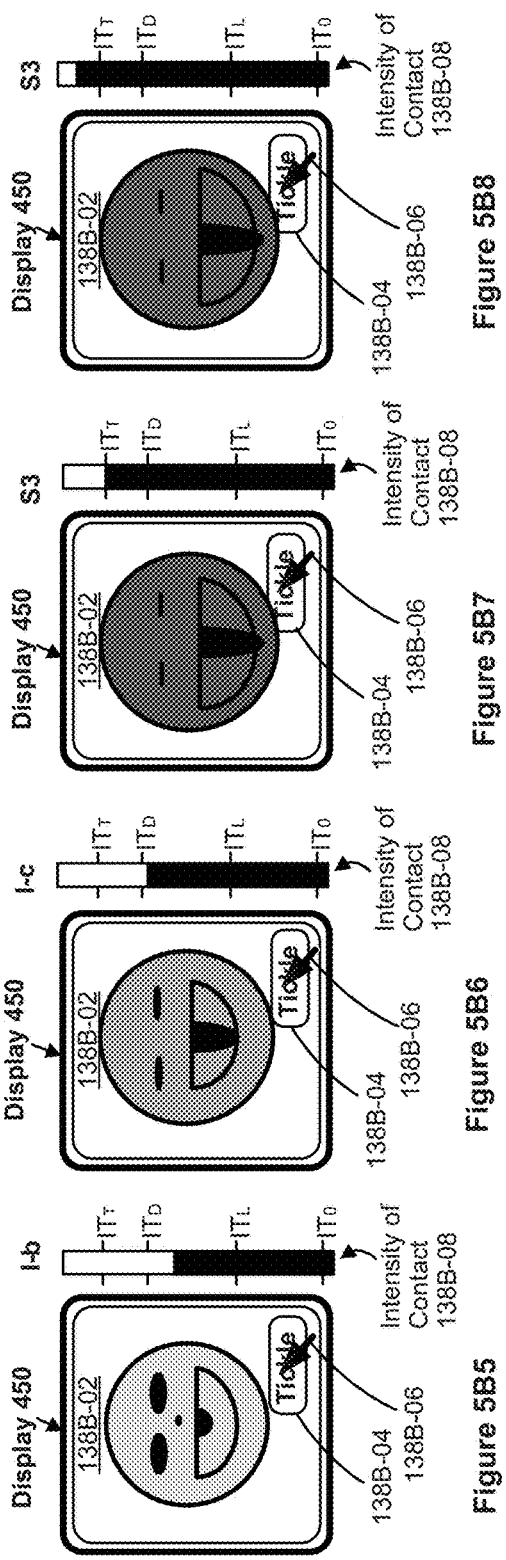

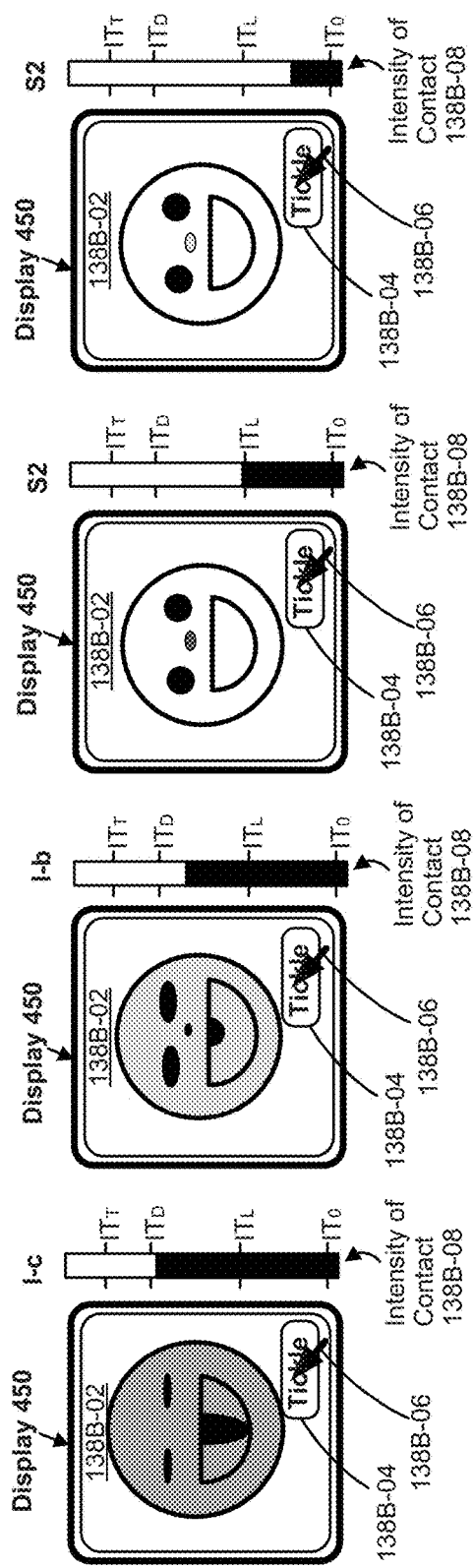

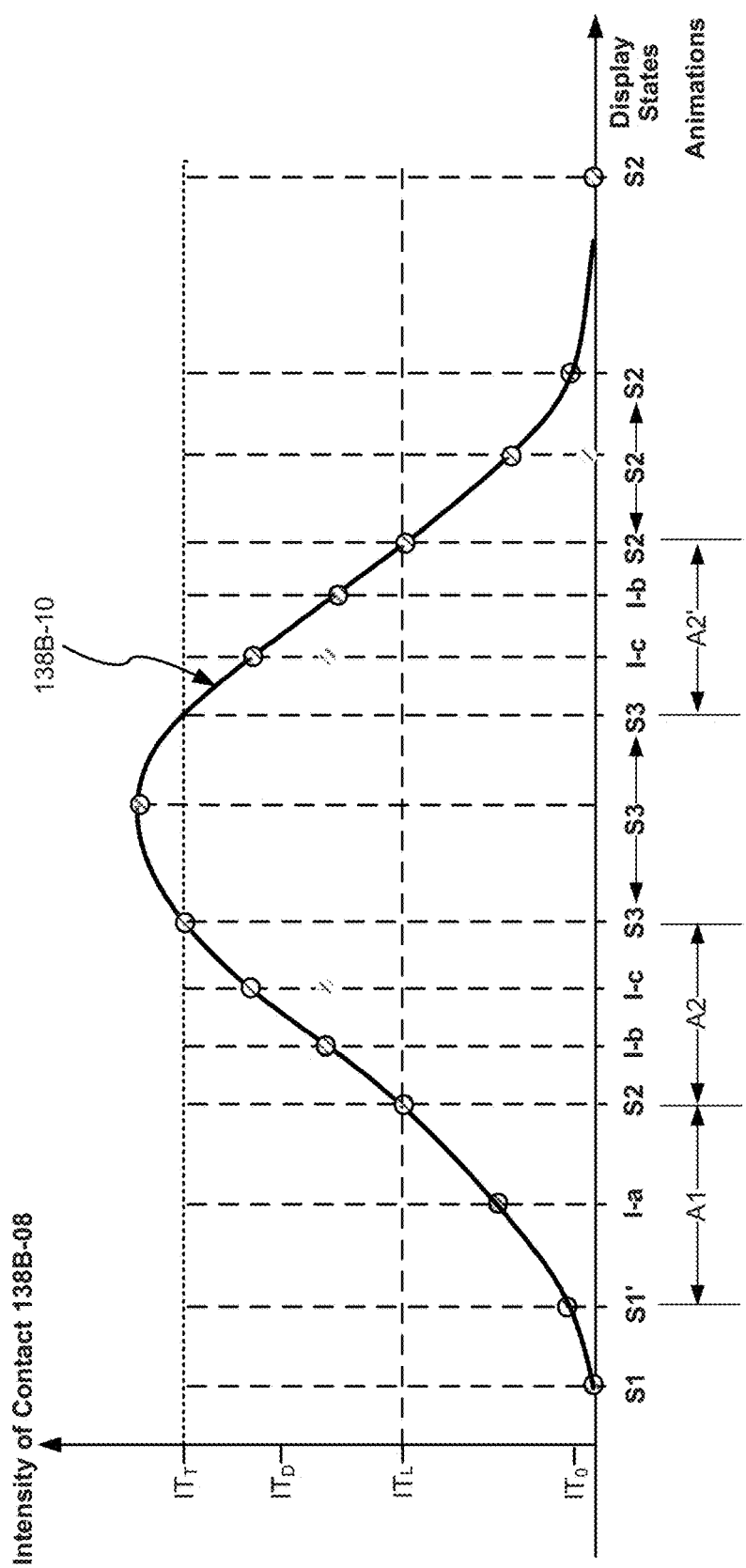
Figure 5B16

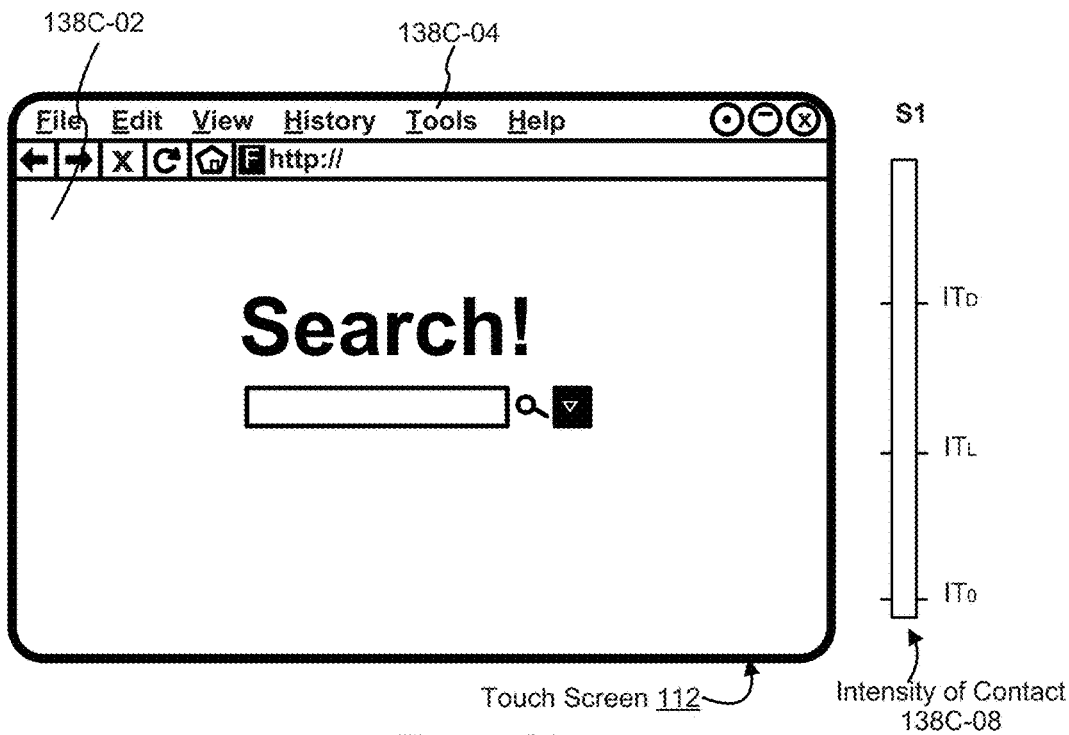
Figure 5C1
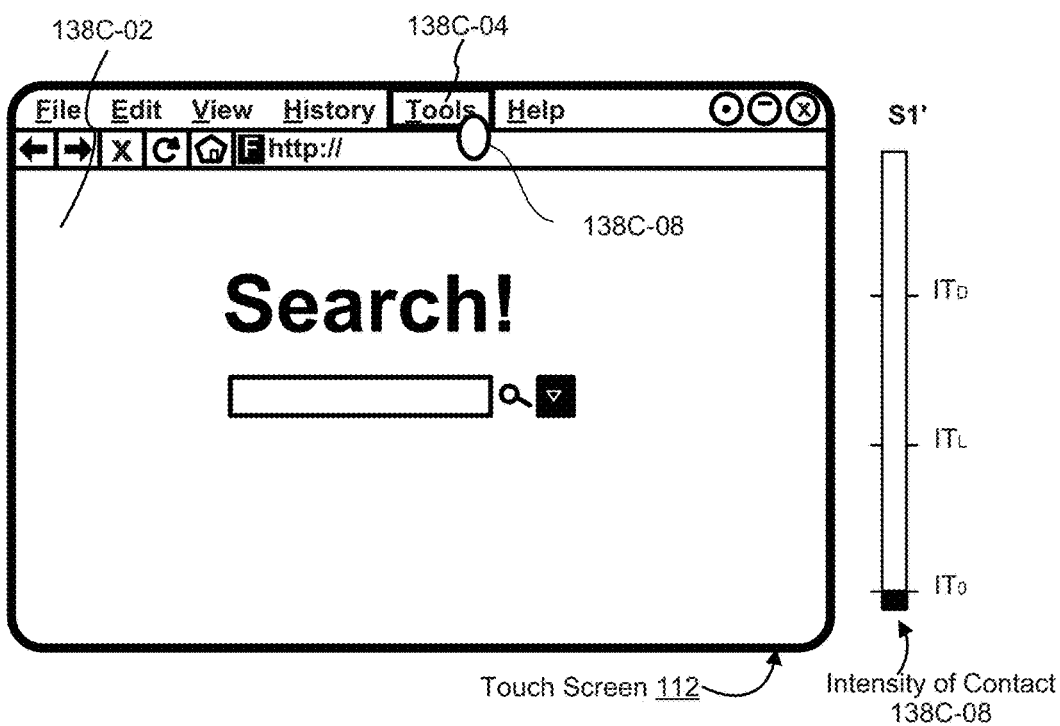
Figure 5C2

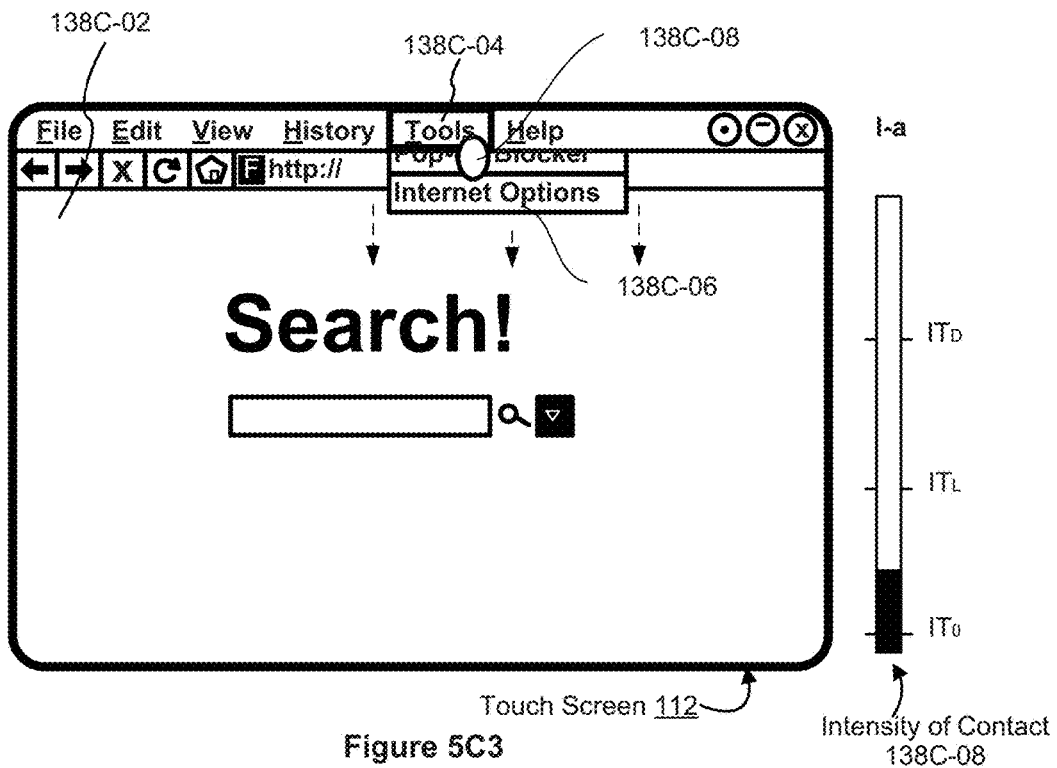
Figure 5C3
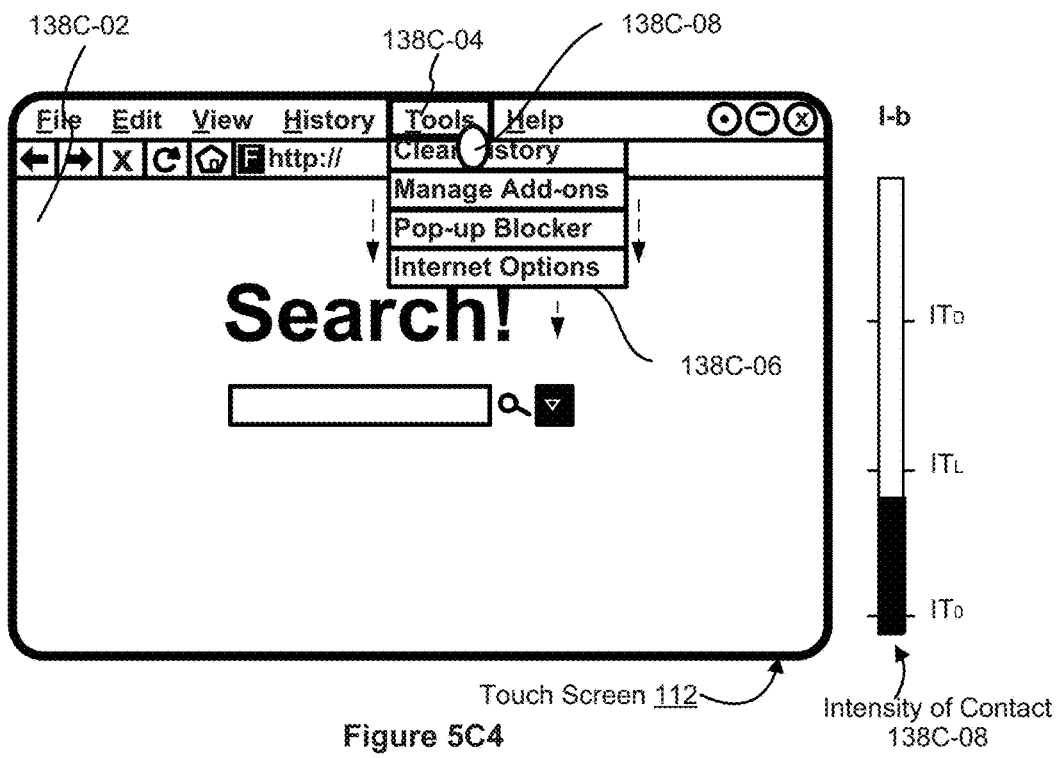
Figure 5C4

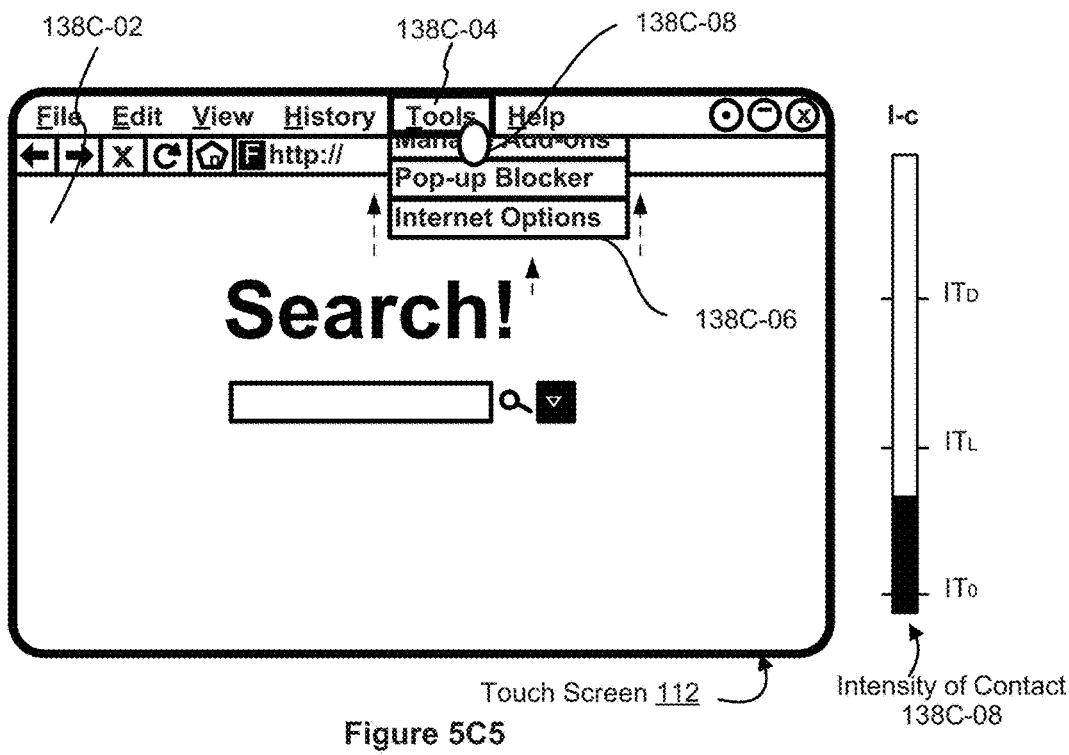
Figure 5C5
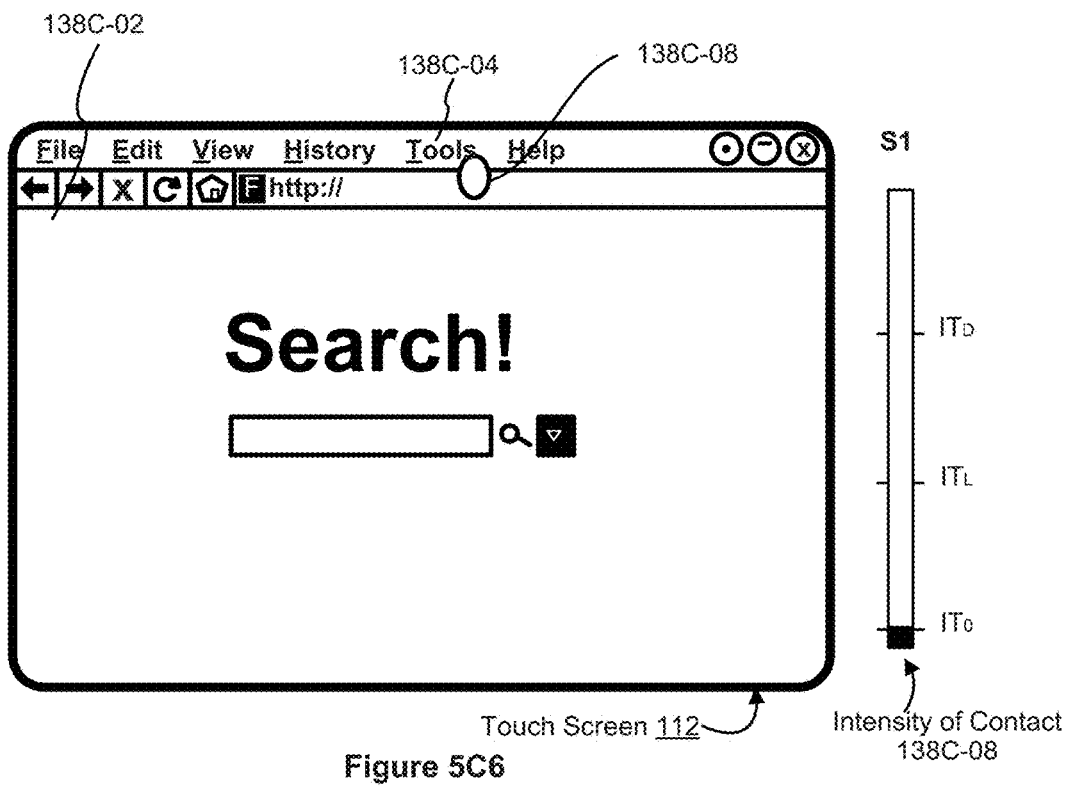
Figure 5C6

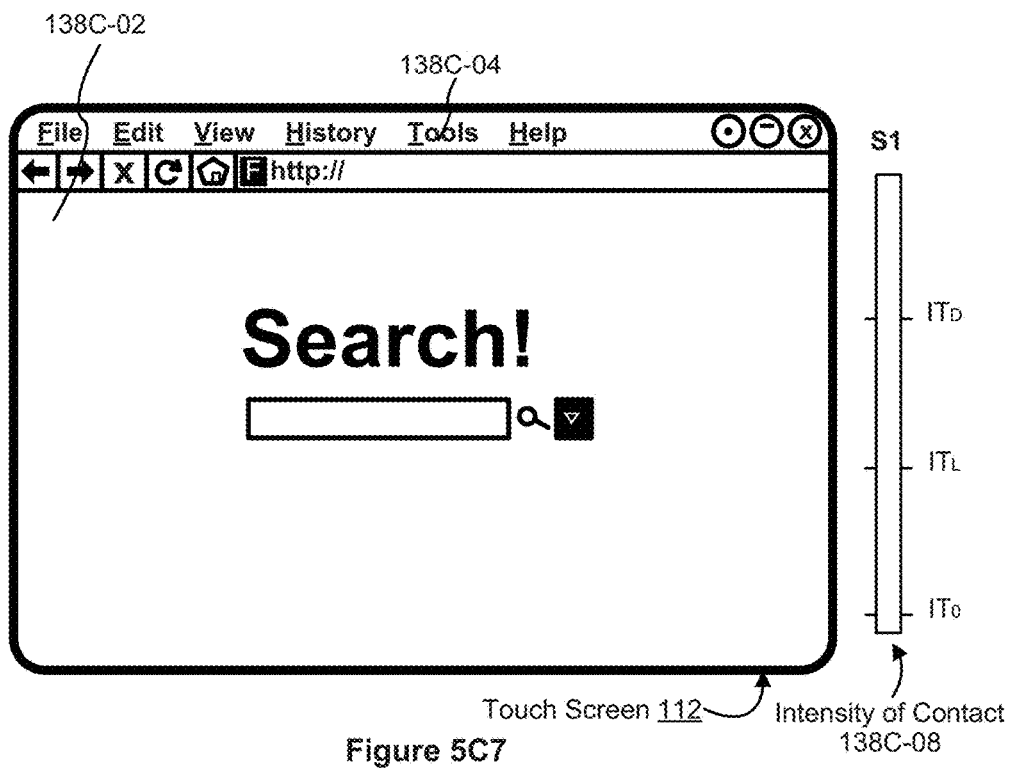
Figure 5C7
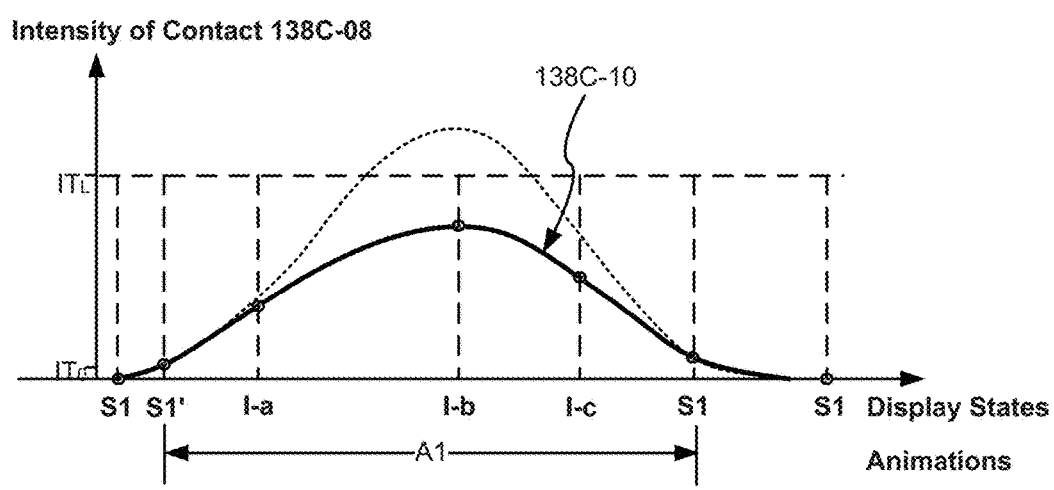
Figure 5C8

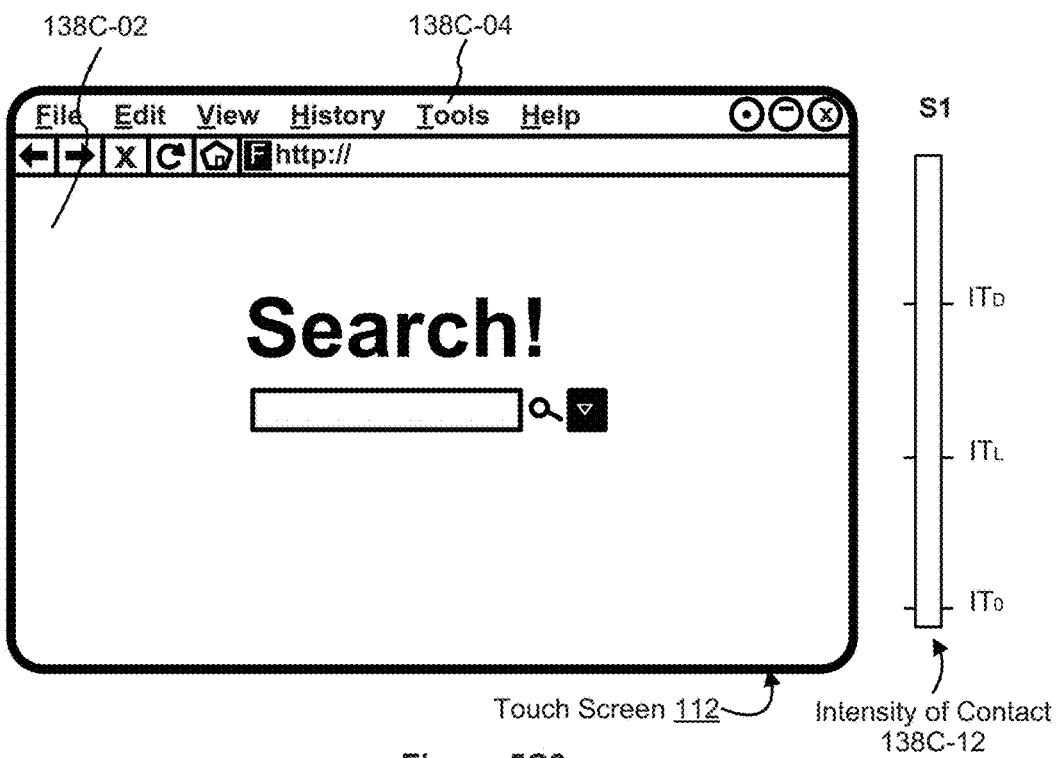
Figure 5C9
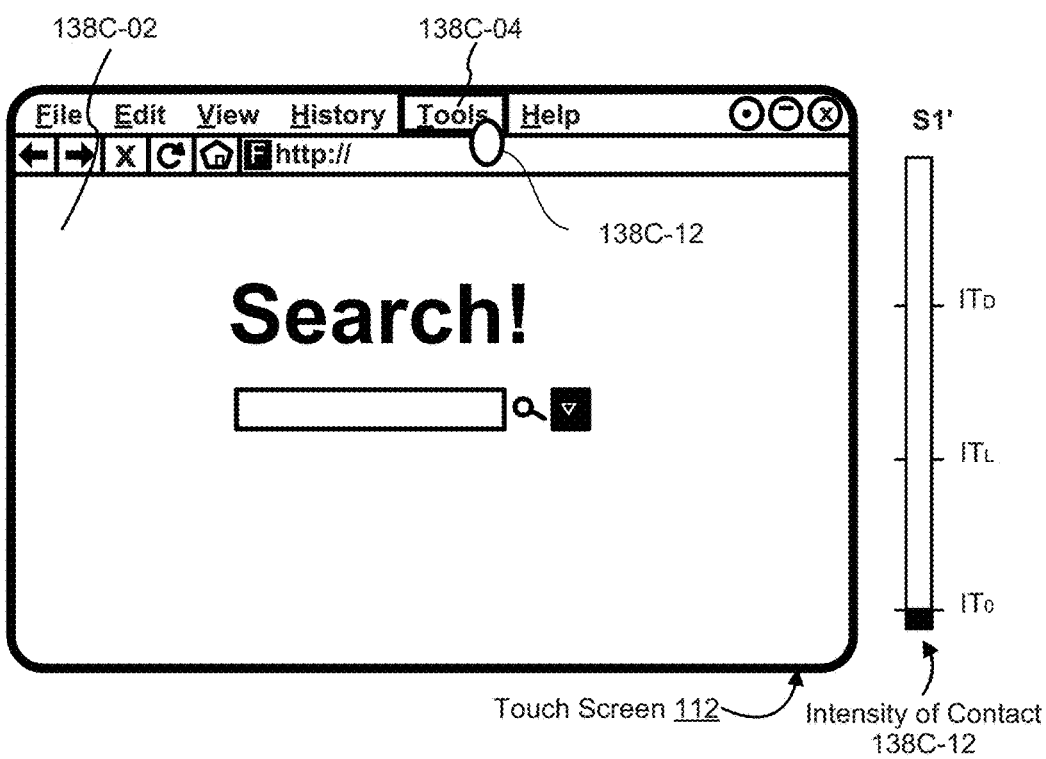
Figure 5C10

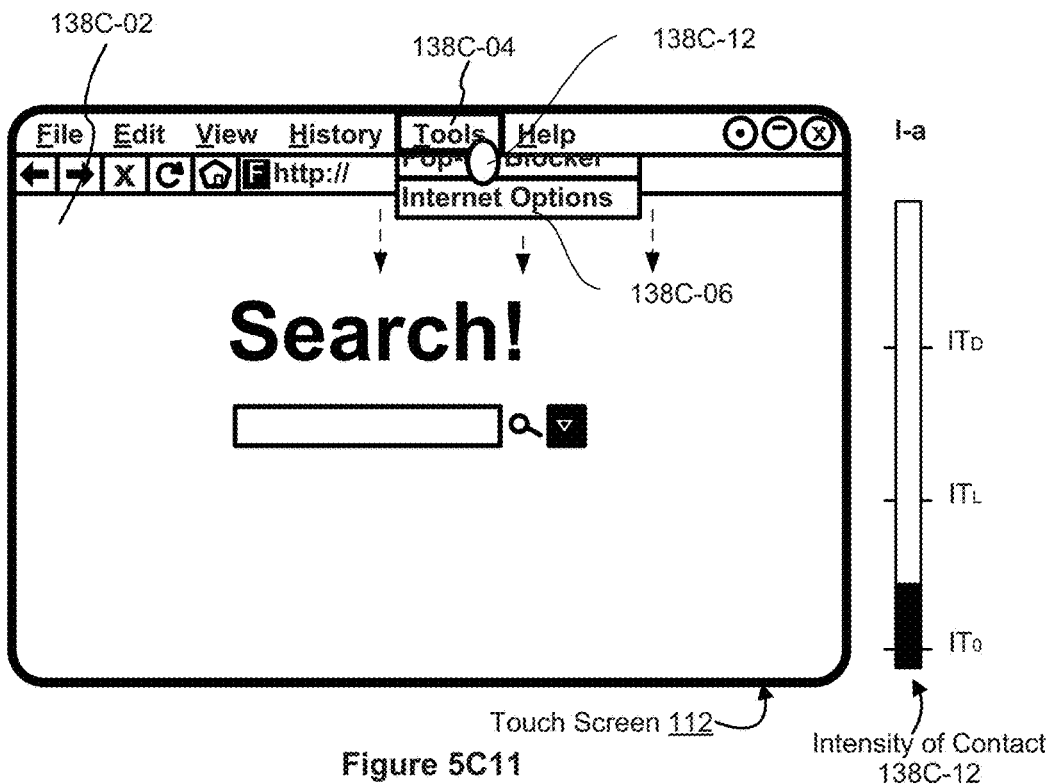
Figure 5C11
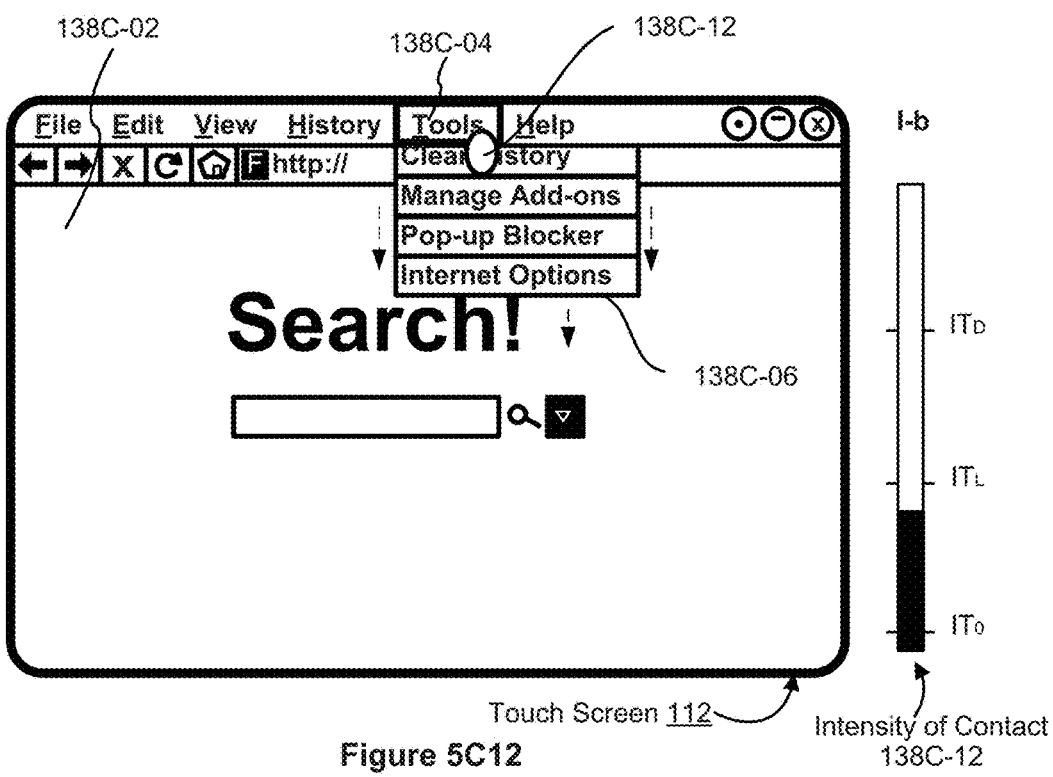
Figure 5C12

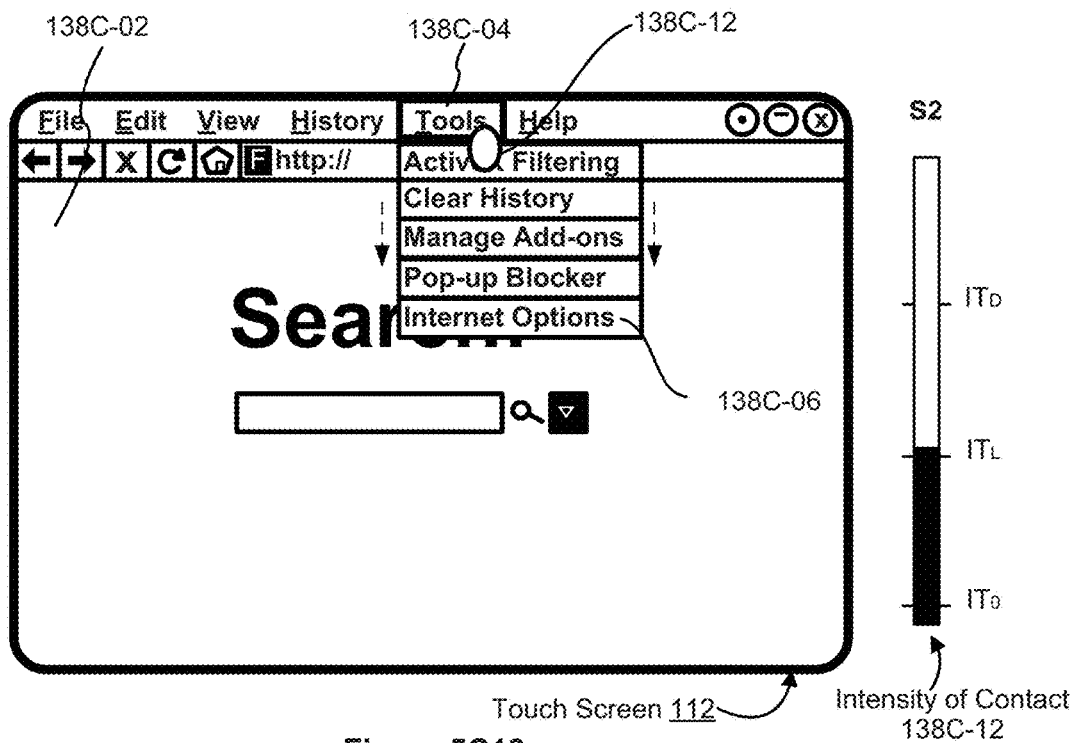
Figure 5C13
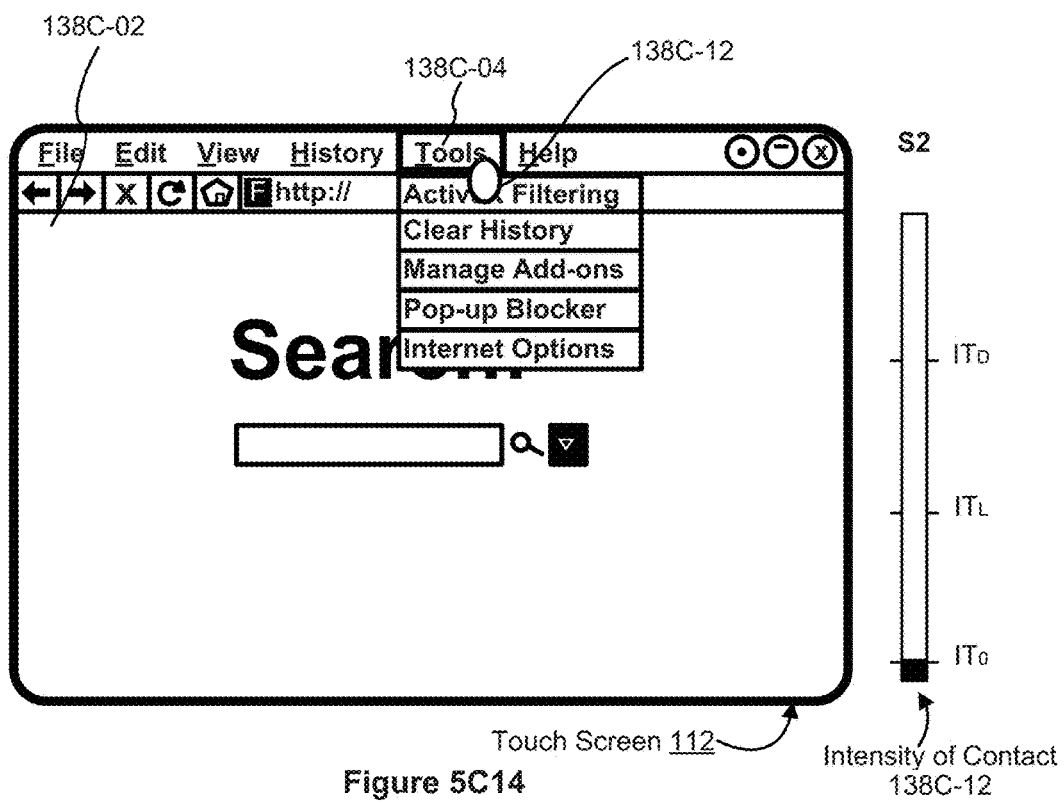
Figure 5C14

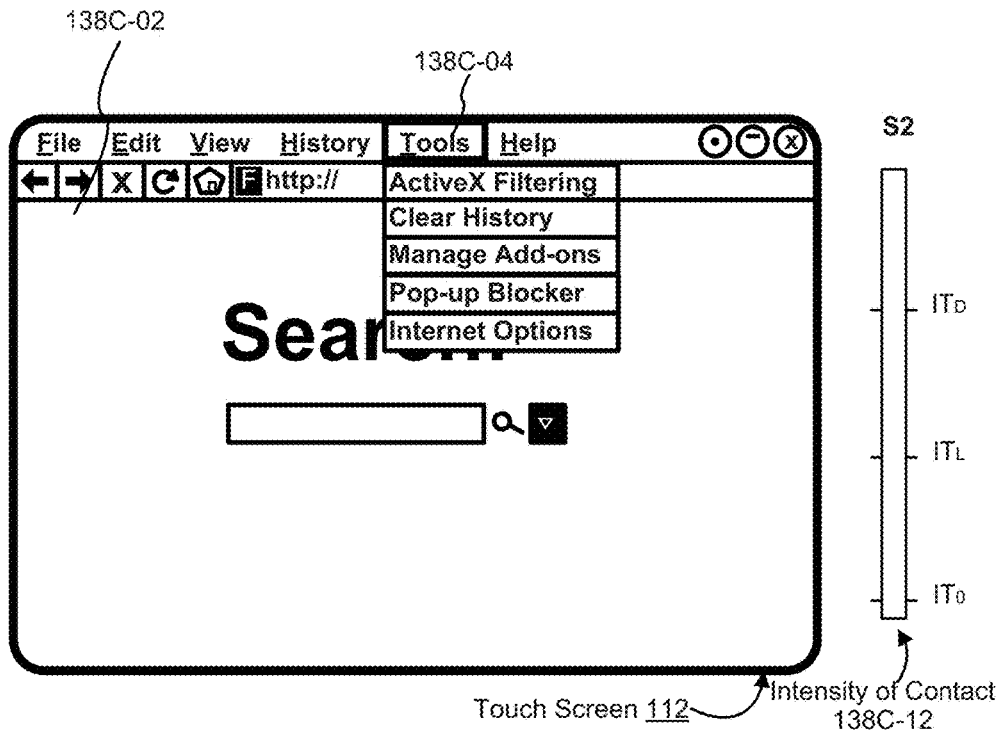
Figure 5C15
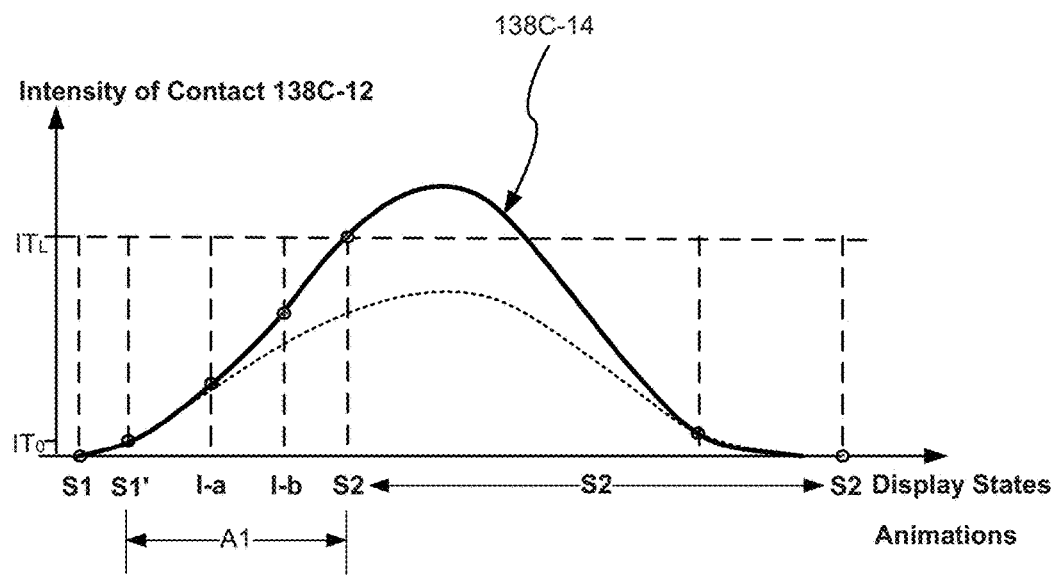
Figure 5C16

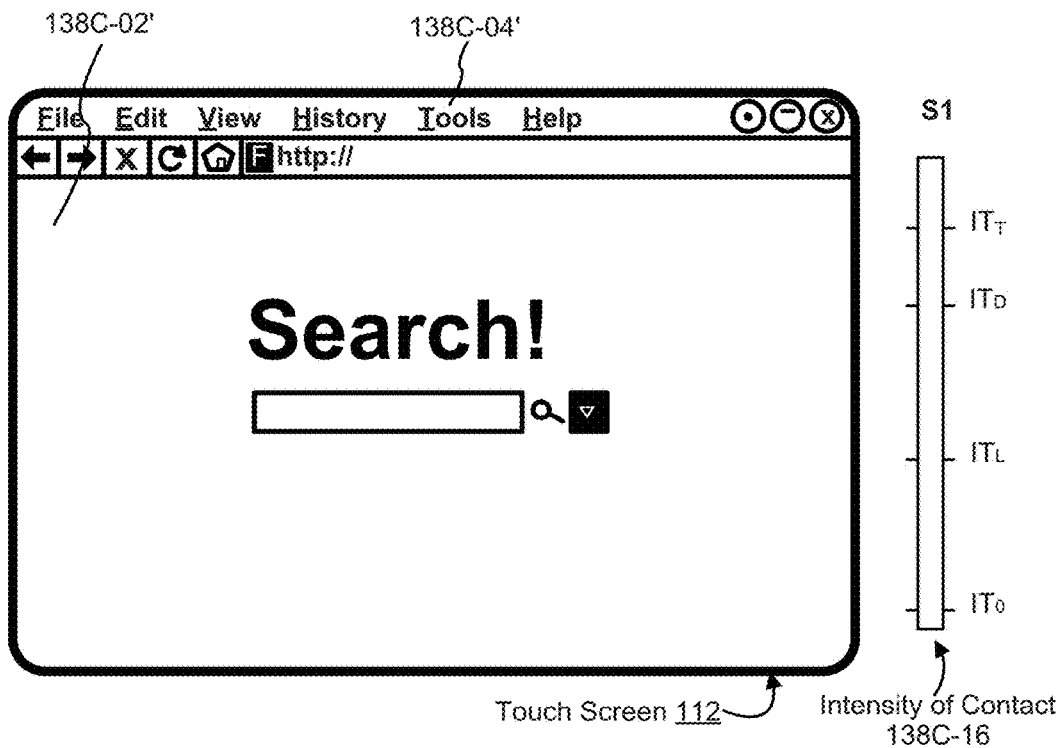
Figure 5C17
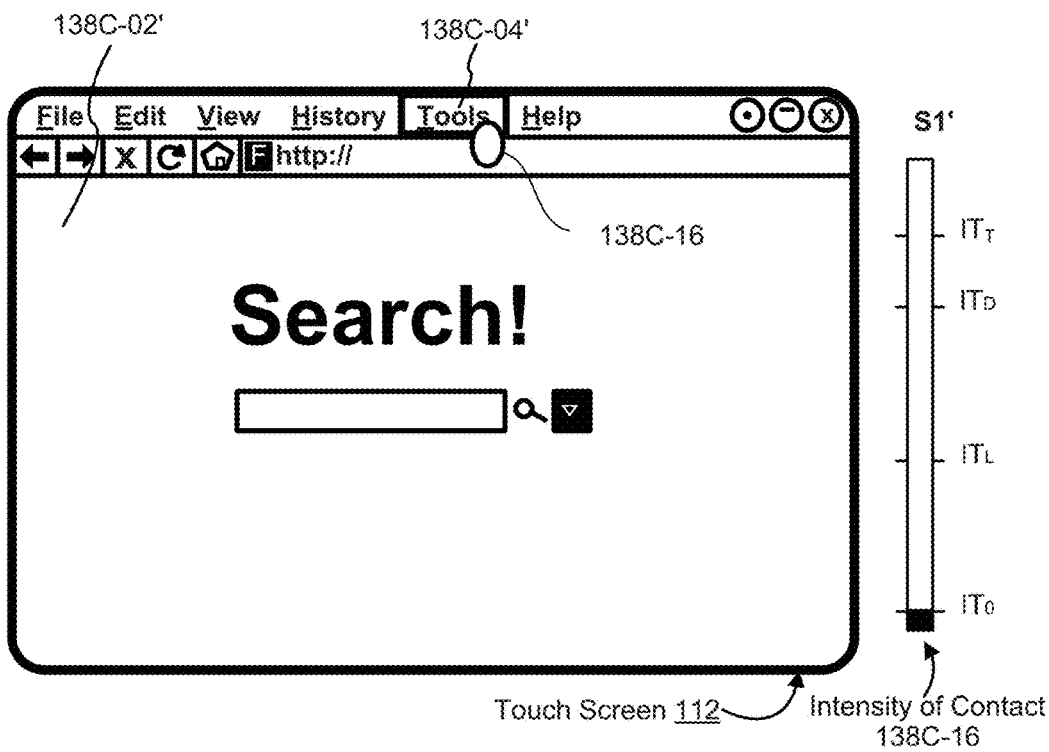
Figure 5C18

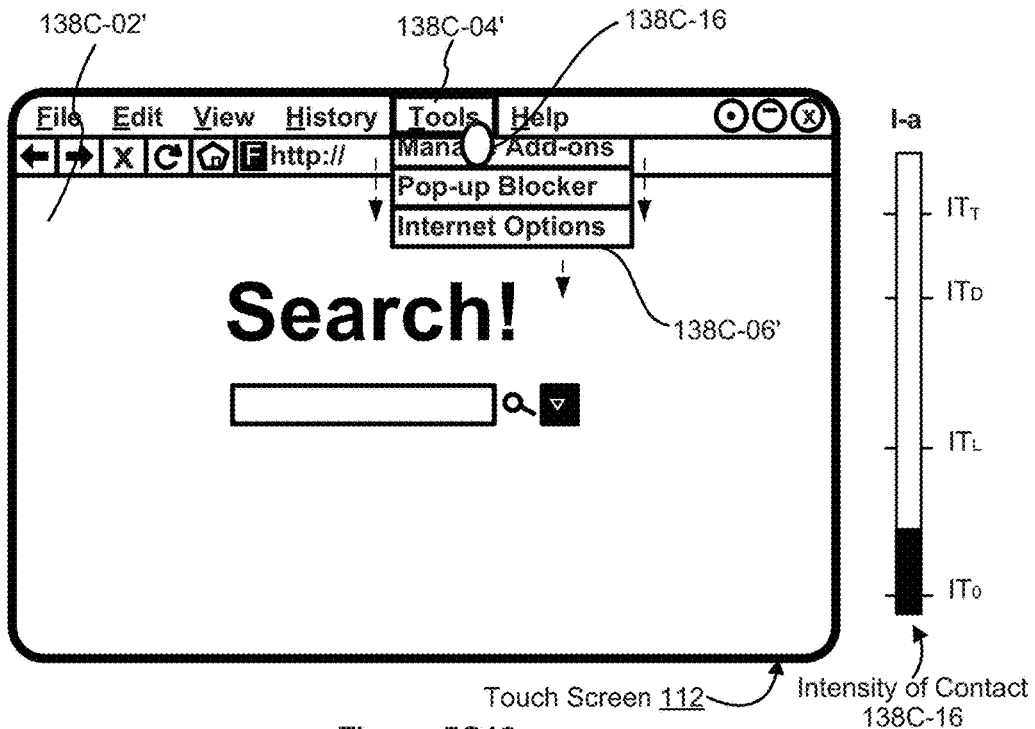
Figure 5C19
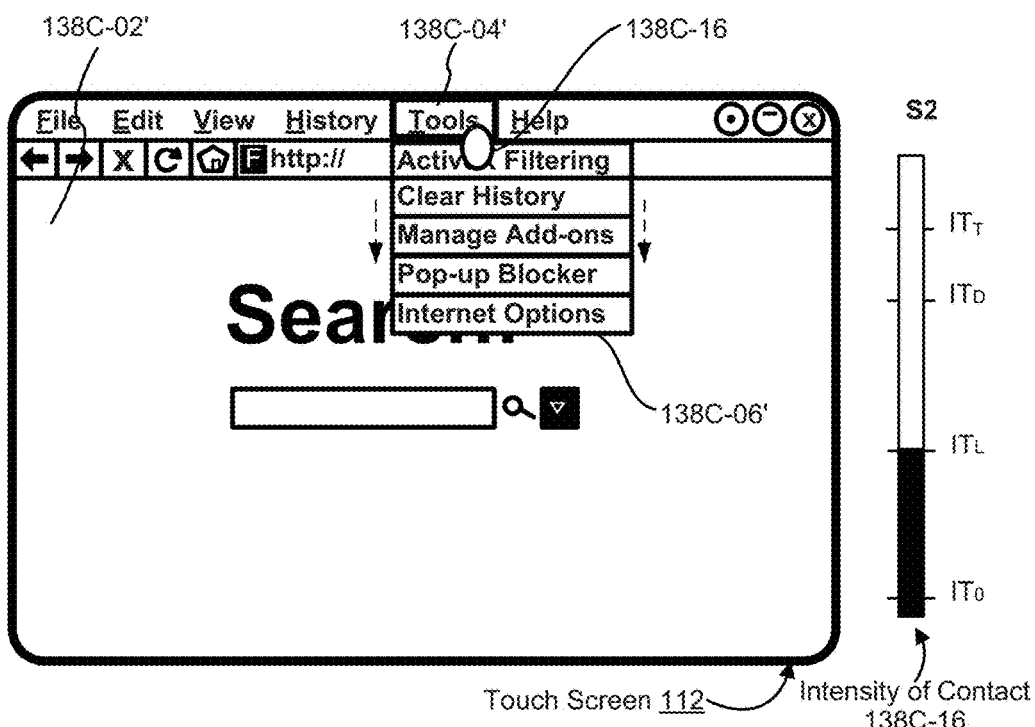
Figure 5C20

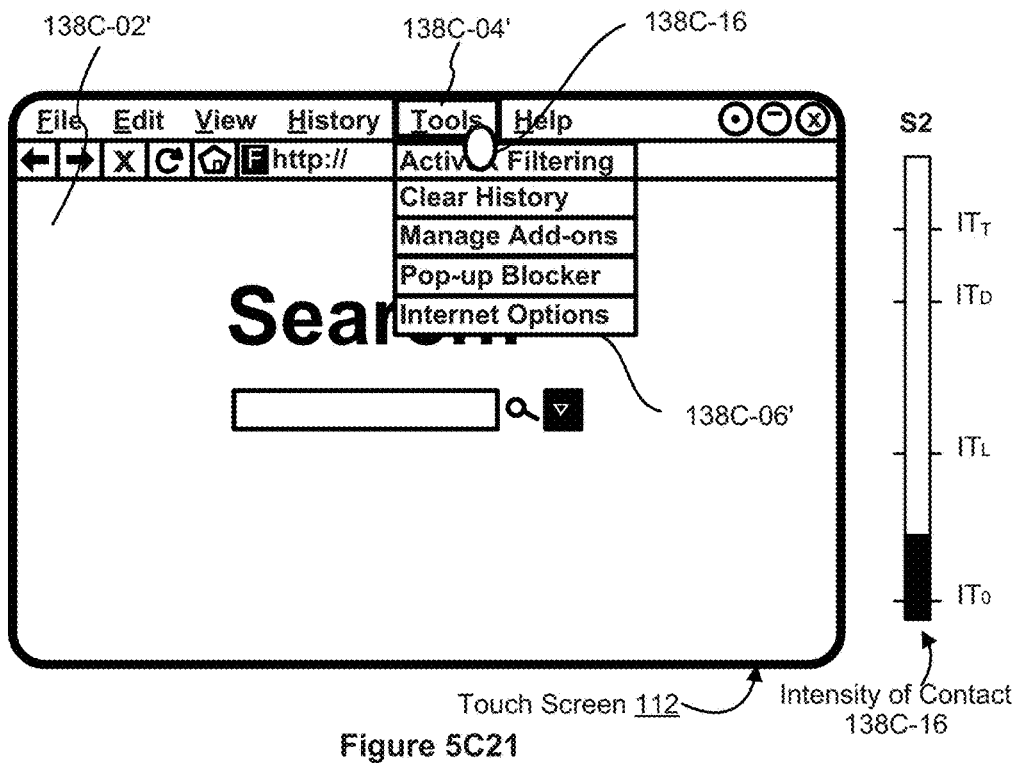
Figure 5C21
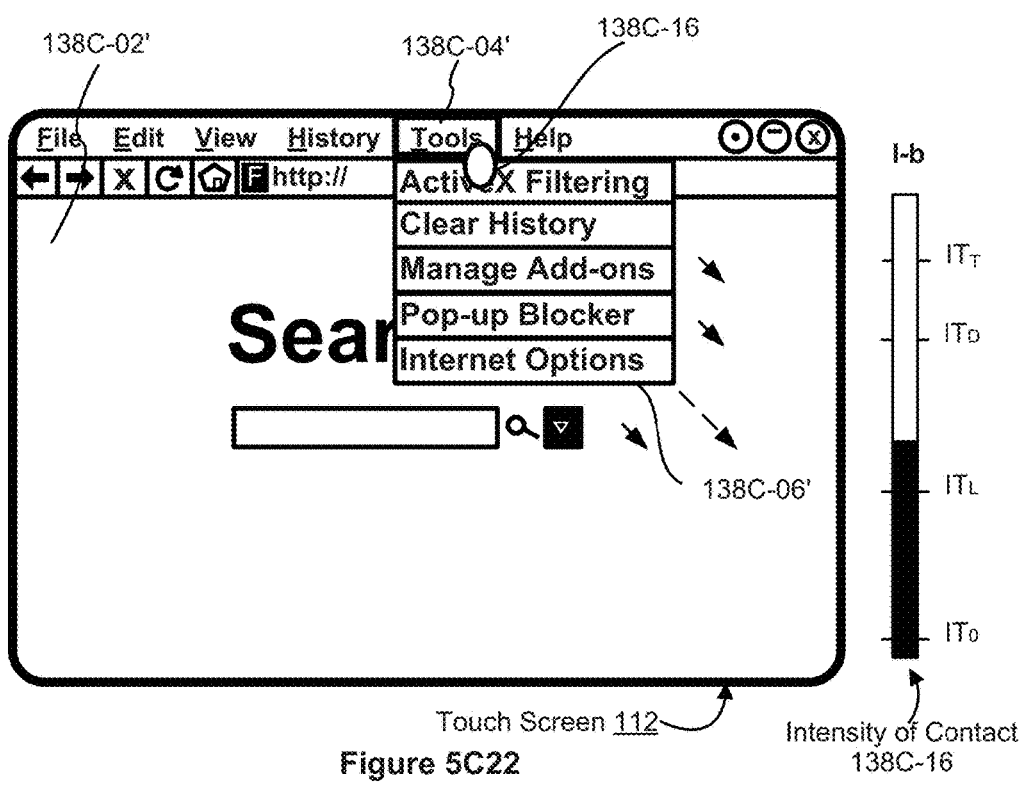
Figure 5C22

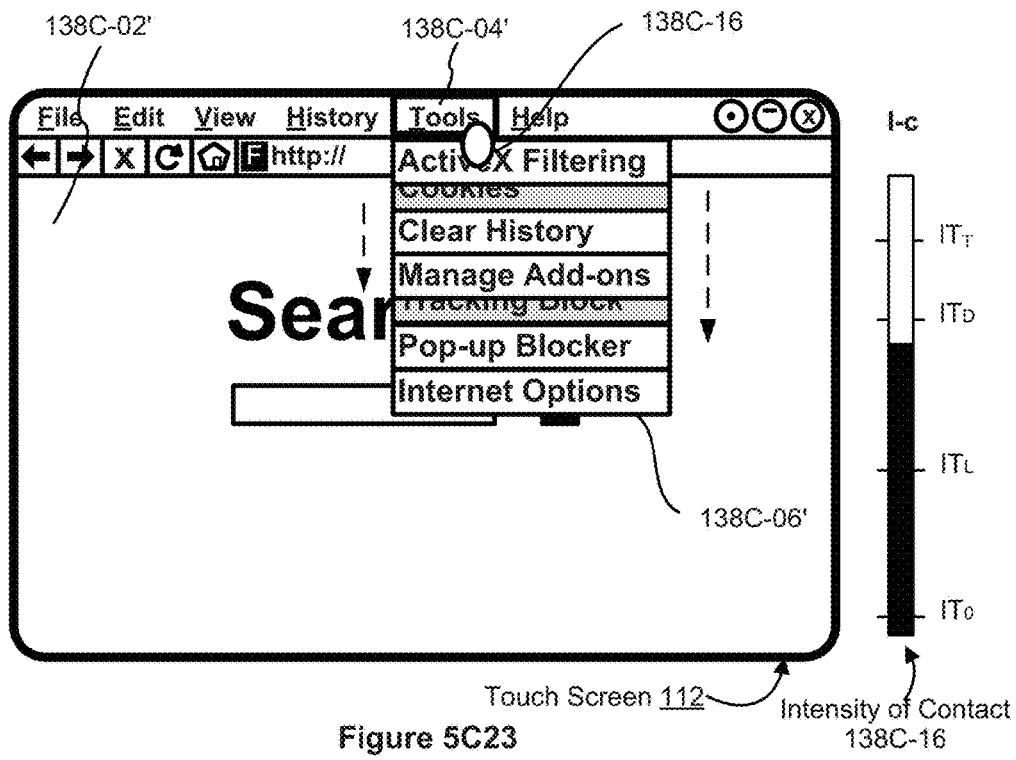
Figure 5C23
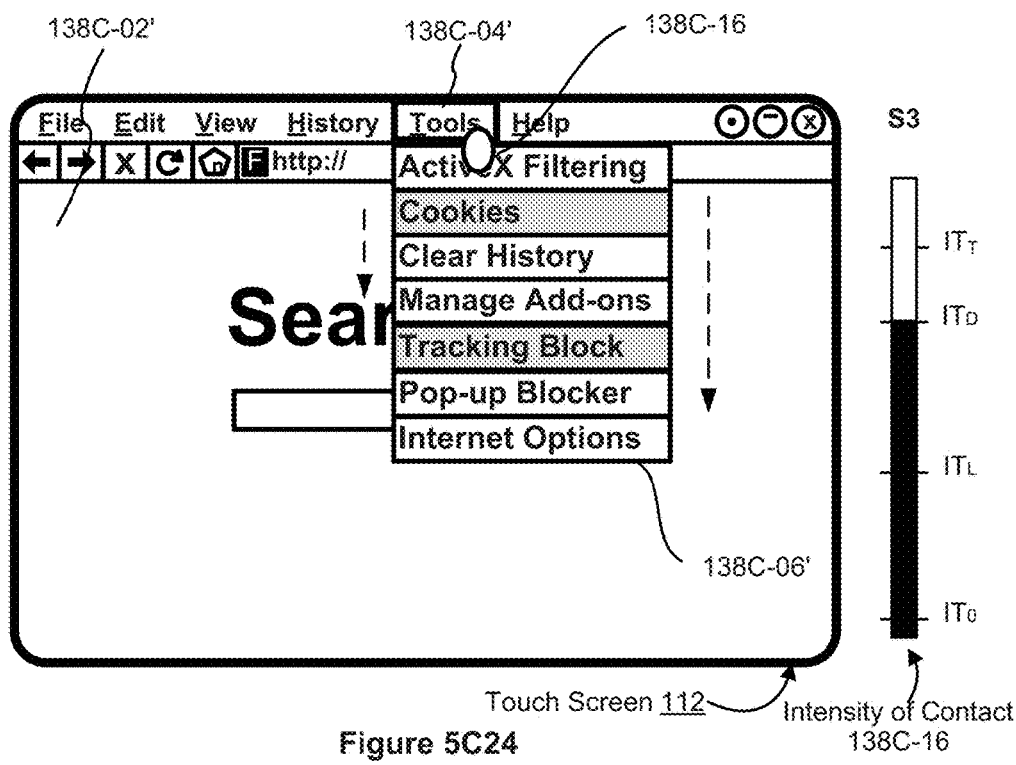
Figure 5C24

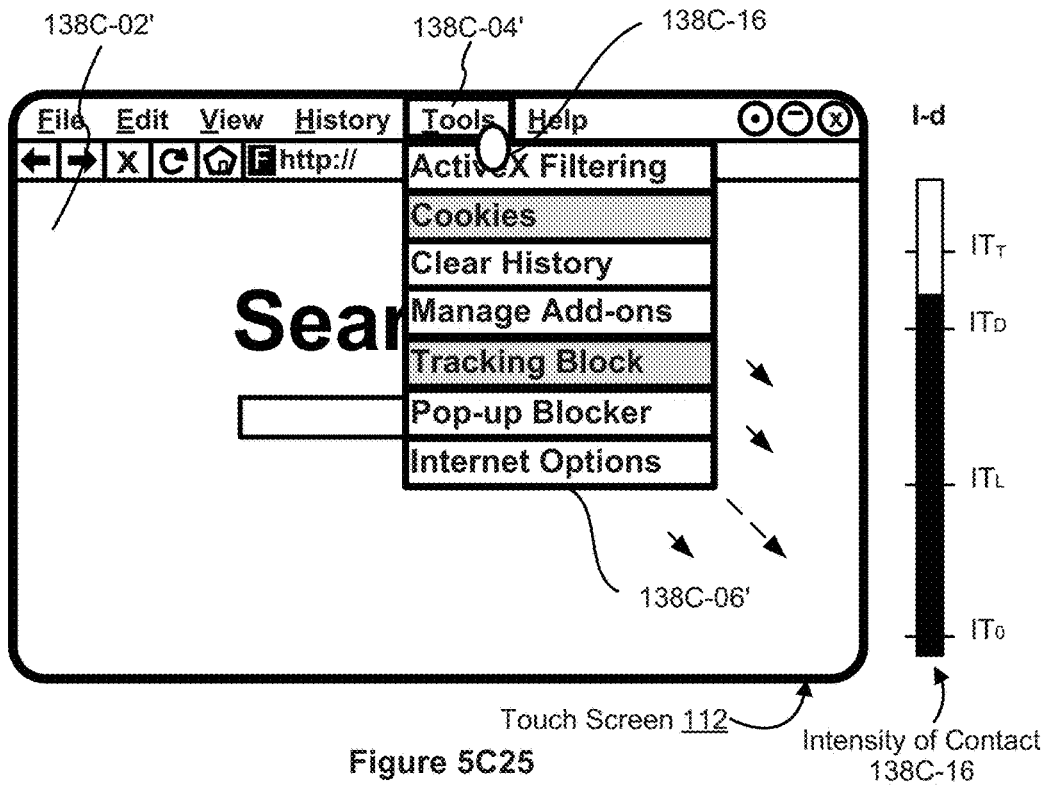
Figure 5C25
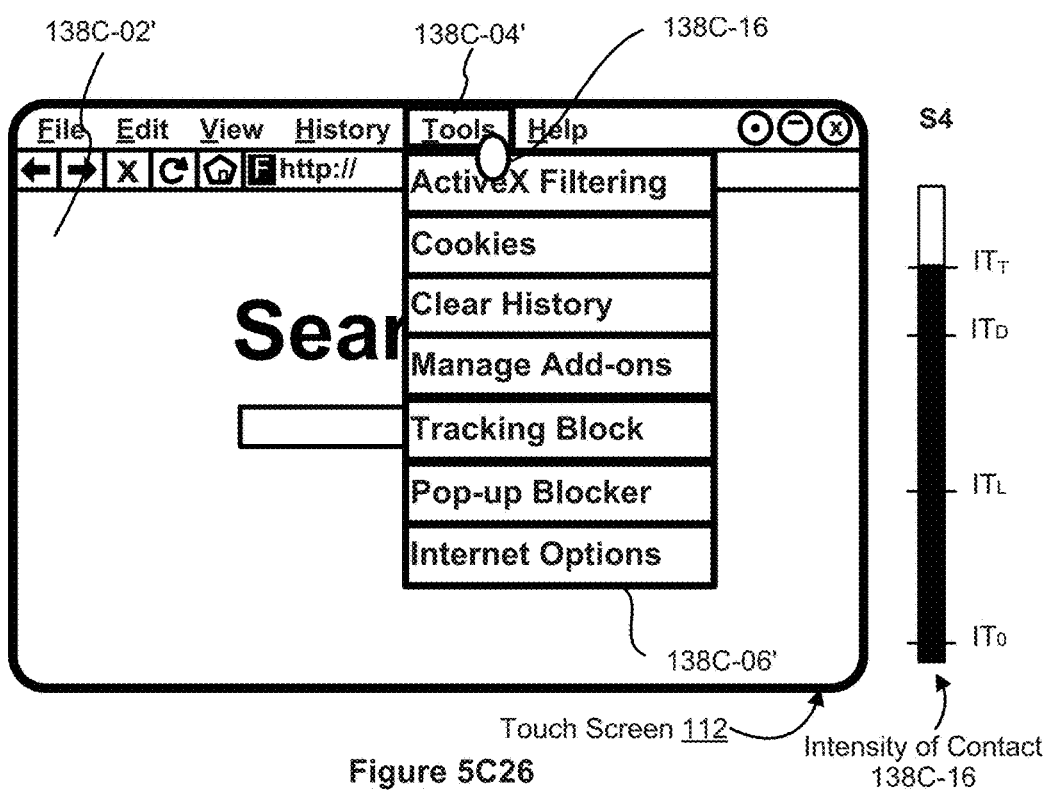
Figure 5C26

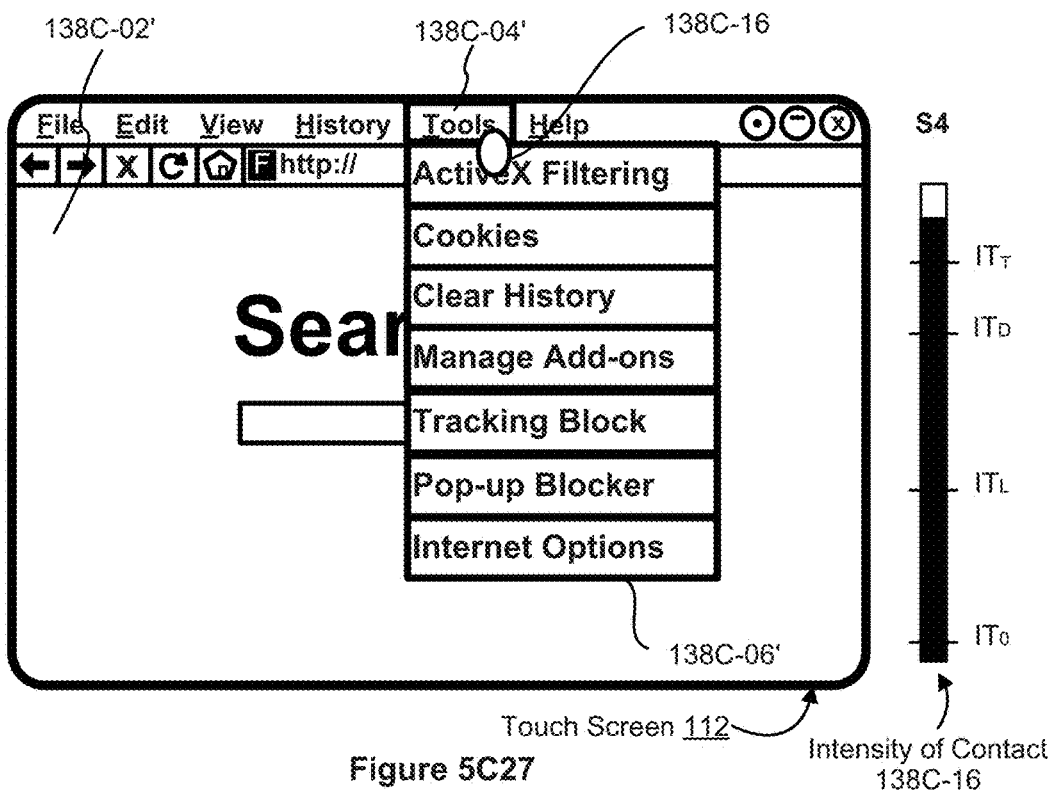
Figure 5C27
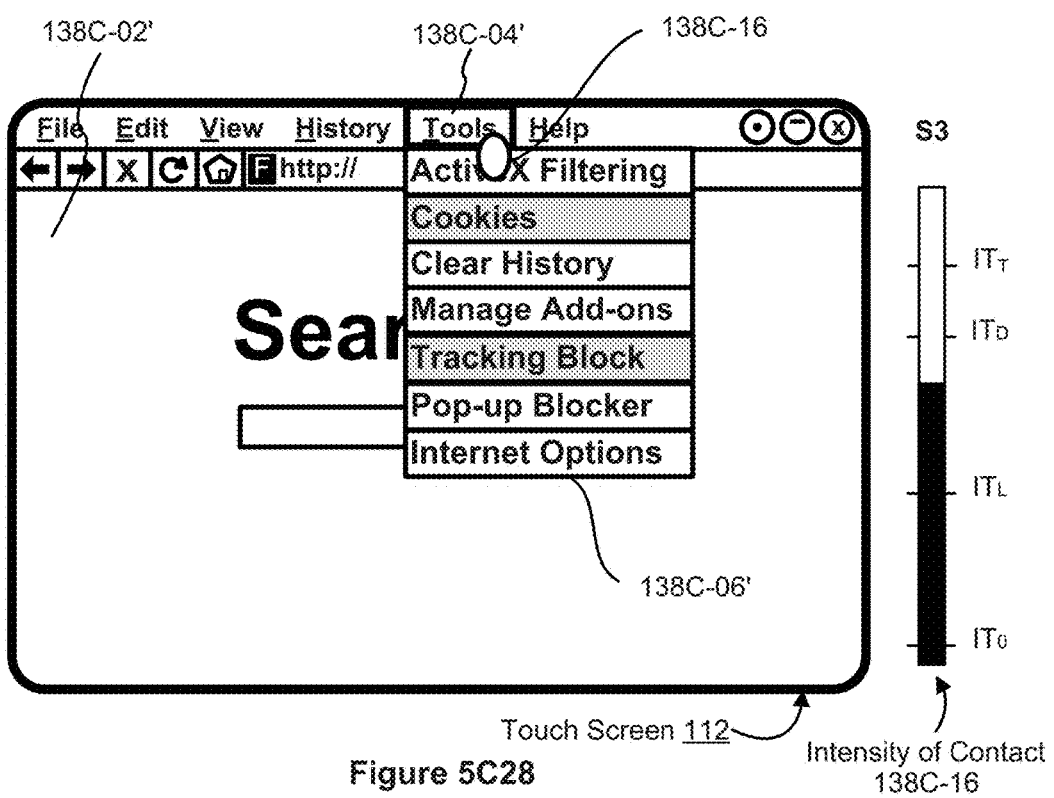
Figure 5C28

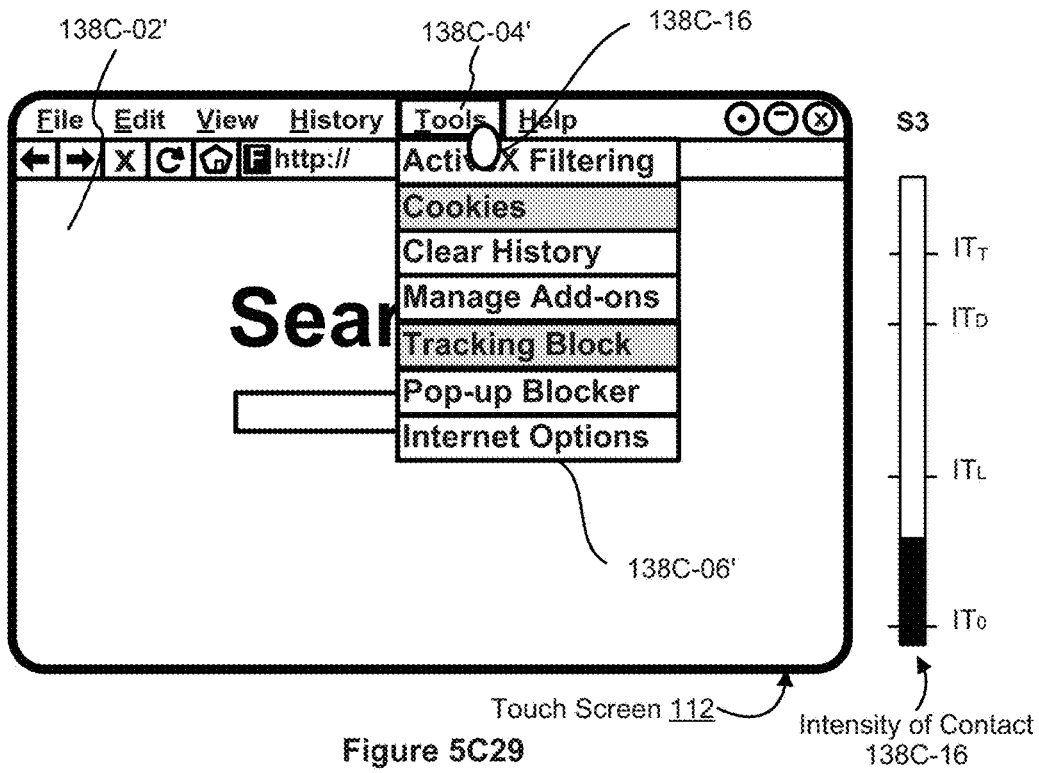
Figure 5C29
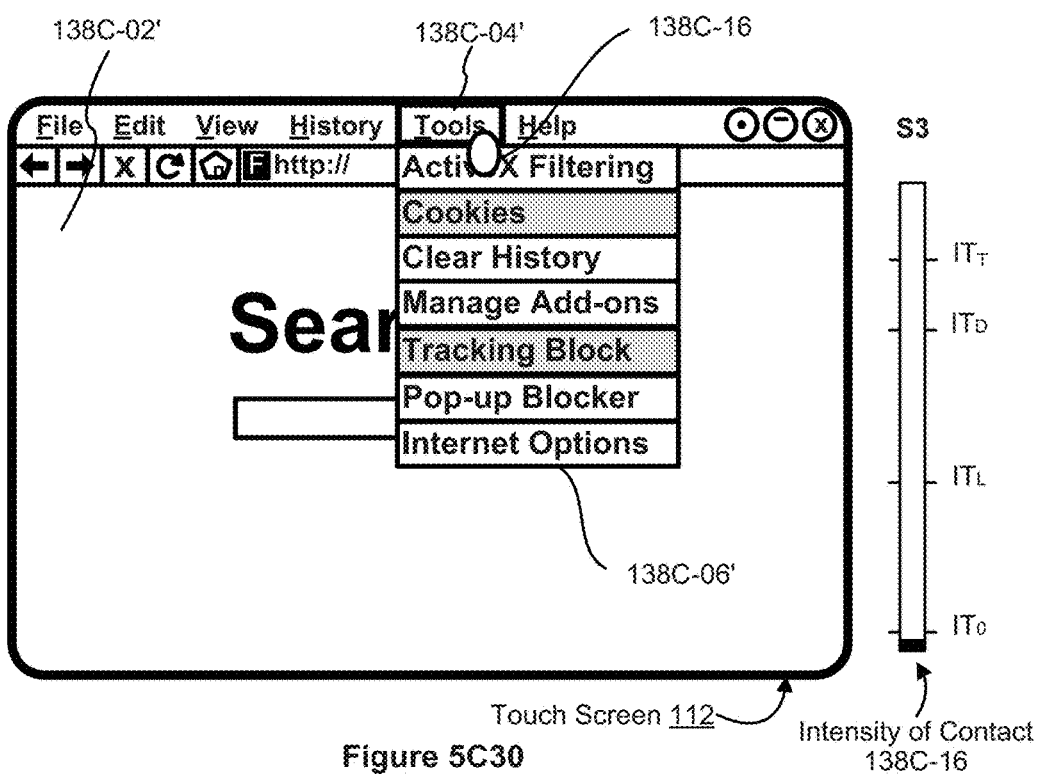
Figure 5C30

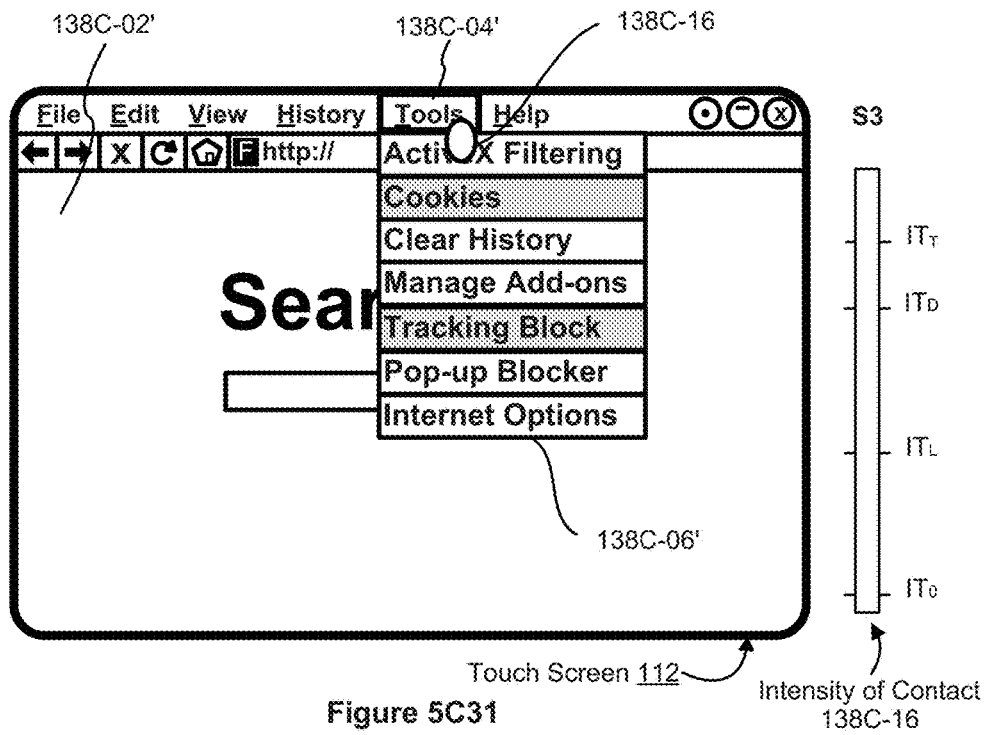
Figure 5C31
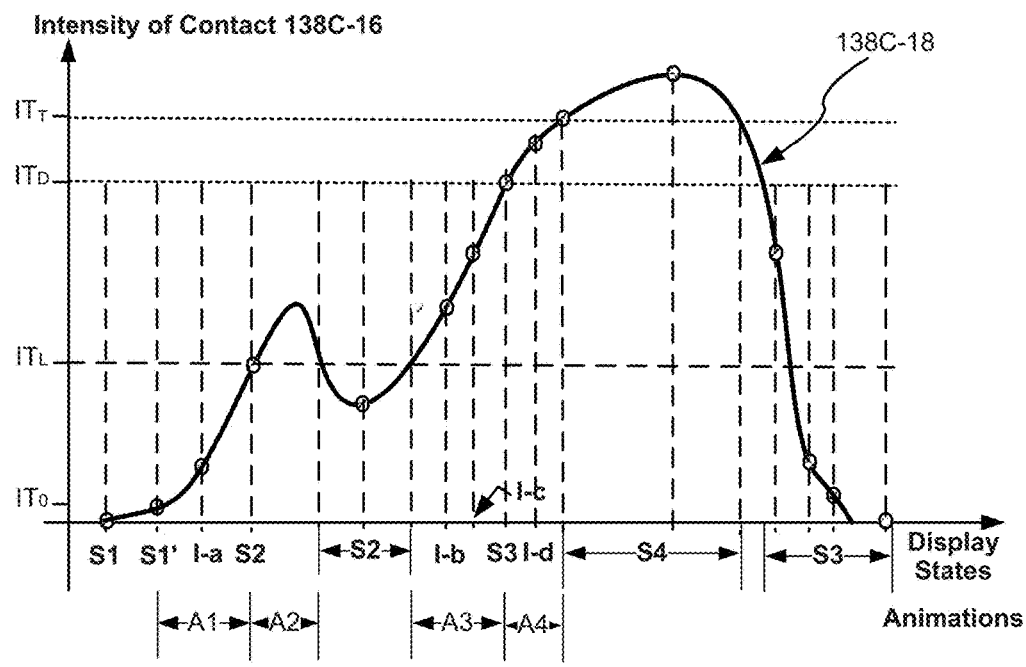
Figure 5C32

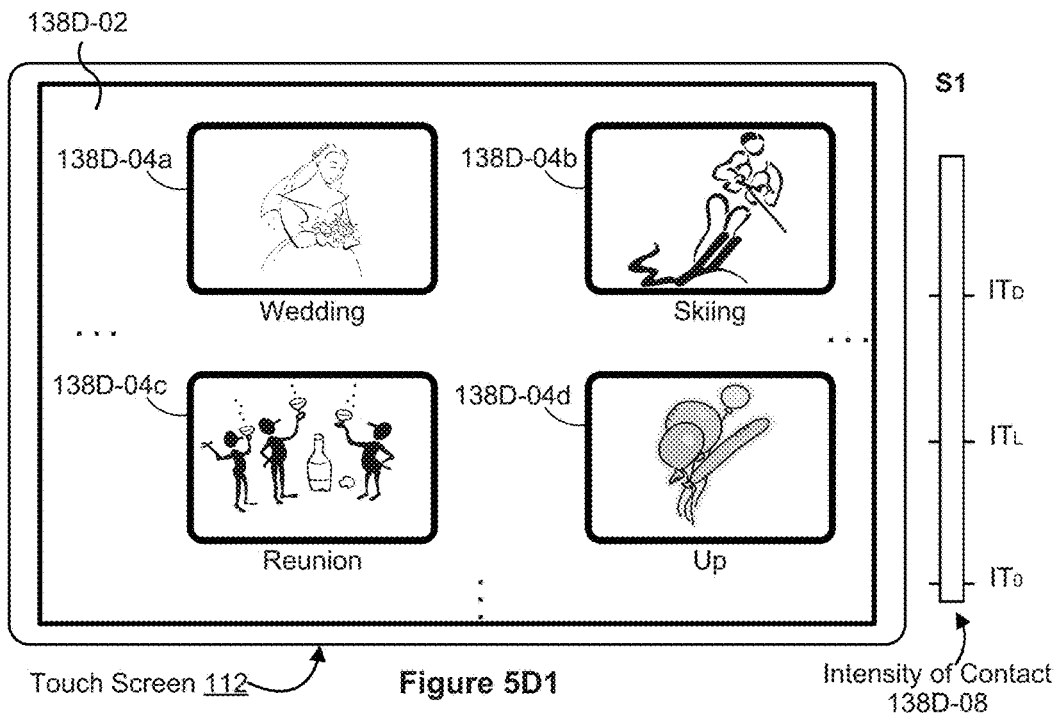
Figure 5D1
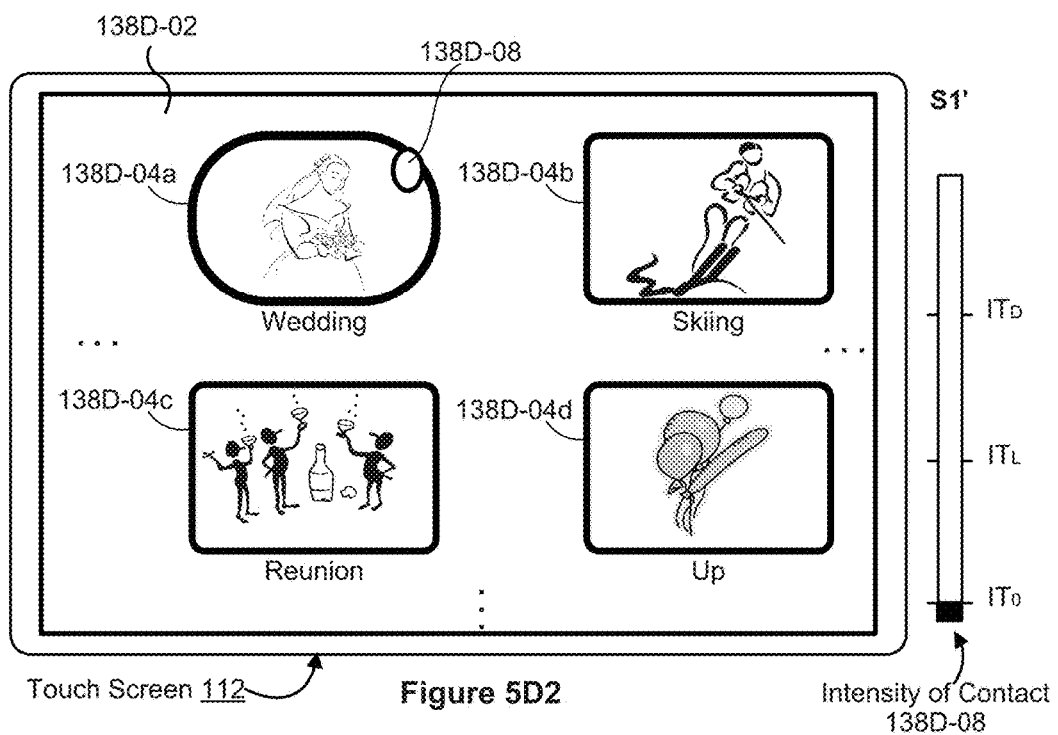
Figure 5D2

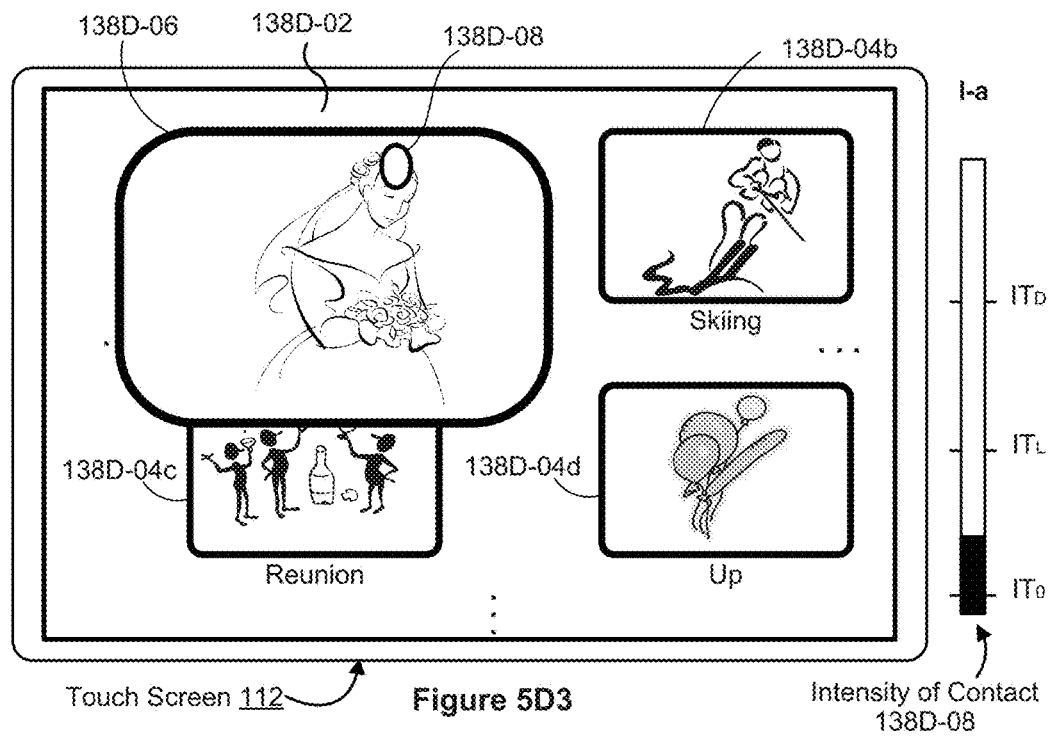
Figure 5D3
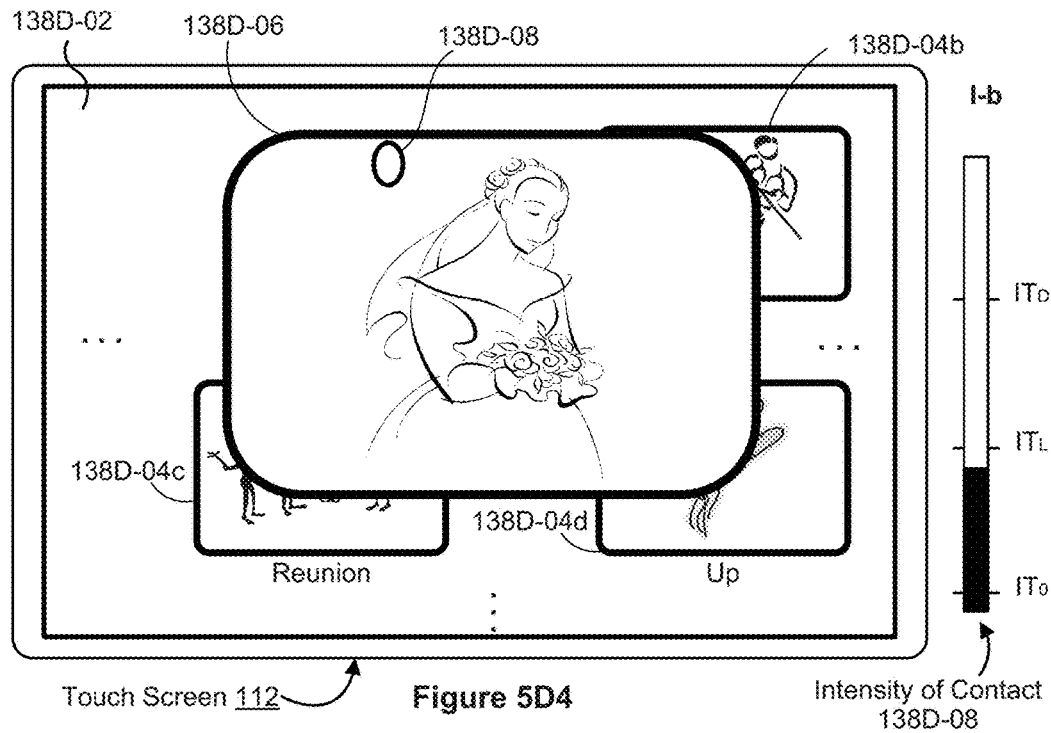
Figure 5D4

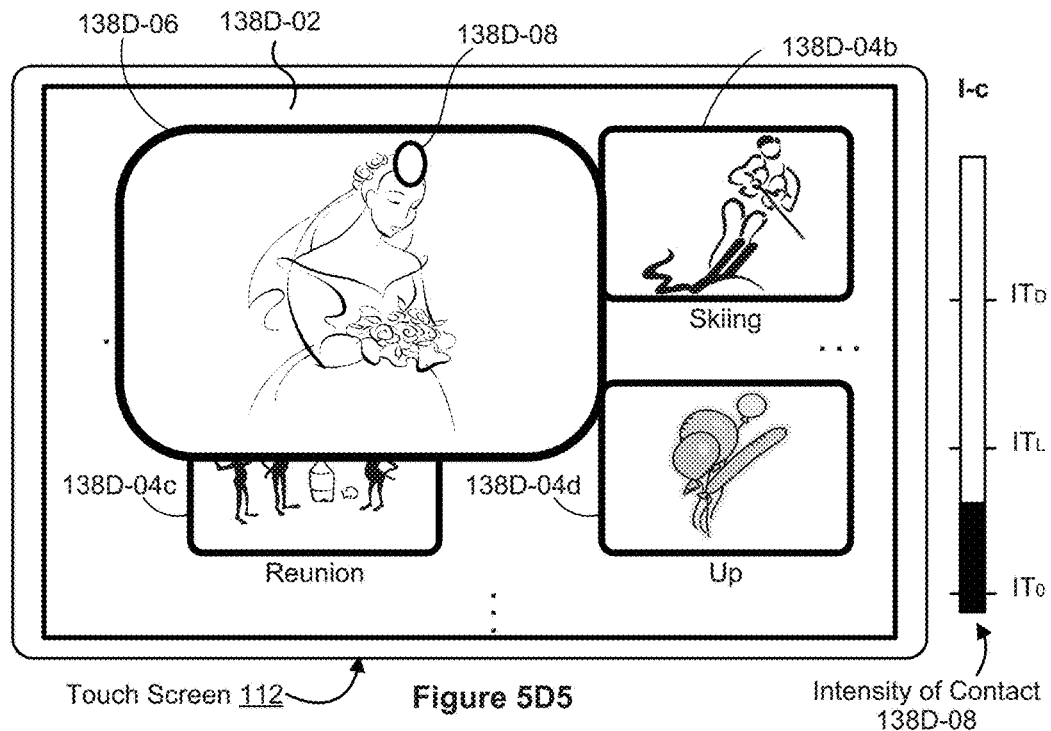
Figure 5D5
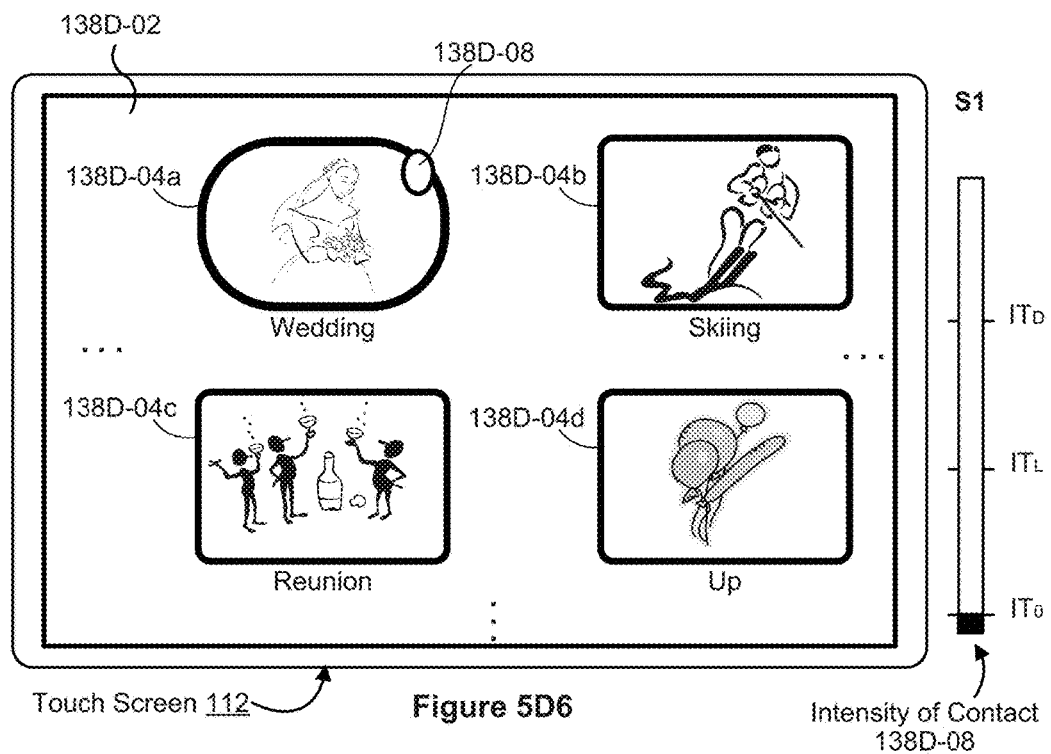
Figure 5D6

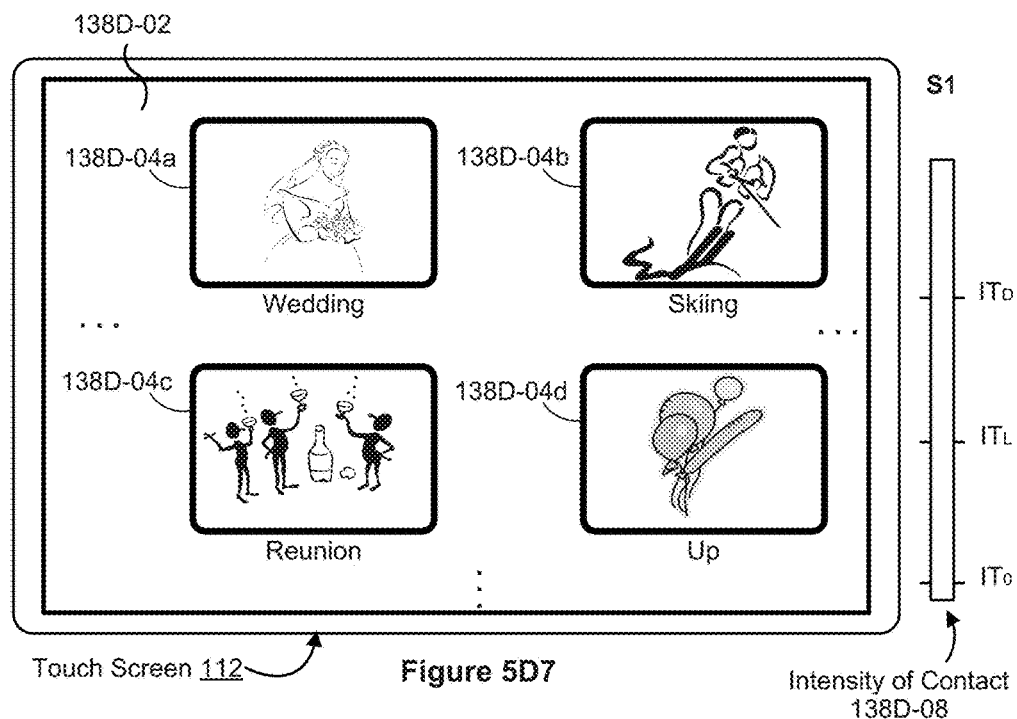
Figure 5D7
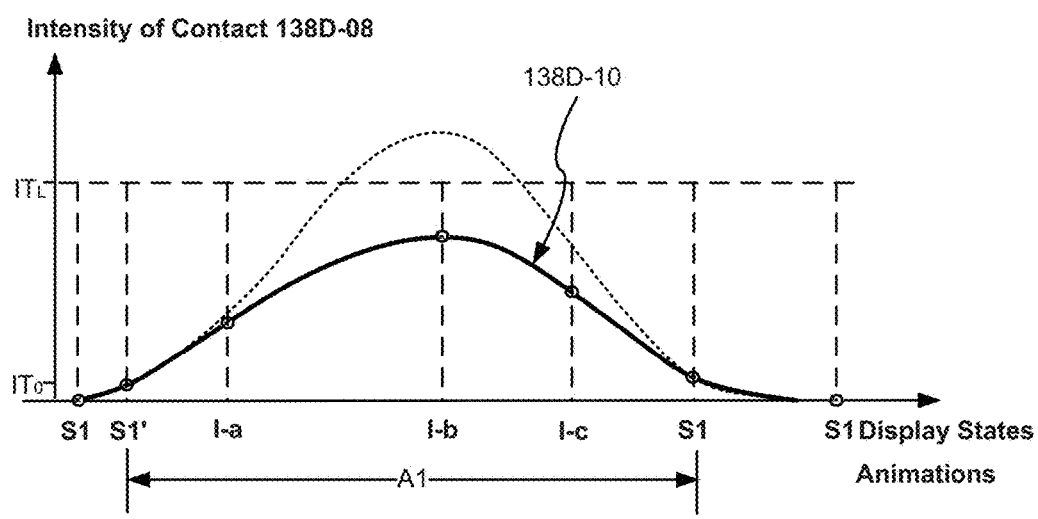
Figure 5D8

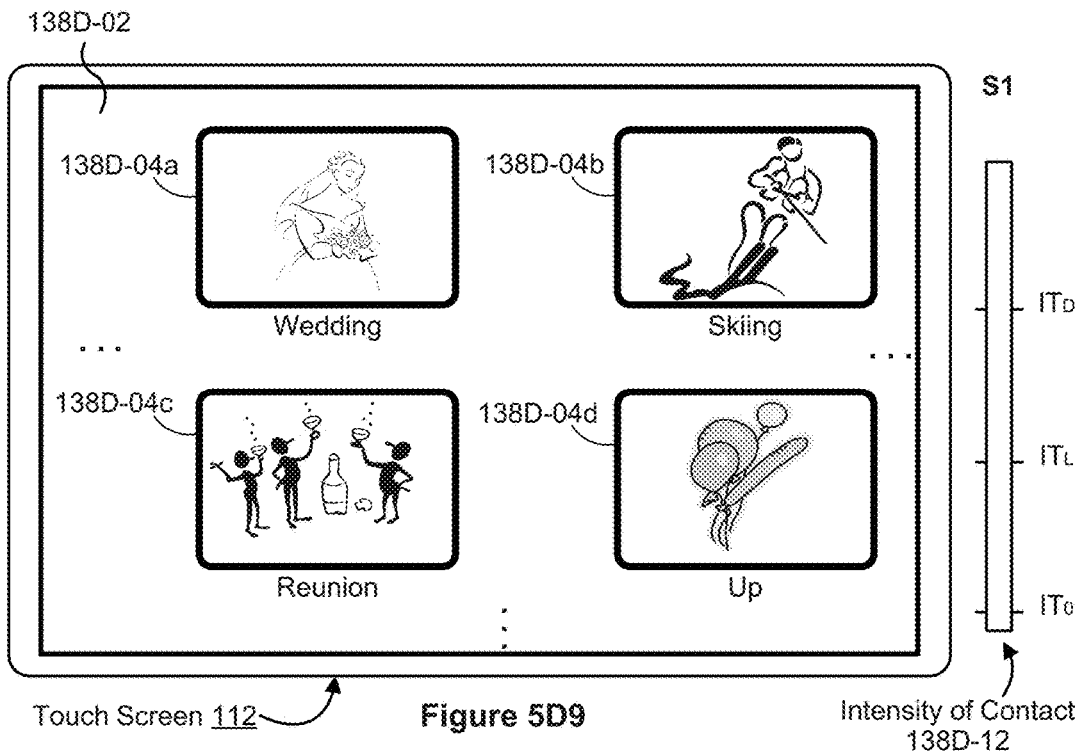
Figure 5D9
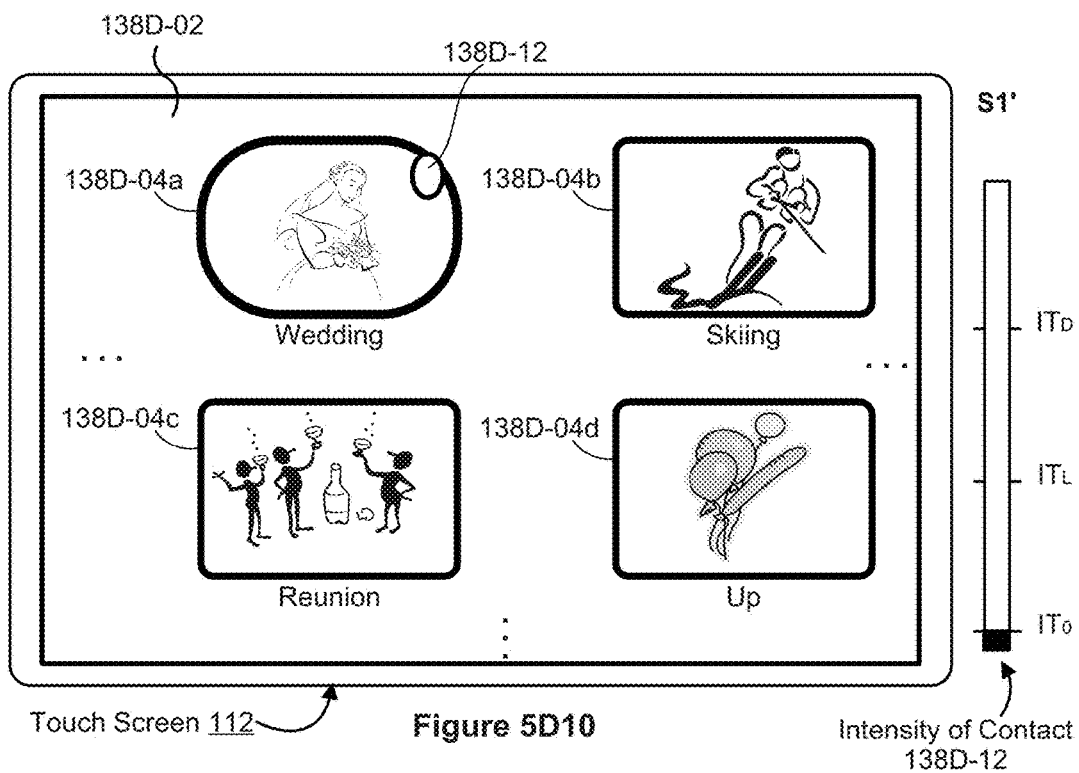
Figure 5D10

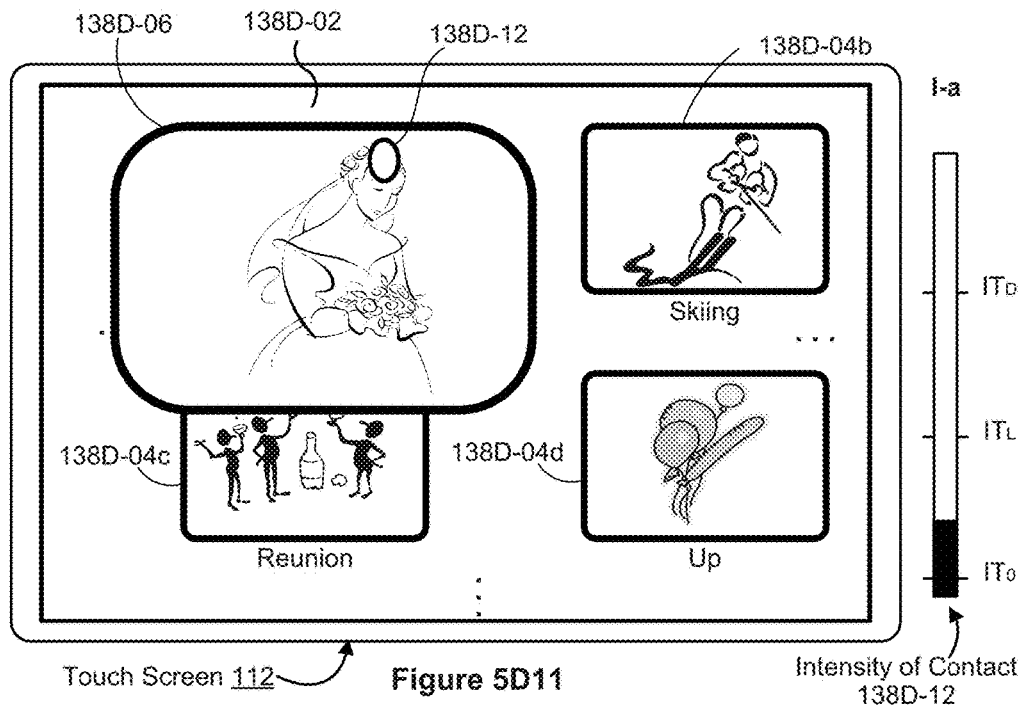
Figure 5D11
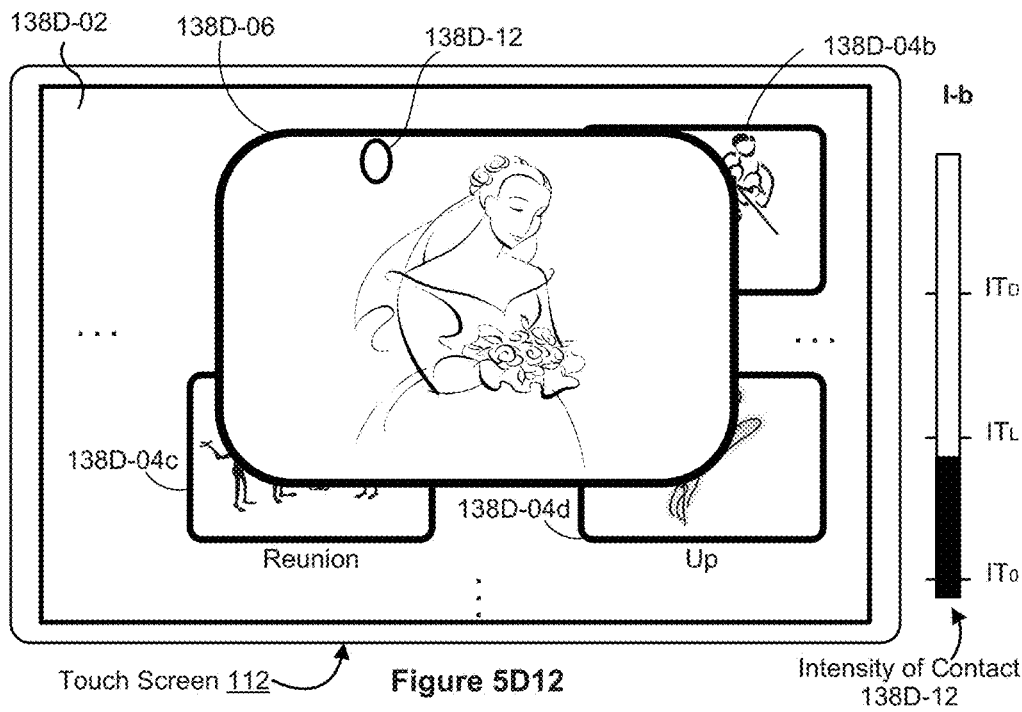
Figure 5D12

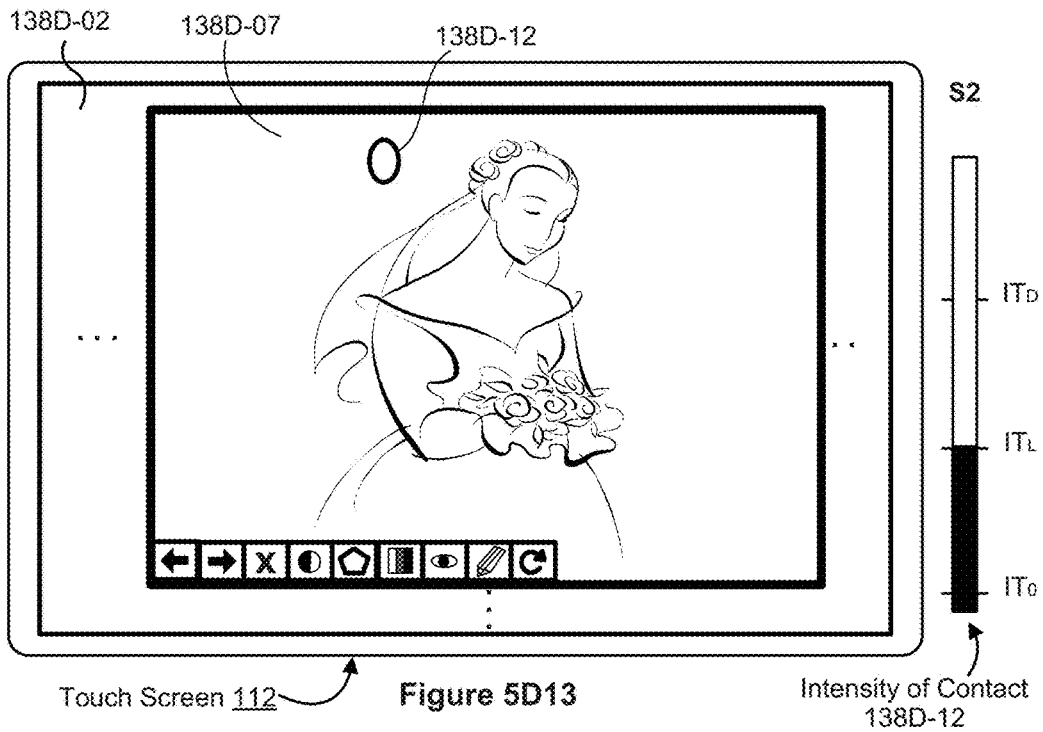
Figure 5D13
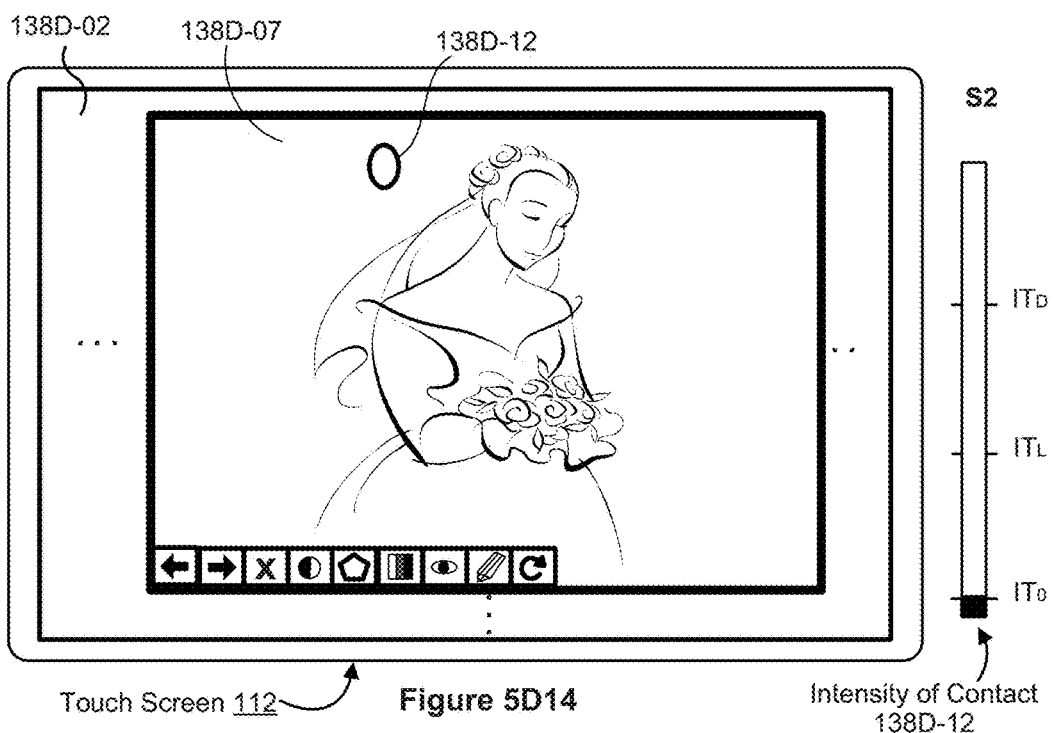
Figure 5D14

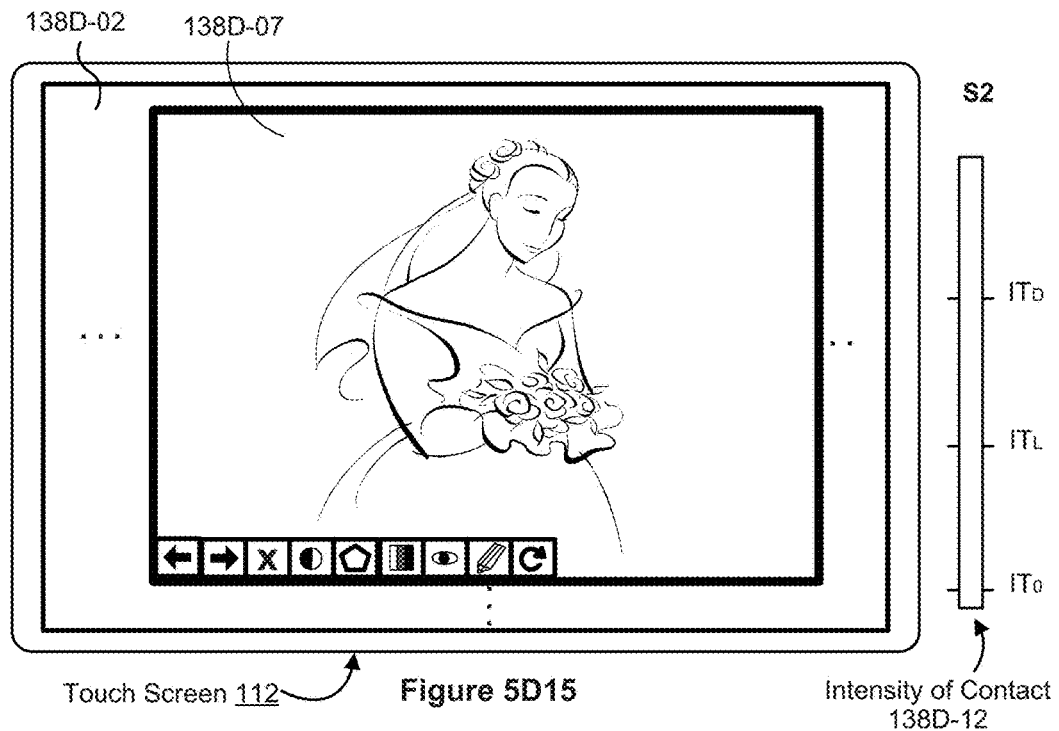
Figure 5D15
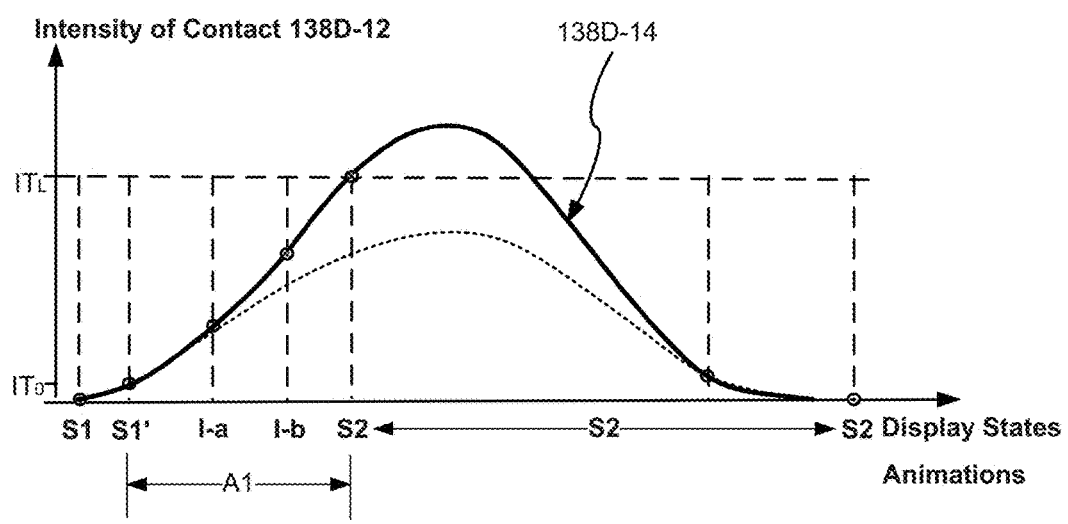
Figure 5D16

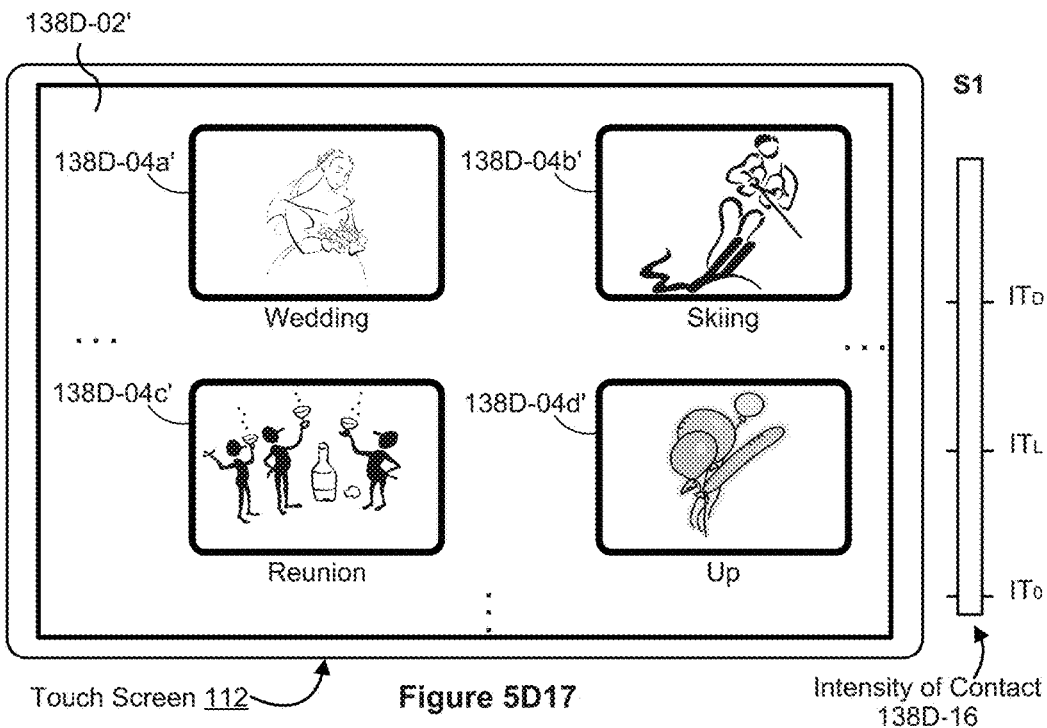
Figure 5D17
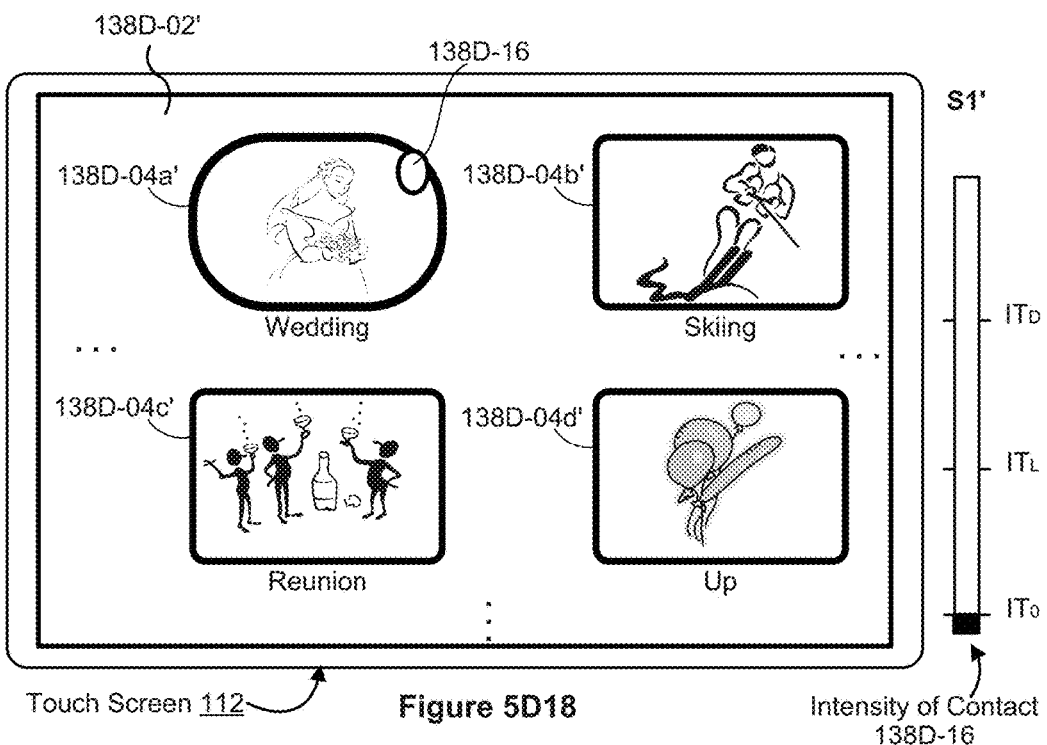
Figure 5D18

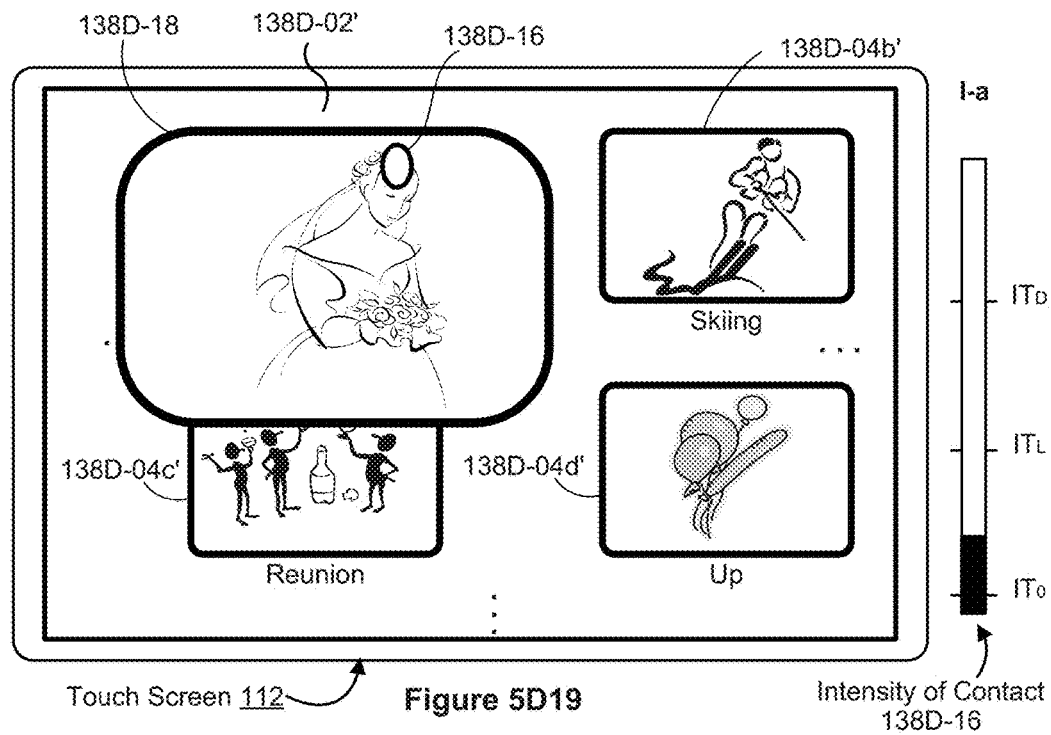
Figure 5D19
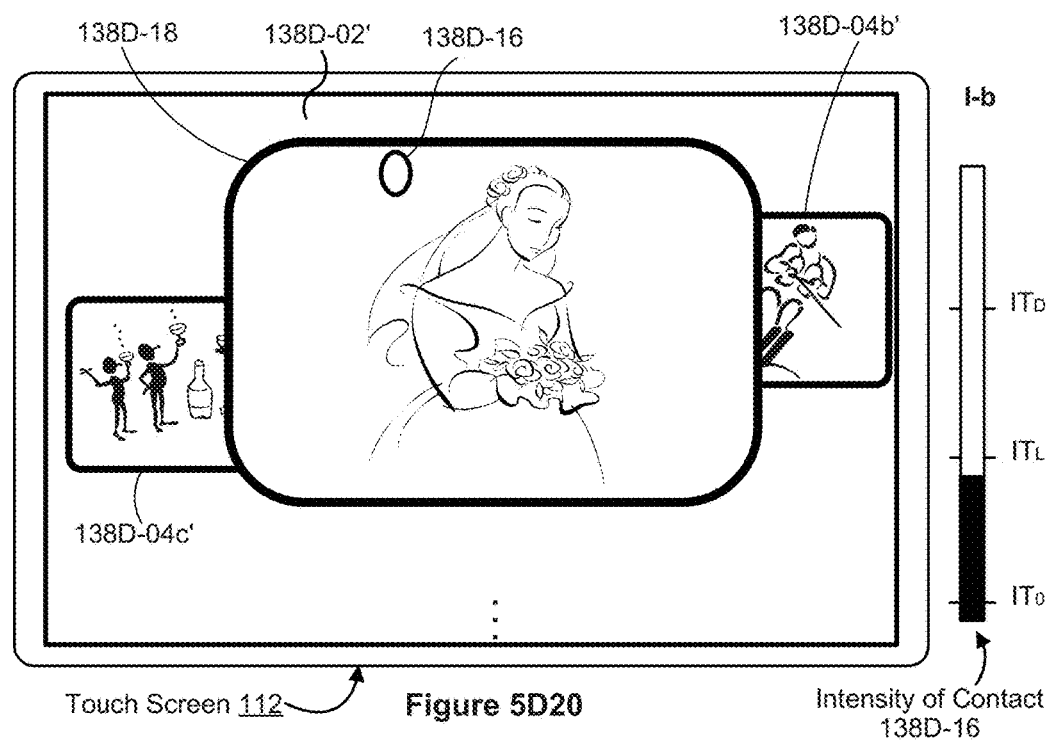
Figure 5D20

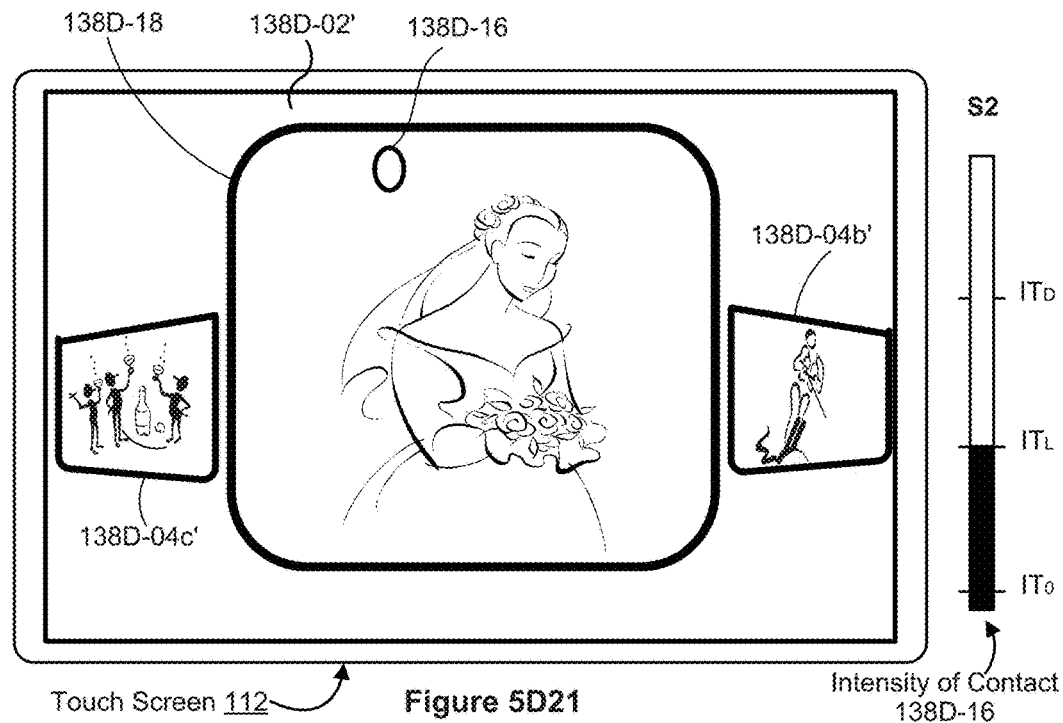
Figure 5D21
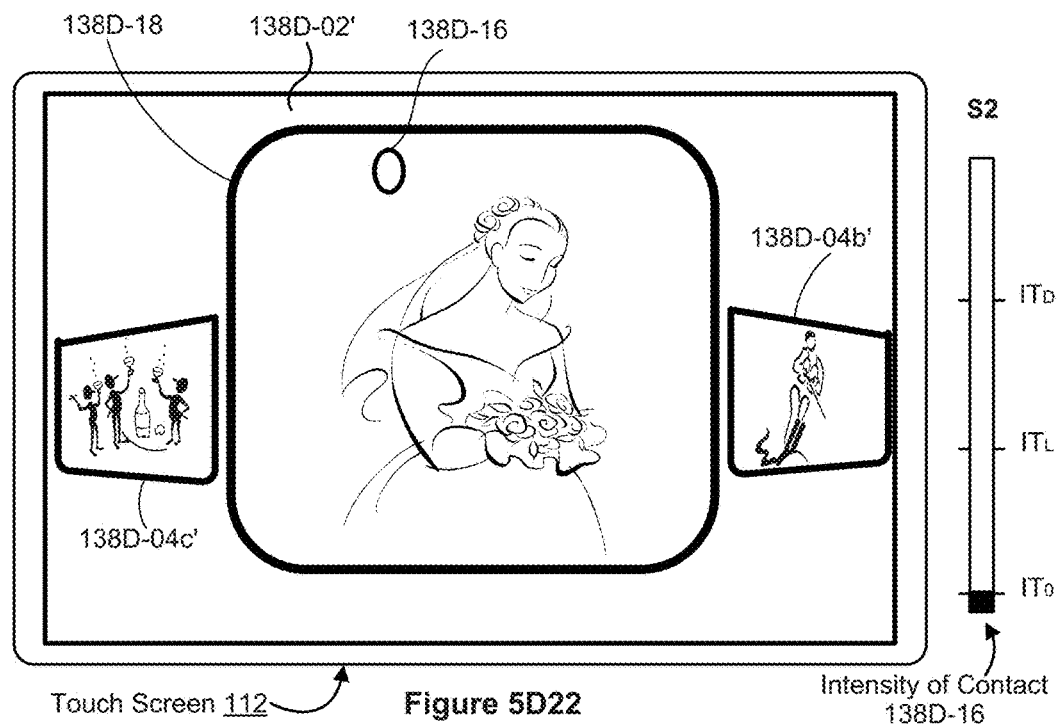
Figure 5D22

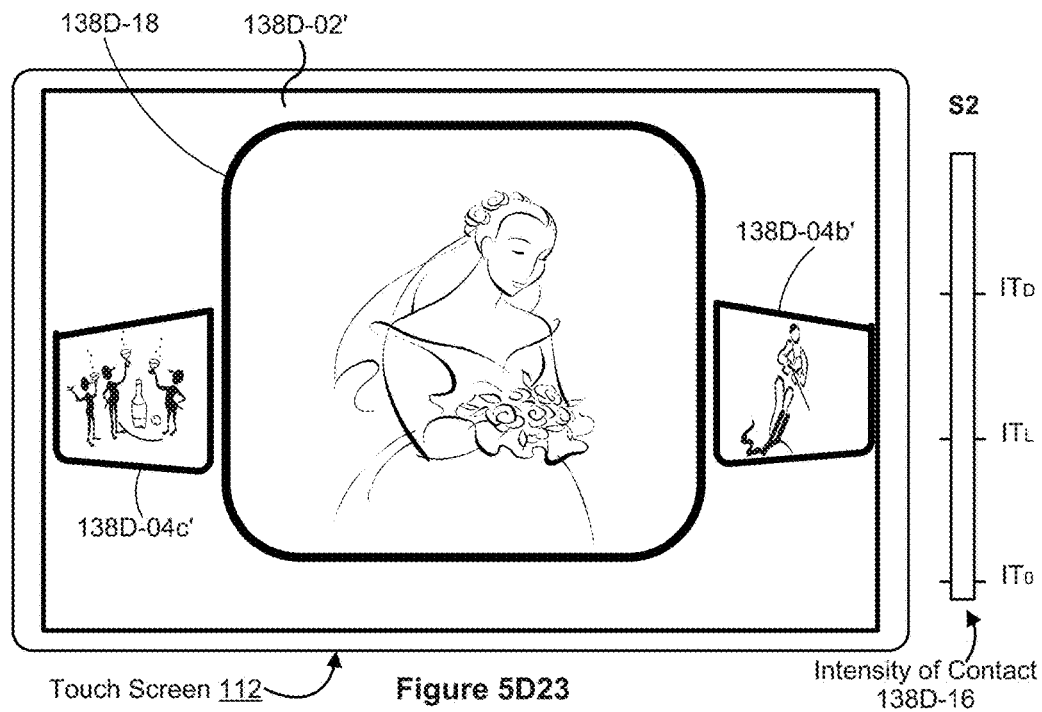
Figure 5D23
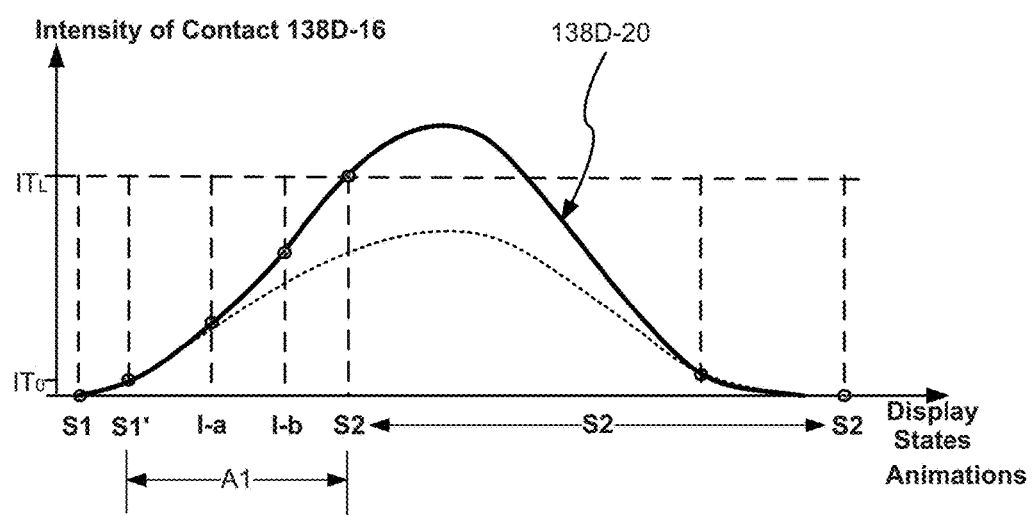
Figure 5D24

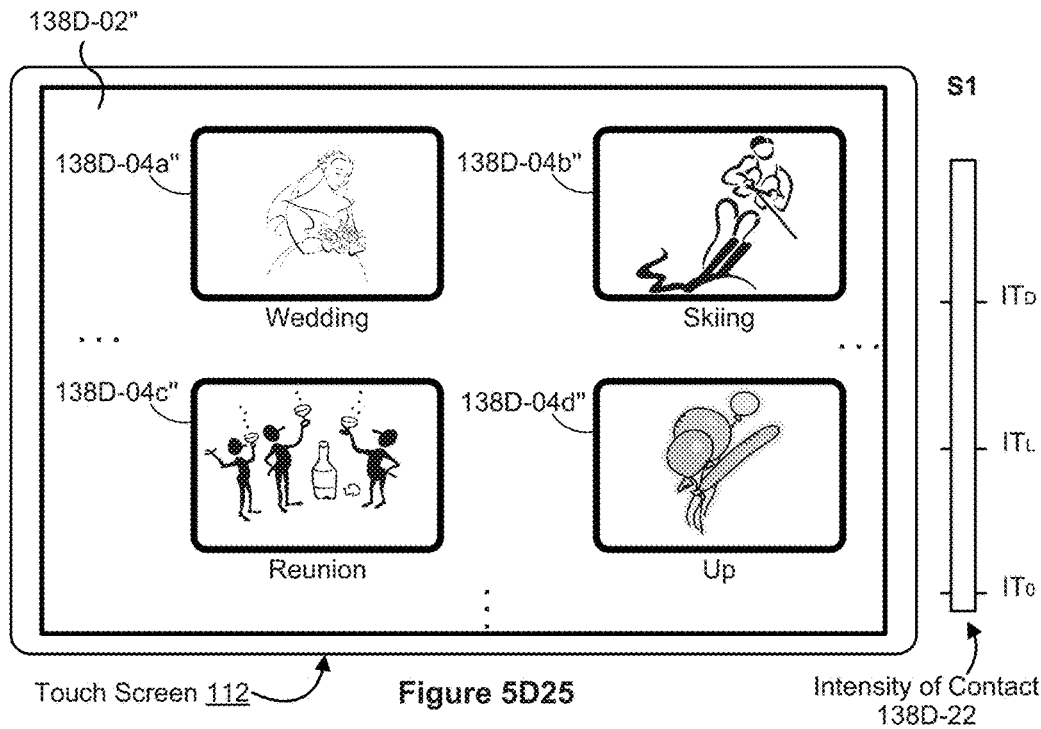
Figure 5D25
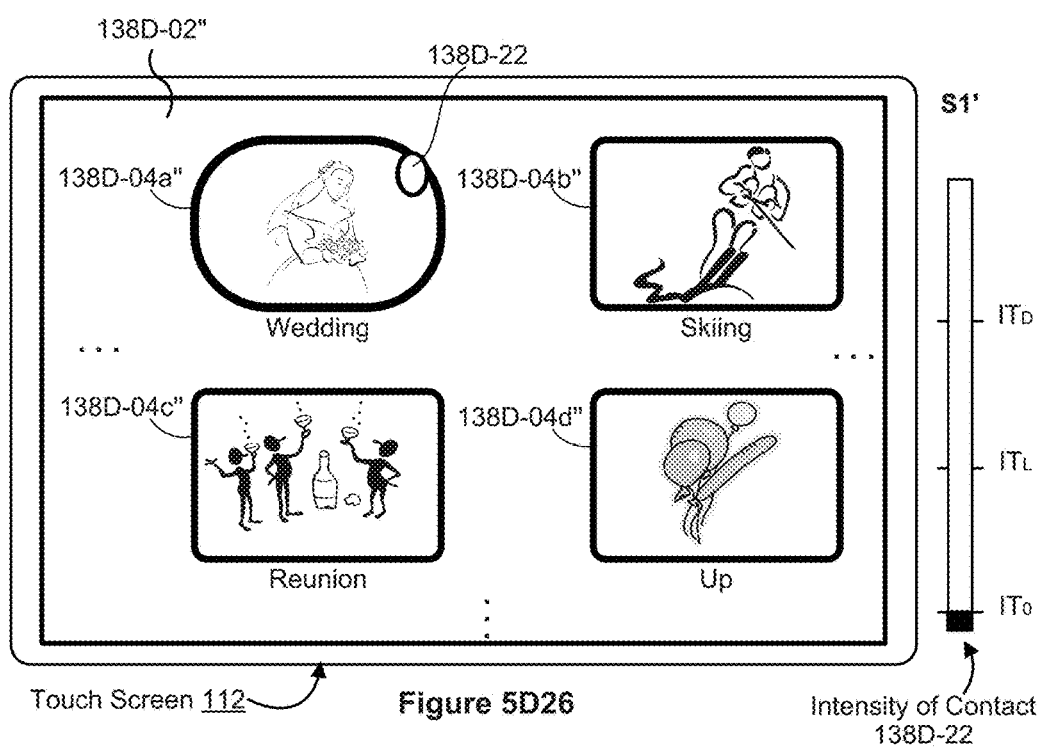
Figure 5D26

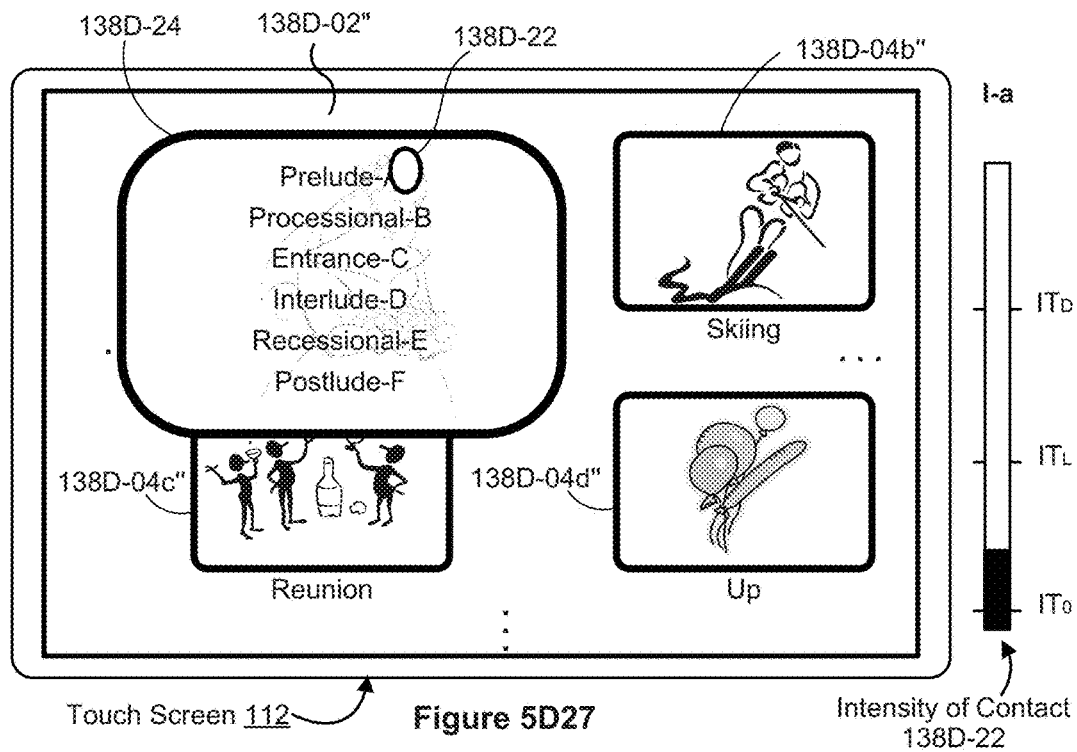
Figure 5D27
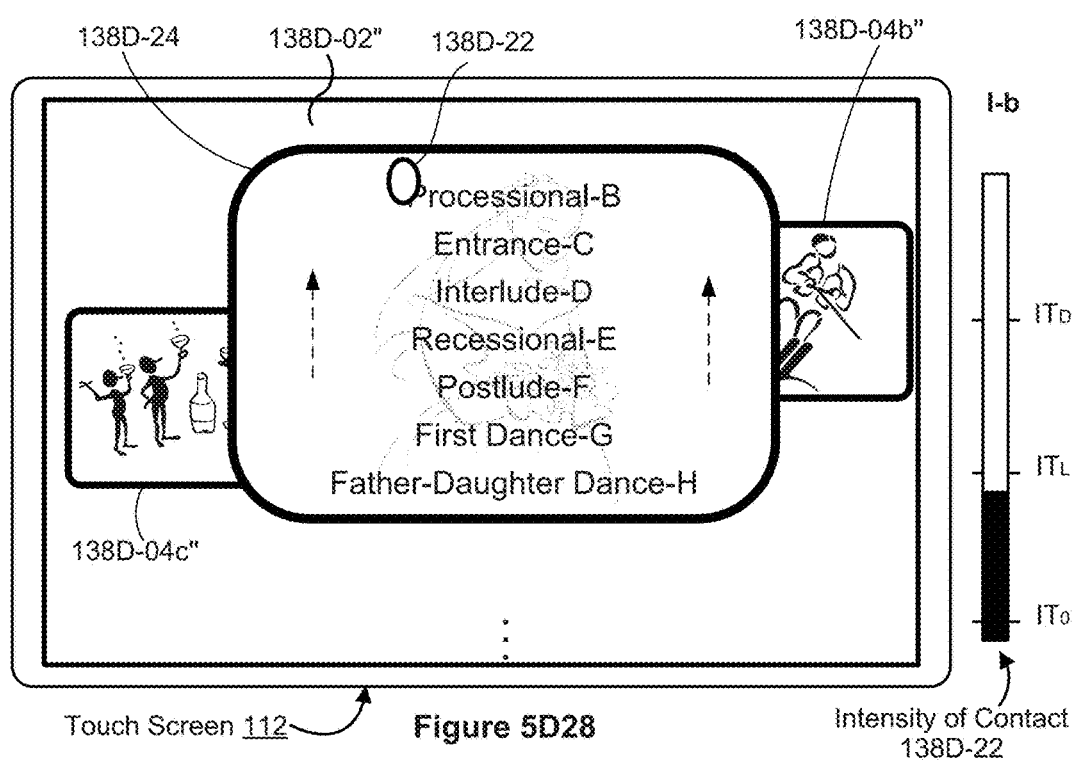
Figure 5D28

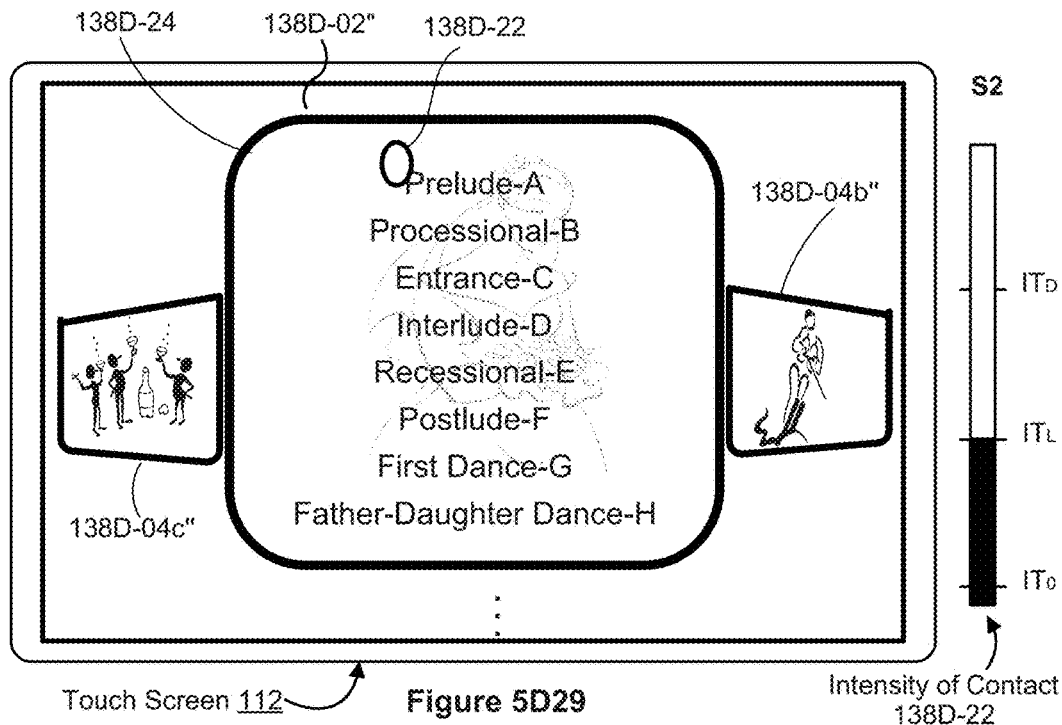
Figure 5D29
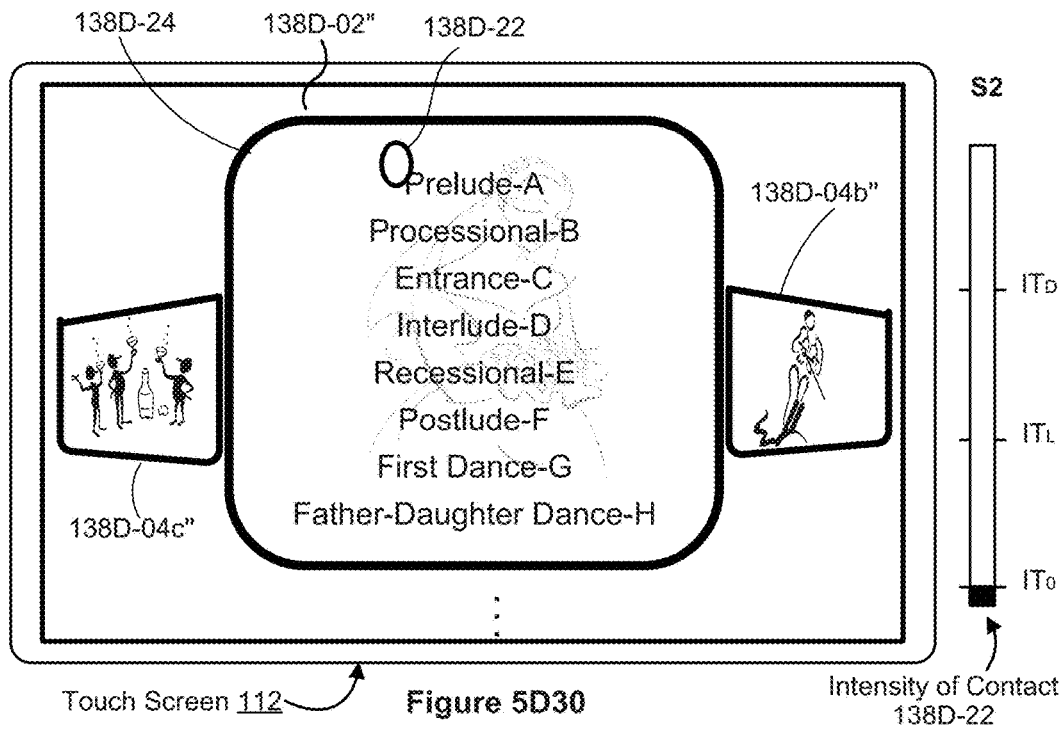
Figure 5D30

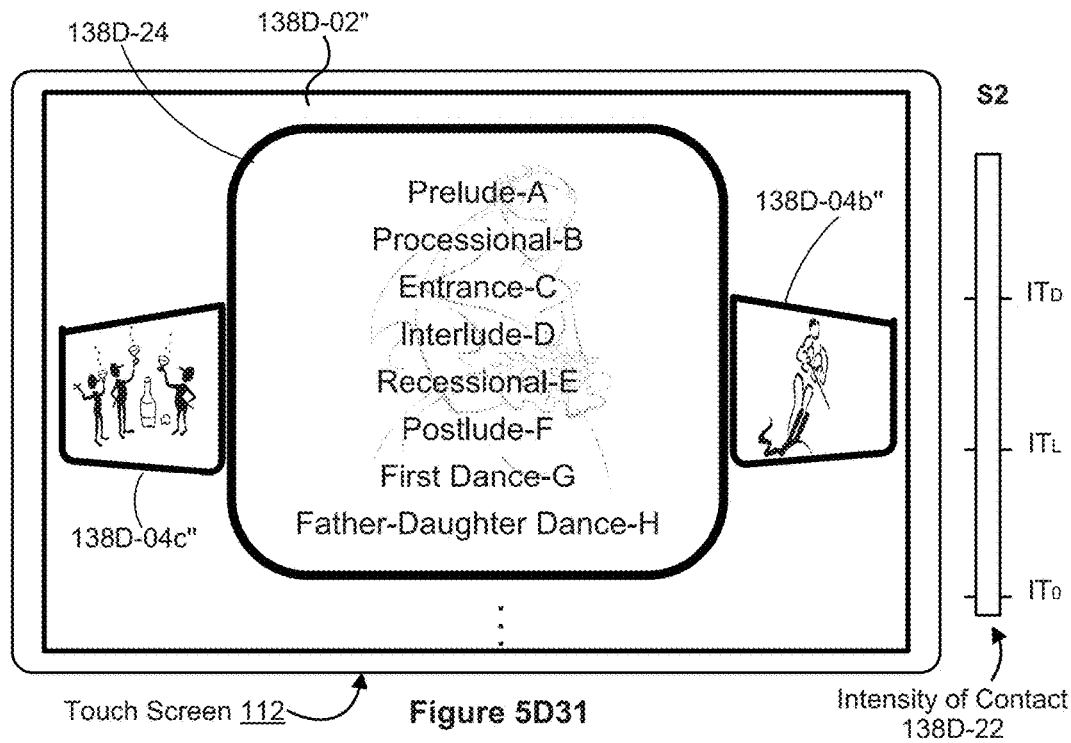
Figure 5D31
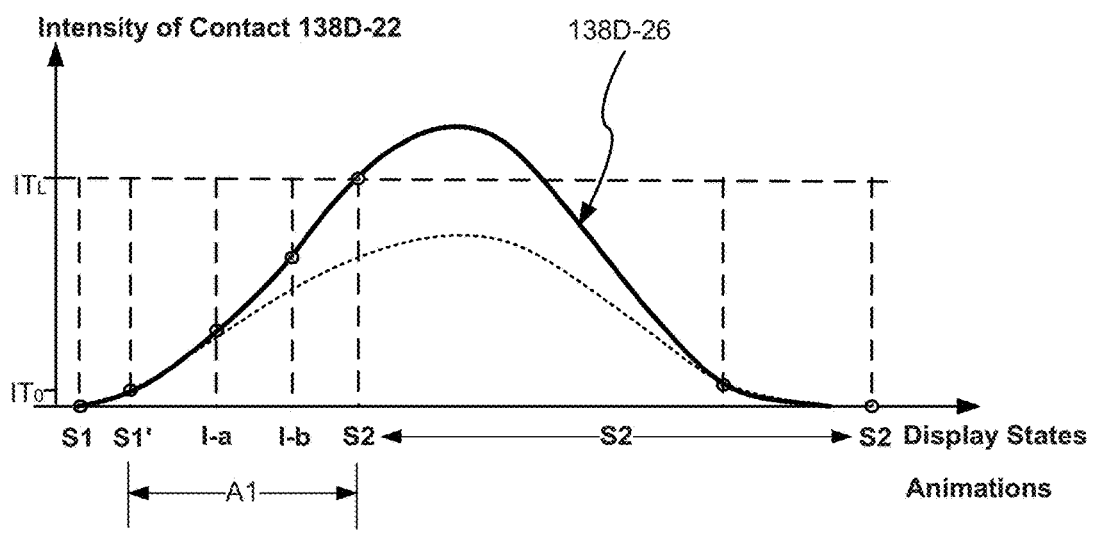
Figure 5D32

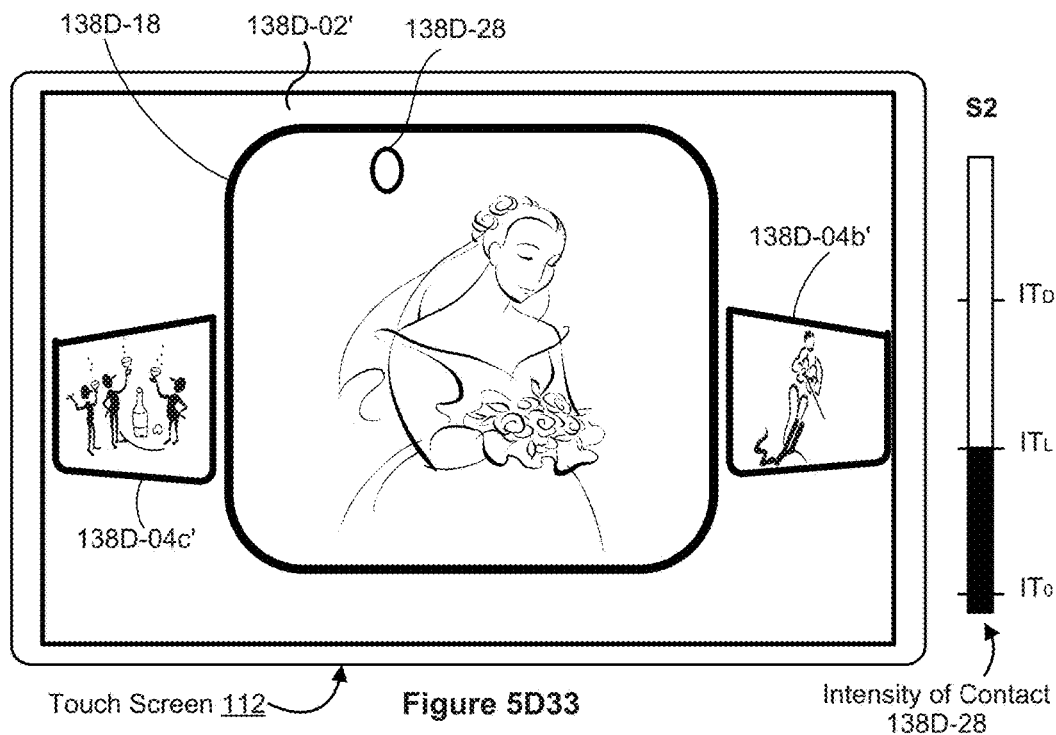
Figure 5D33
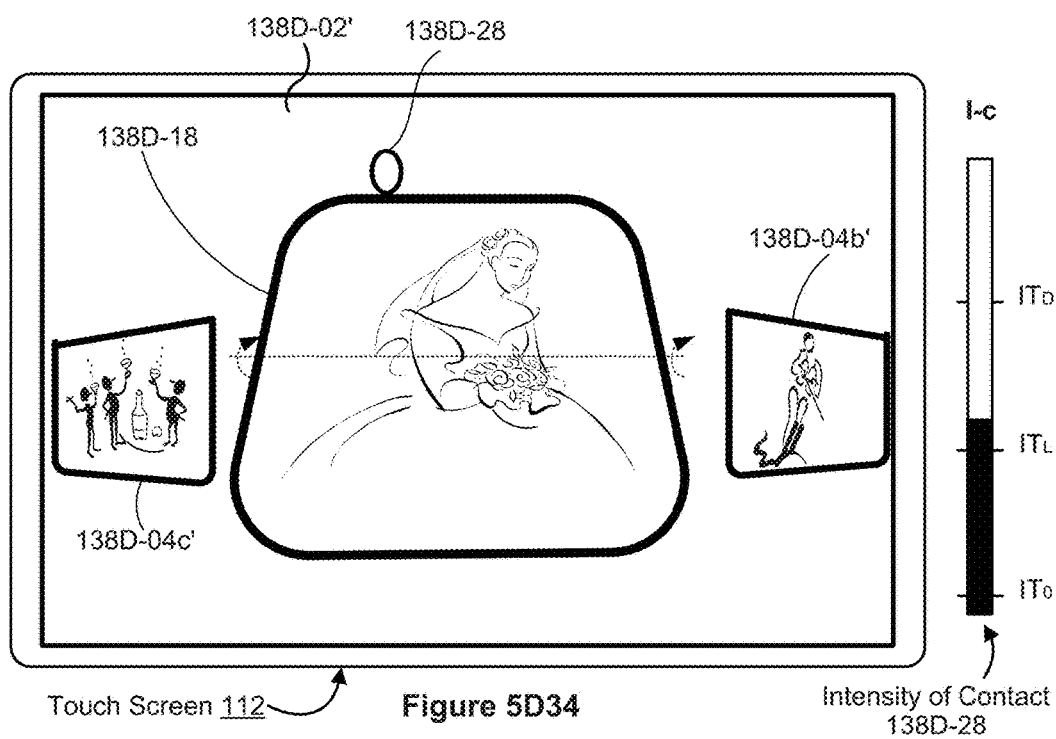
Figure 5D34

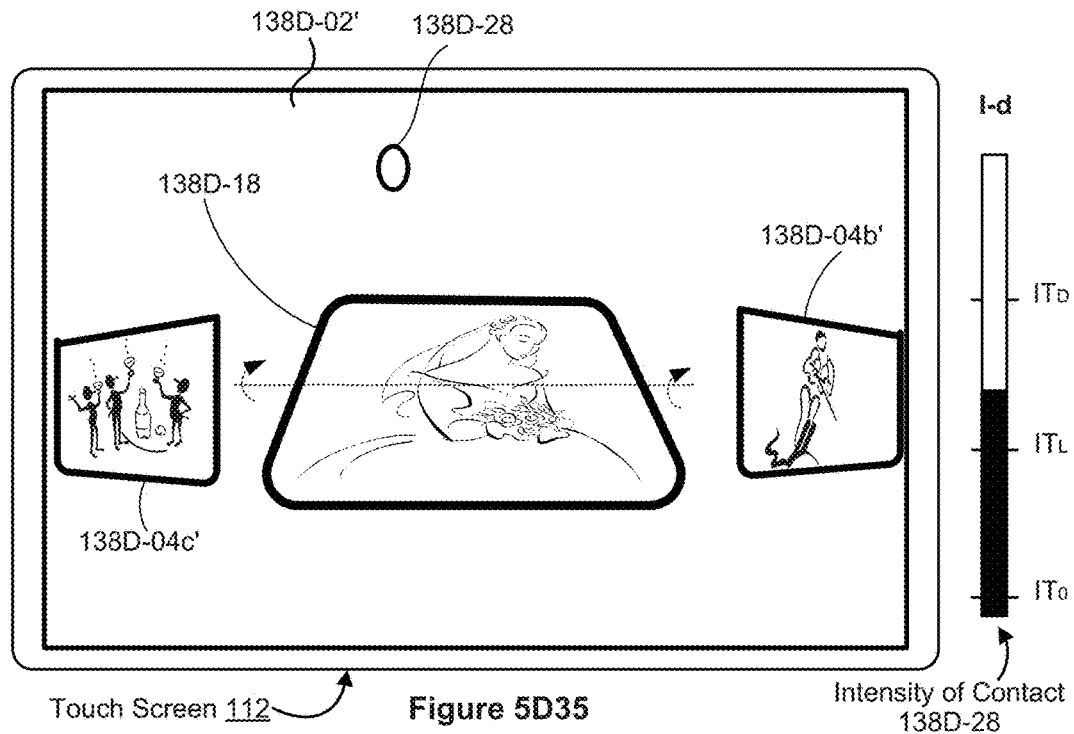
Figure 5D35
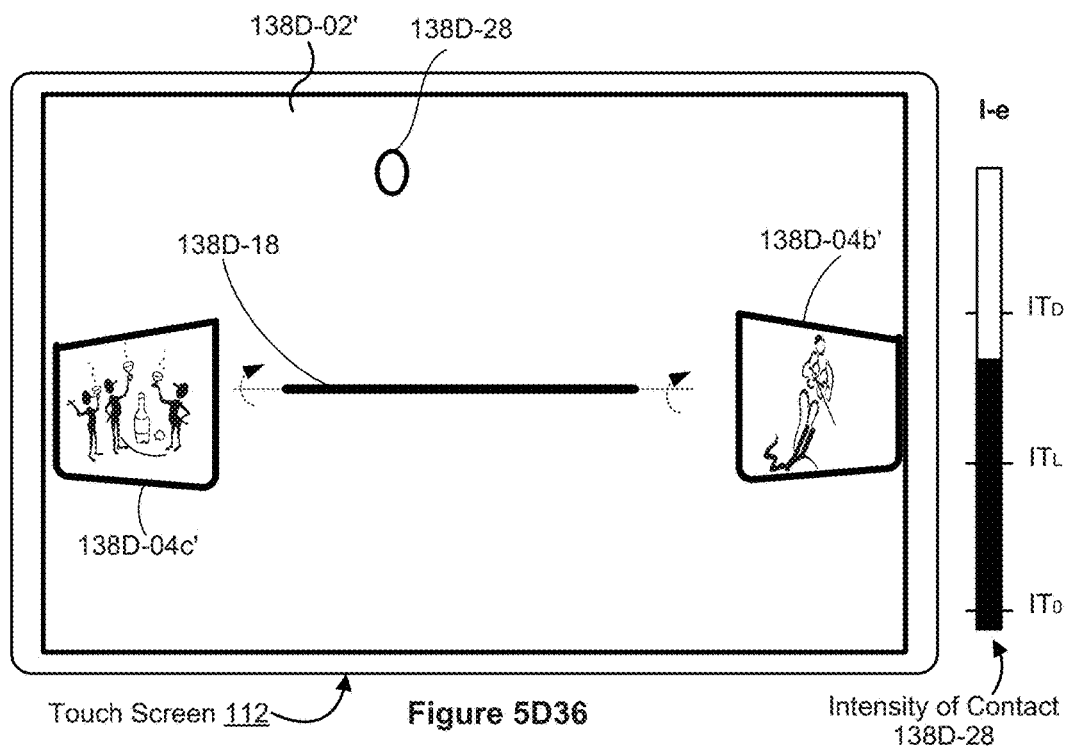
Figure 5D36

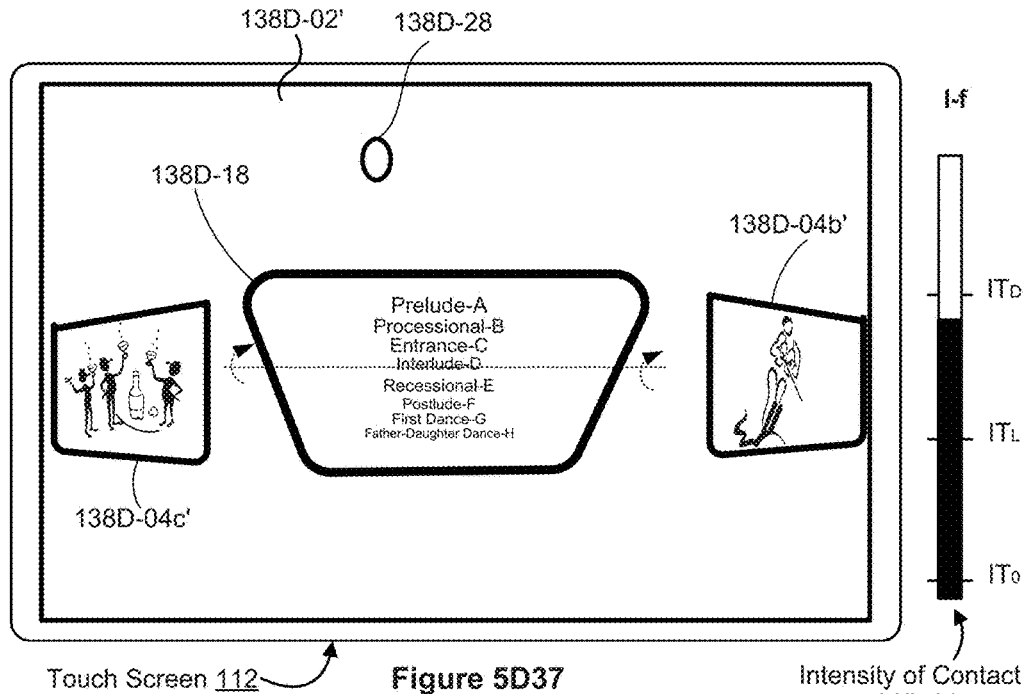
Figure 5D37
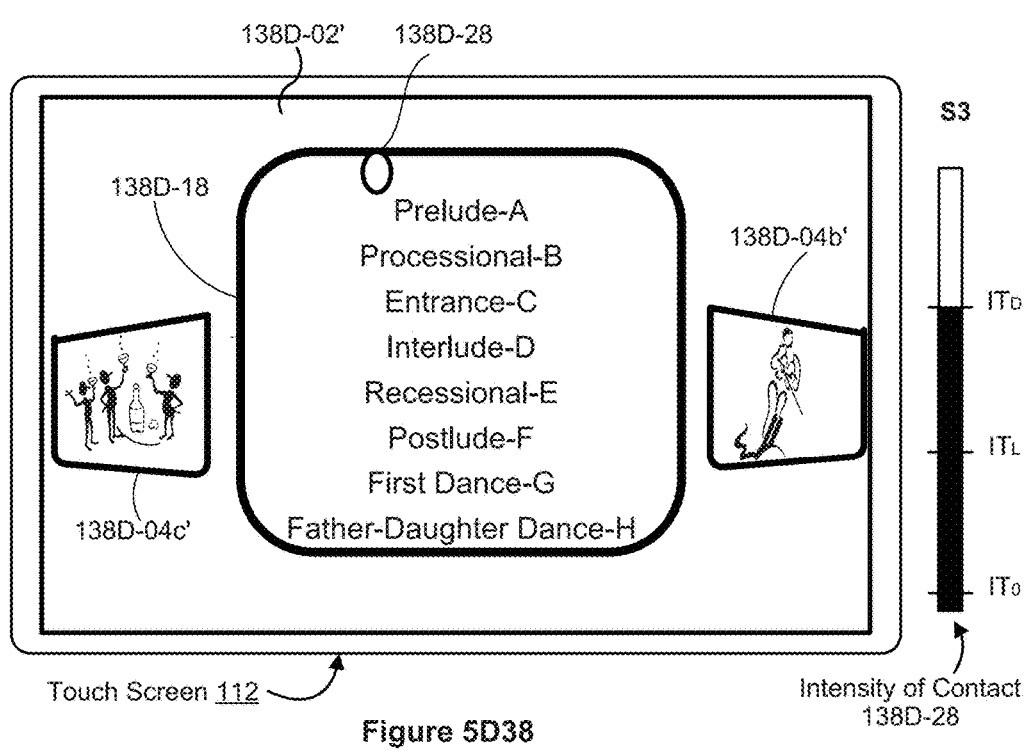
Figure 5D38

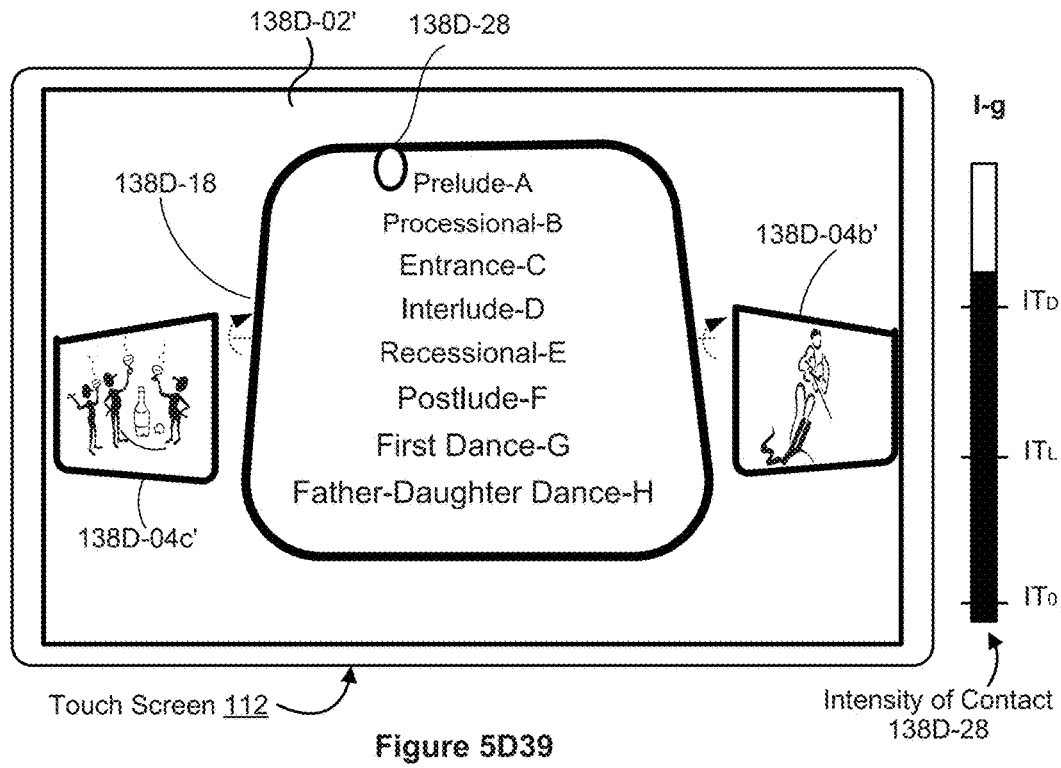
Figure 5D39
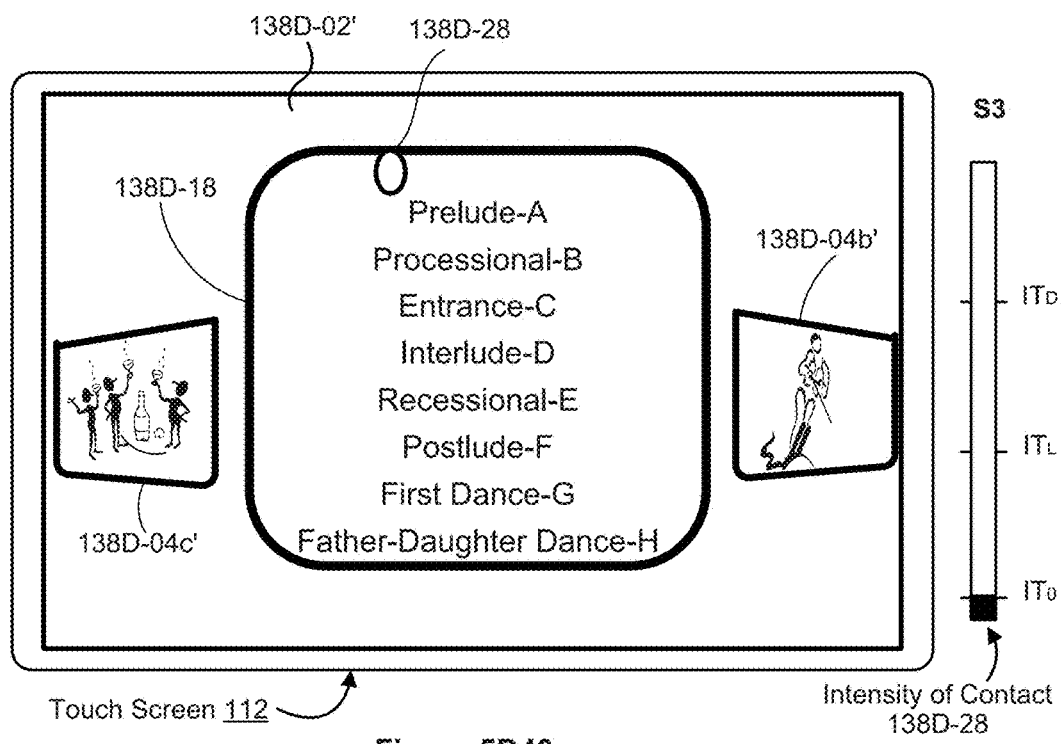
Figure 5D40

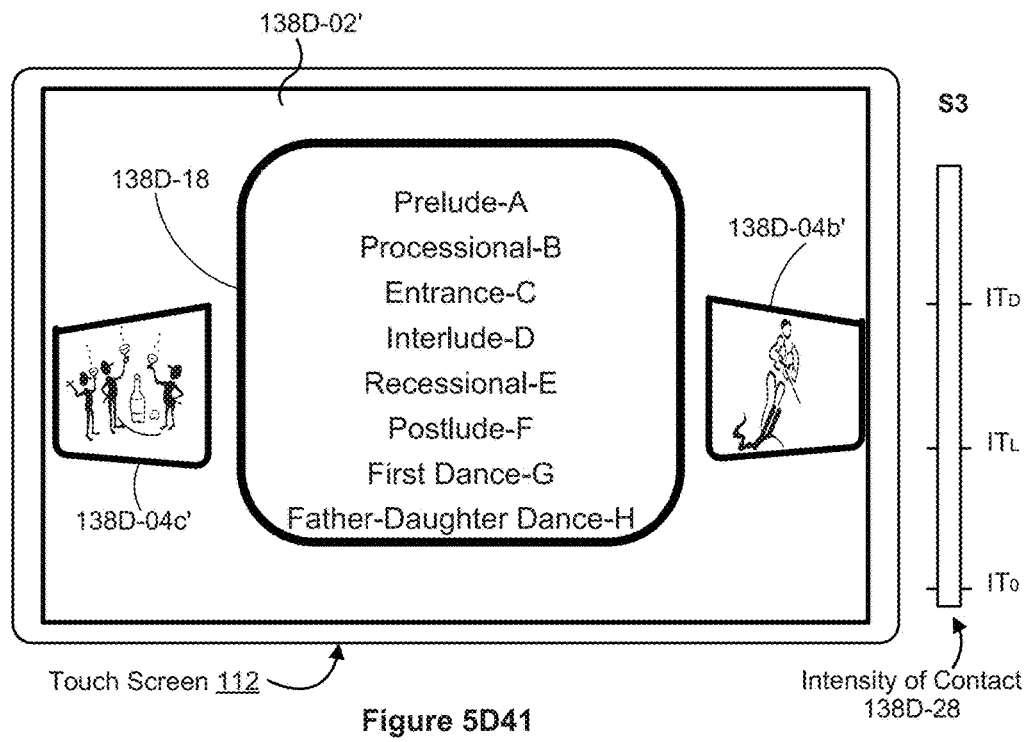
Figure 5D41
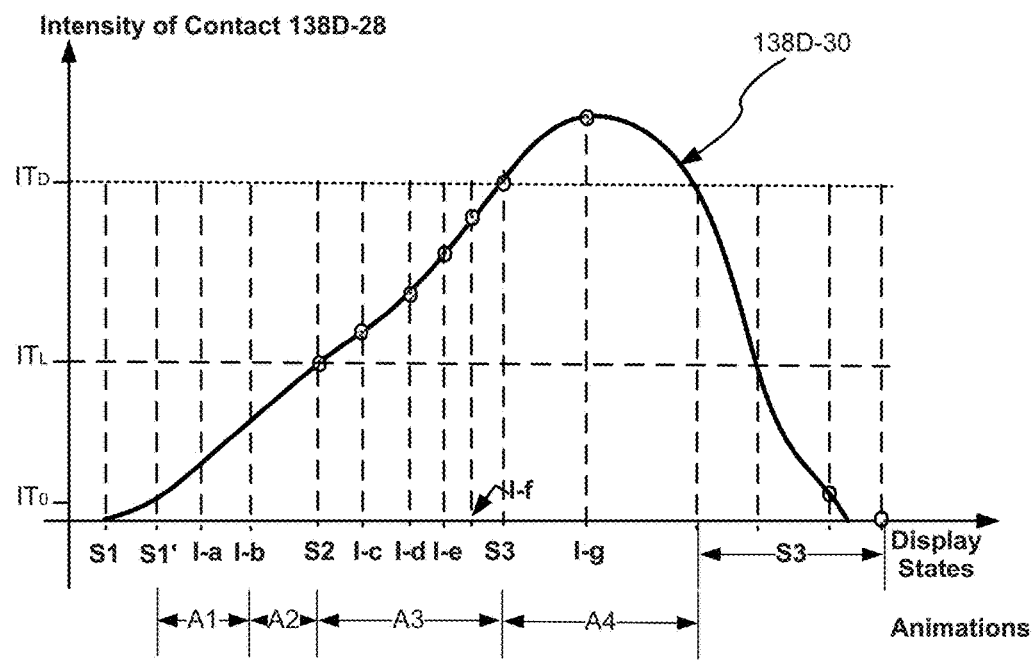
Figure 5D42

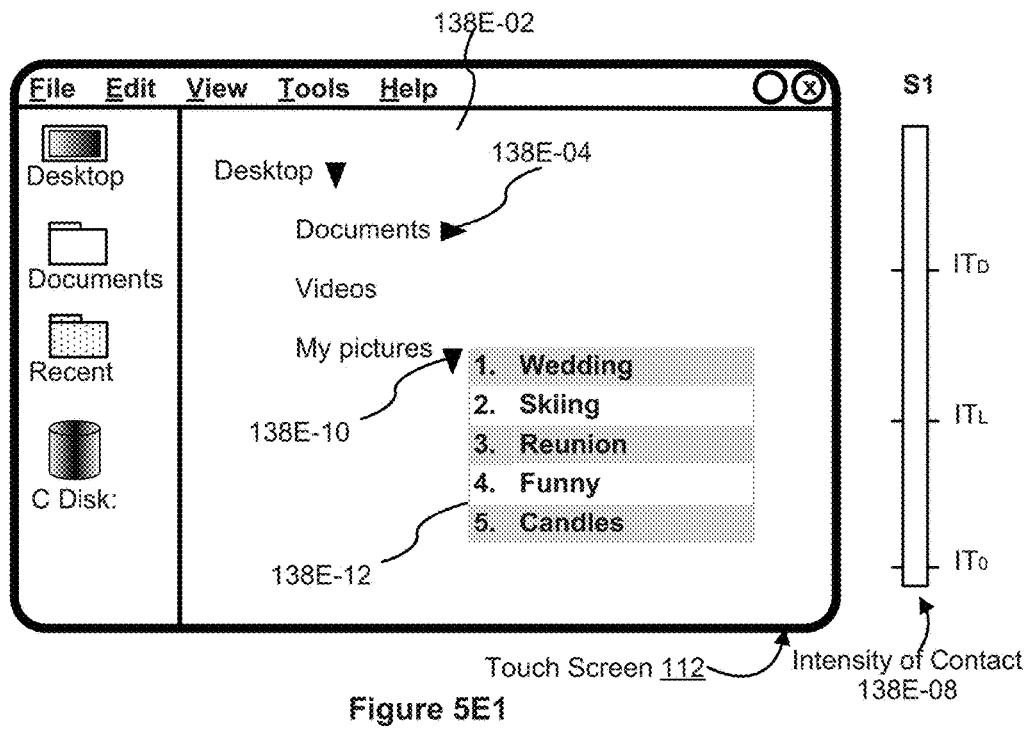
Figure 5E1
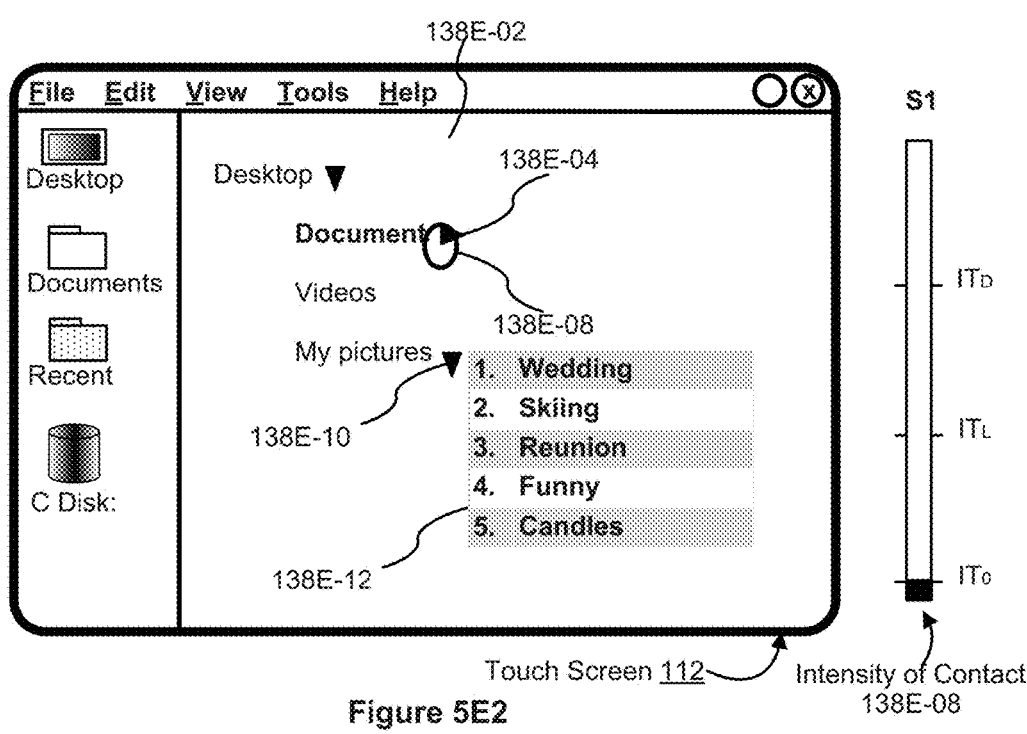
Figure 5E2

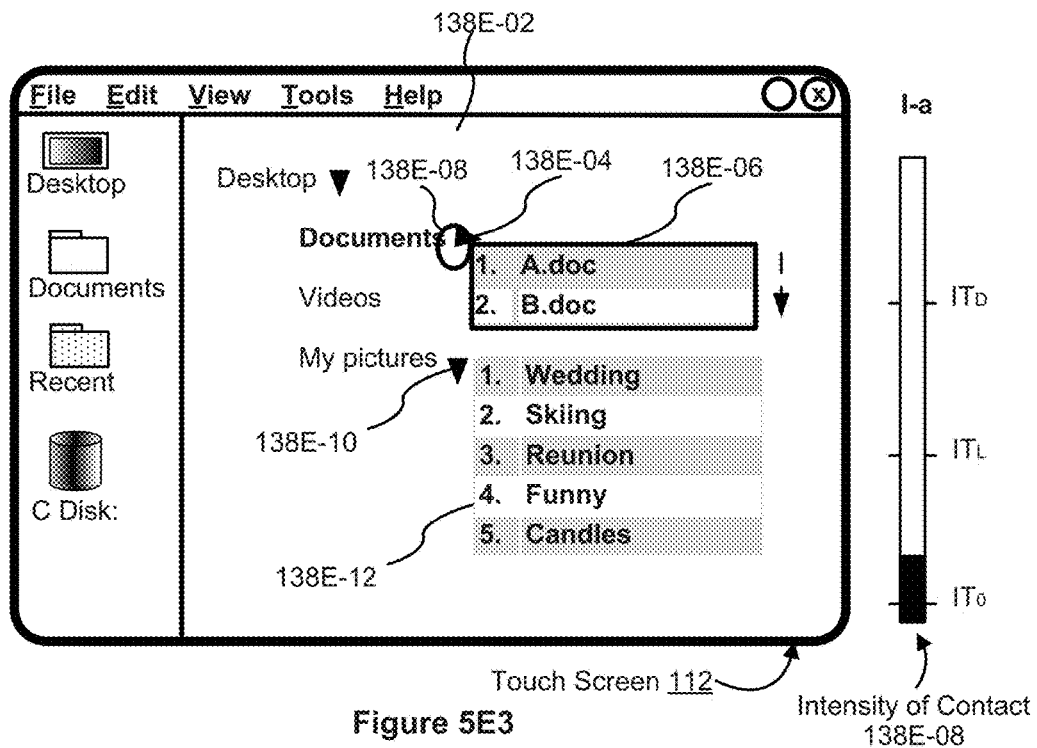
Figure 5E3
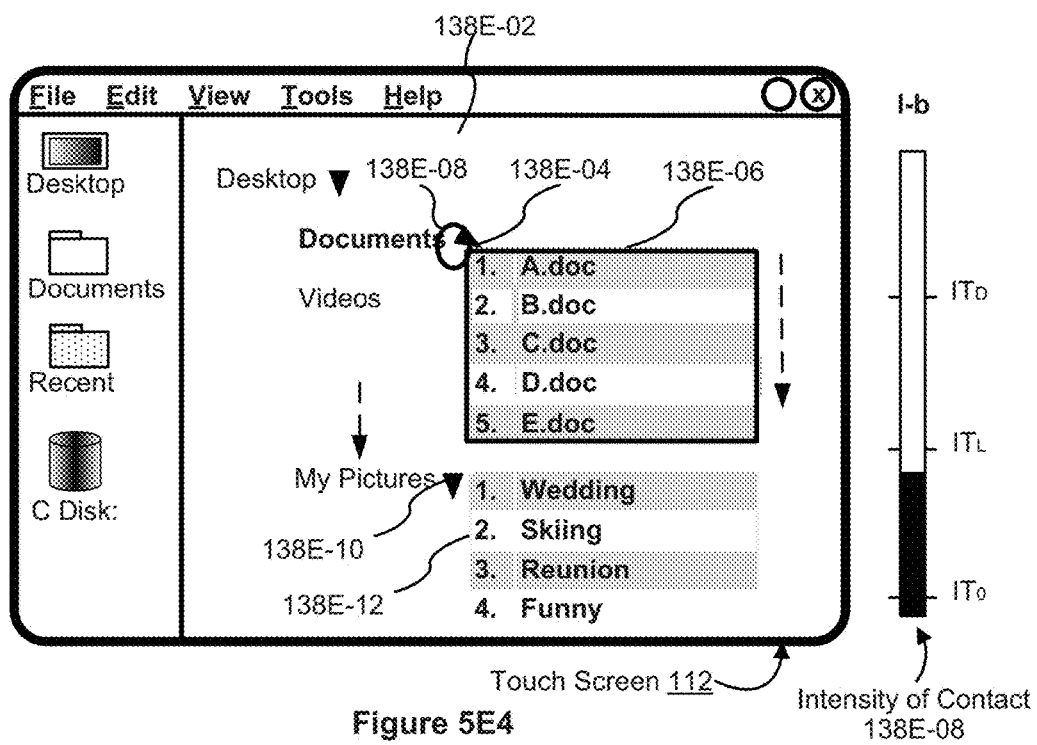
Figure 5E4

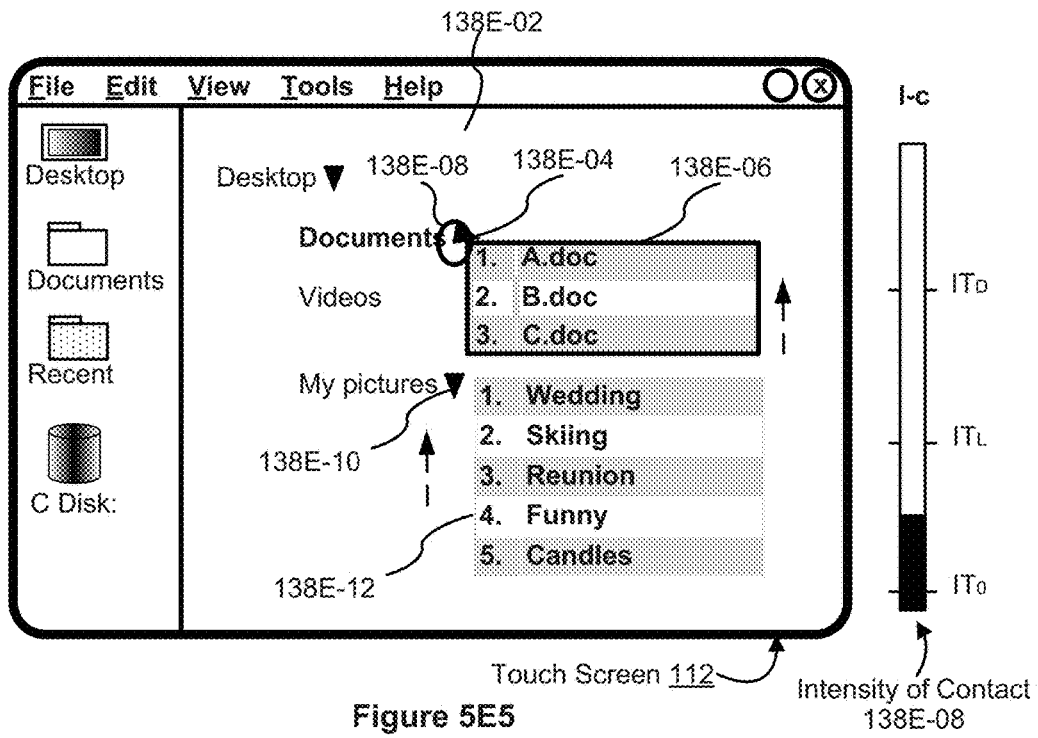
Figure 5E5
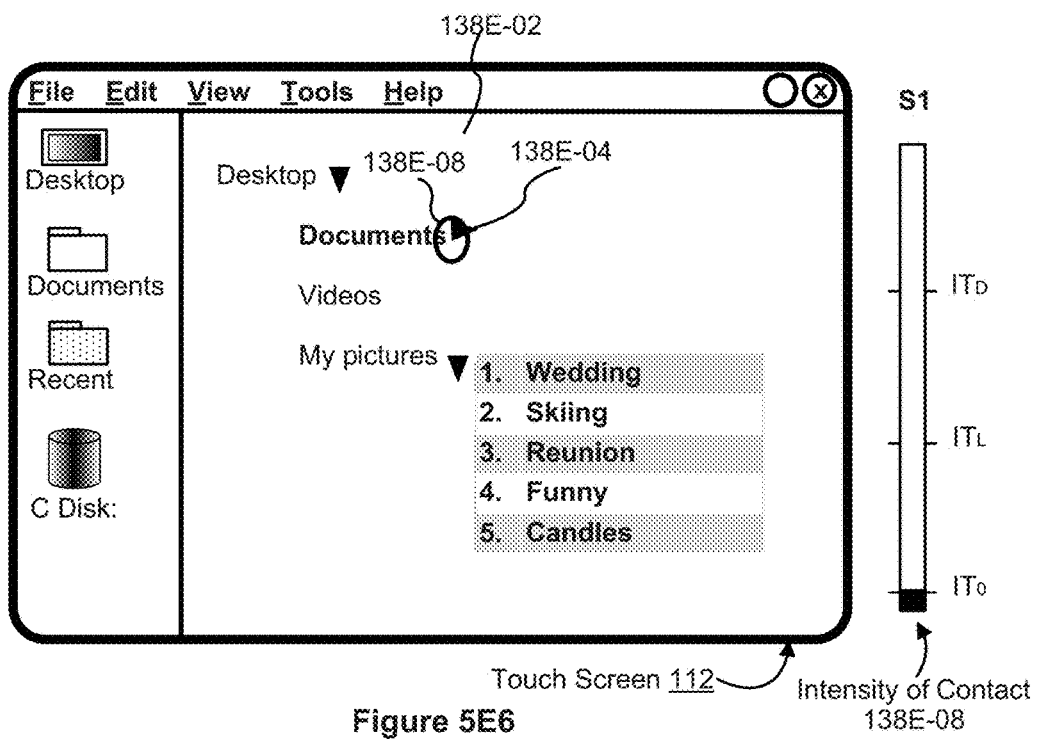
Figure 5E6

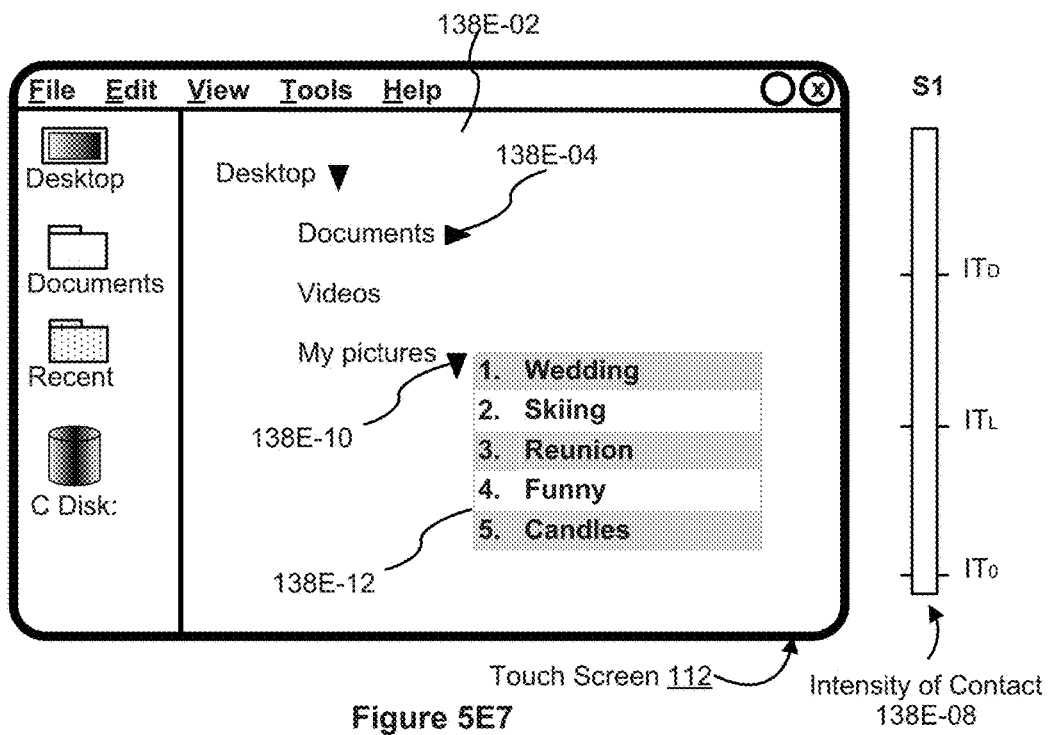
Figure 5E7
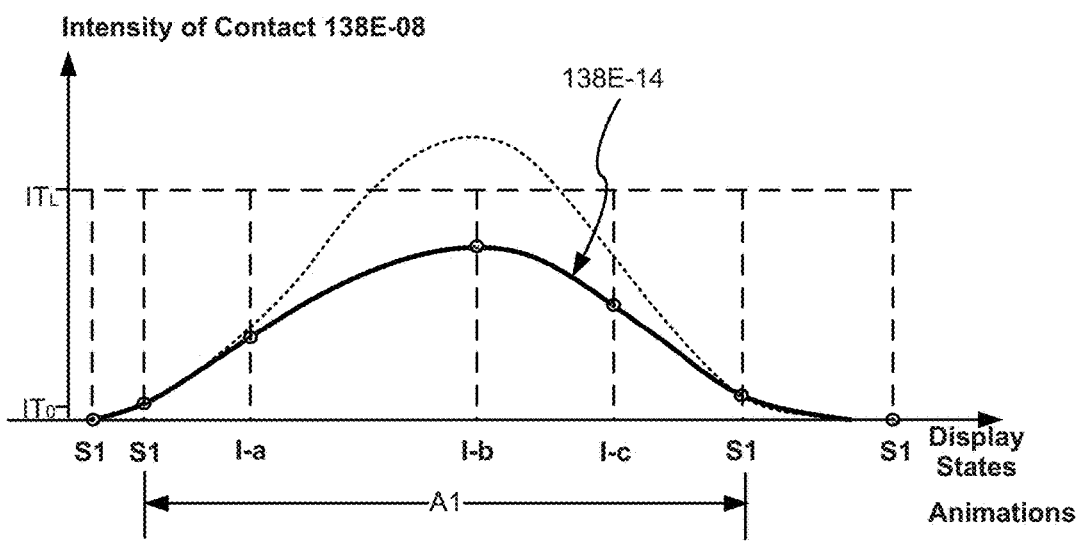
Figure 5E8

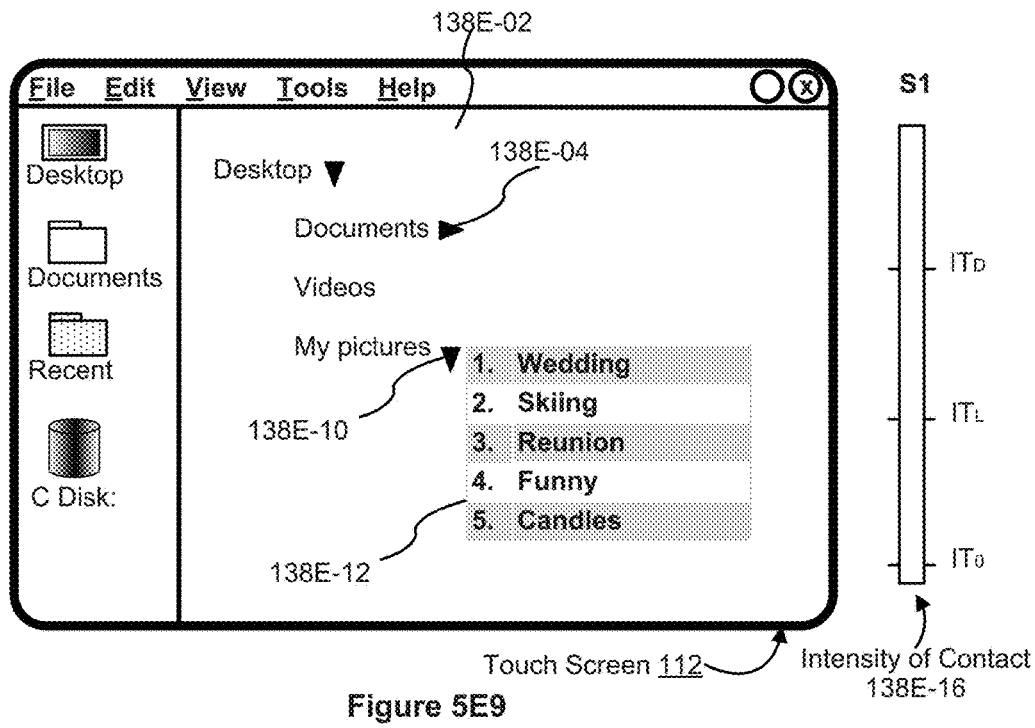
Figure 5E9
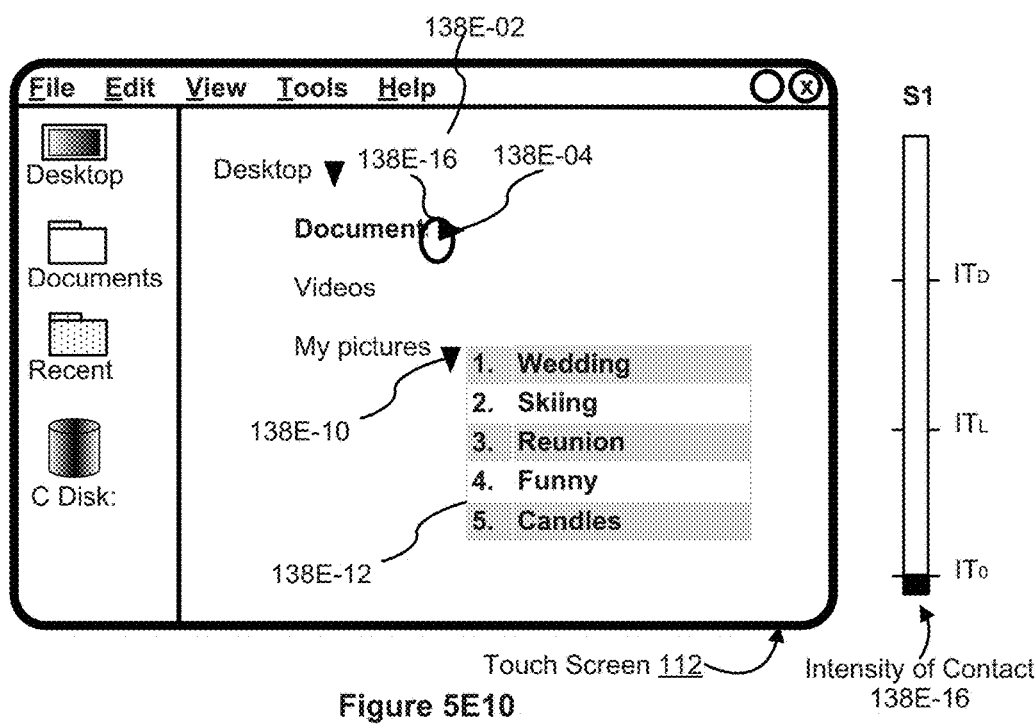
Figure 5E10

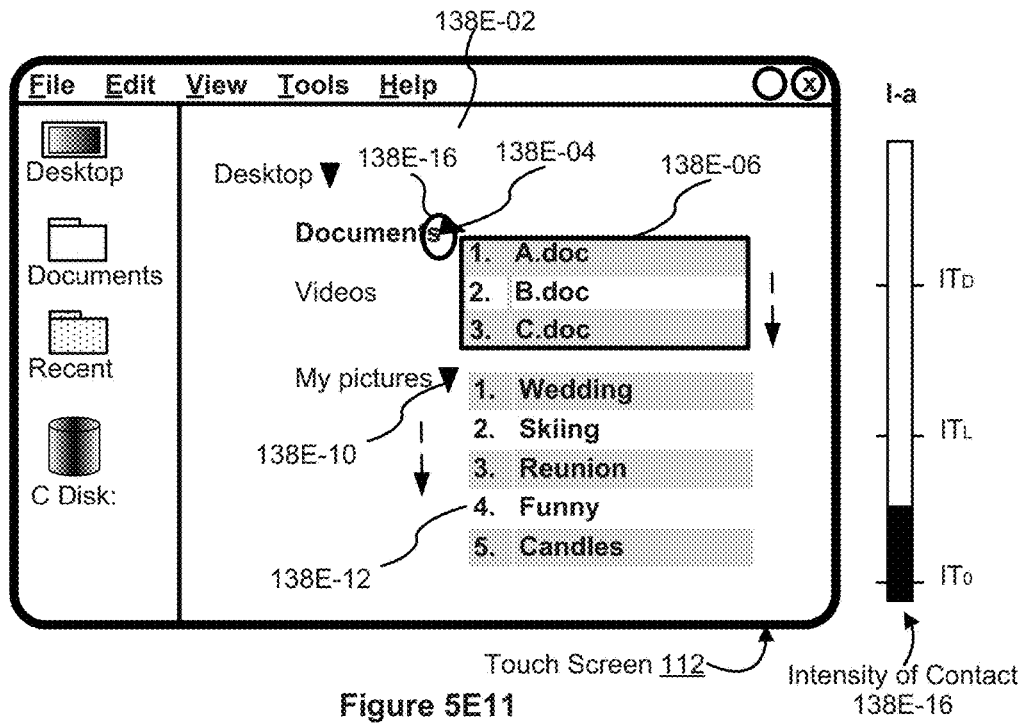
Figure 5E11
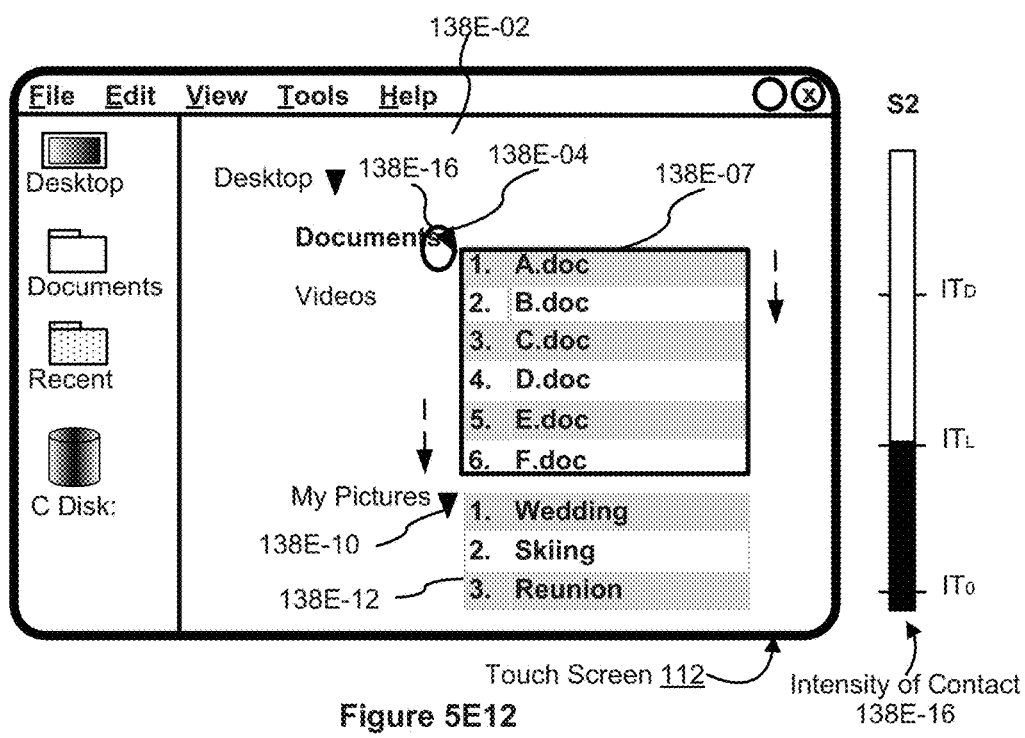
Figure 5E12

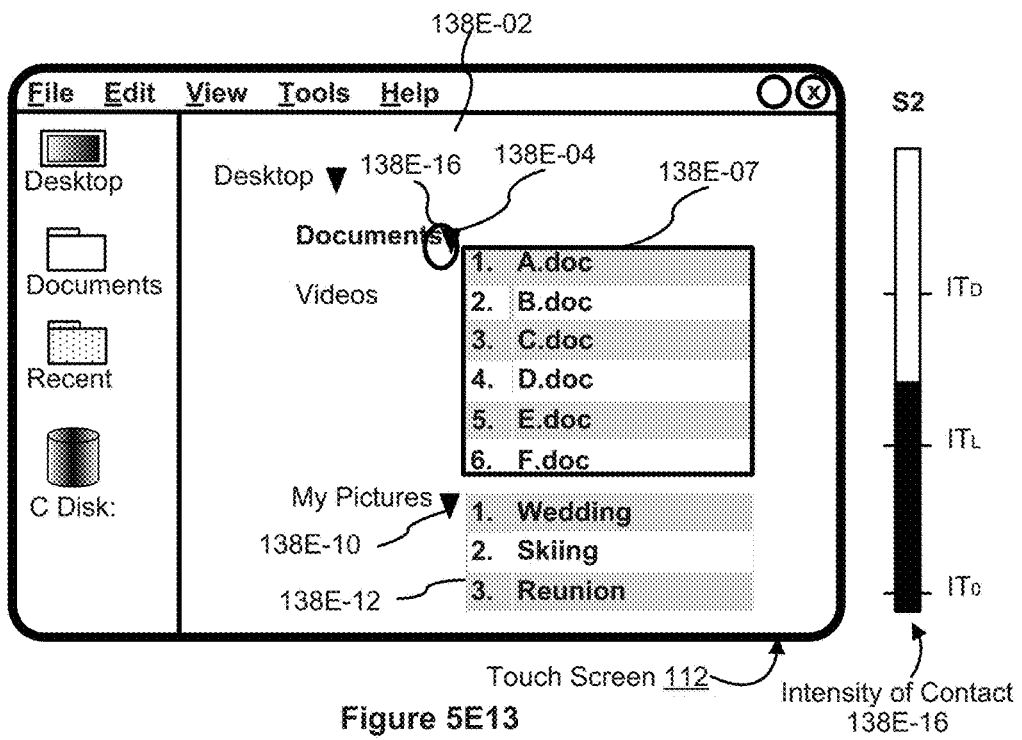
Figure 5E13
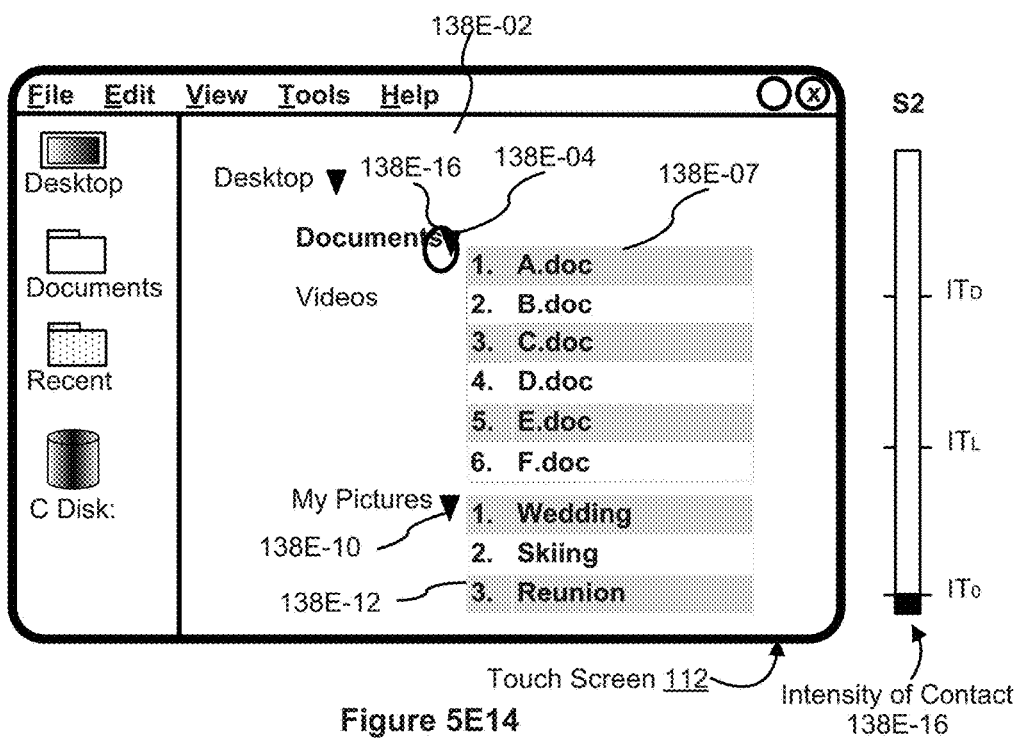
Figure 5E14

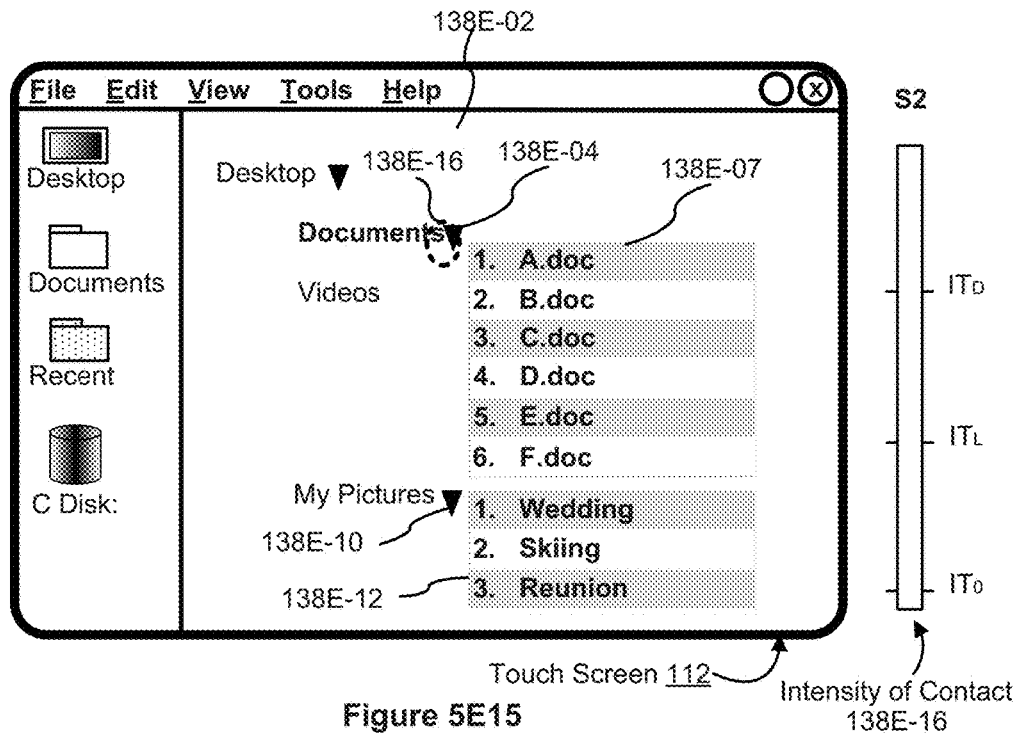
Figure 5E15
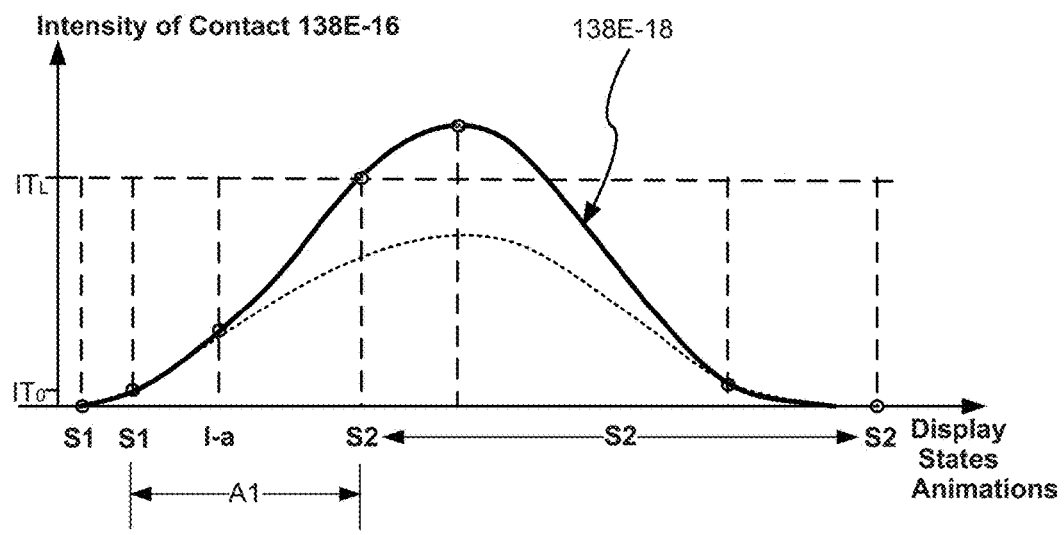
Figure 5E16

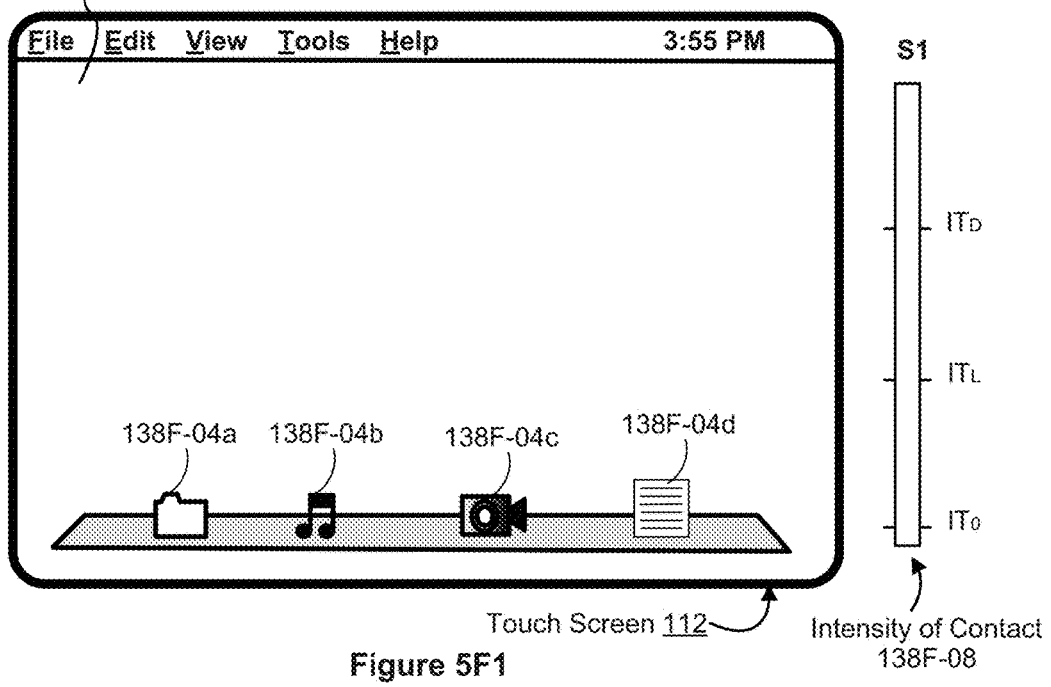
Figure 5F1
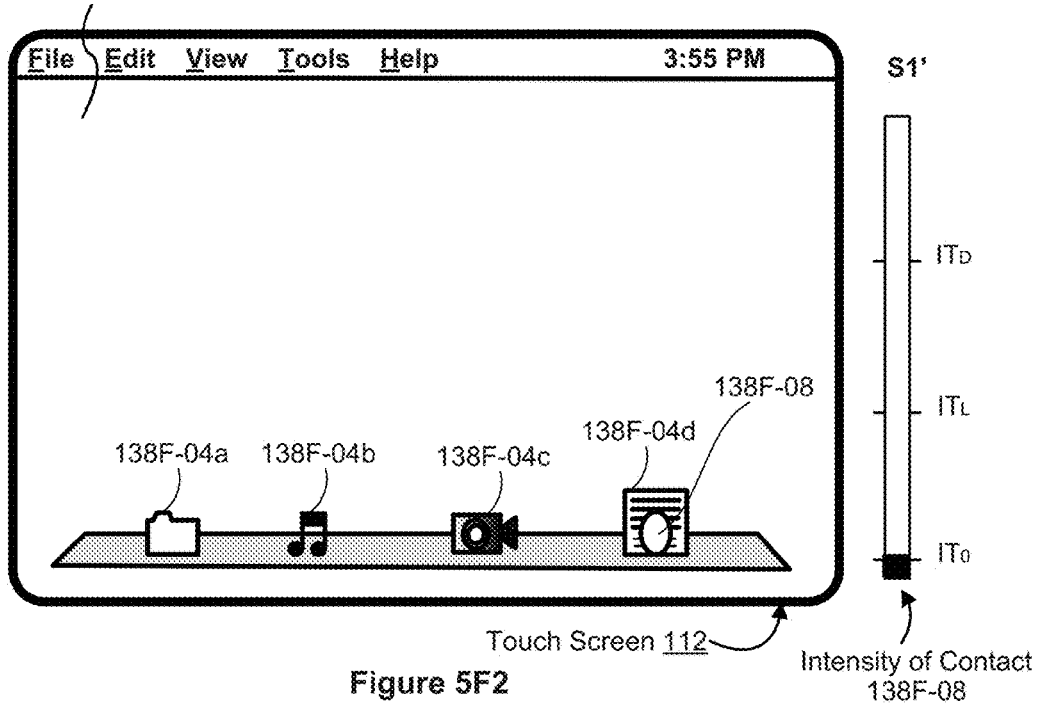
Figure 5F2

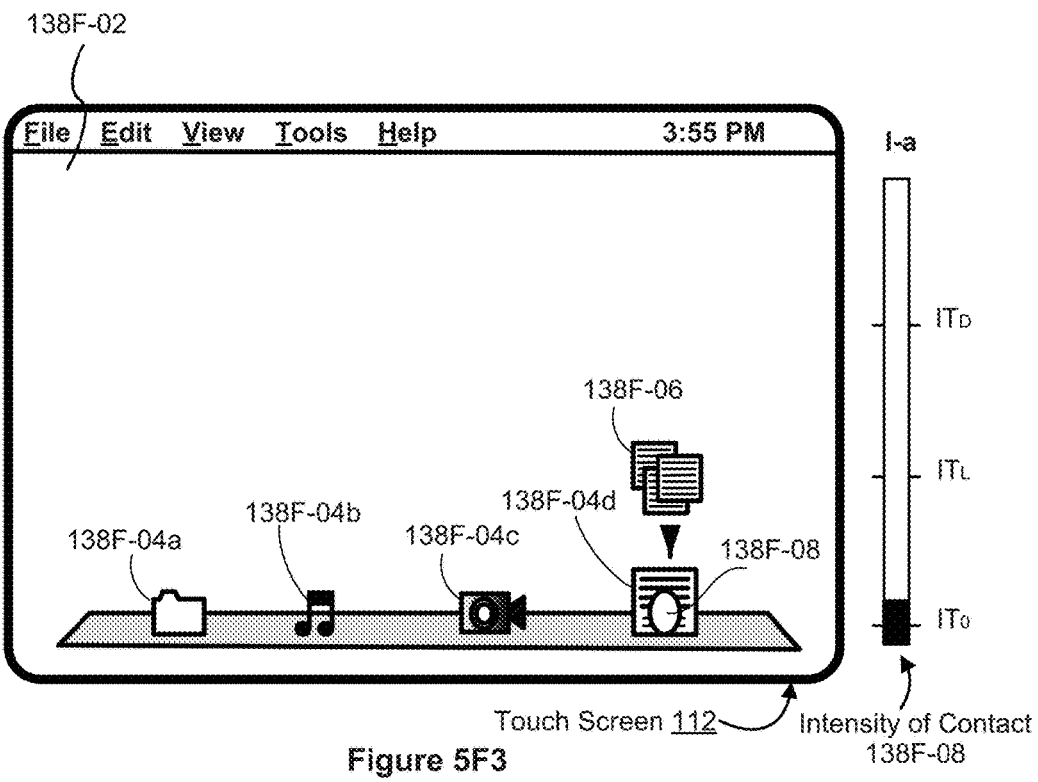
Figure 5F3
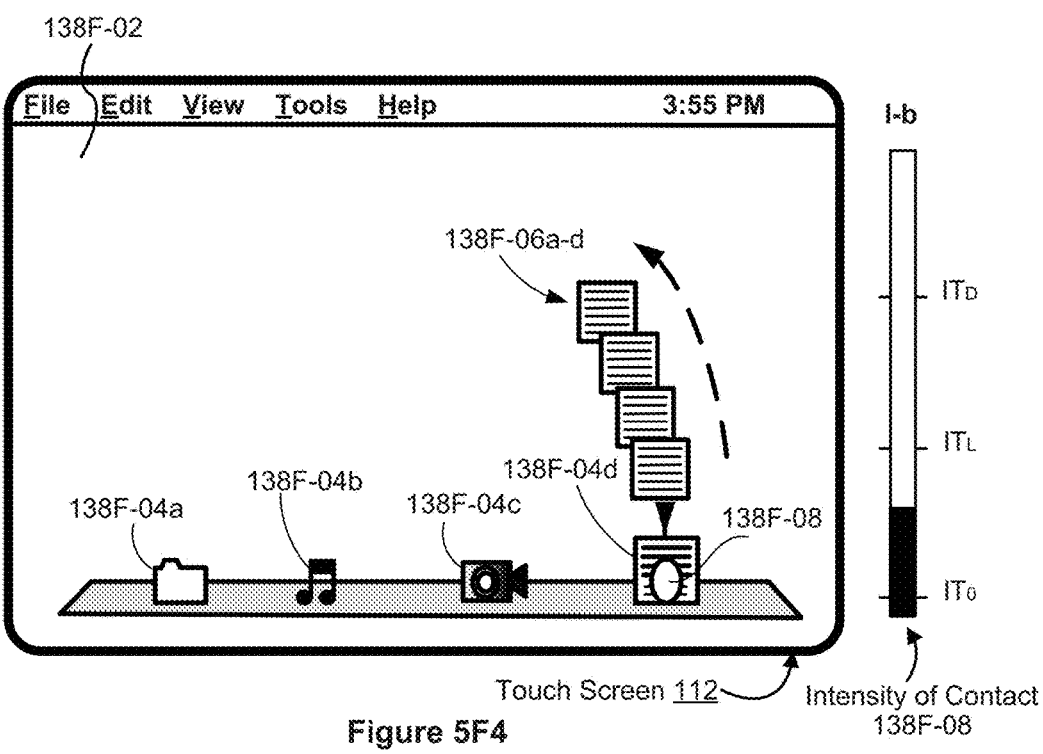
Figure 5F4

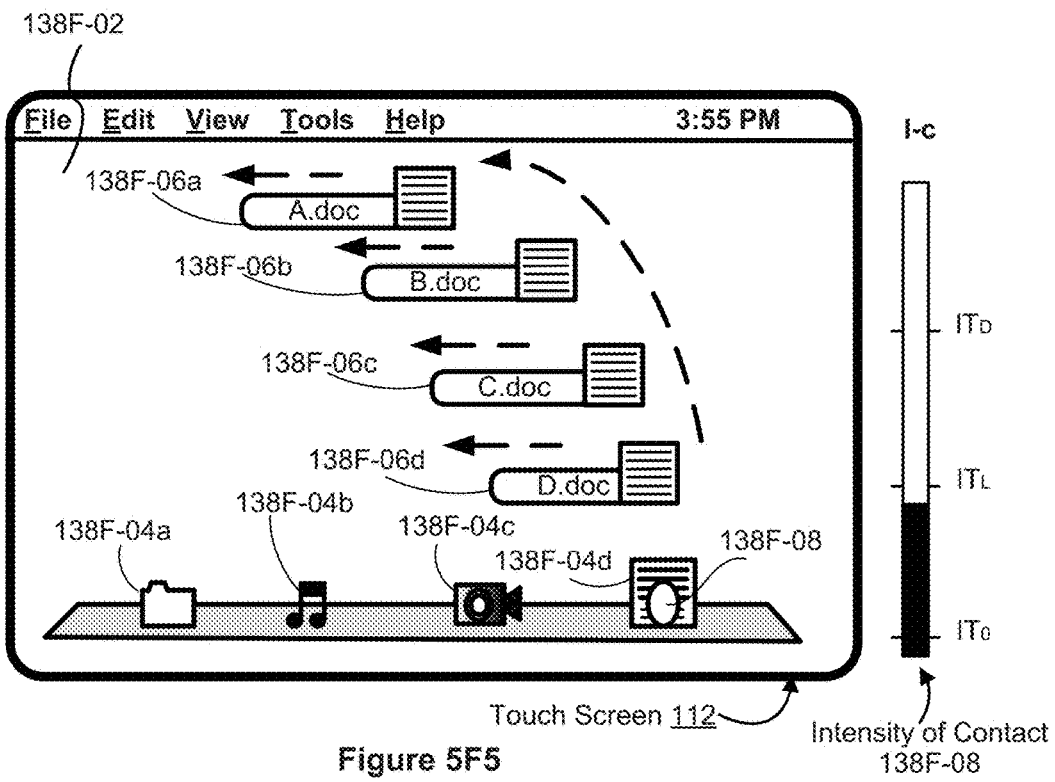
Figure 5F5
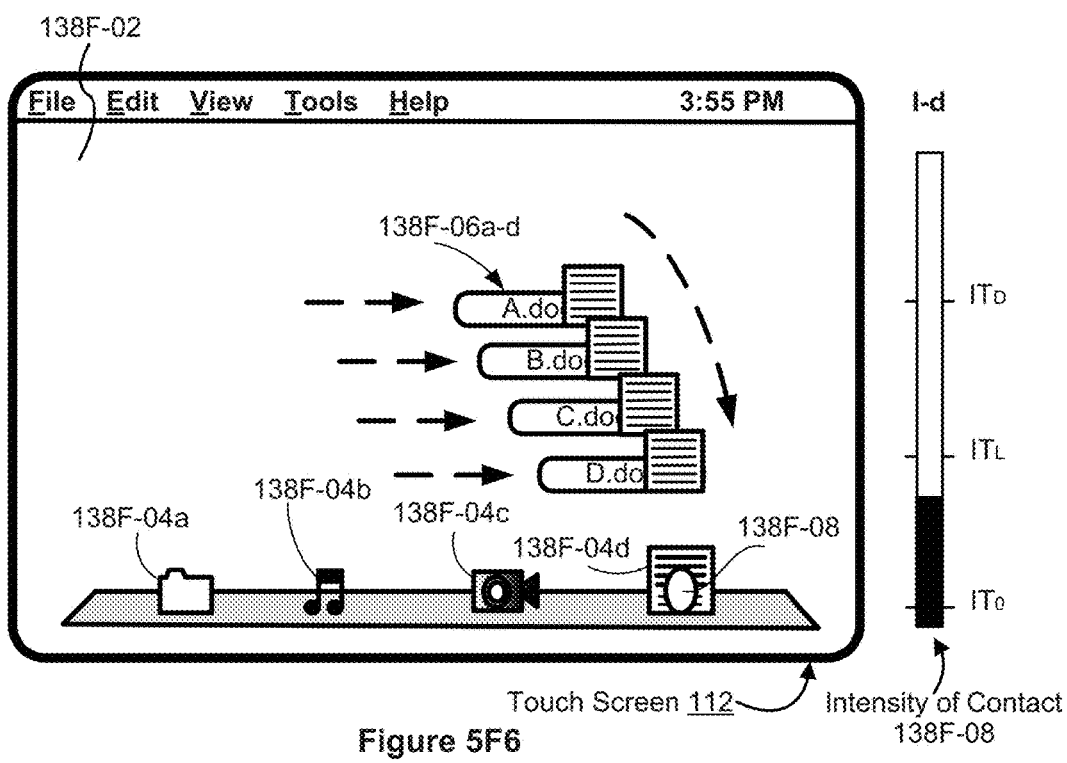
Figure 5F6

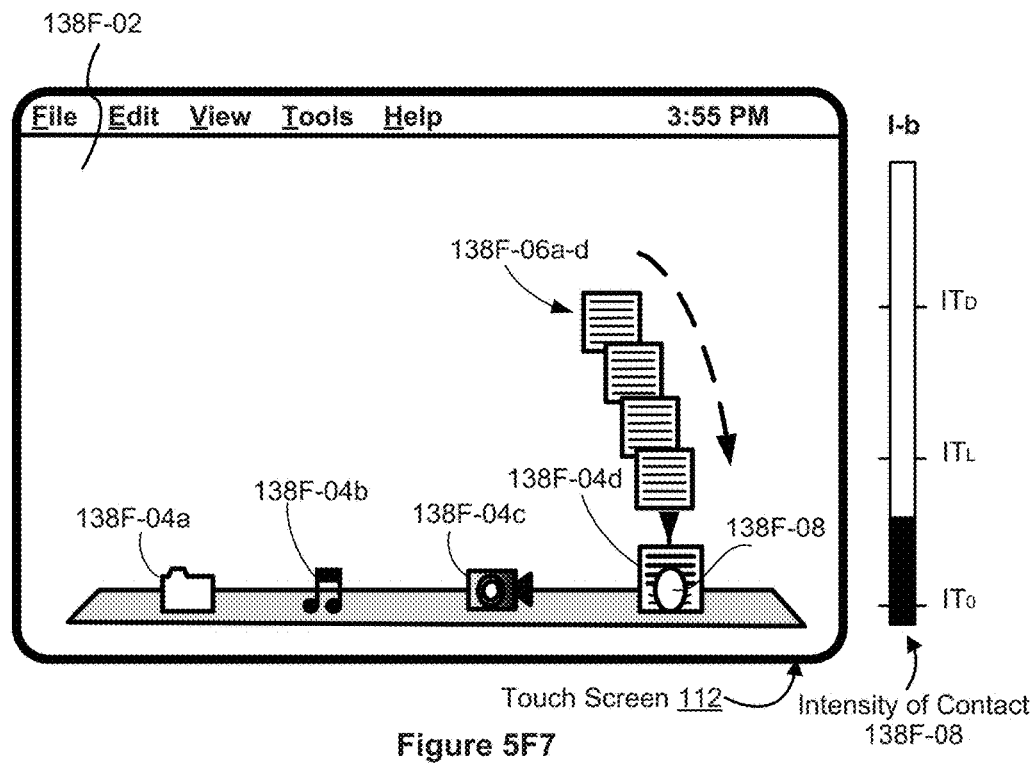
Figure 5F7
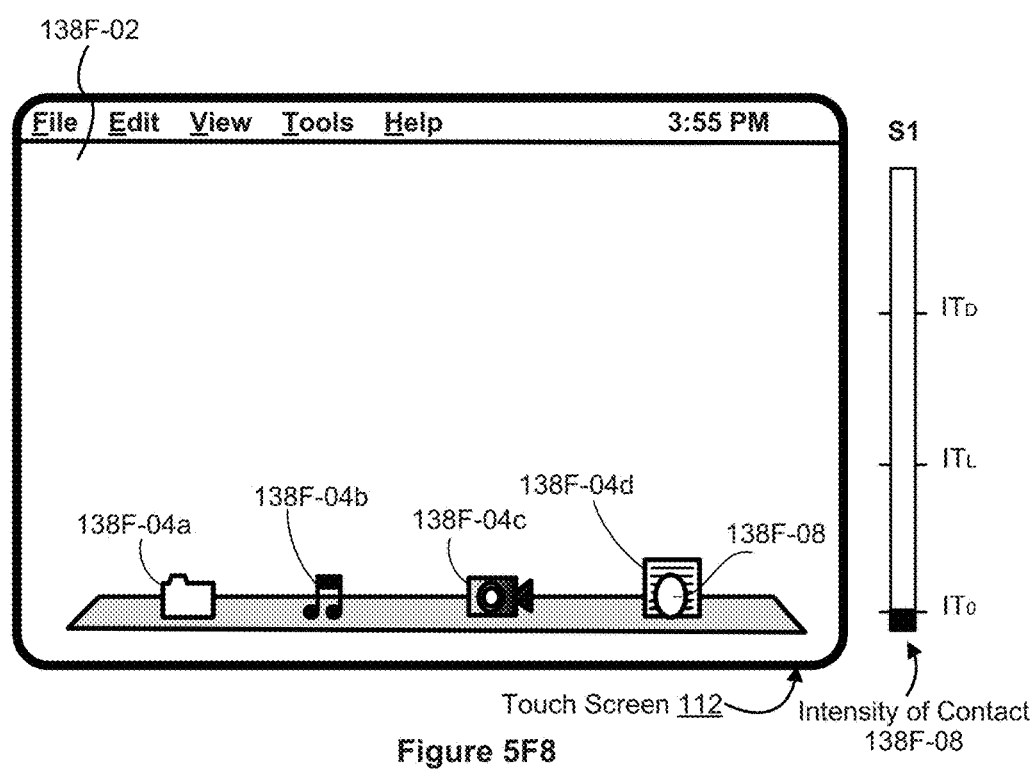
Figure 5F8

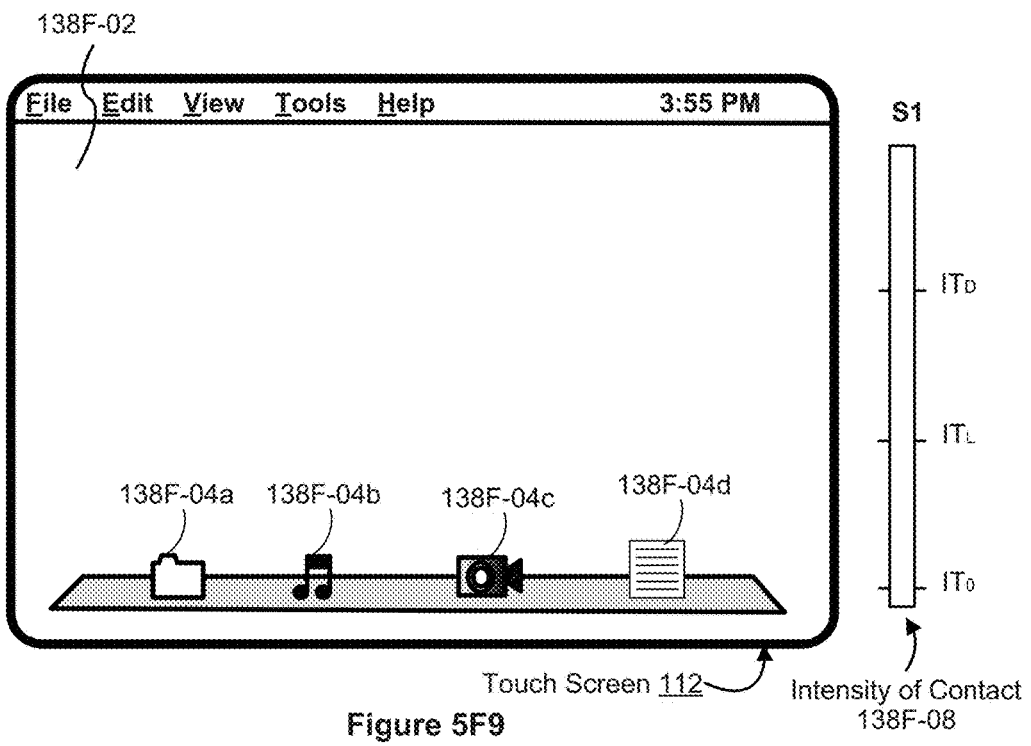
Figure 5F9
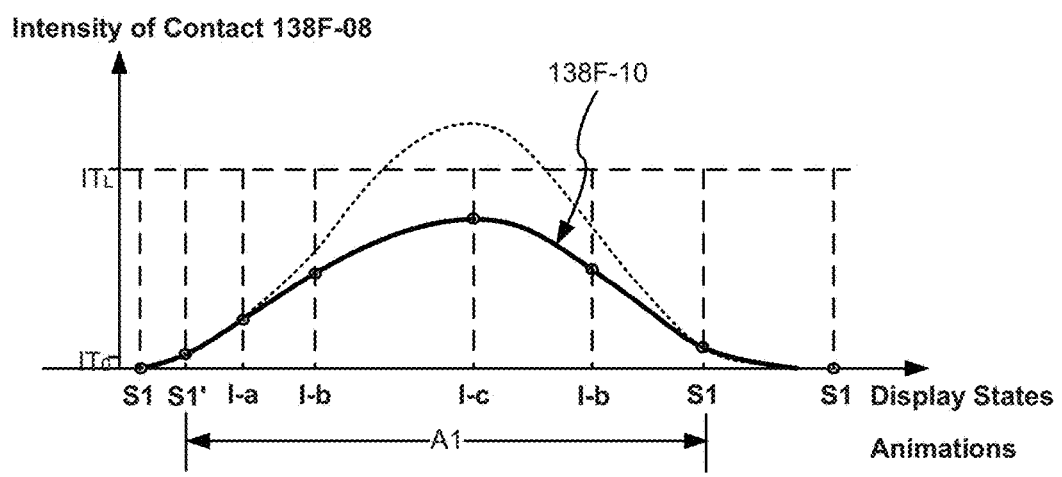
Figure 5F10

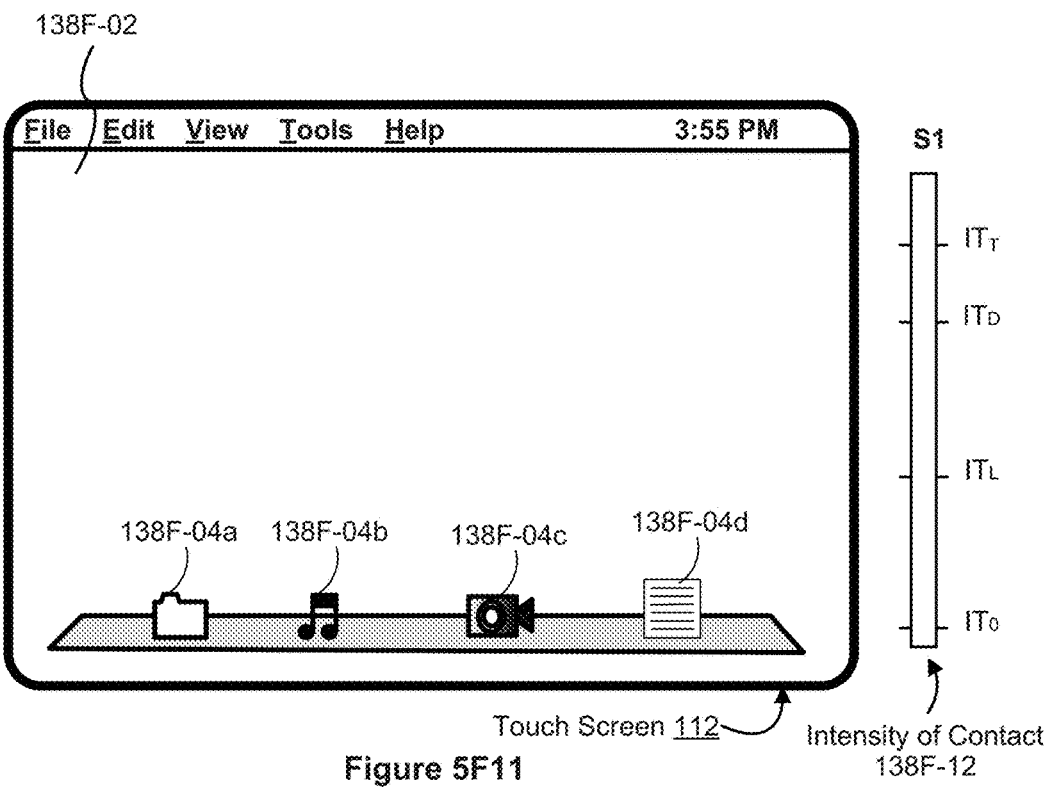
Figure 5F11
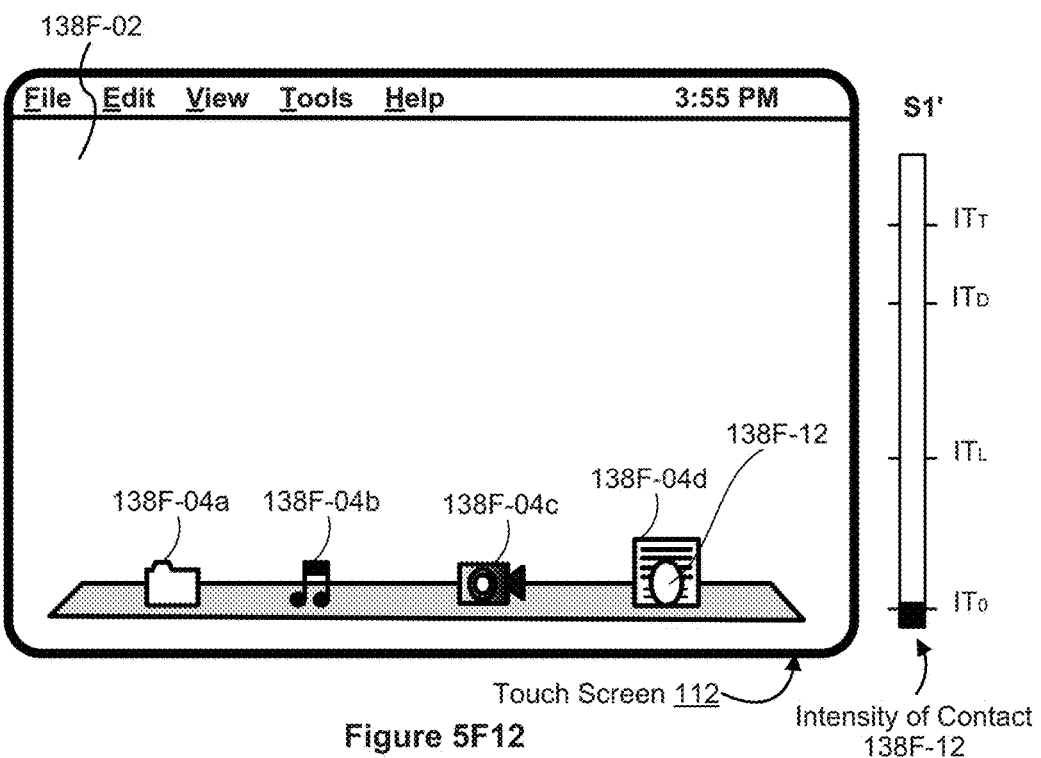
Figure 5F12

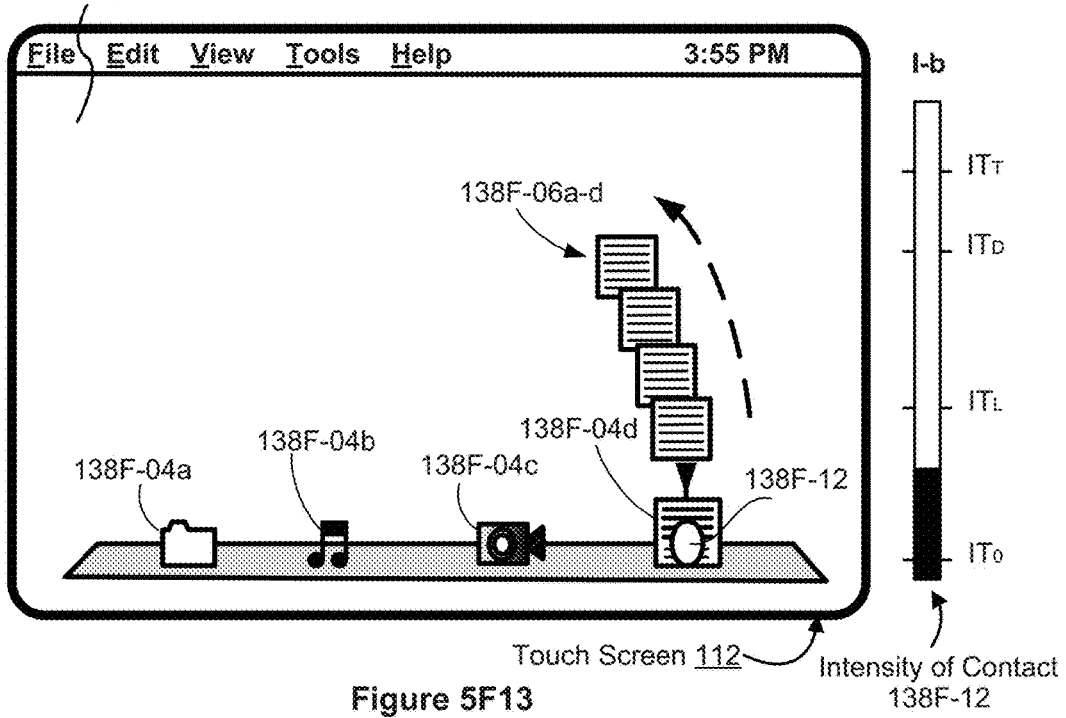
Figure 5F13
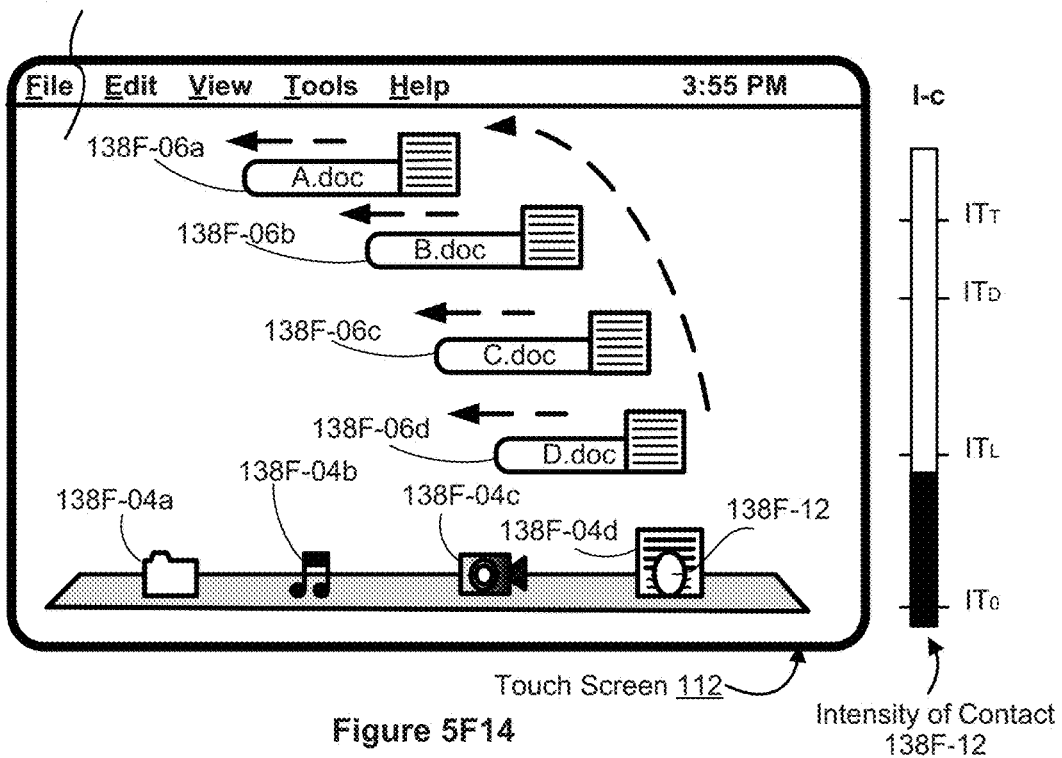
Figure 5F14

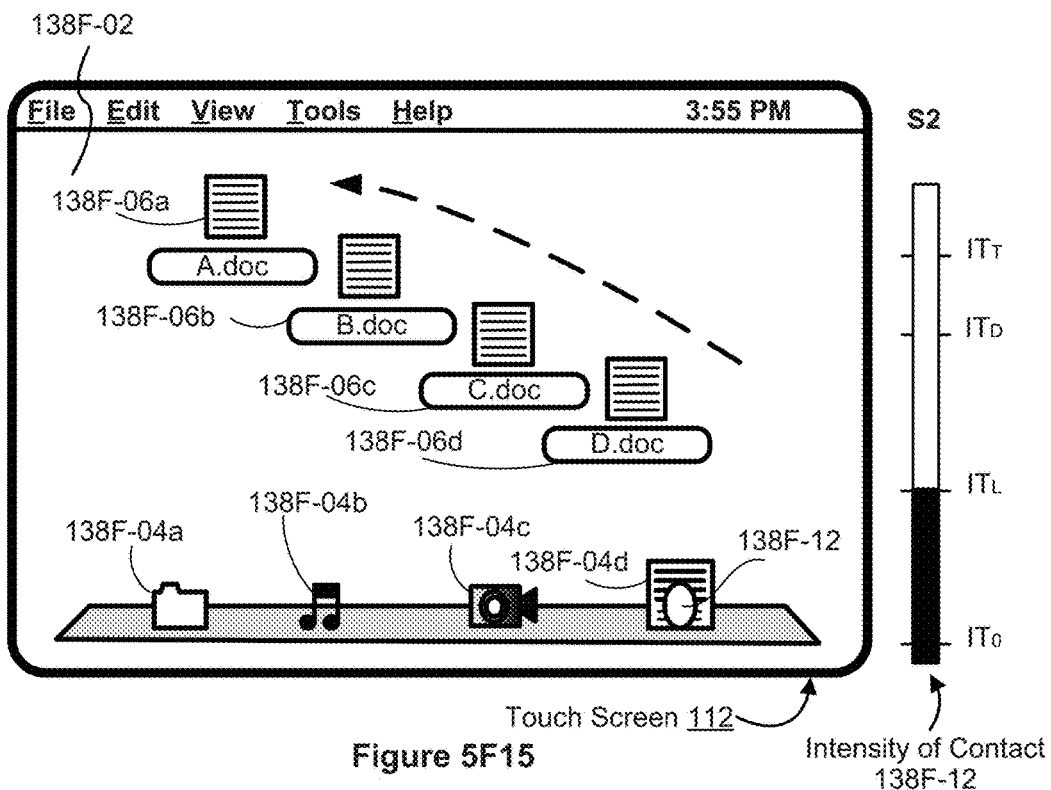
Figure 5F15
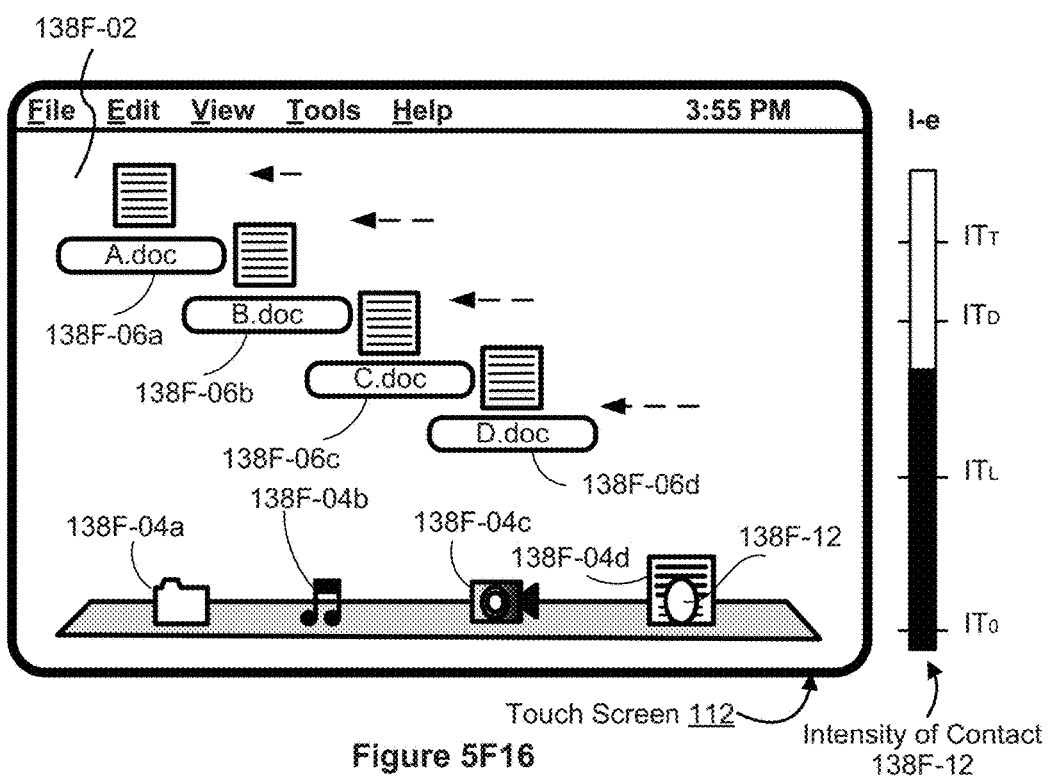
Figure 5F16

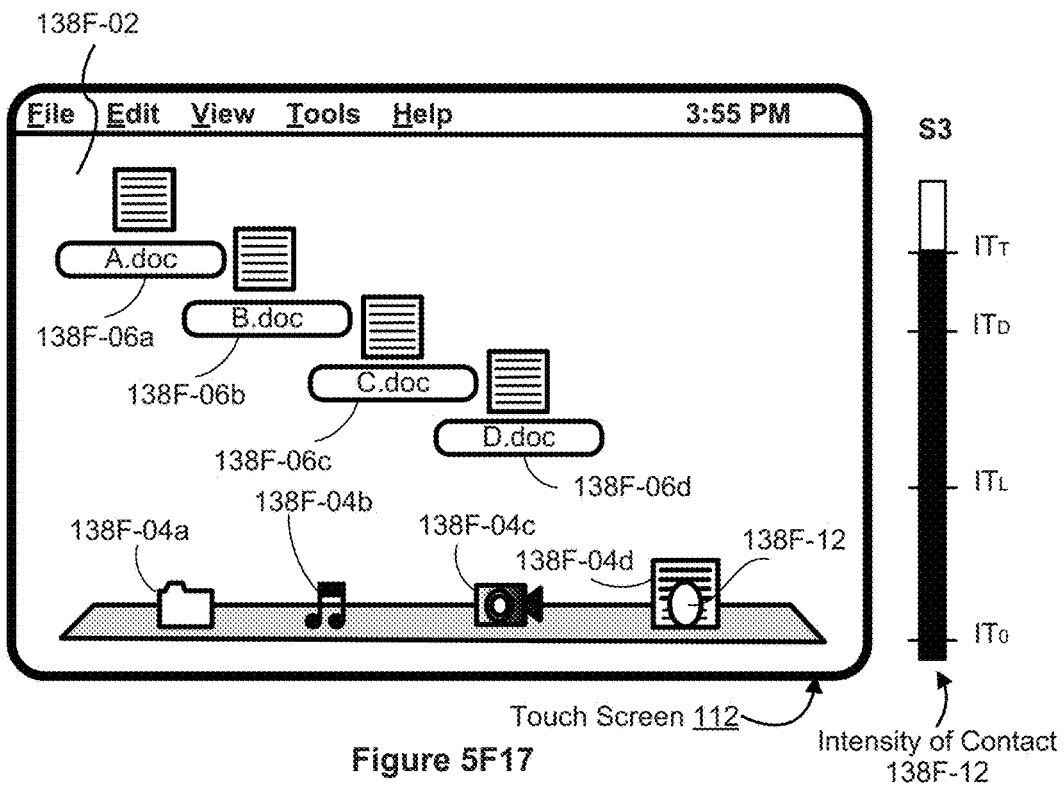
Figure 5F17
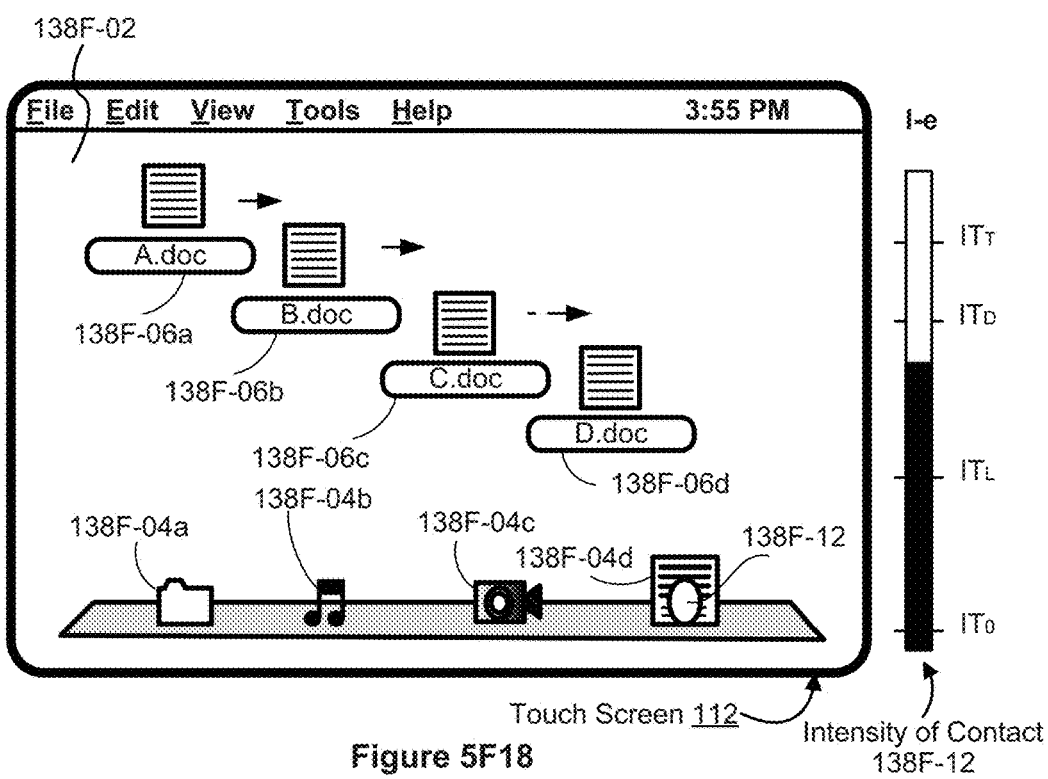
Figure 5F18

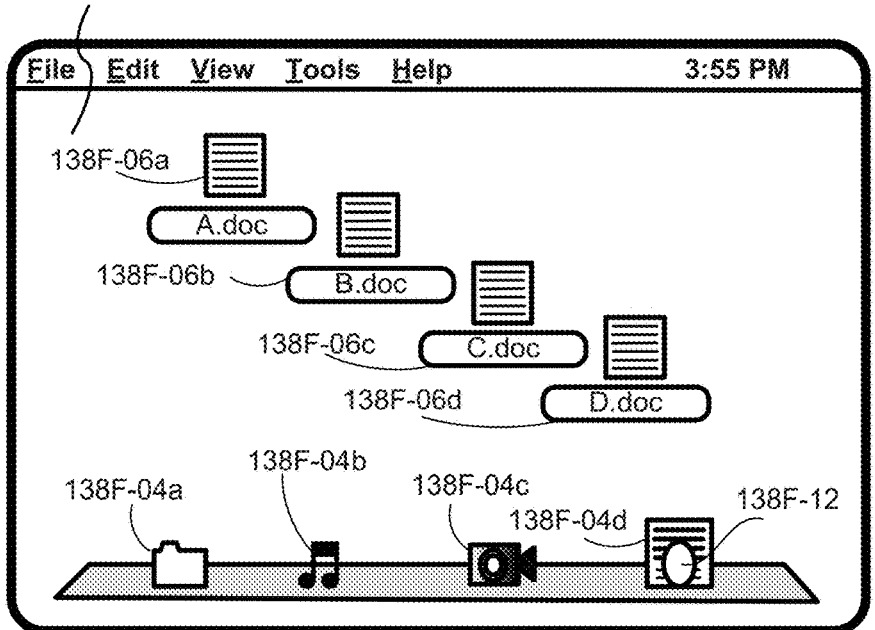
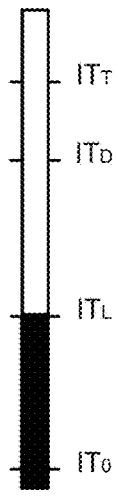
Figure 5F19
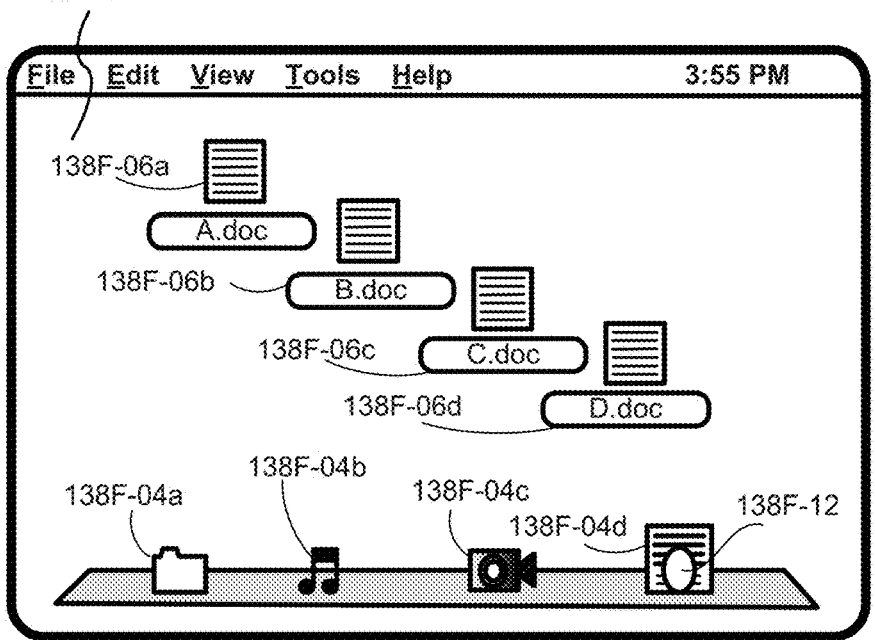
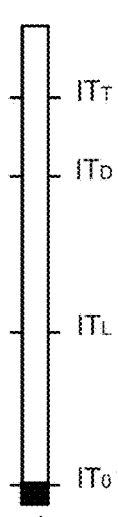
Figure 5F20

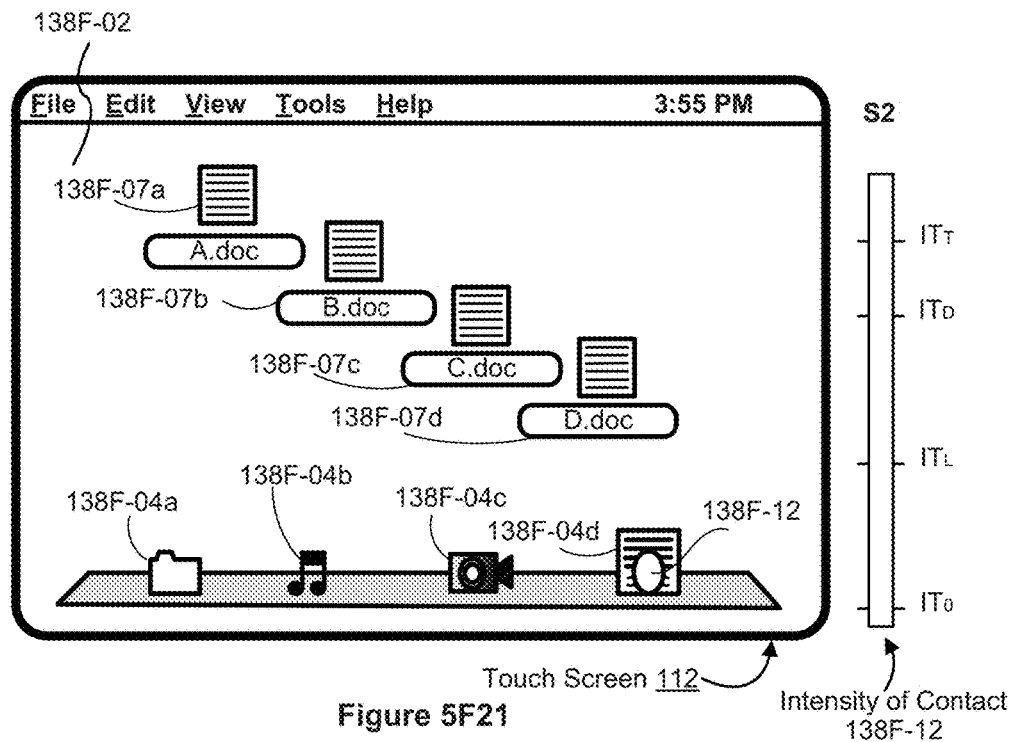
Figure 5F21
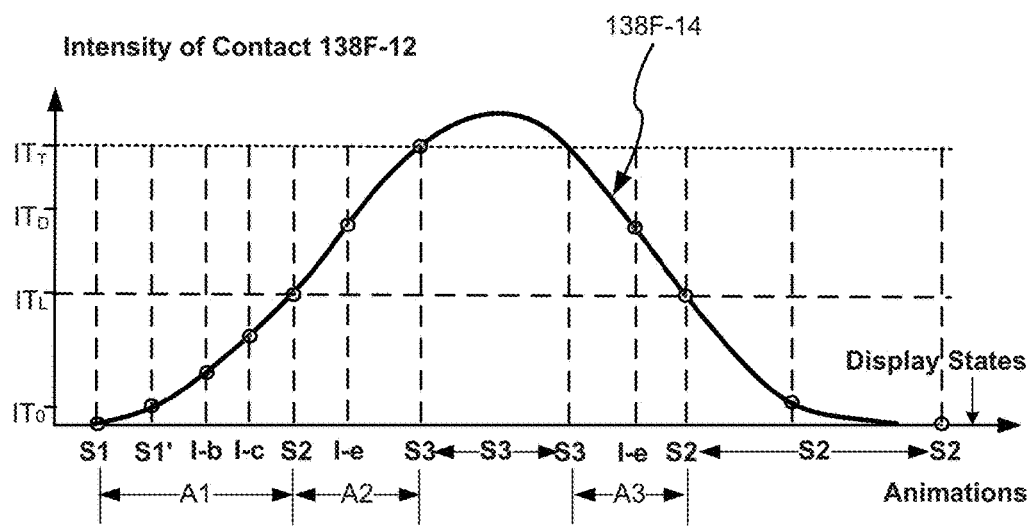
Figure 5F22

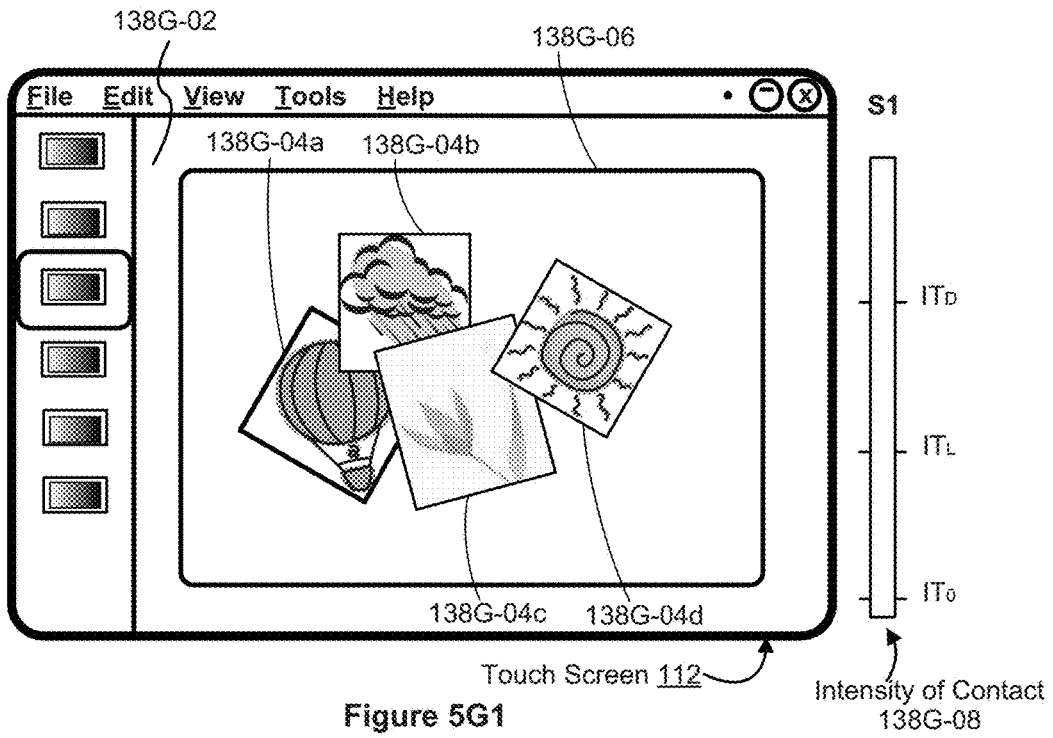
Figure 5G1
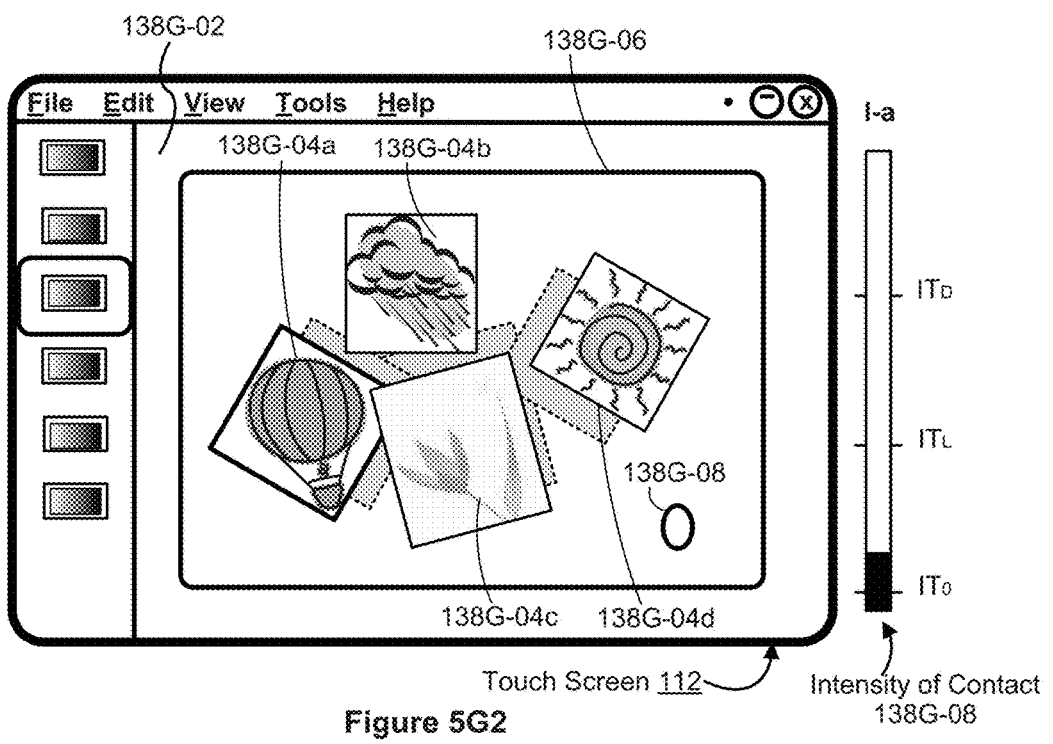
Figure 5G2

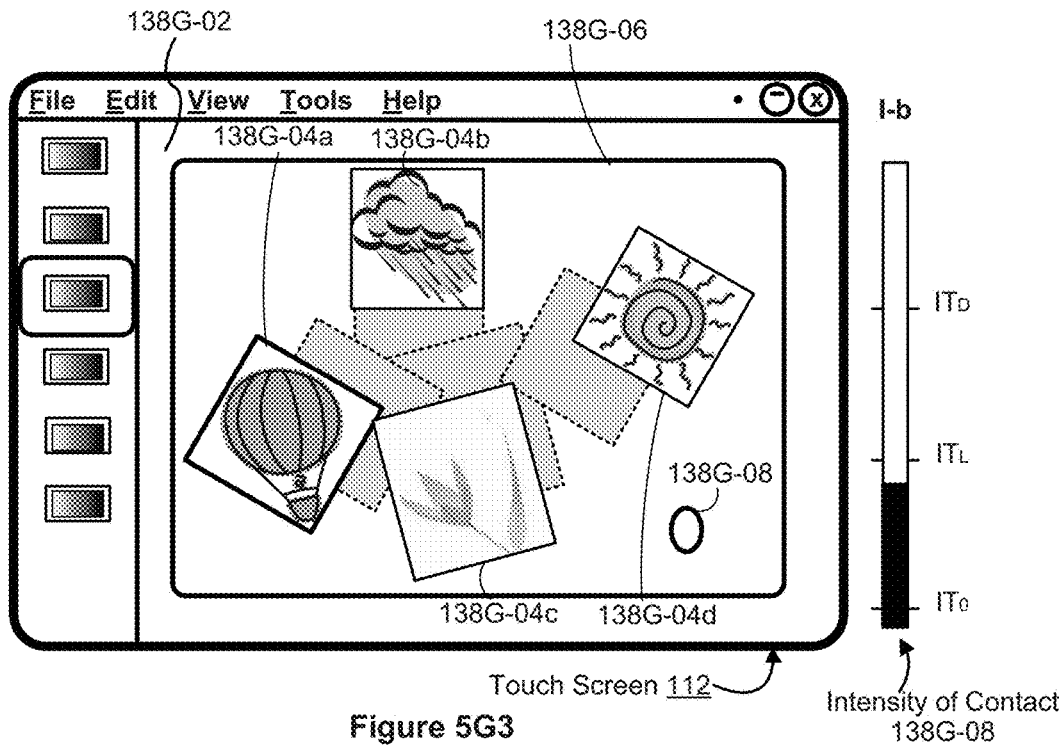
Figure 5G3
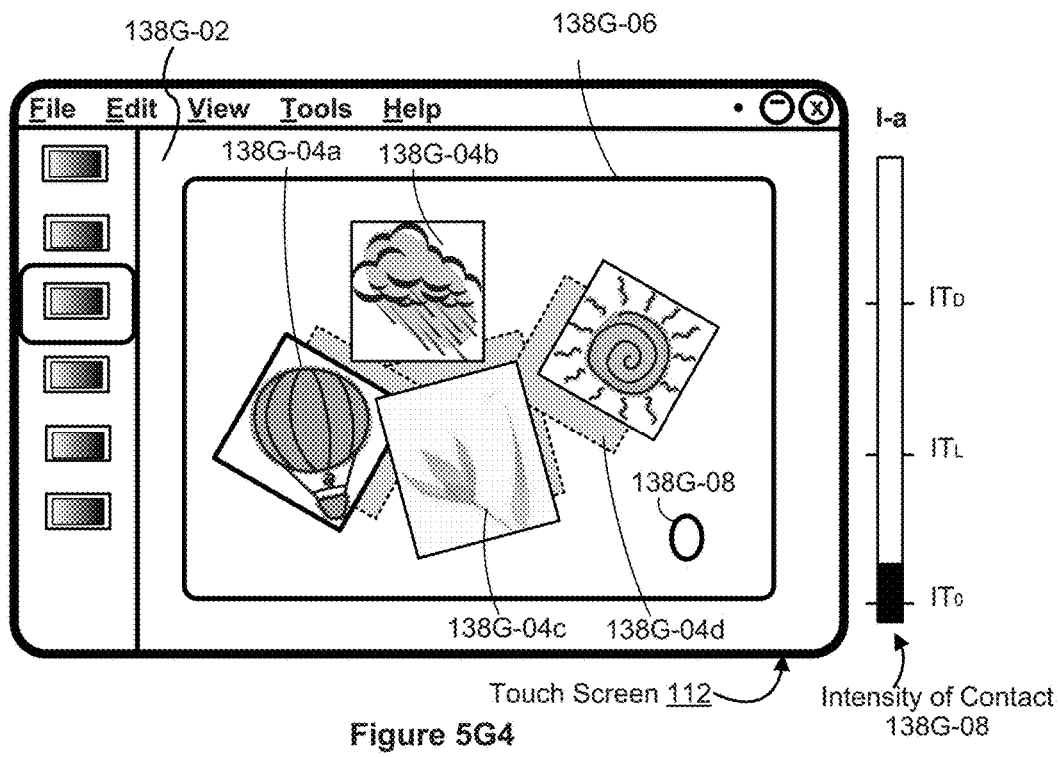
Figure 5G4

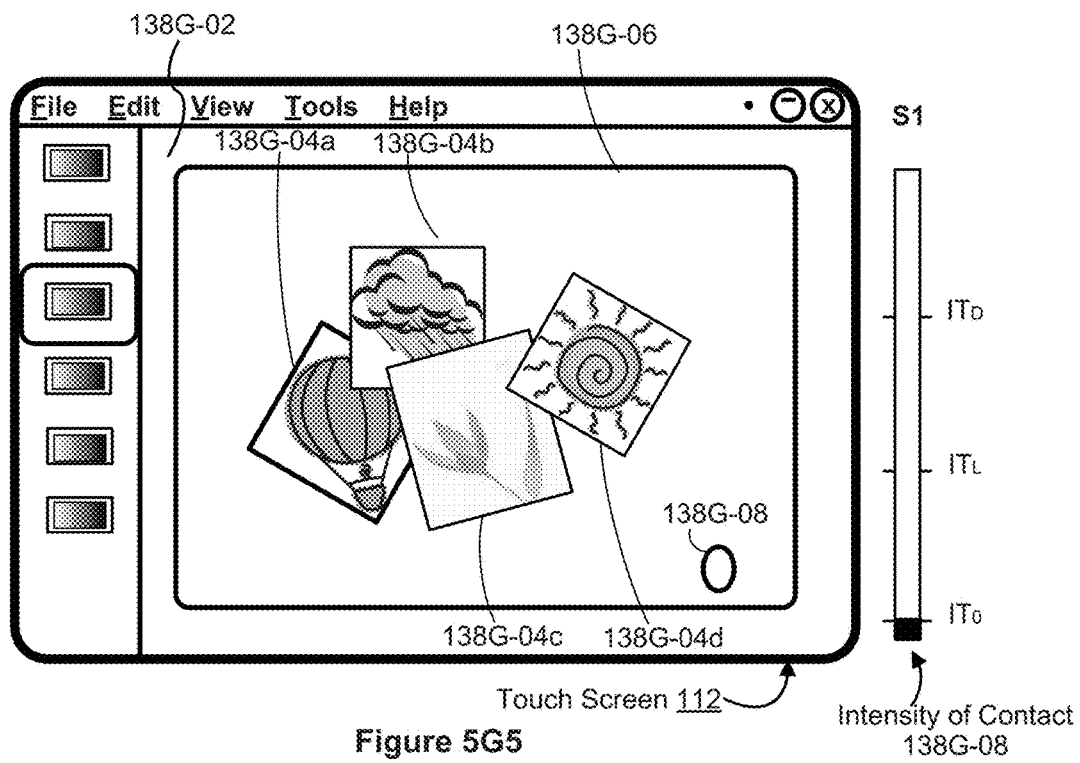
Figure 5G5
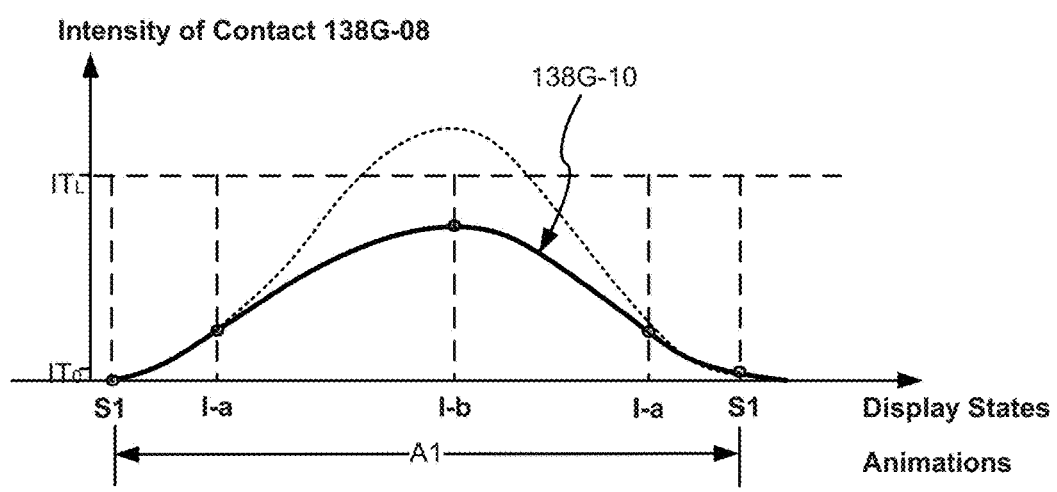
Figure 5G6

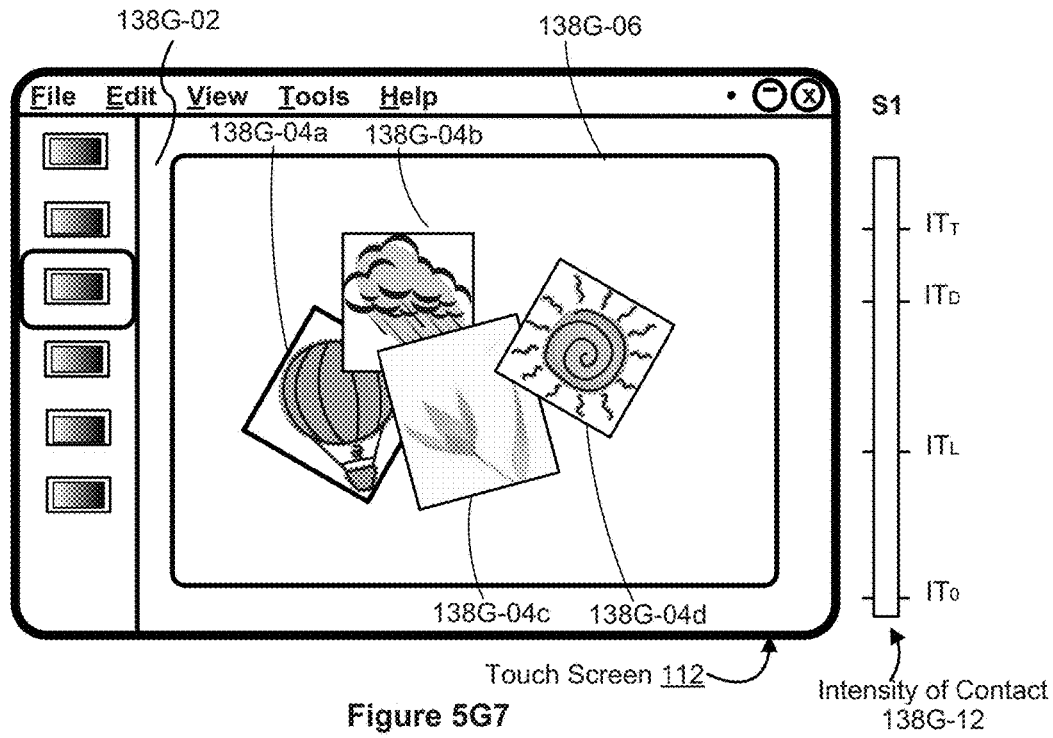
Figure 5G7
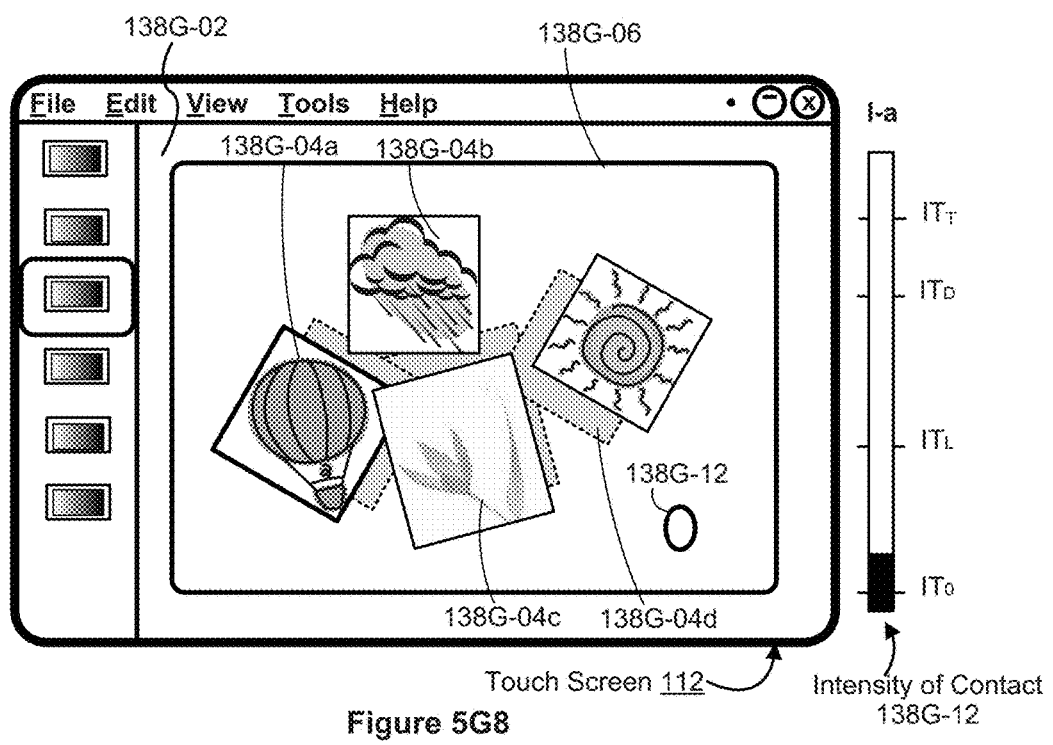
Figure 5G8

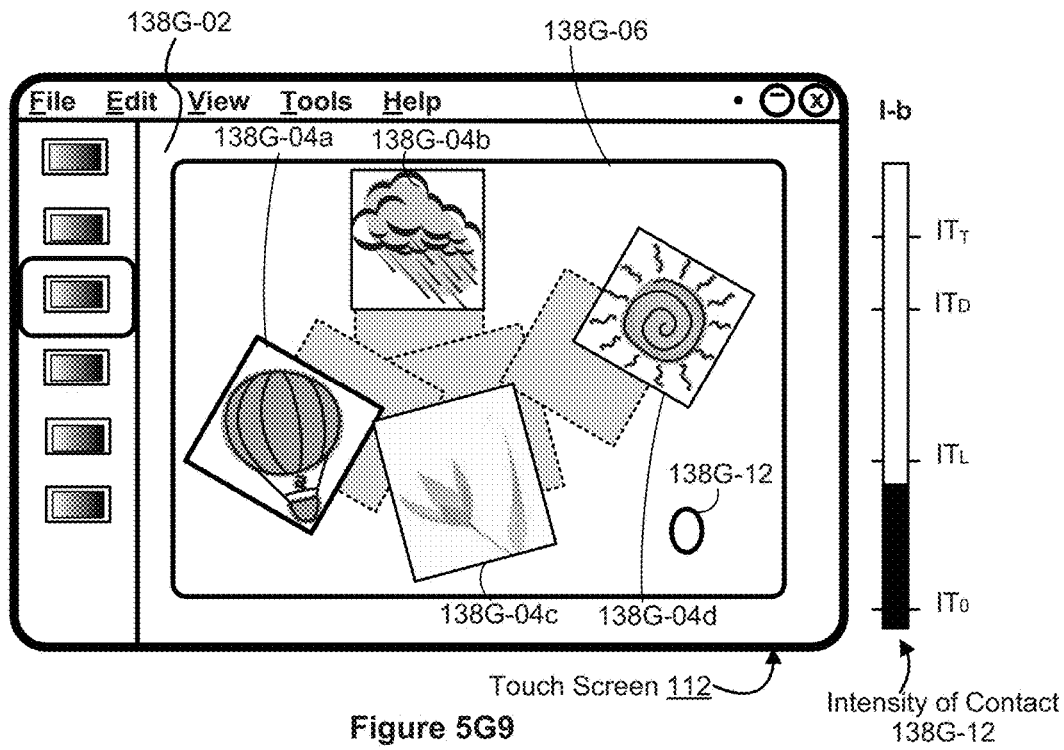
Figure 5G9
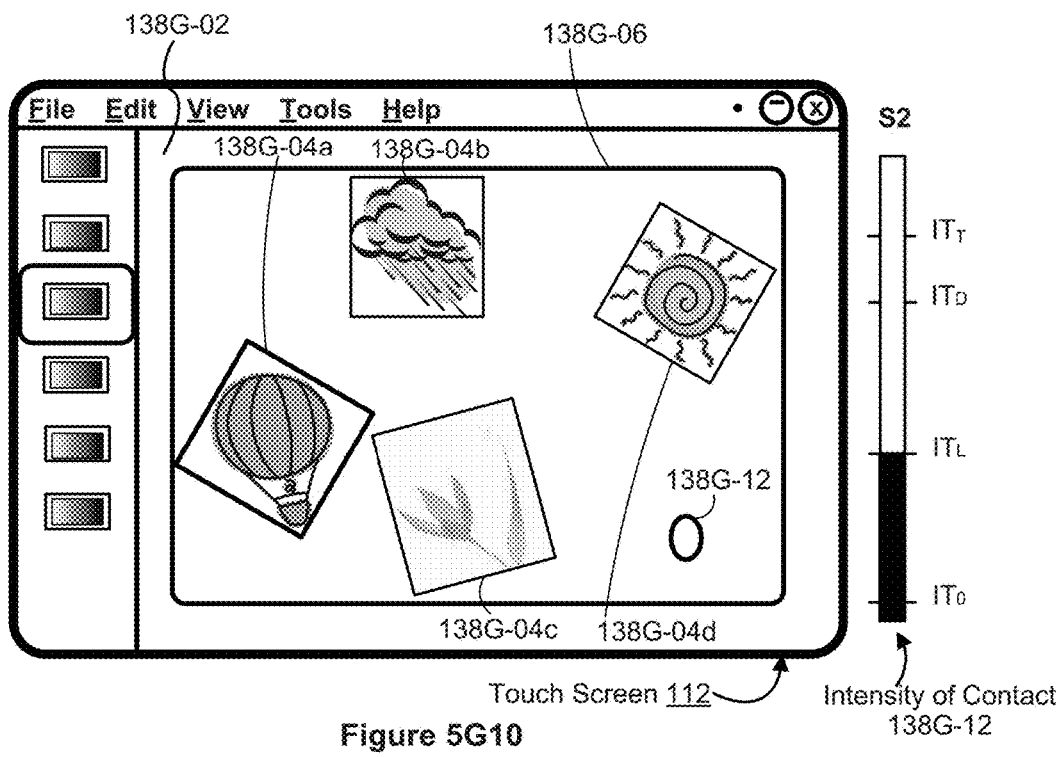
Figure 5G10

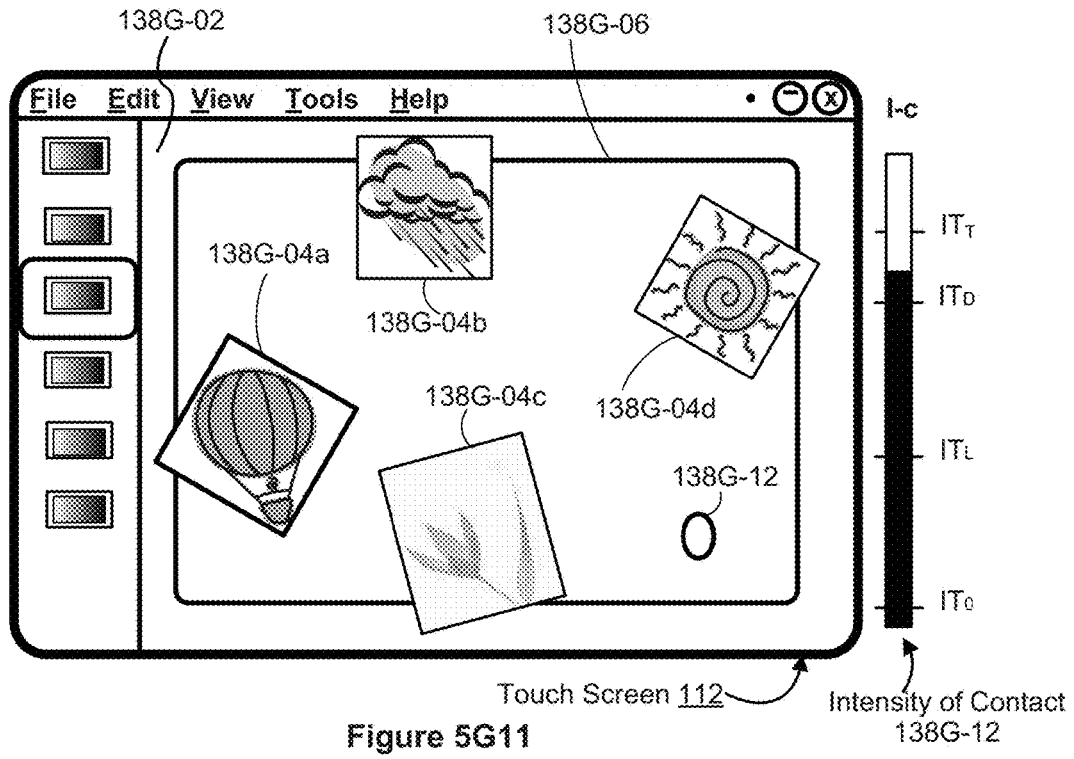
Figure 5G11
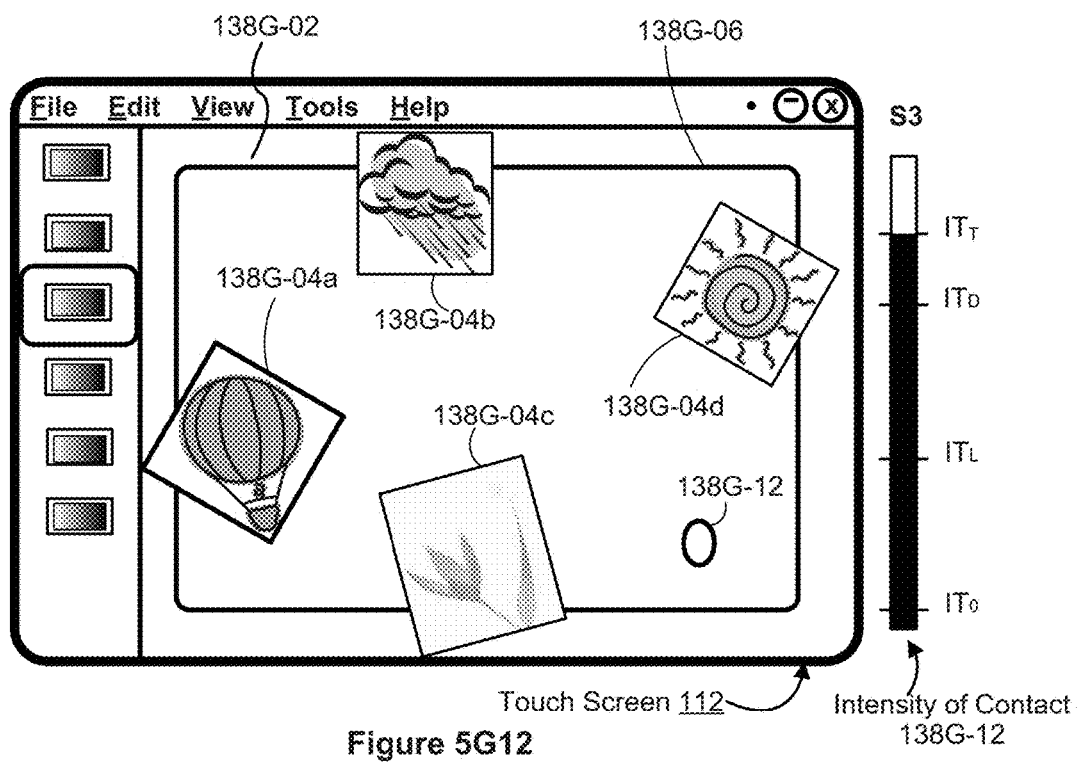
Figure 5G12

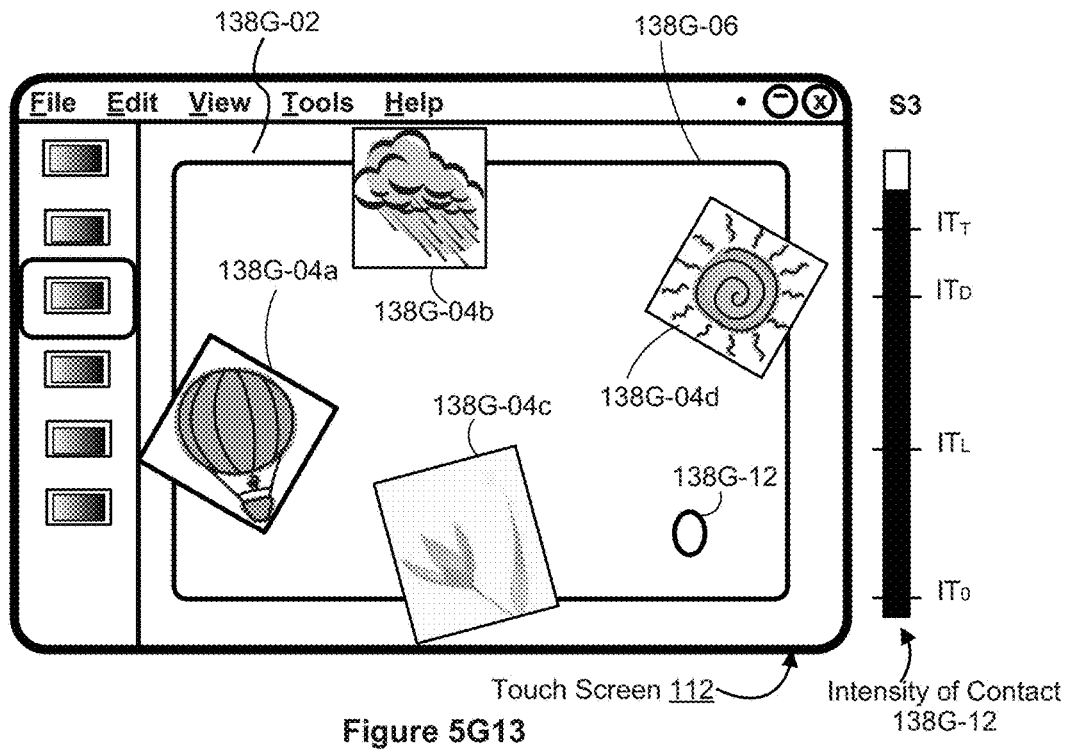
Figure 5G13
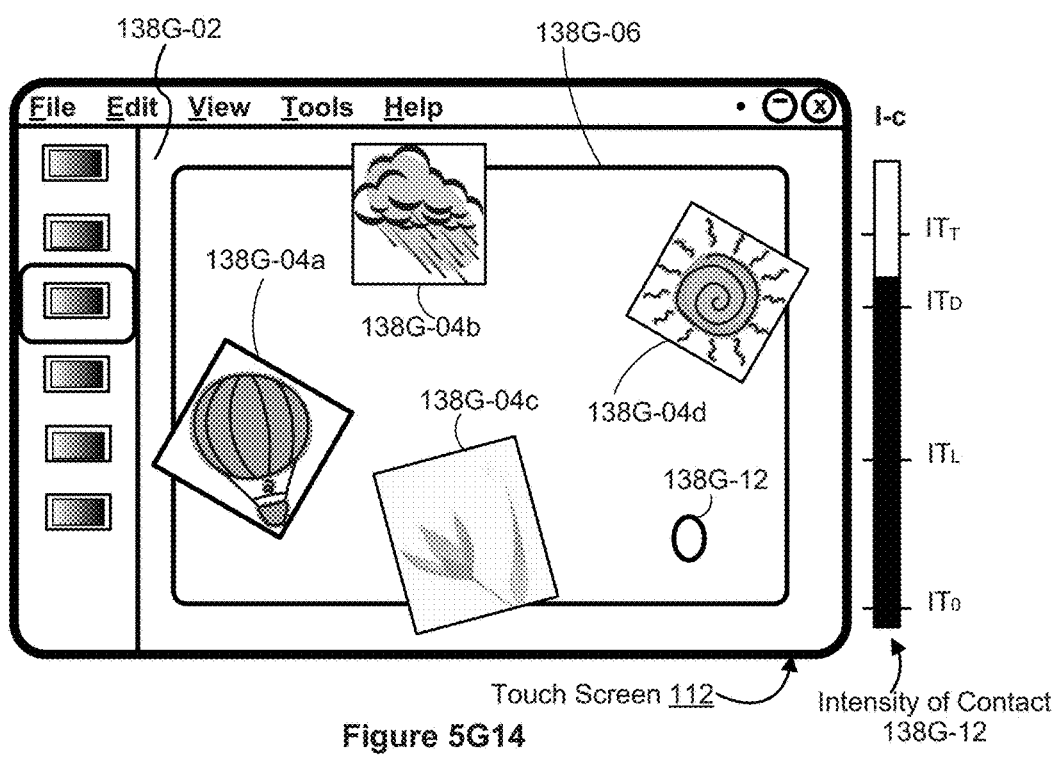
Figure 5G14

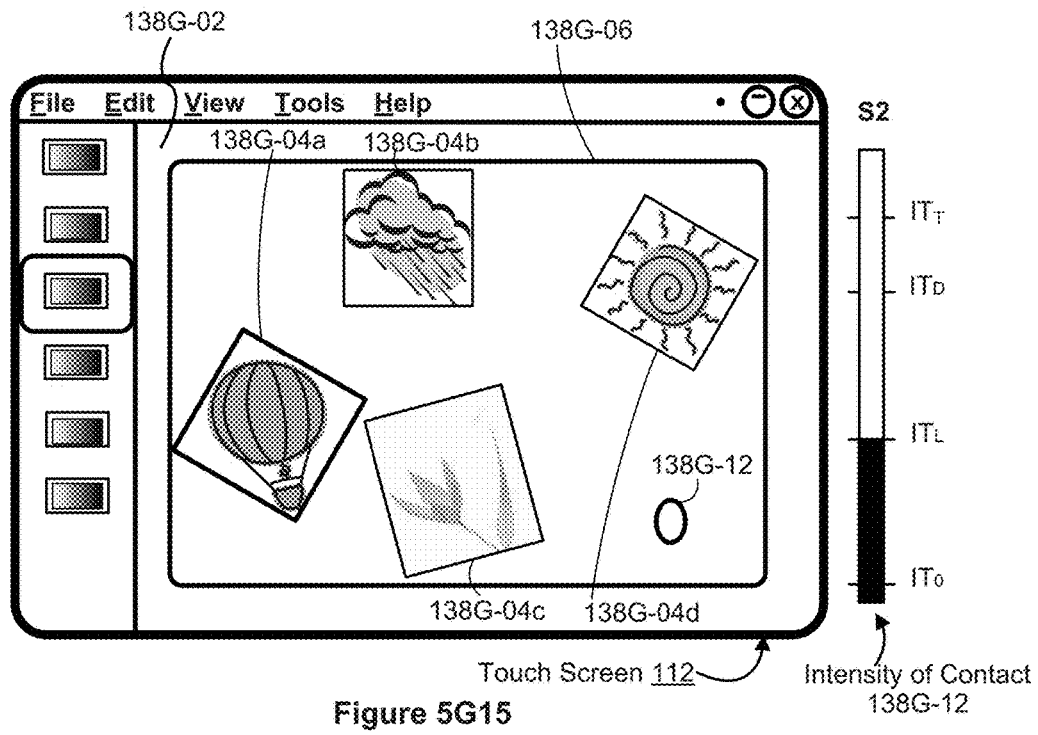
Figure 5G15
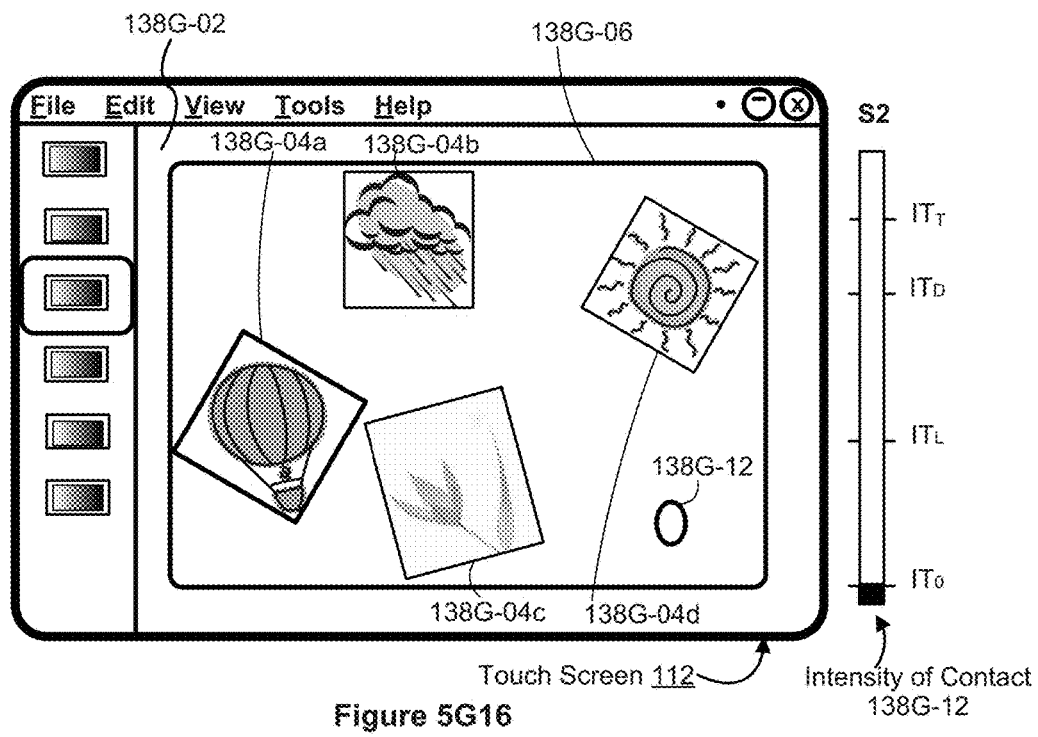
Figure 5G16

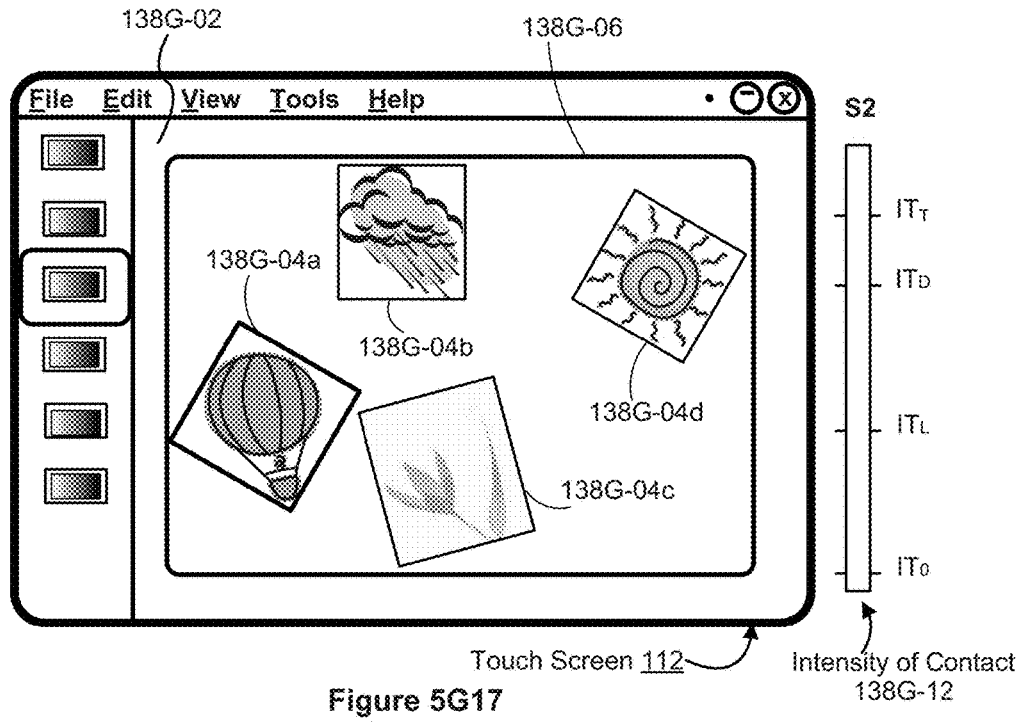
Figure 5G17
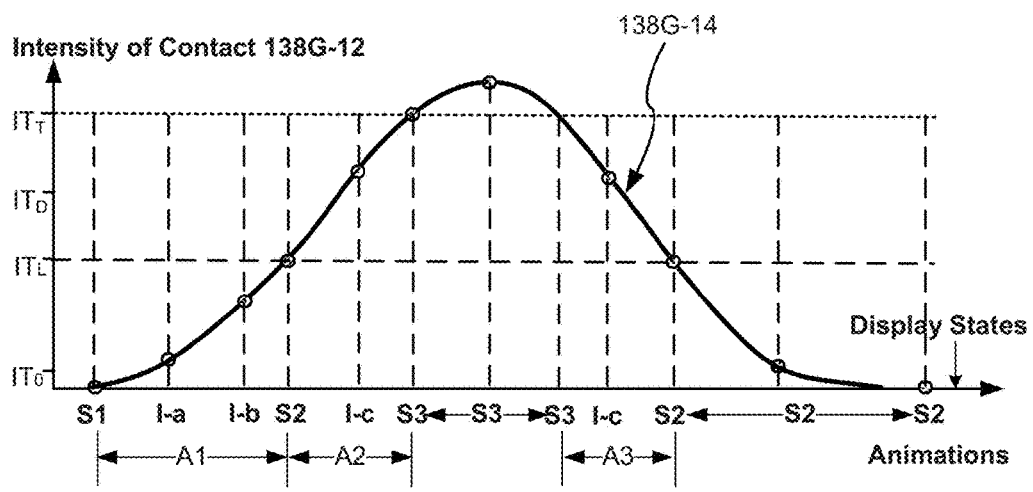
Figure 5G18

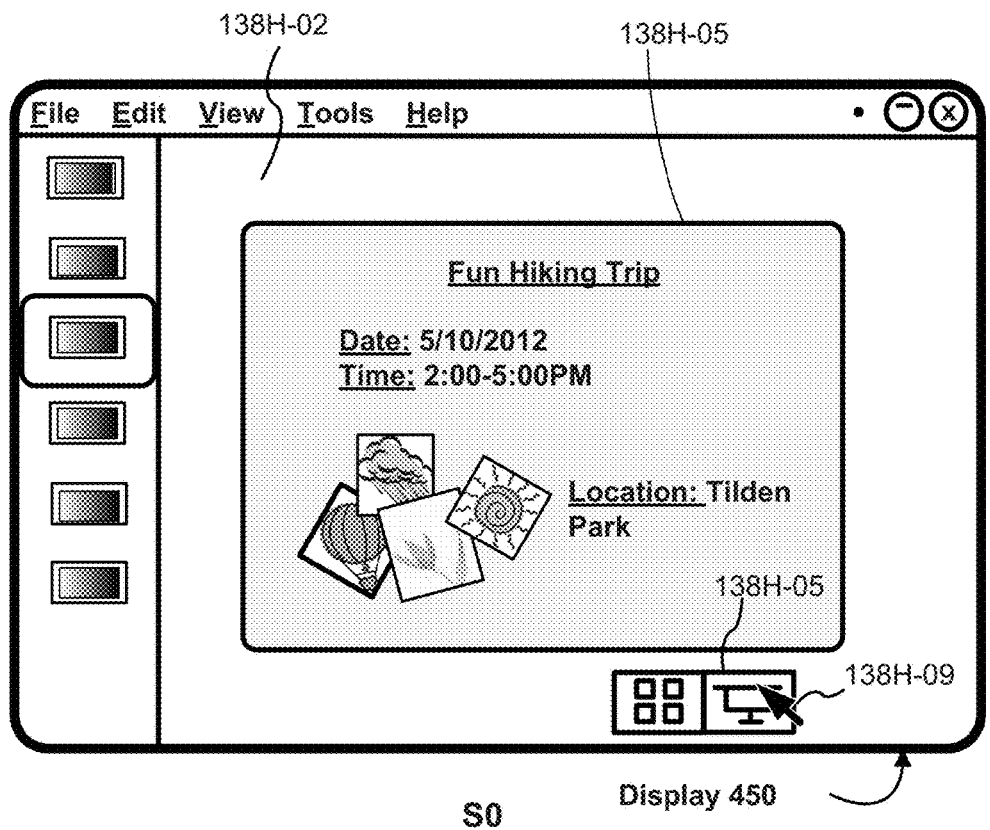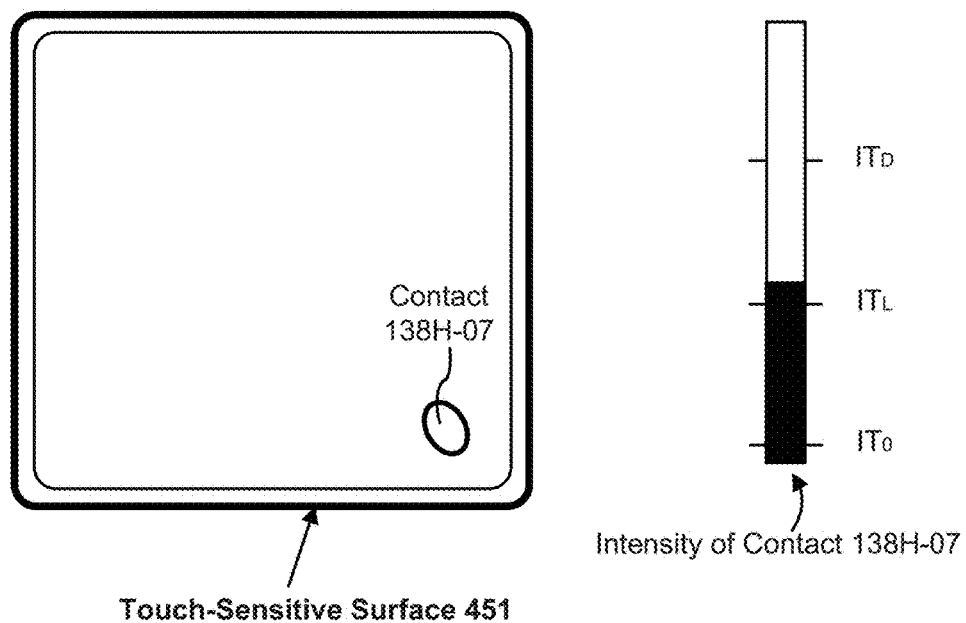
Figure 5H1

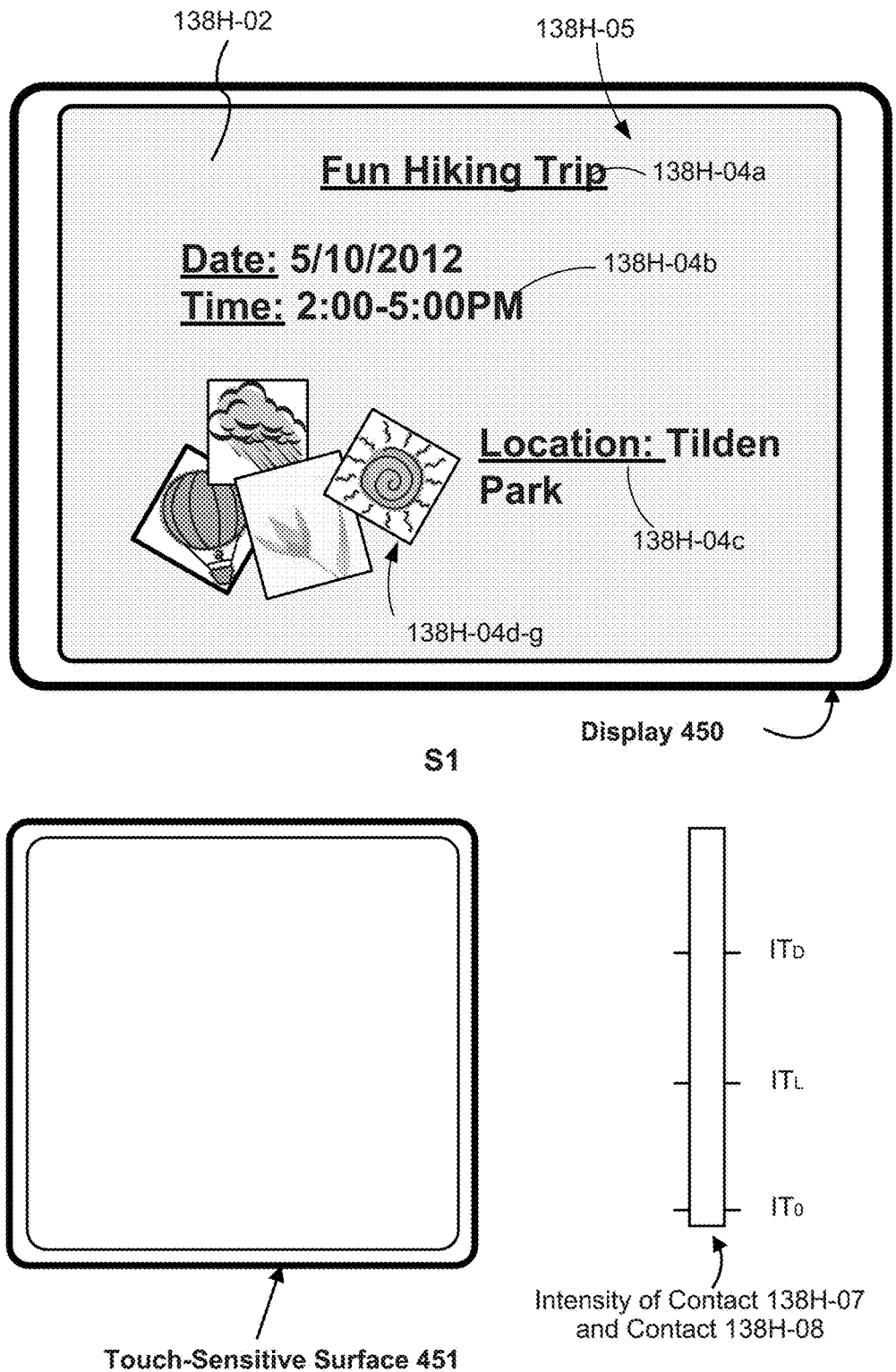
Figure 5H2

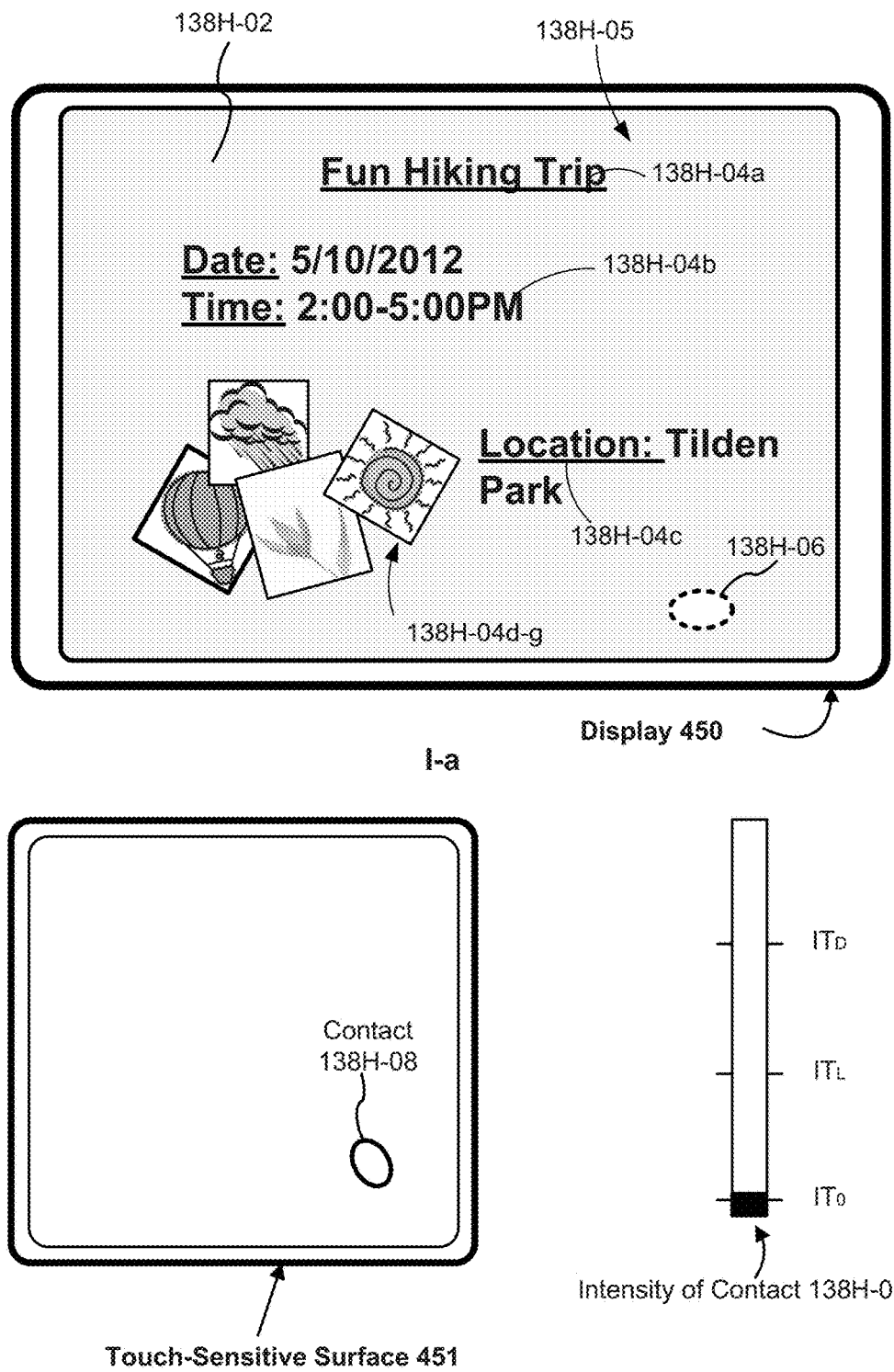
Figure 5H3

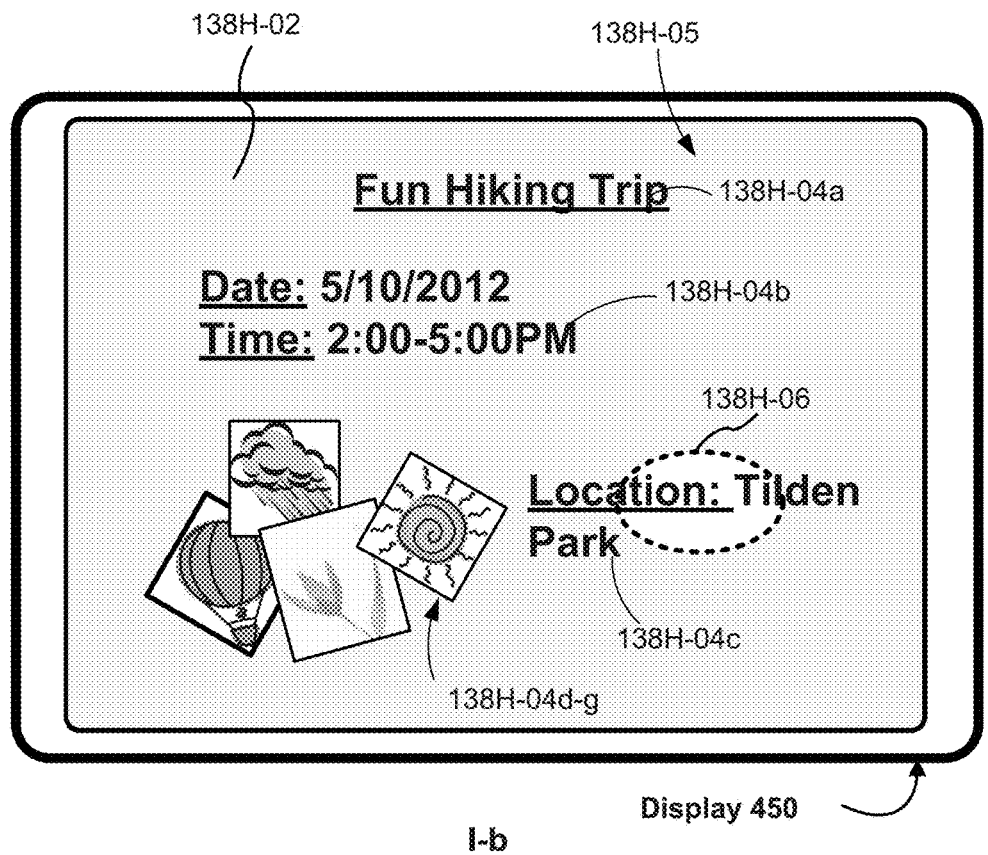
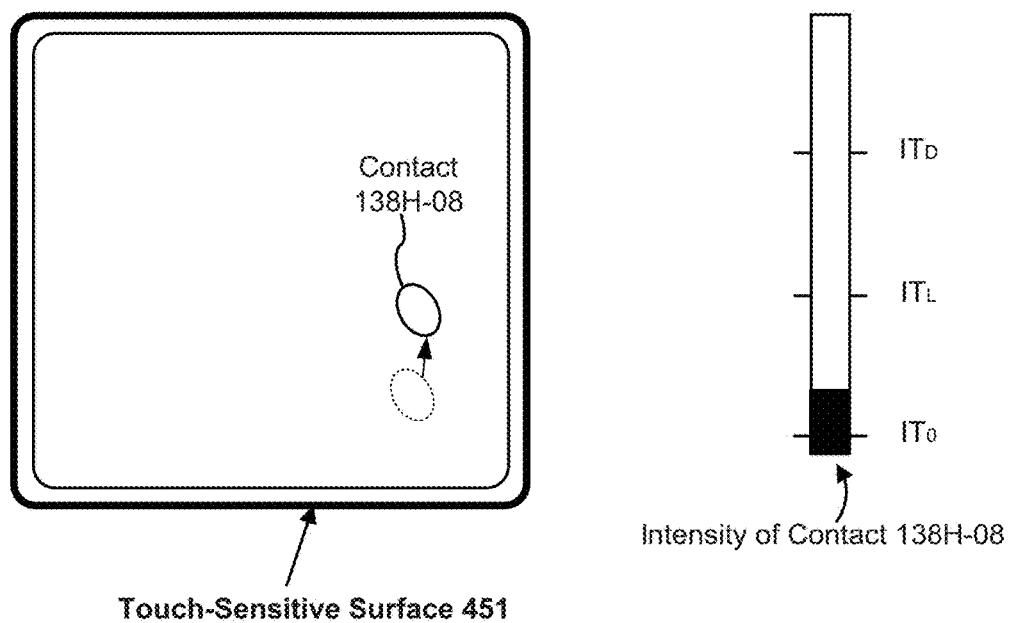
Figure 5H4

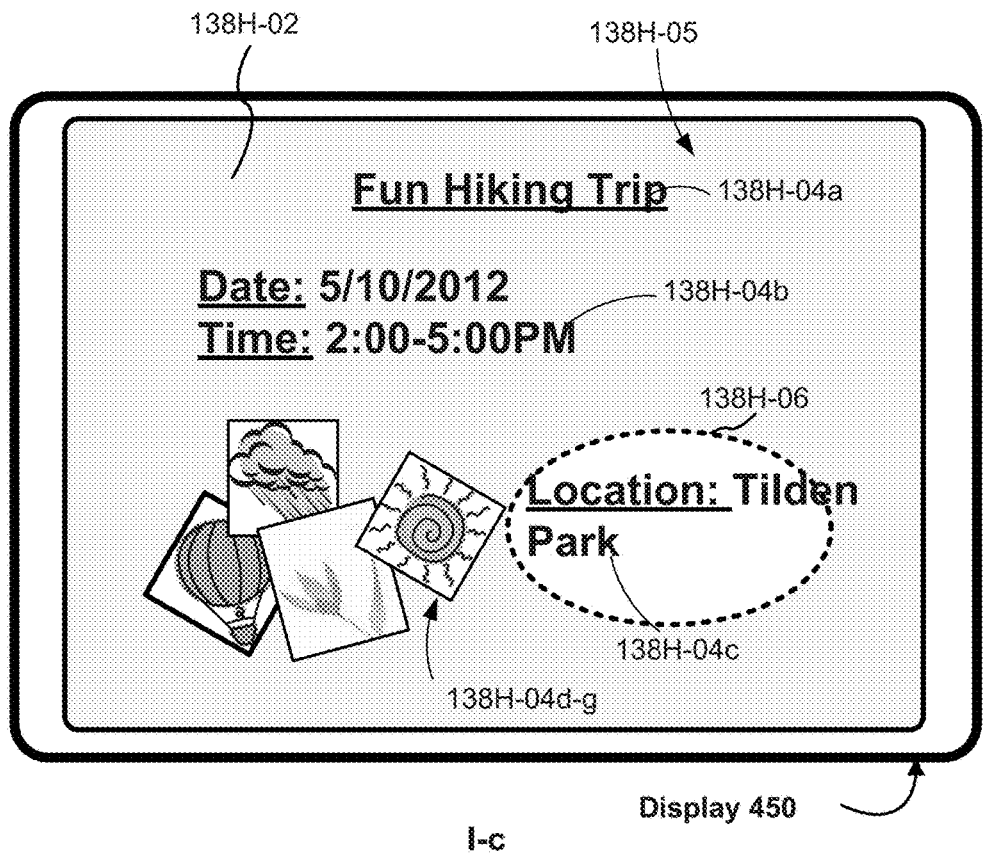
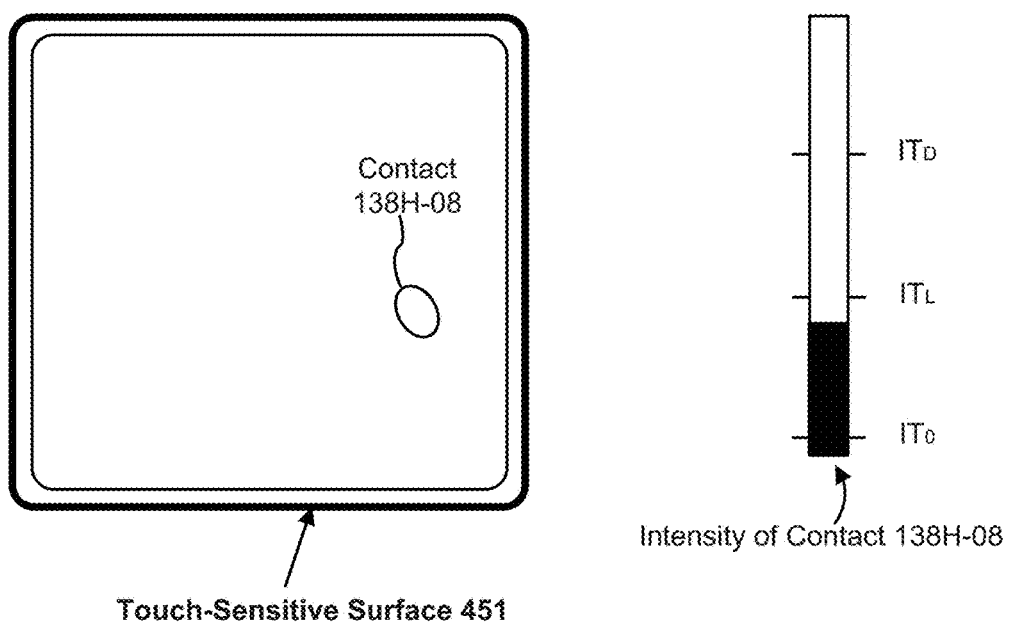
Figure 5H5

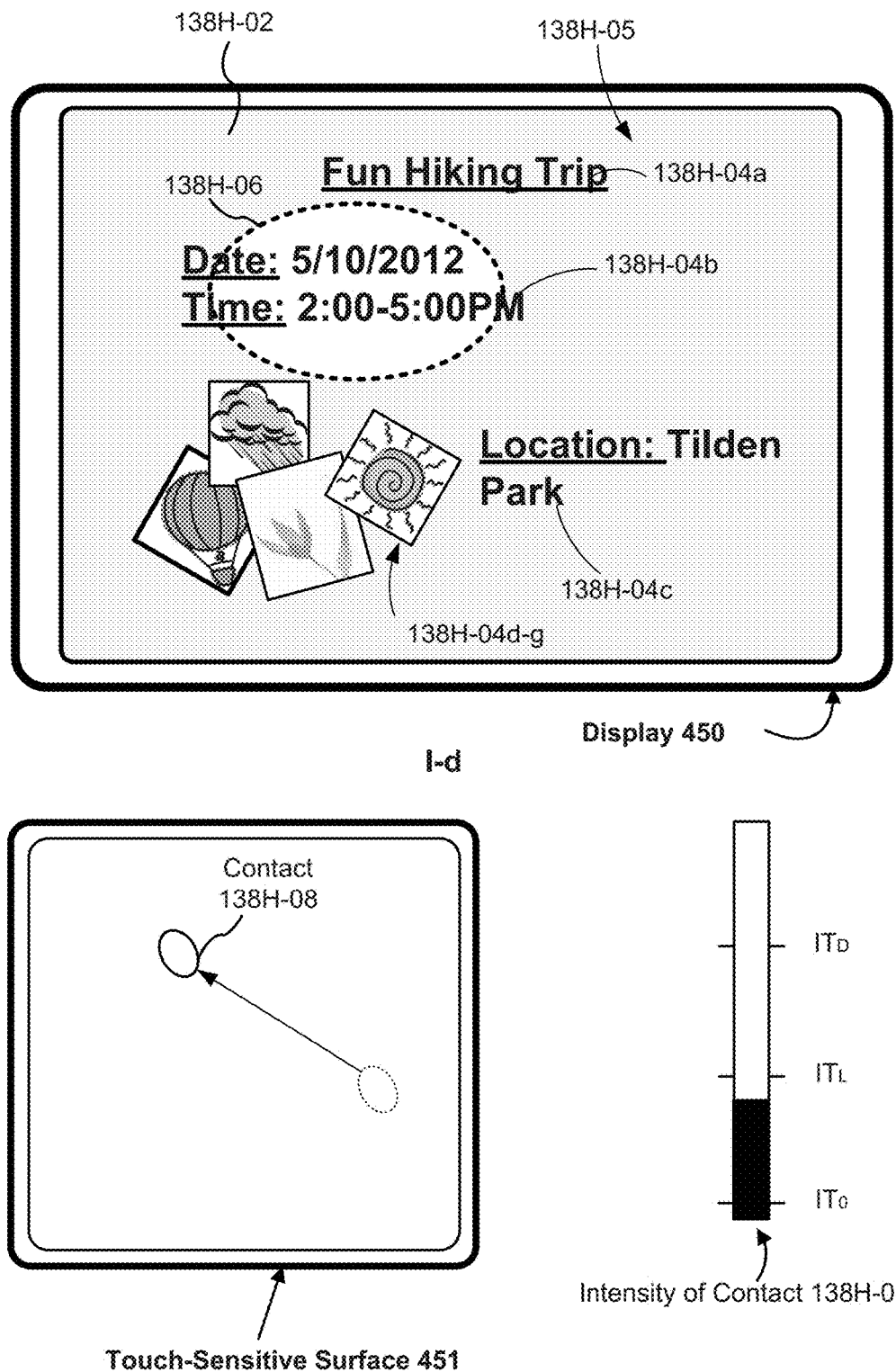
Figure 5H6

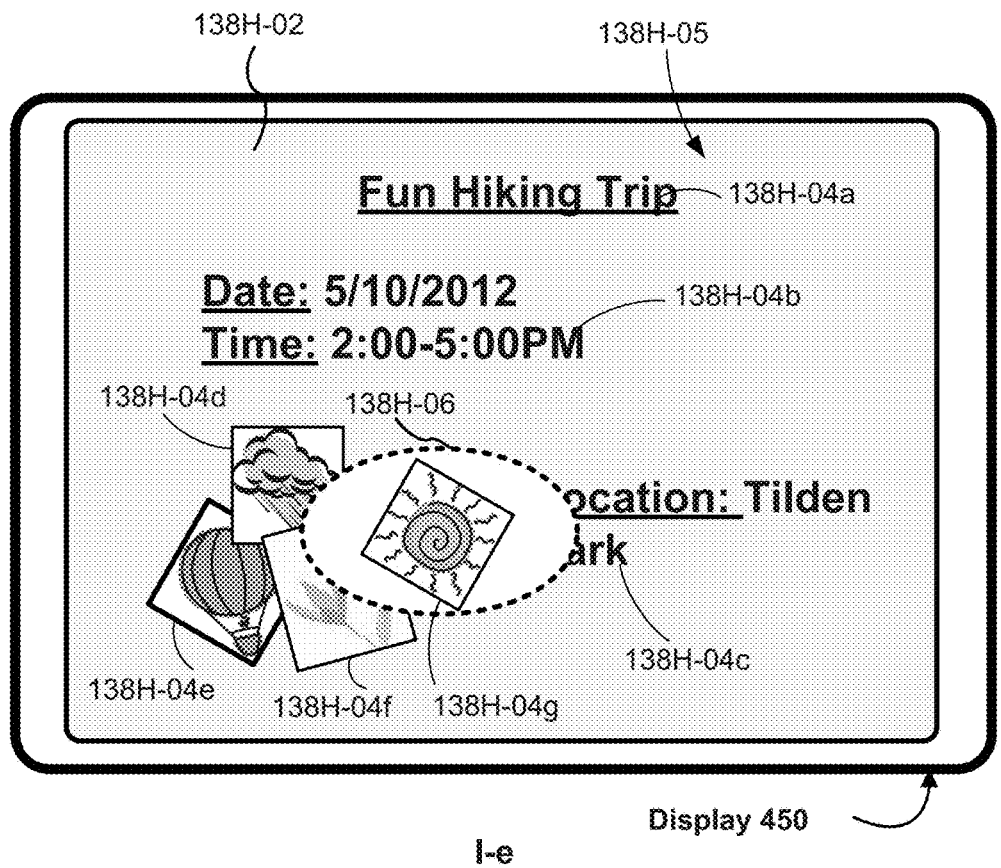
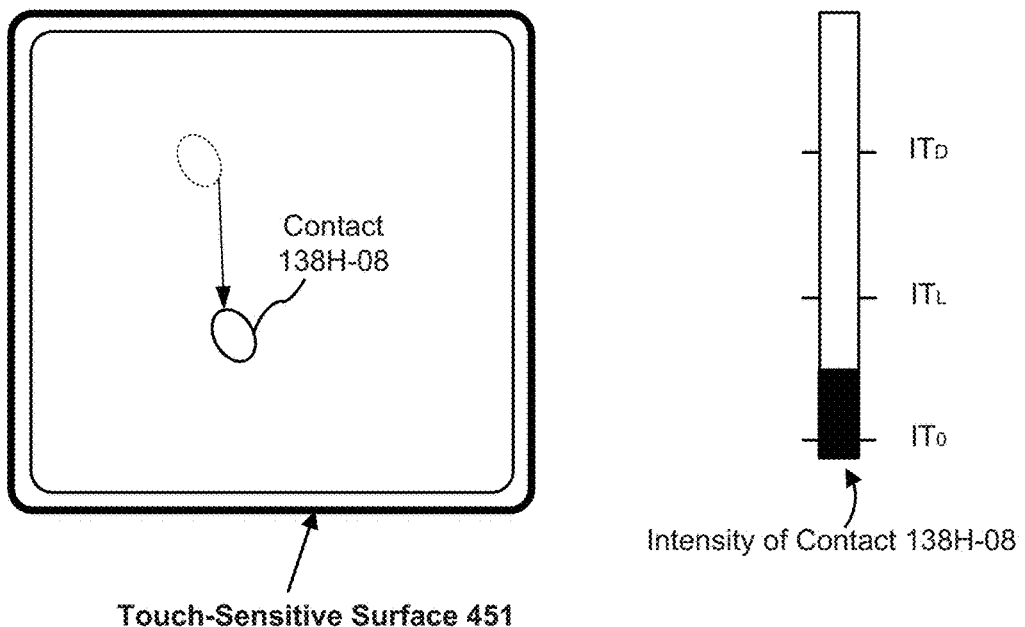
Figure 5H7

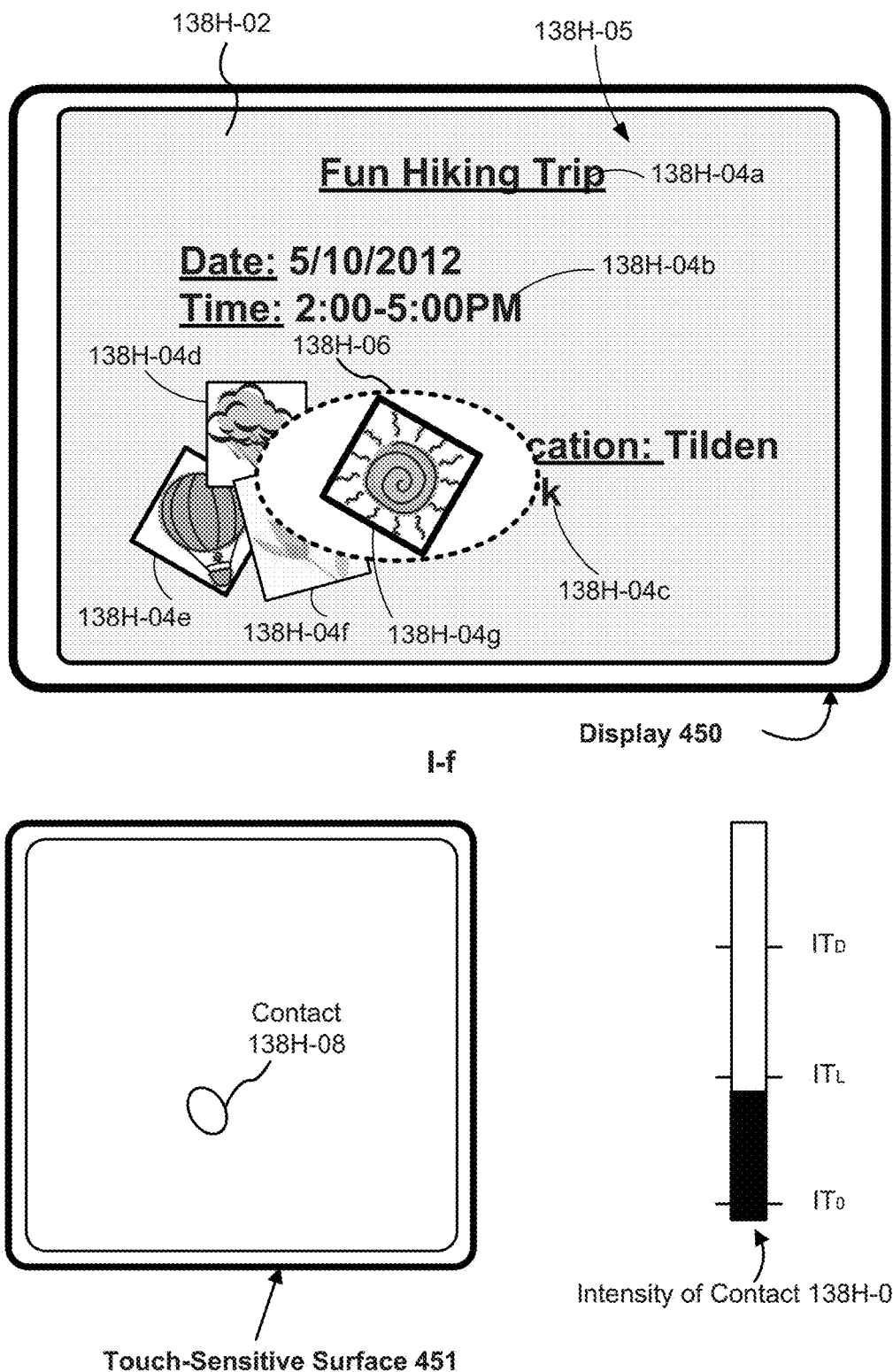
Figure 5H8

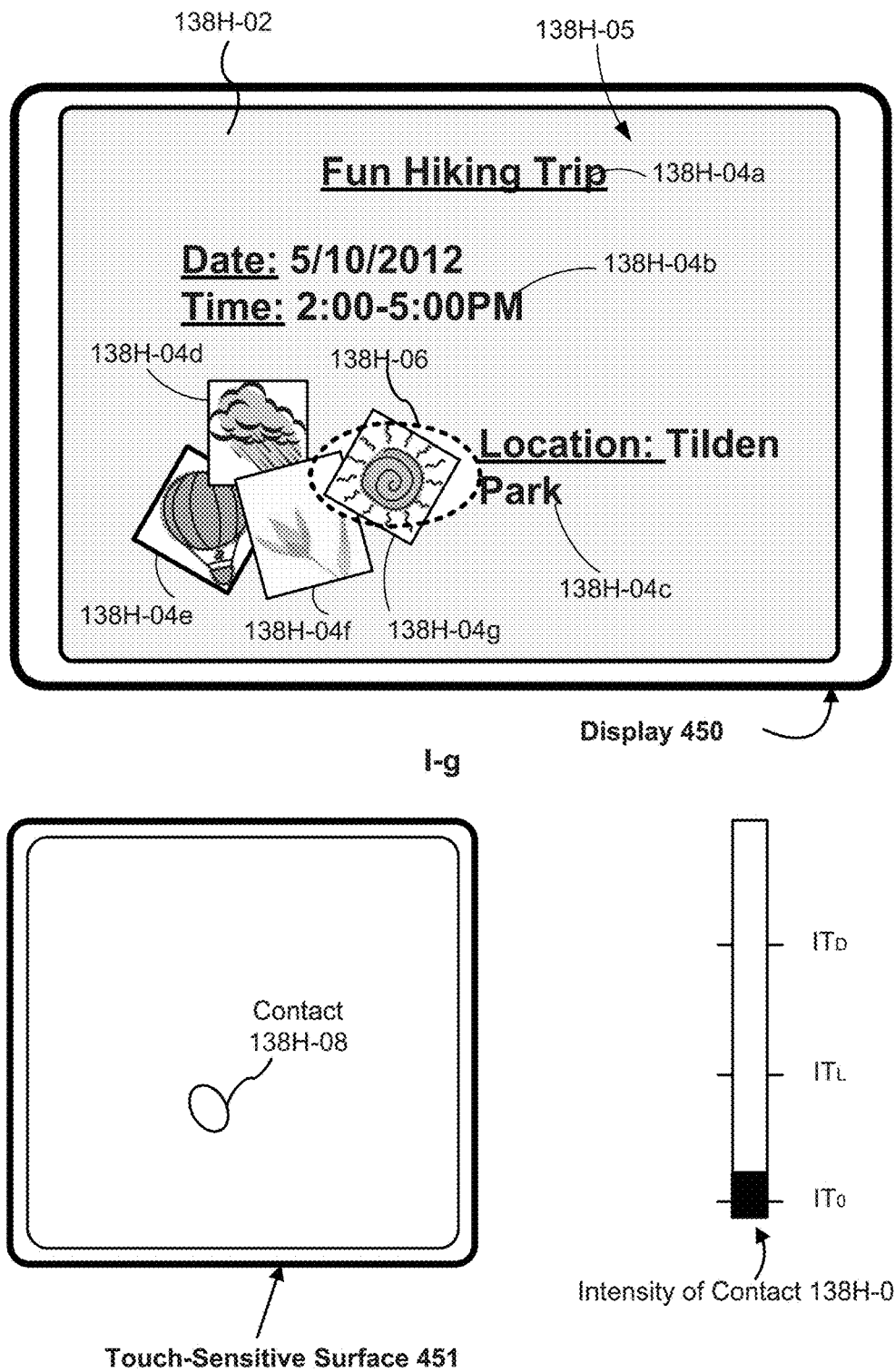
Figure 5H9

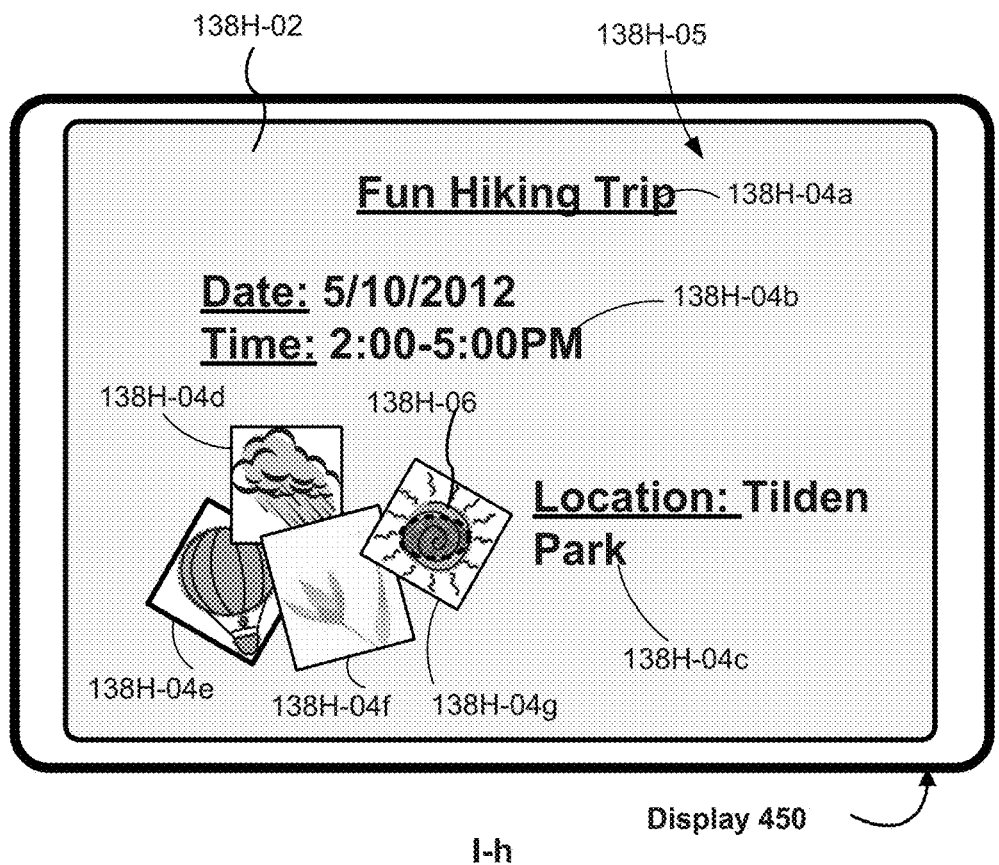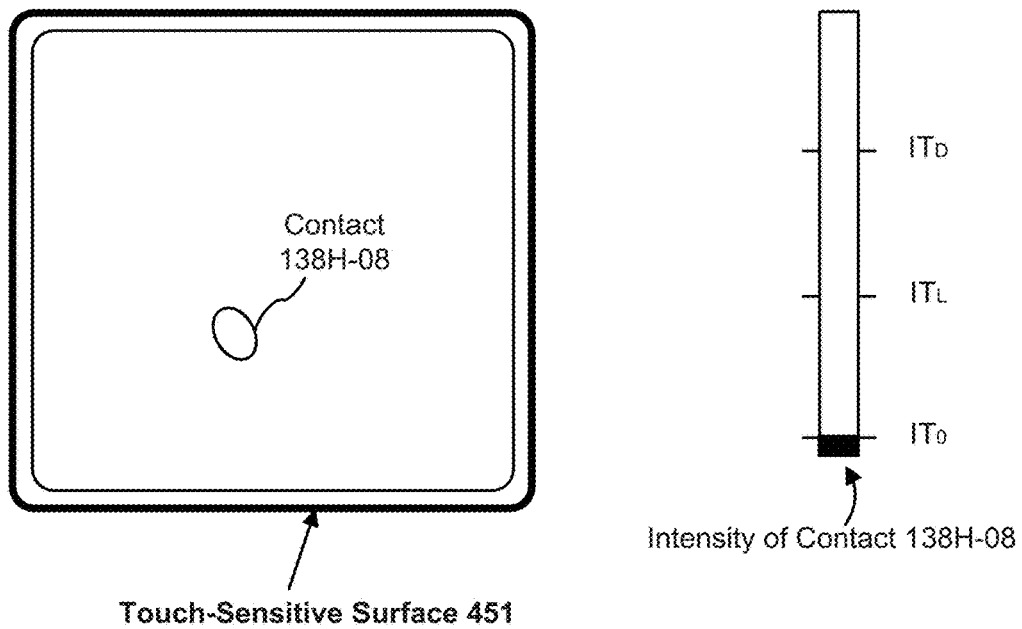
Figure 5H10

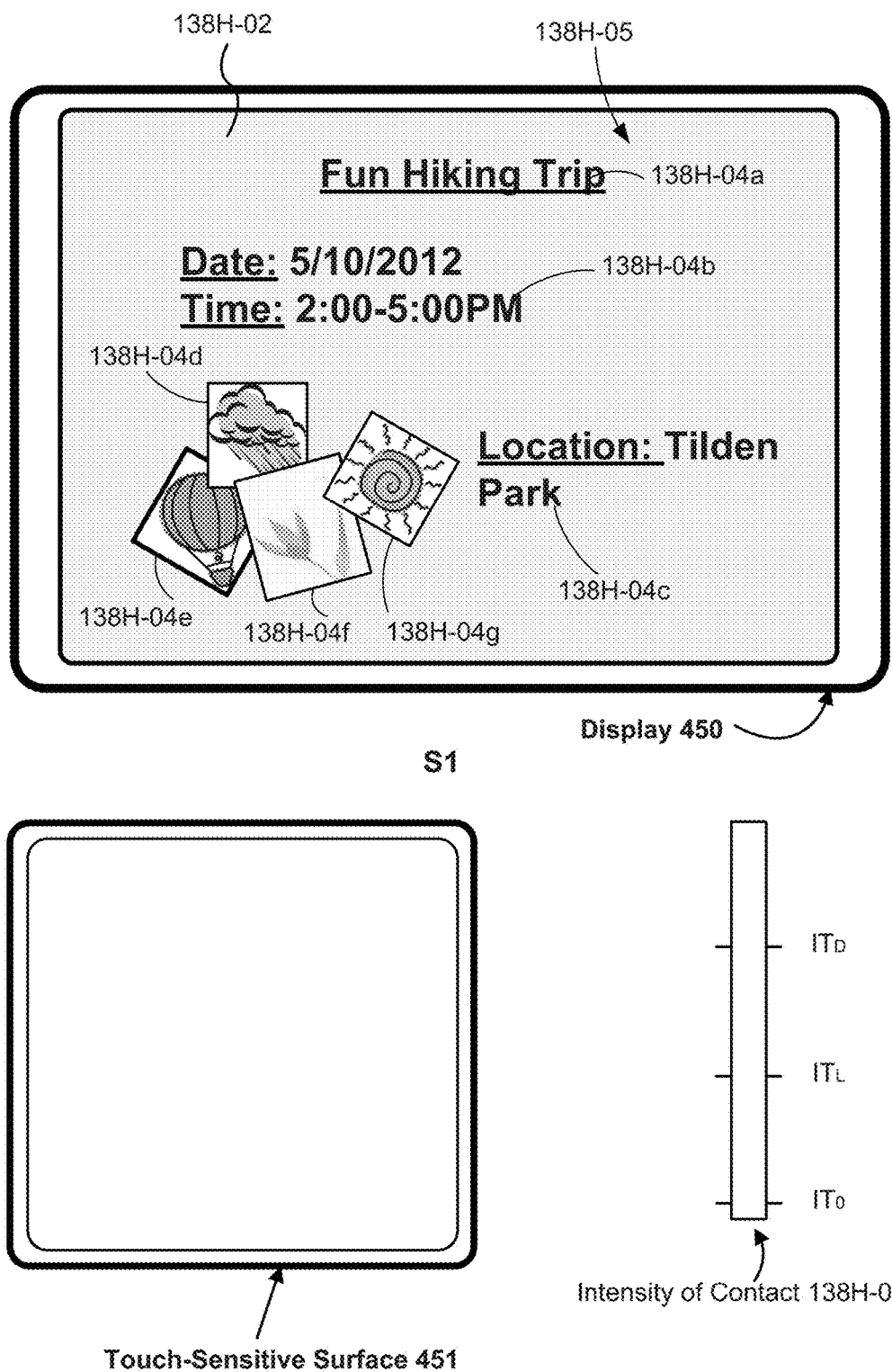
Figure 5H11

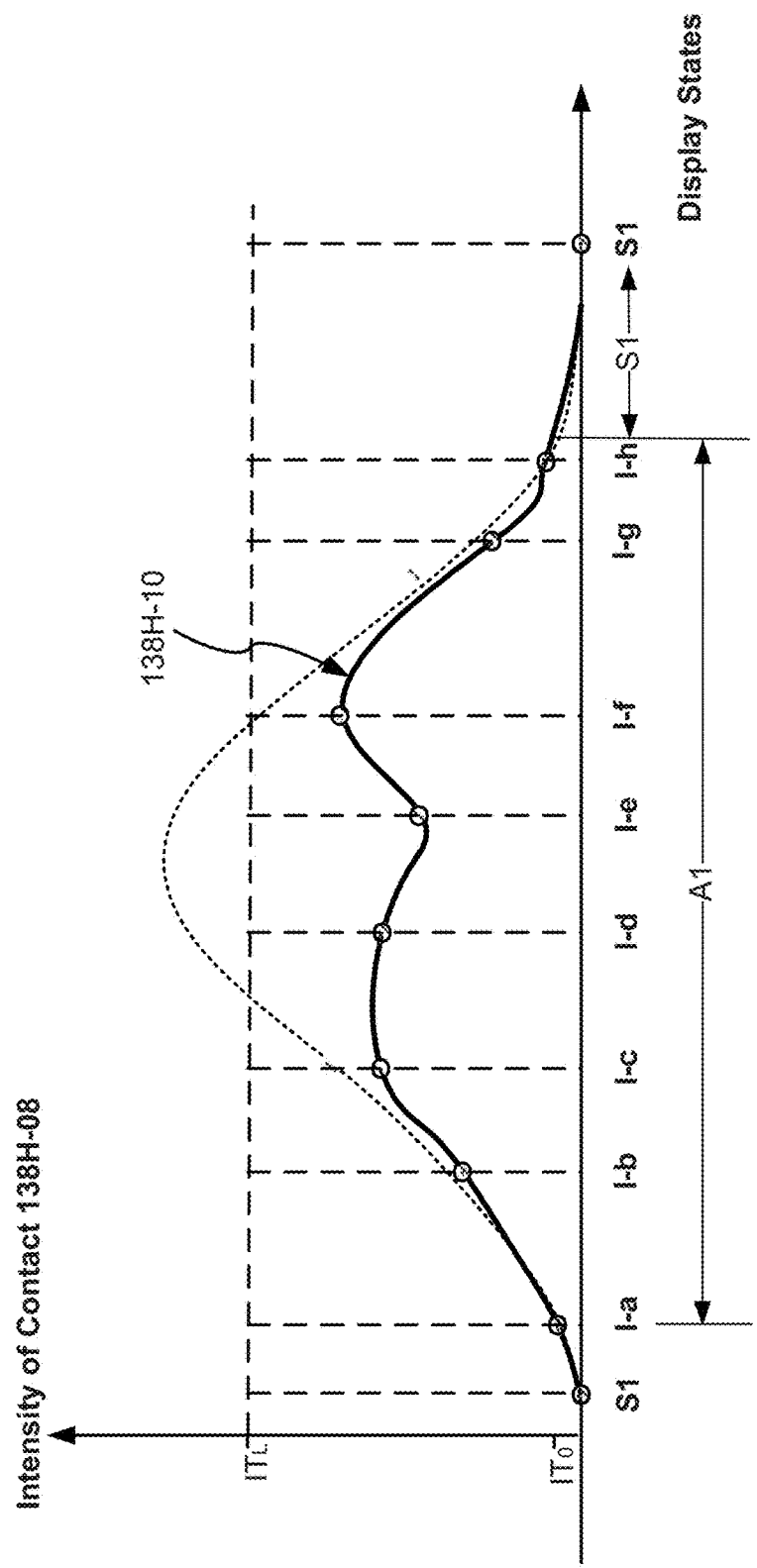
Figure 5H12

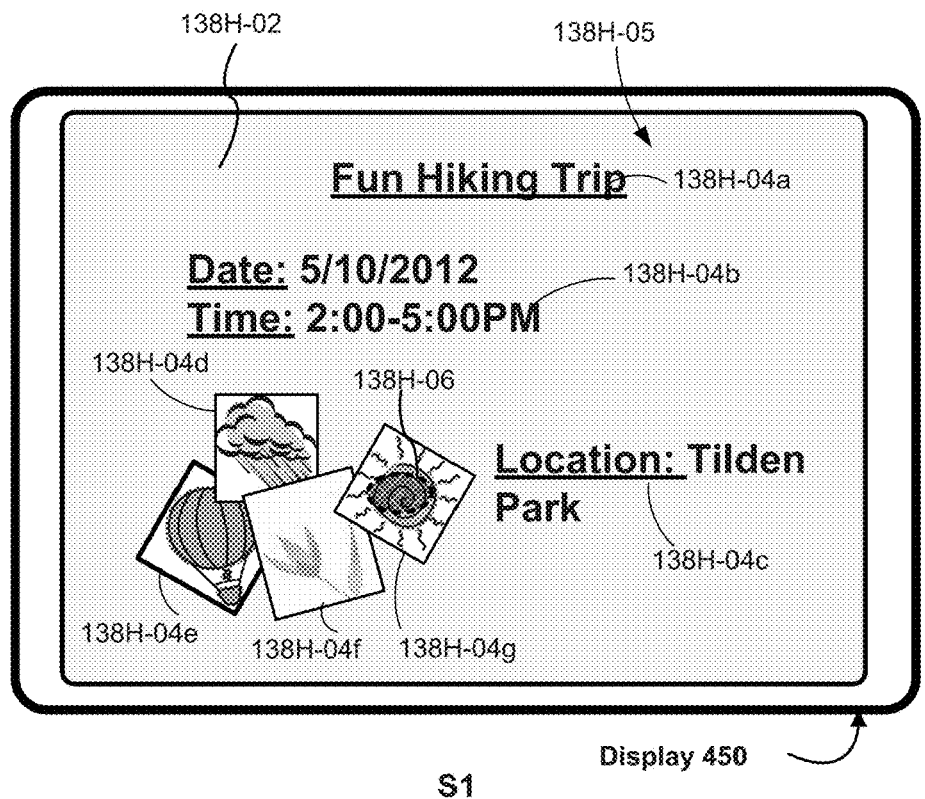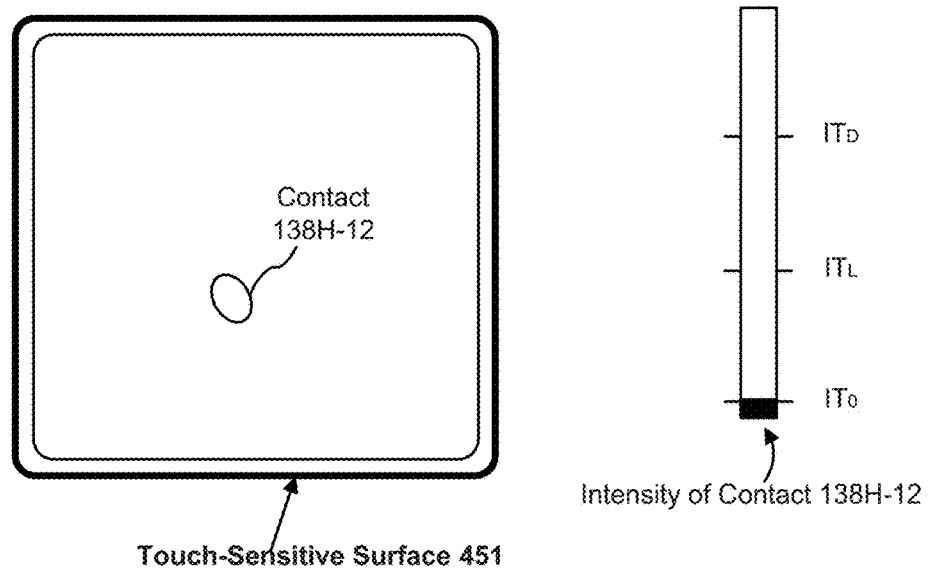
Figure 5H13

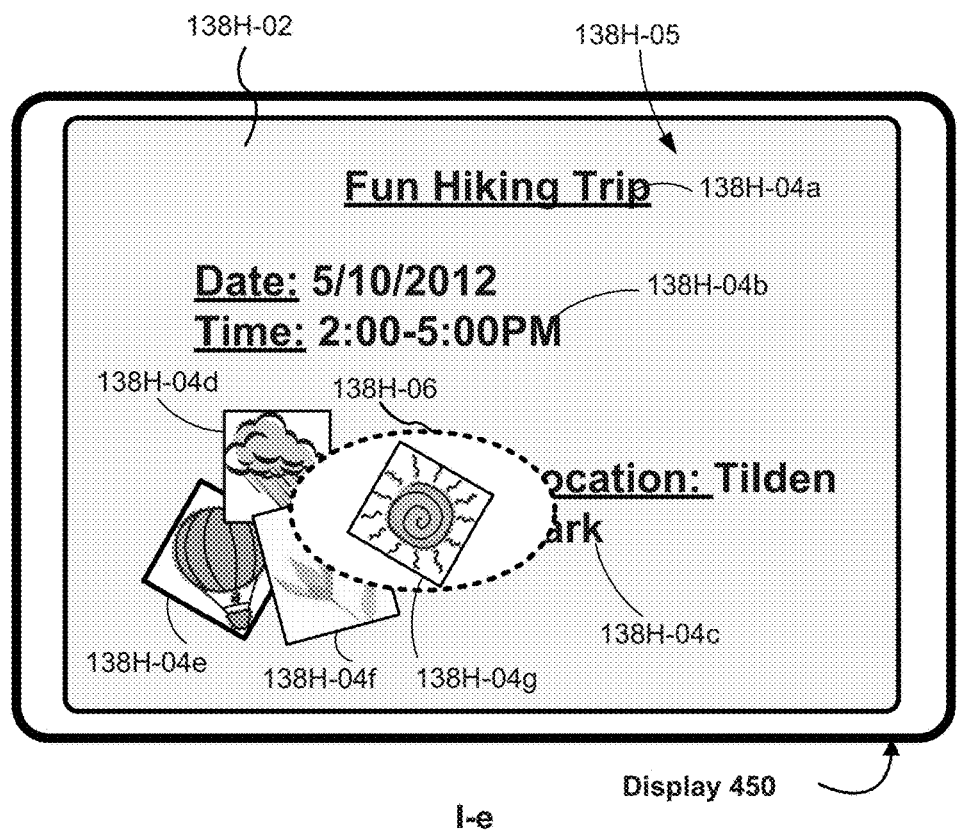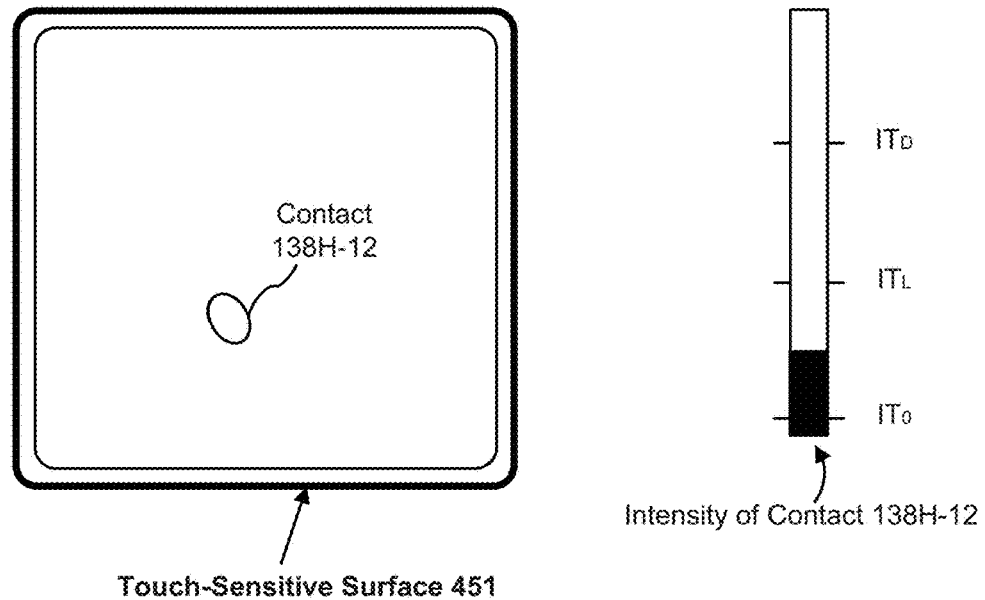
Figure 5H14

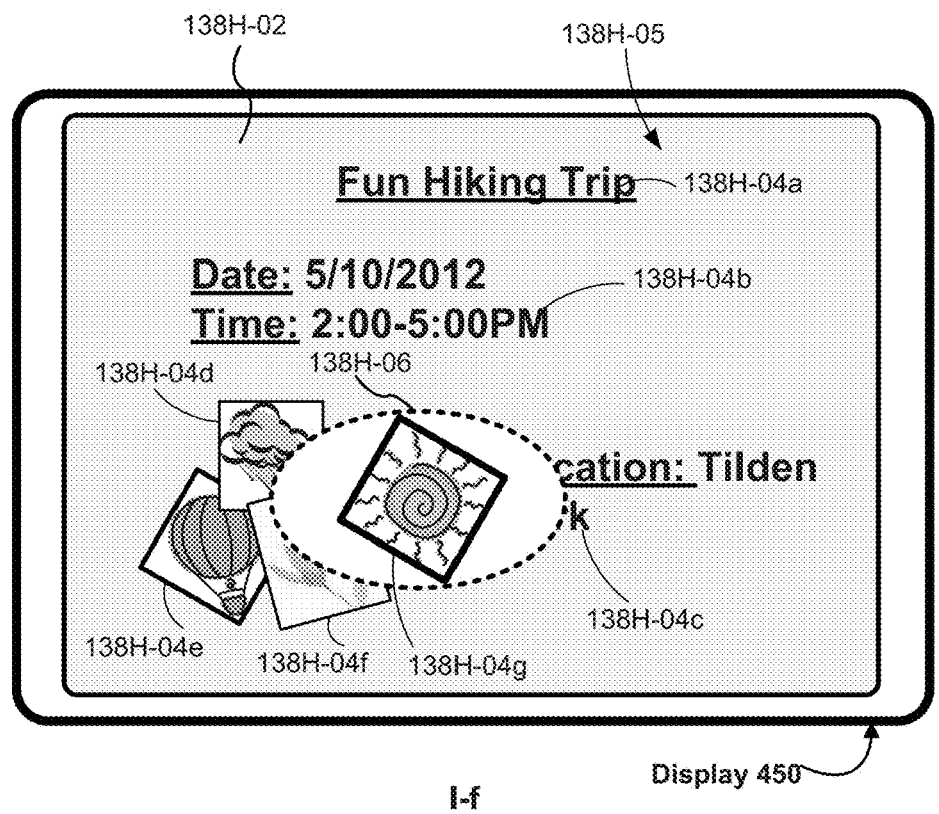
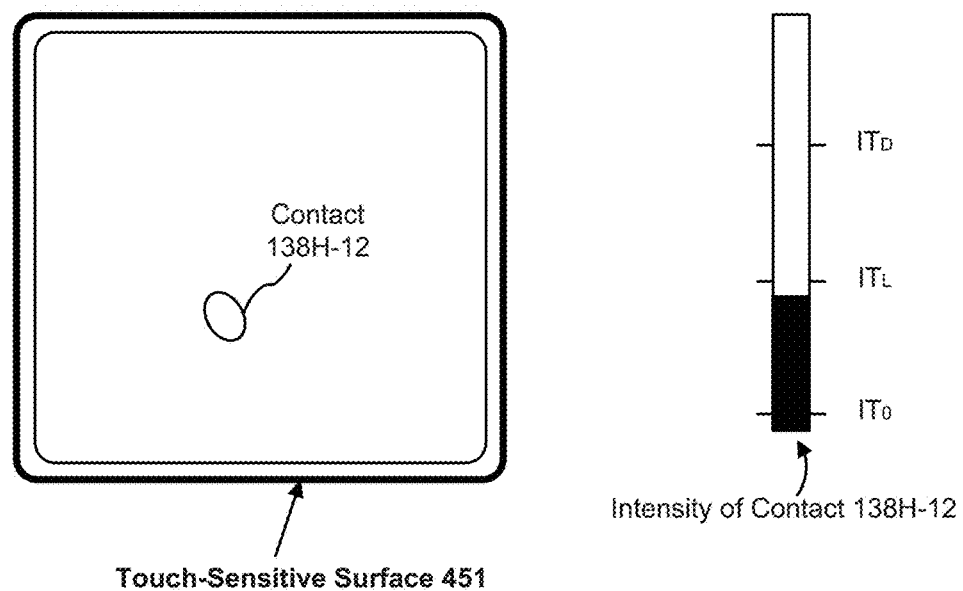
Figure 5H15

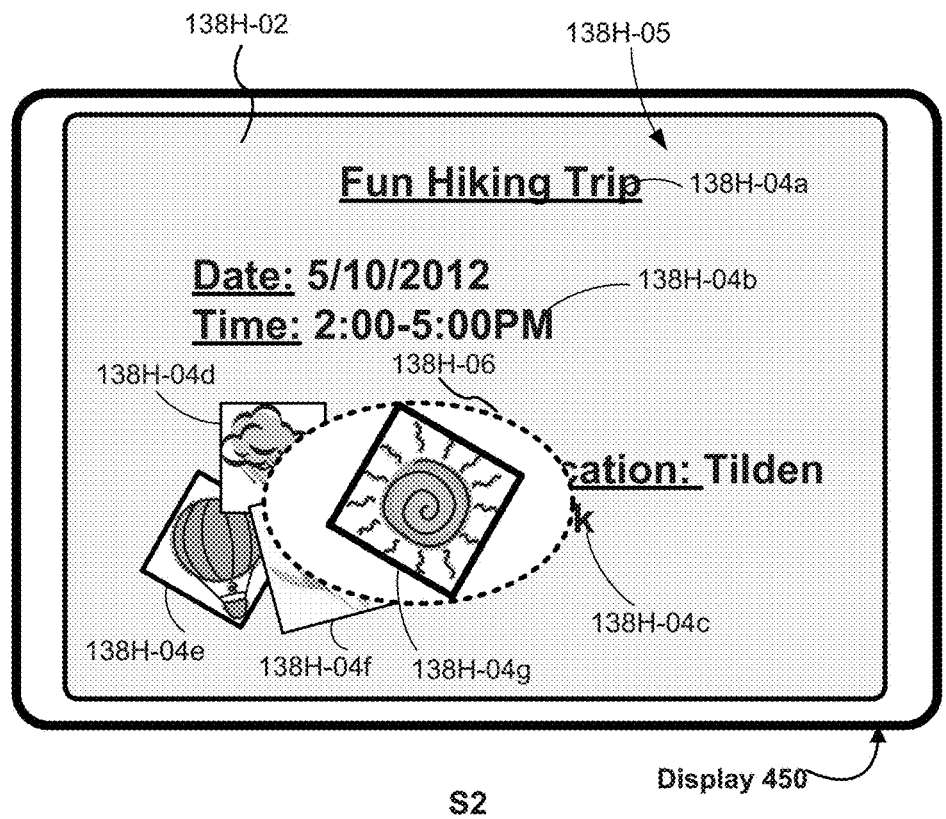
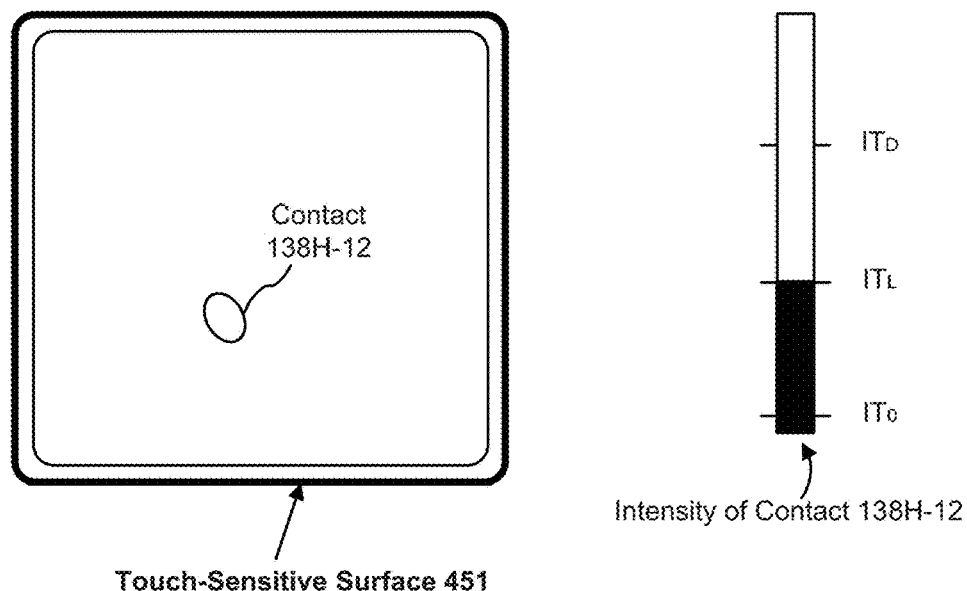
Figure 5H16

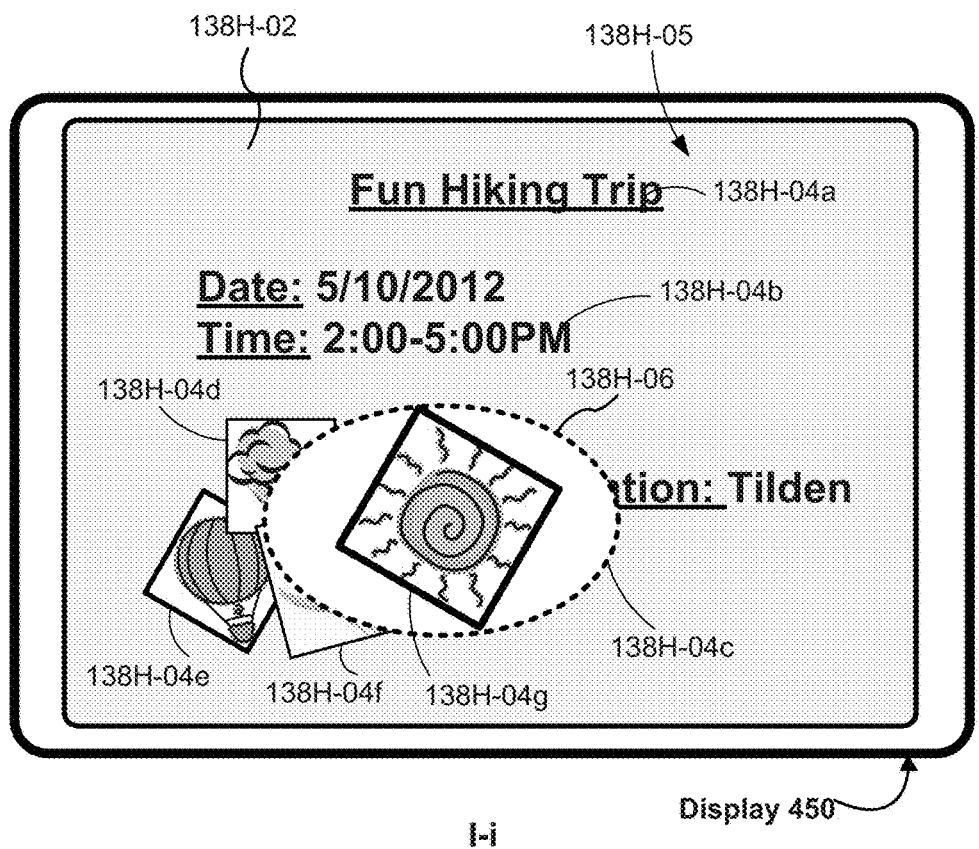
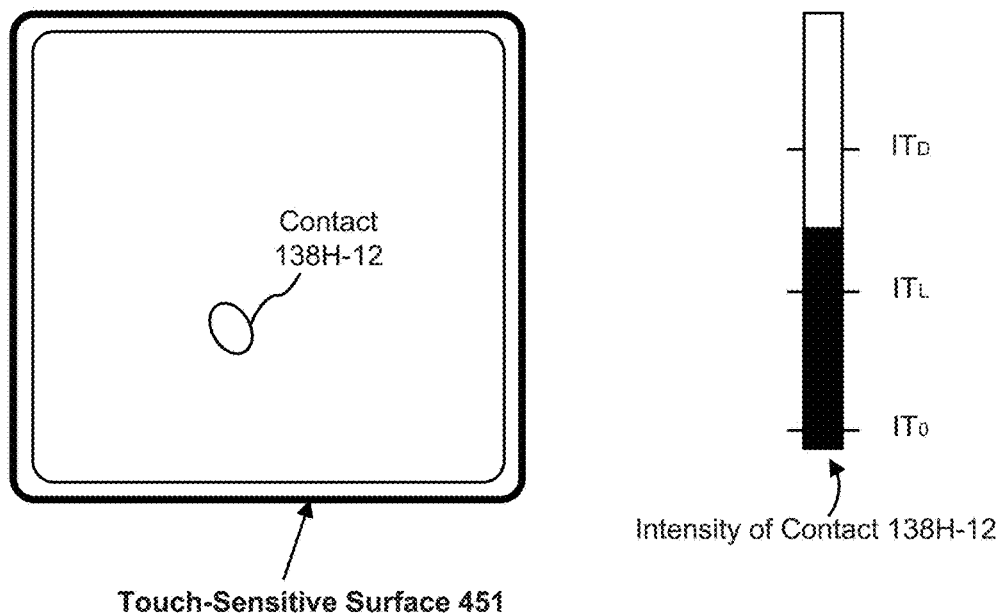
Figure 5H17

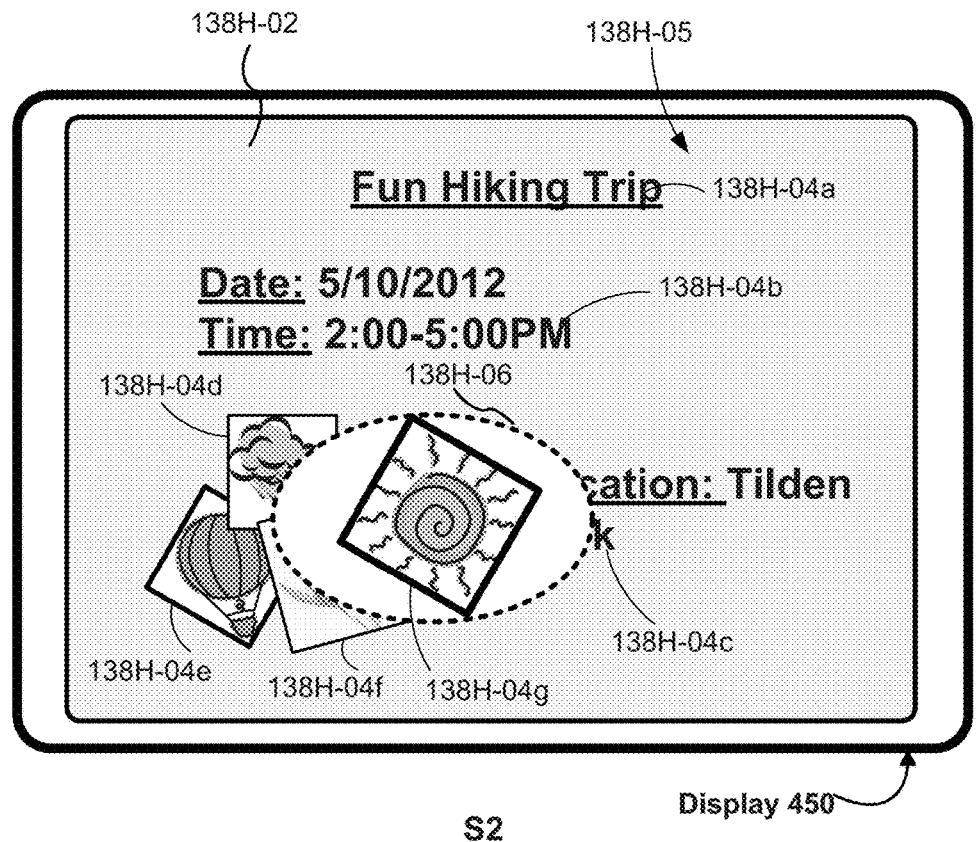
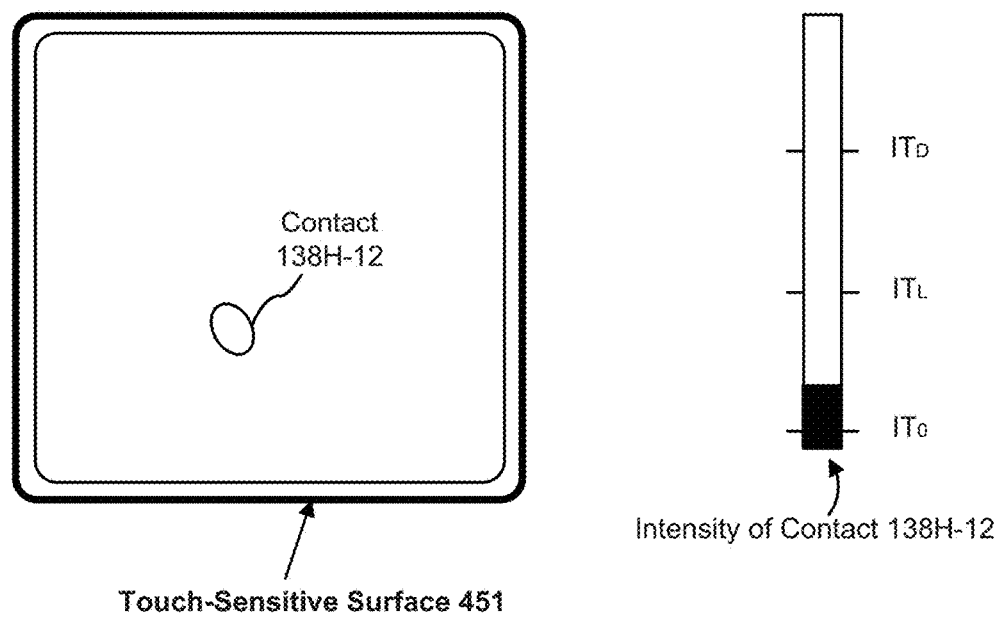
Figure 5H18

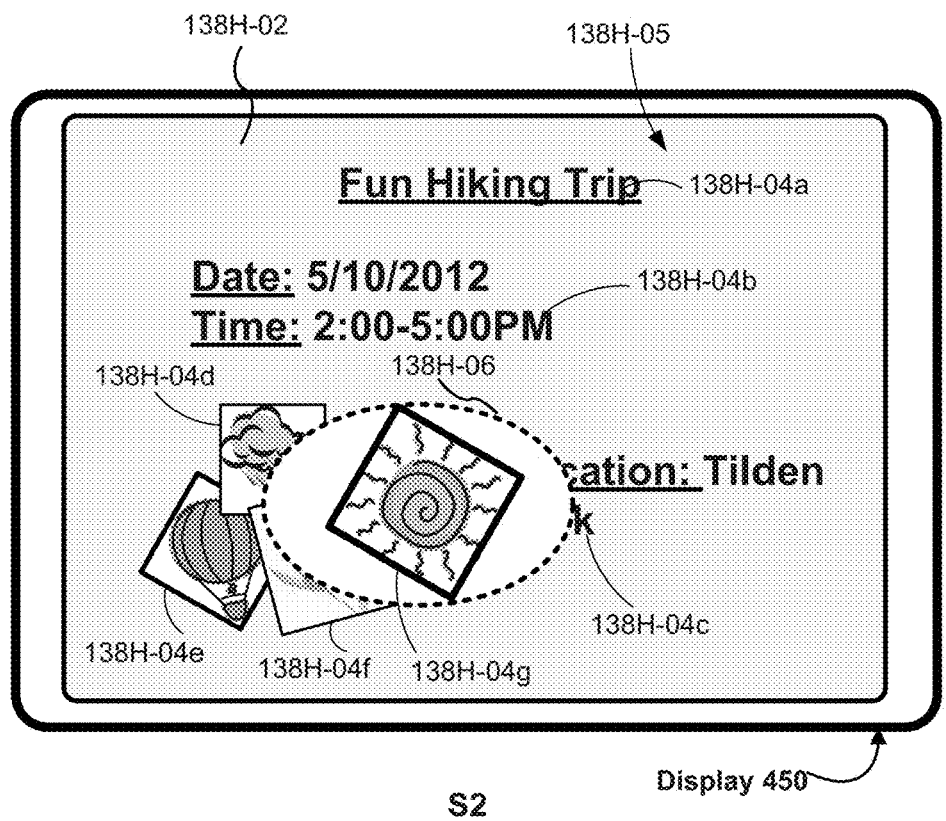
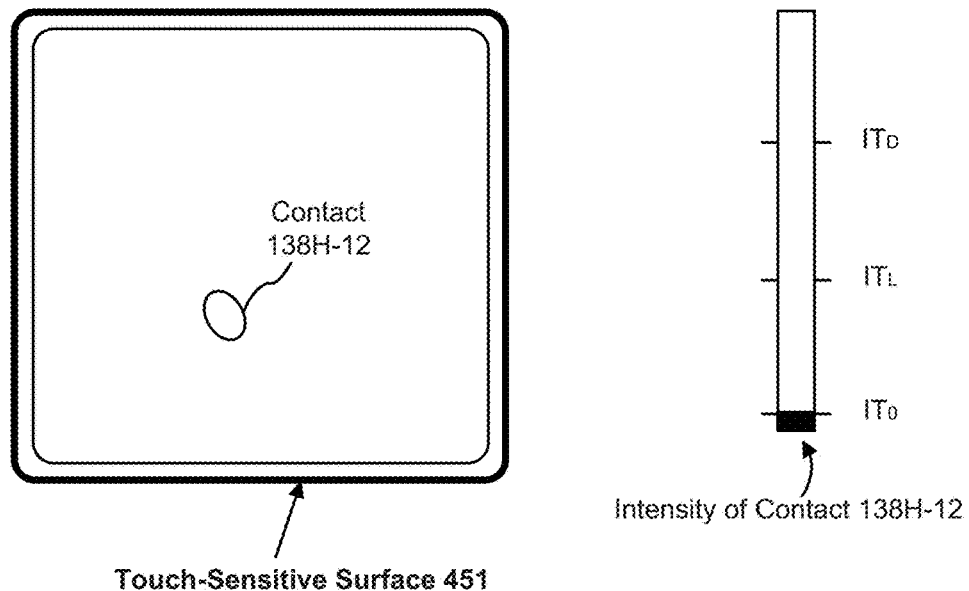
Figure 5H19

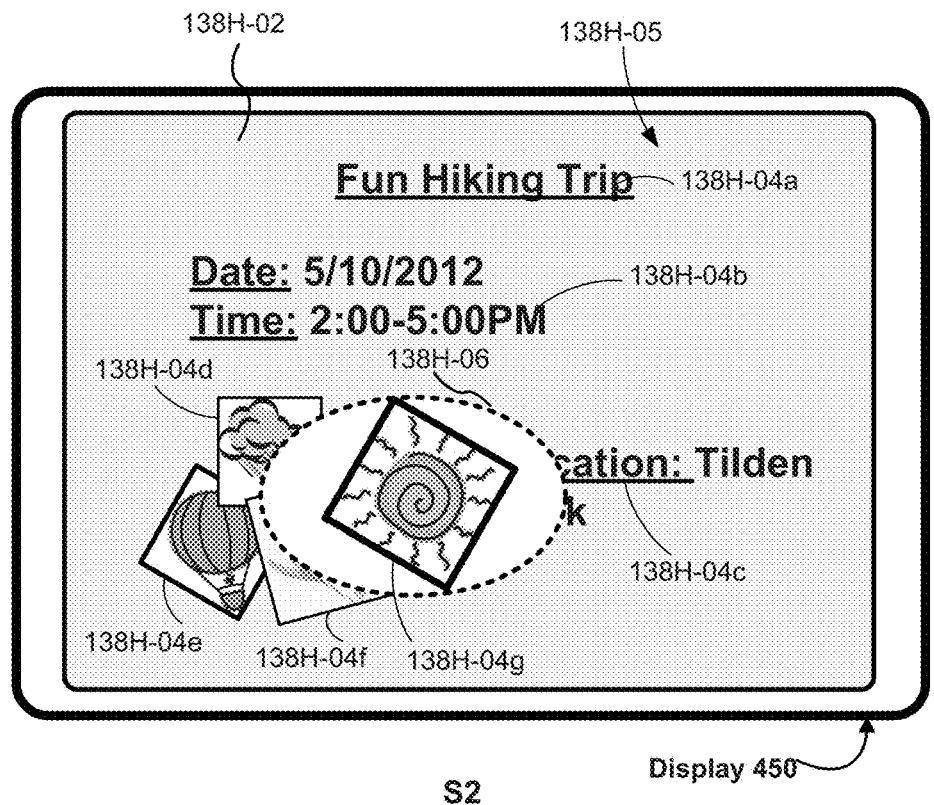
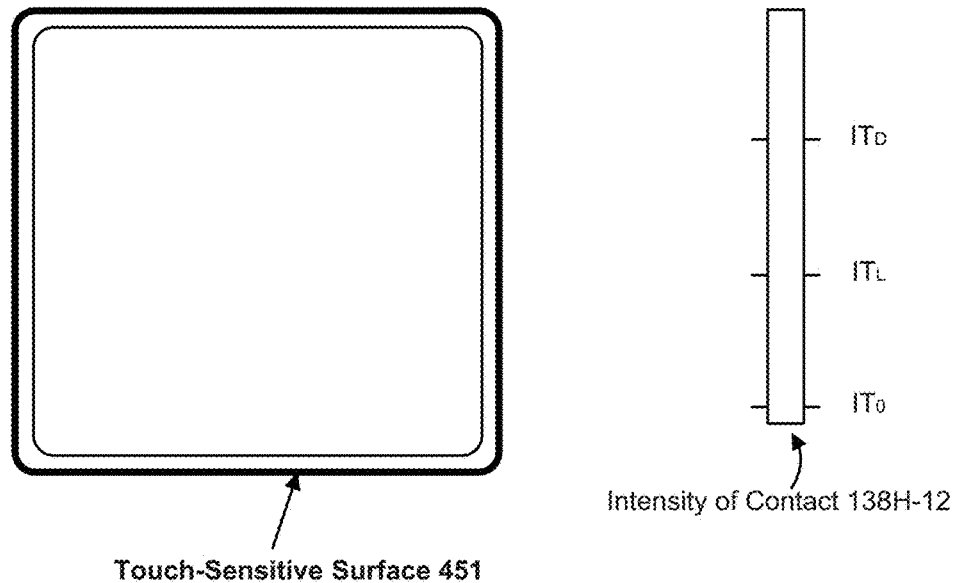
Figure 5H20

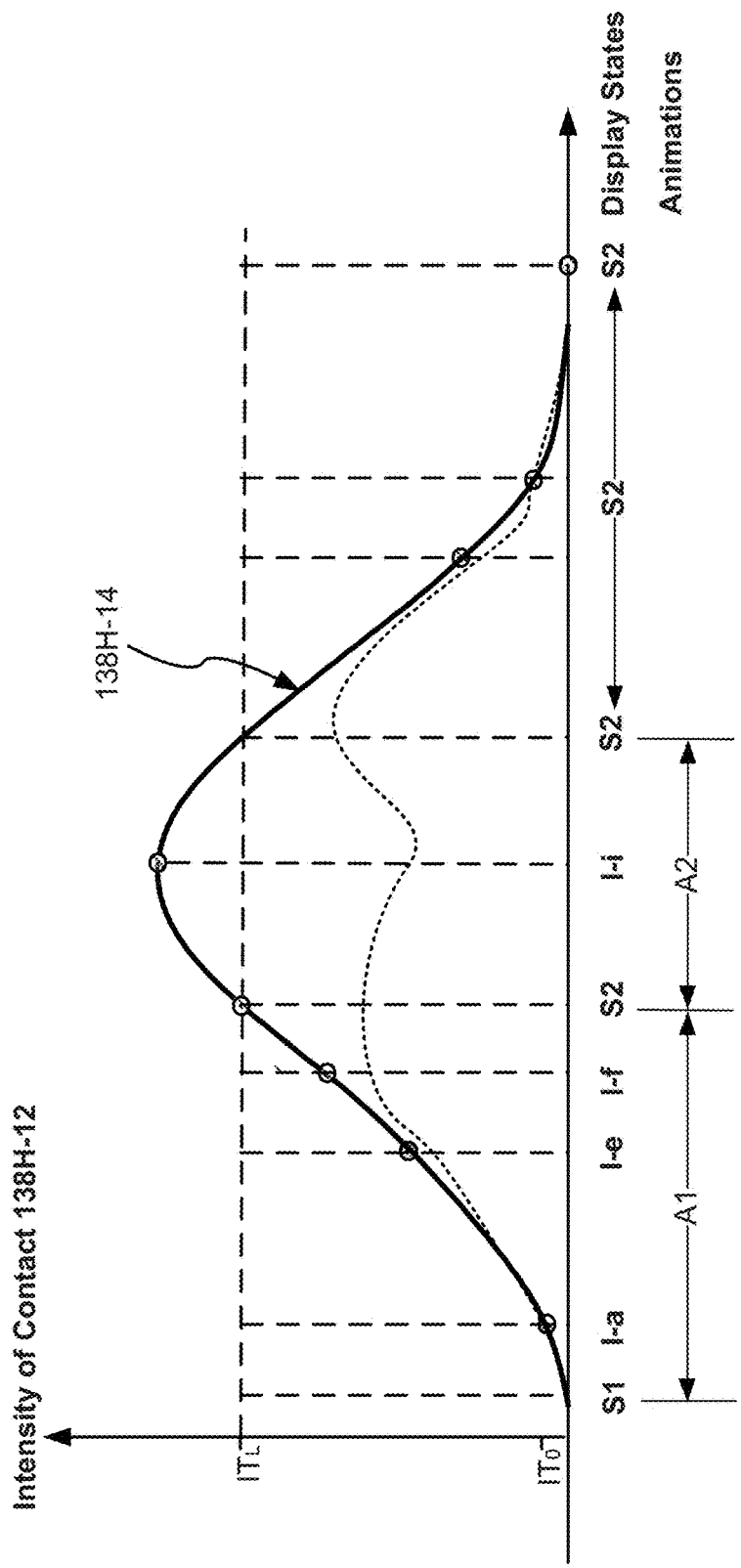

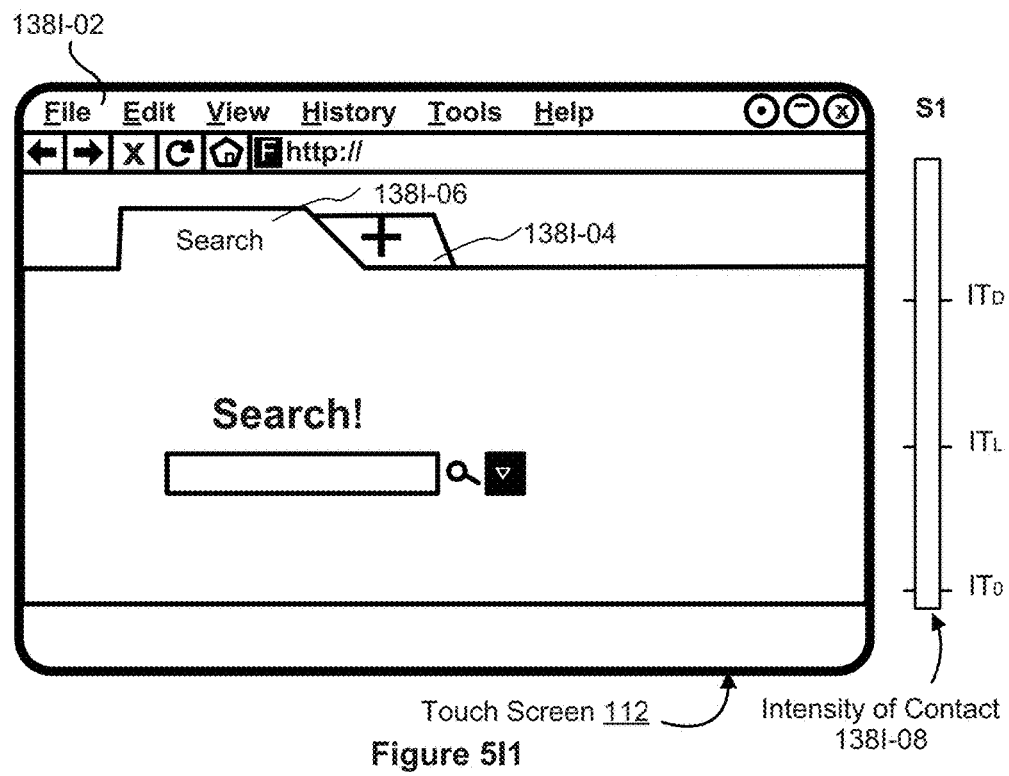
Figure 5I1
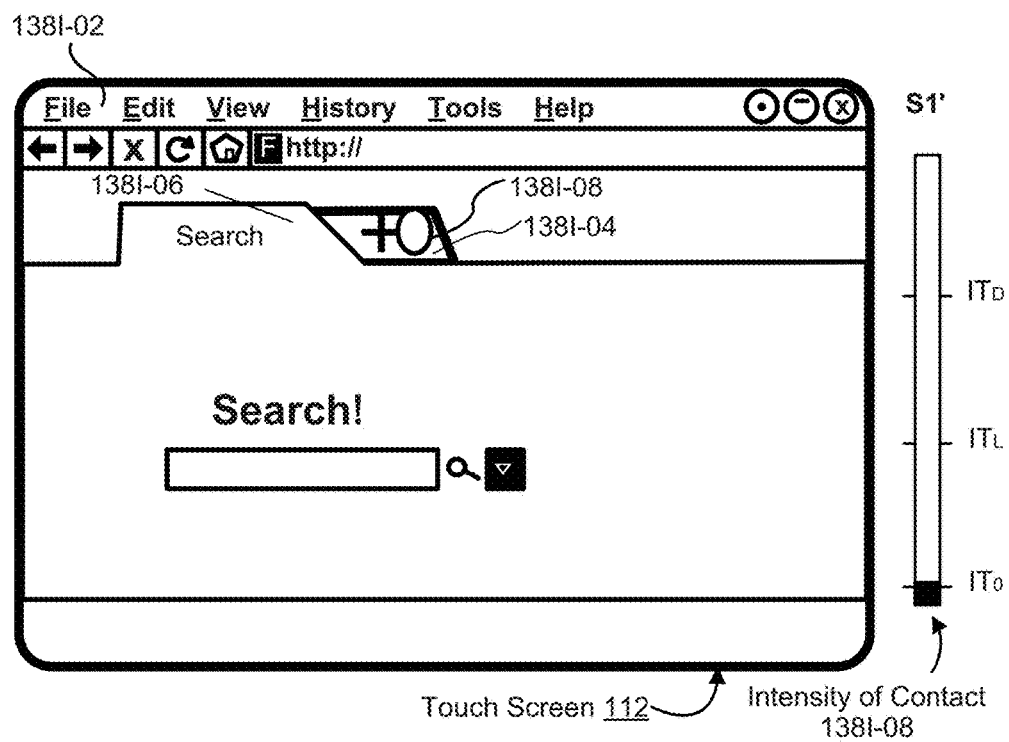
Figure 5I2

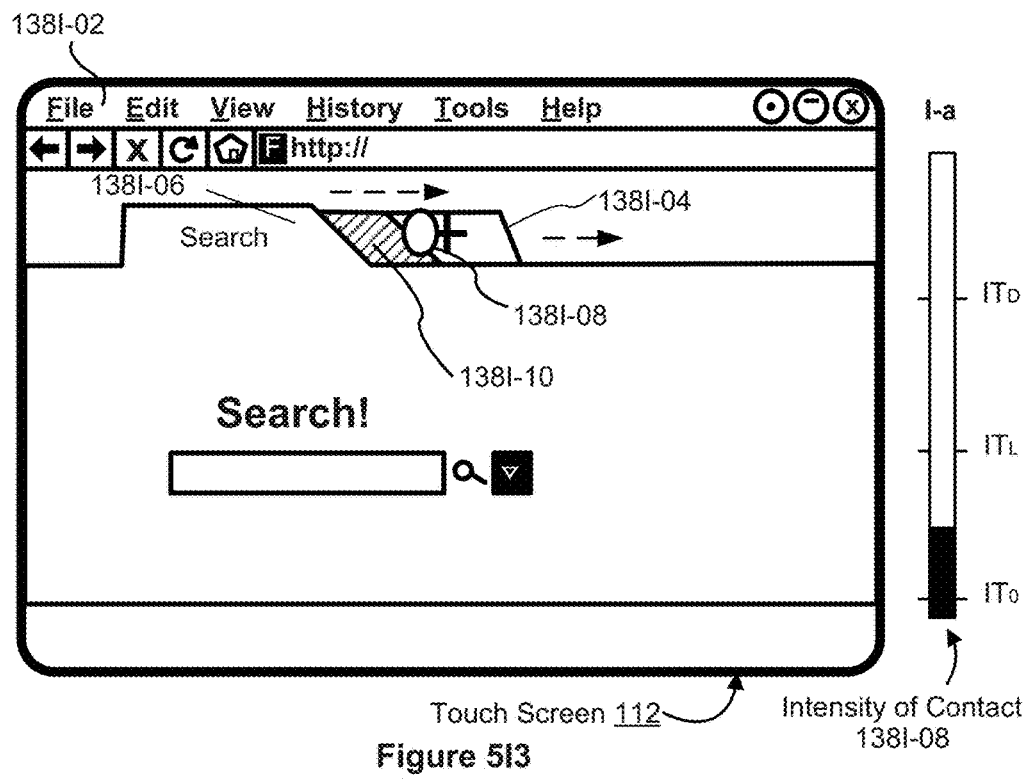
Figure 5I3
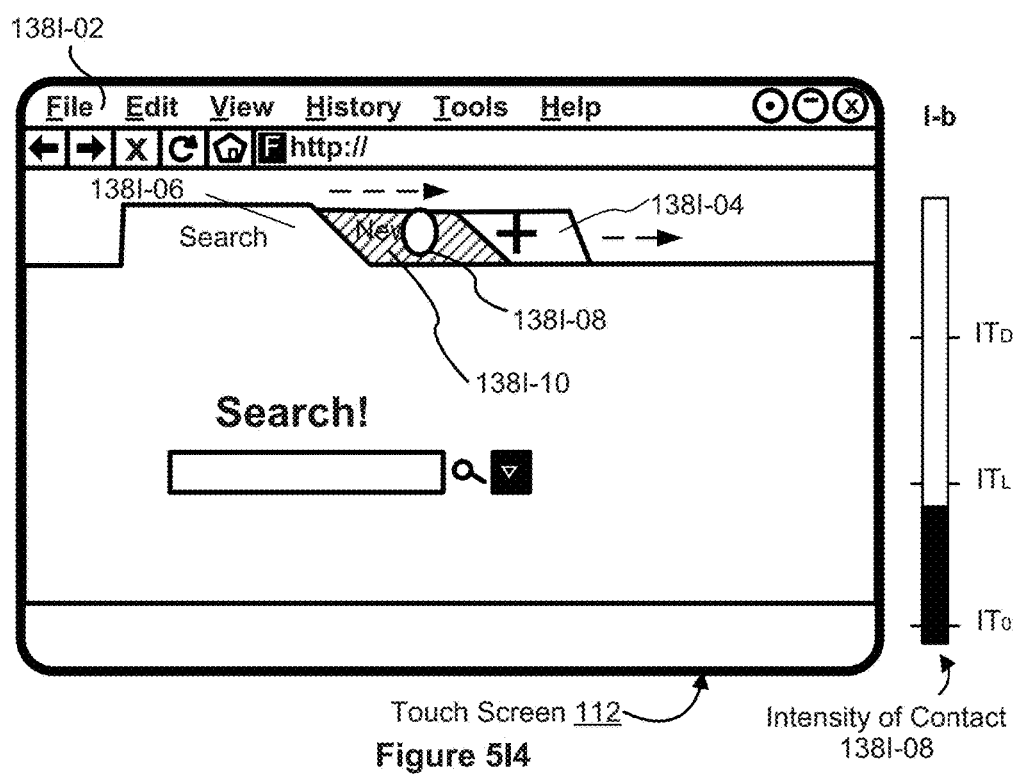
Figure 5I4

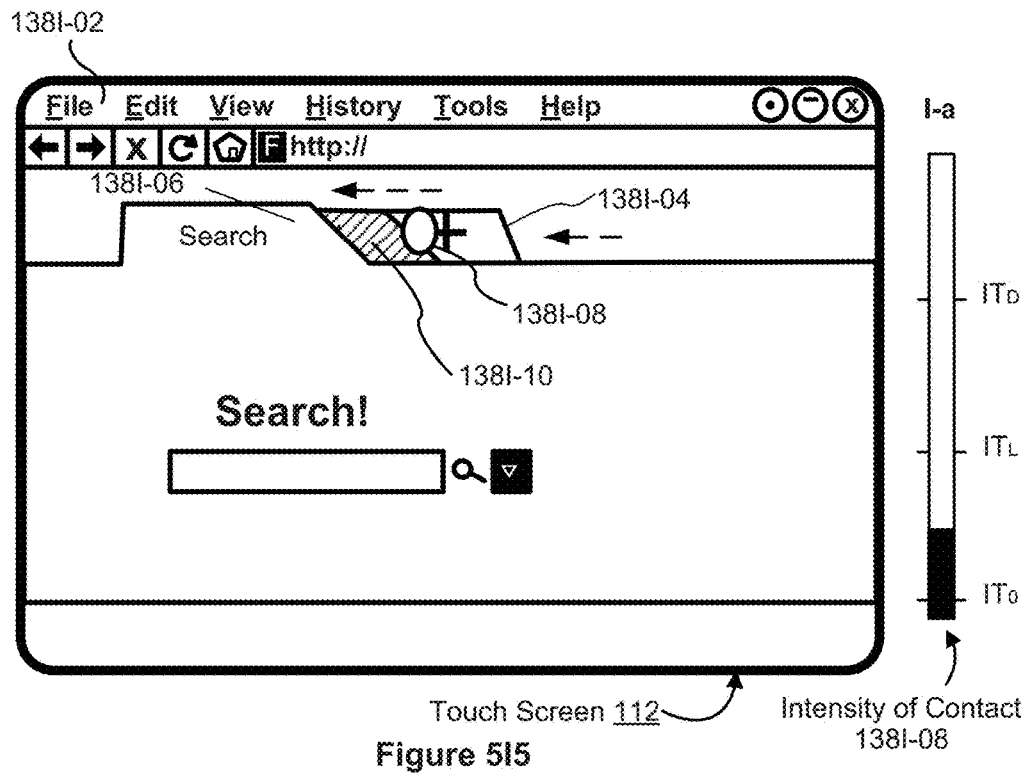
Figure 5I5
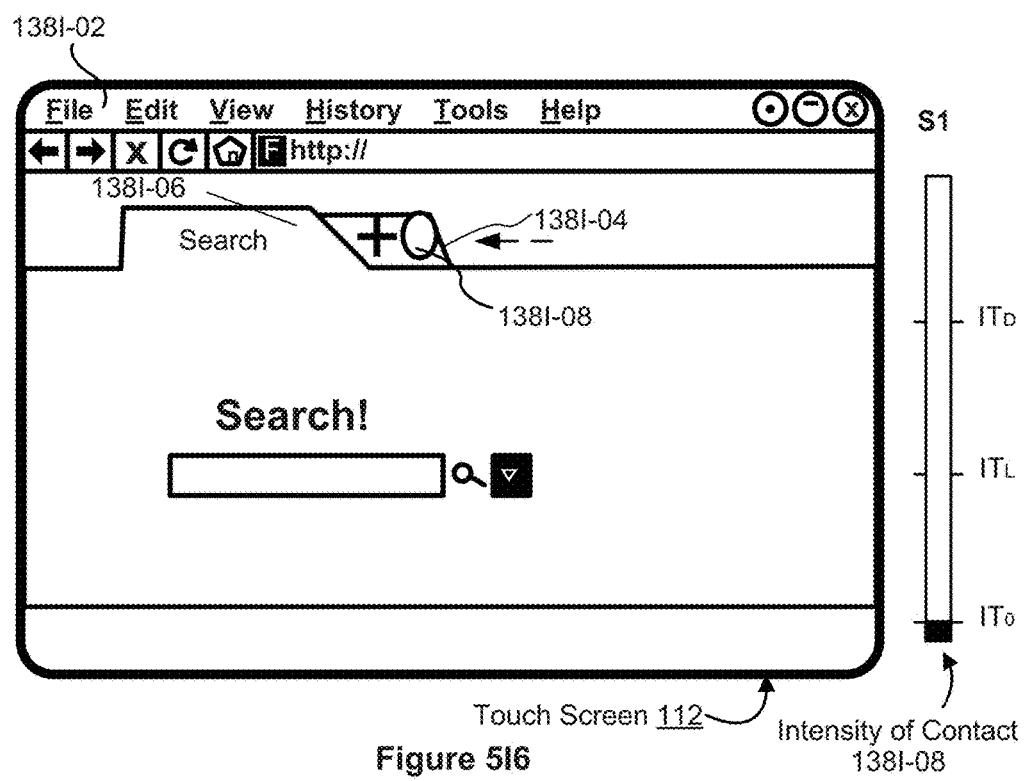
Figure 5I6

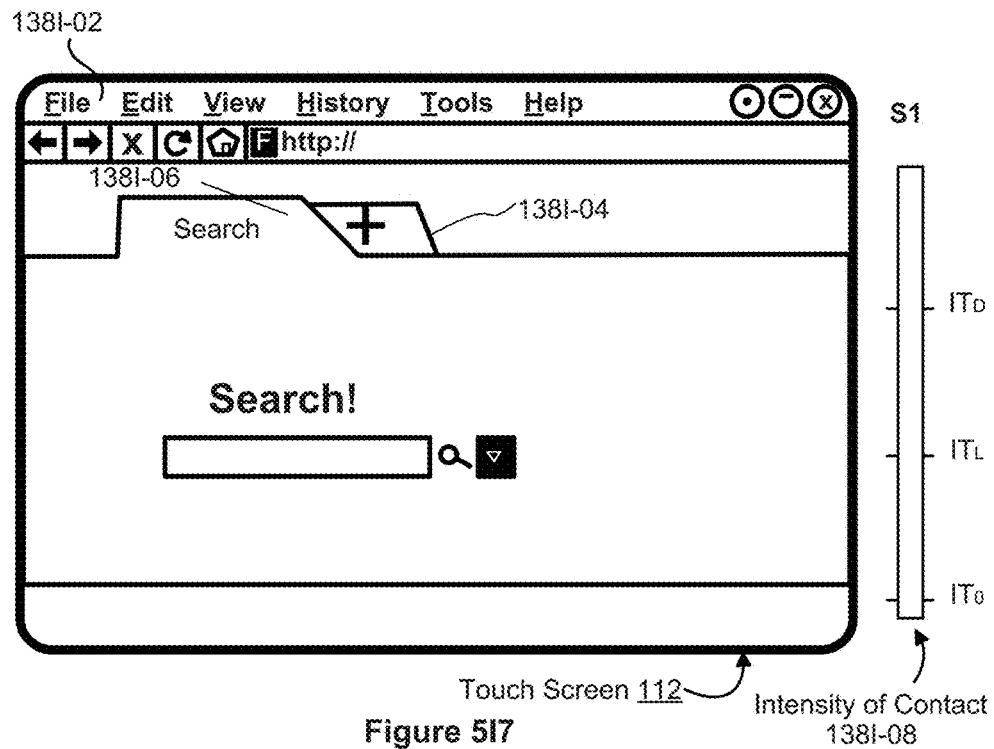
Figure 5I7
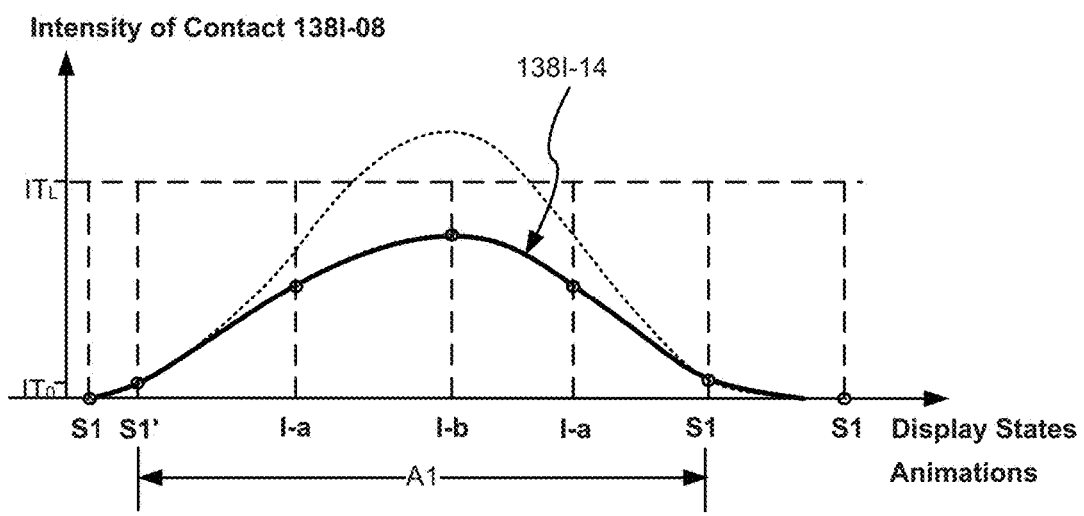
Figure 5I8

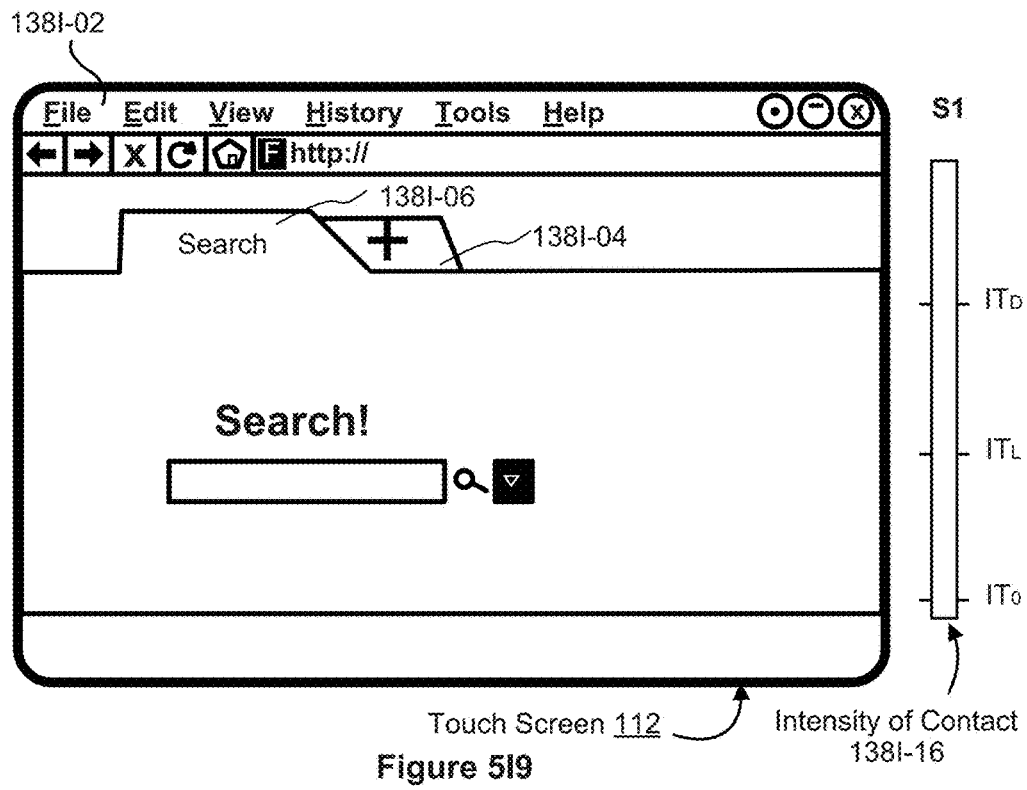
Figure 5I9
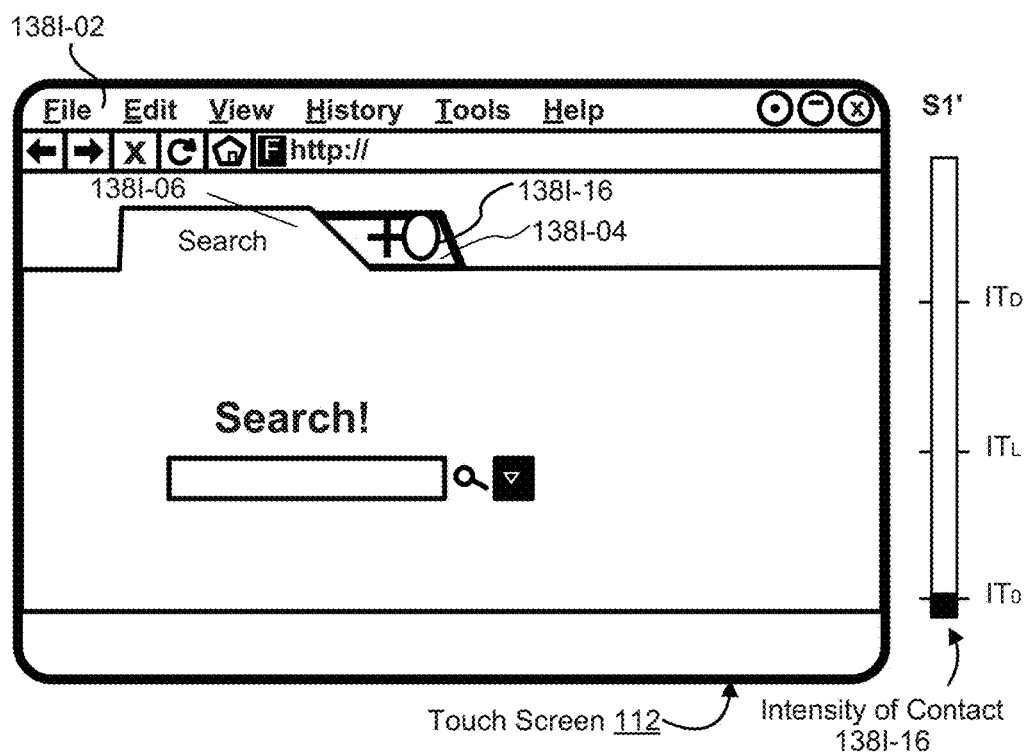
Figure 5I10

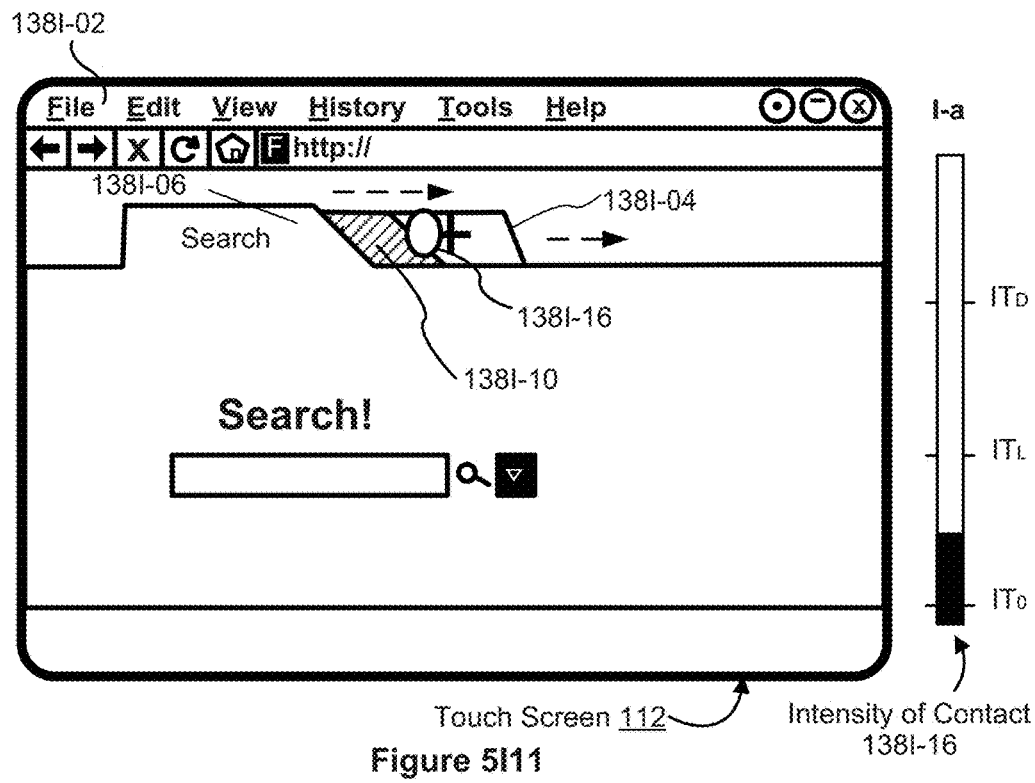
Figure 5I11
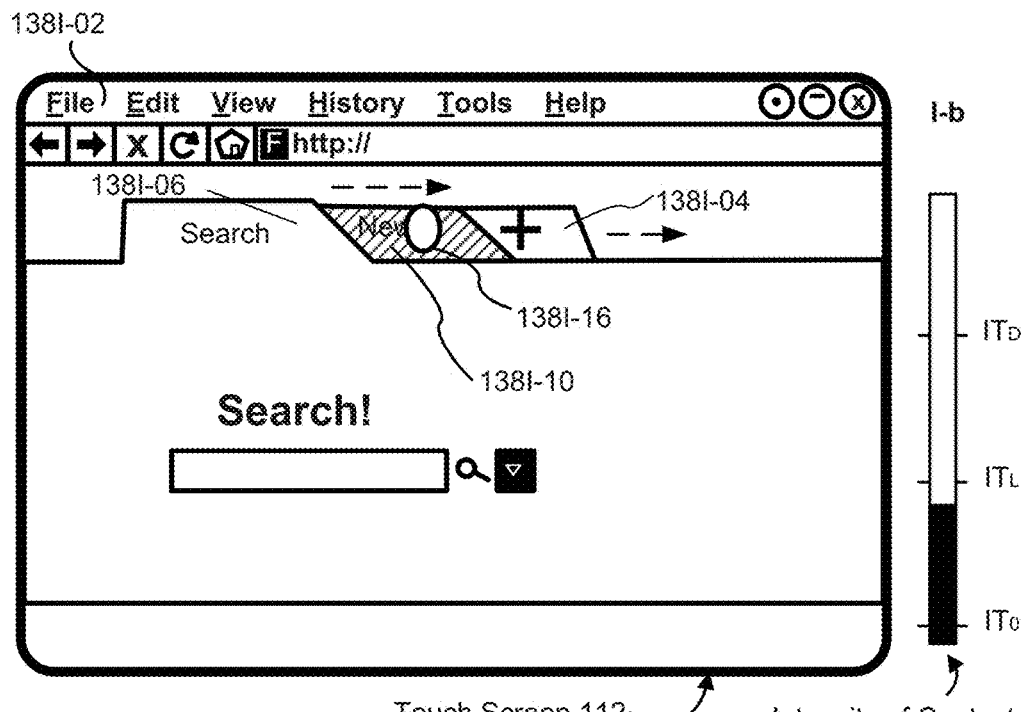
Figure 5I12

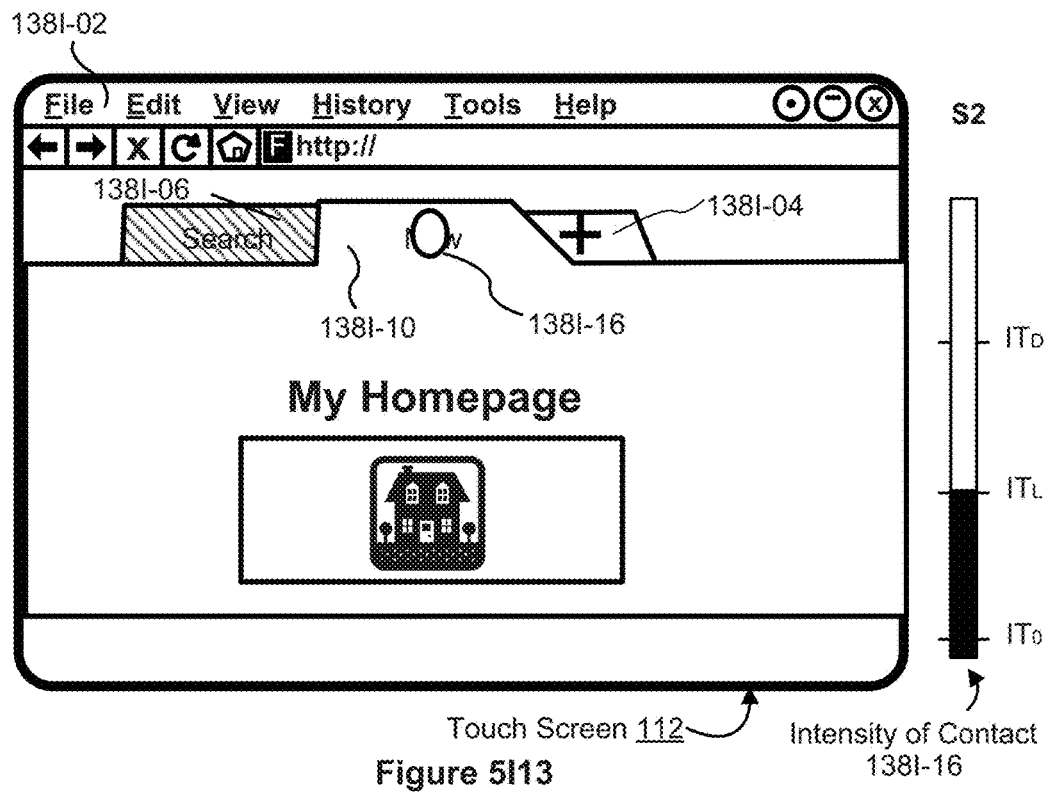
Figure 5I13
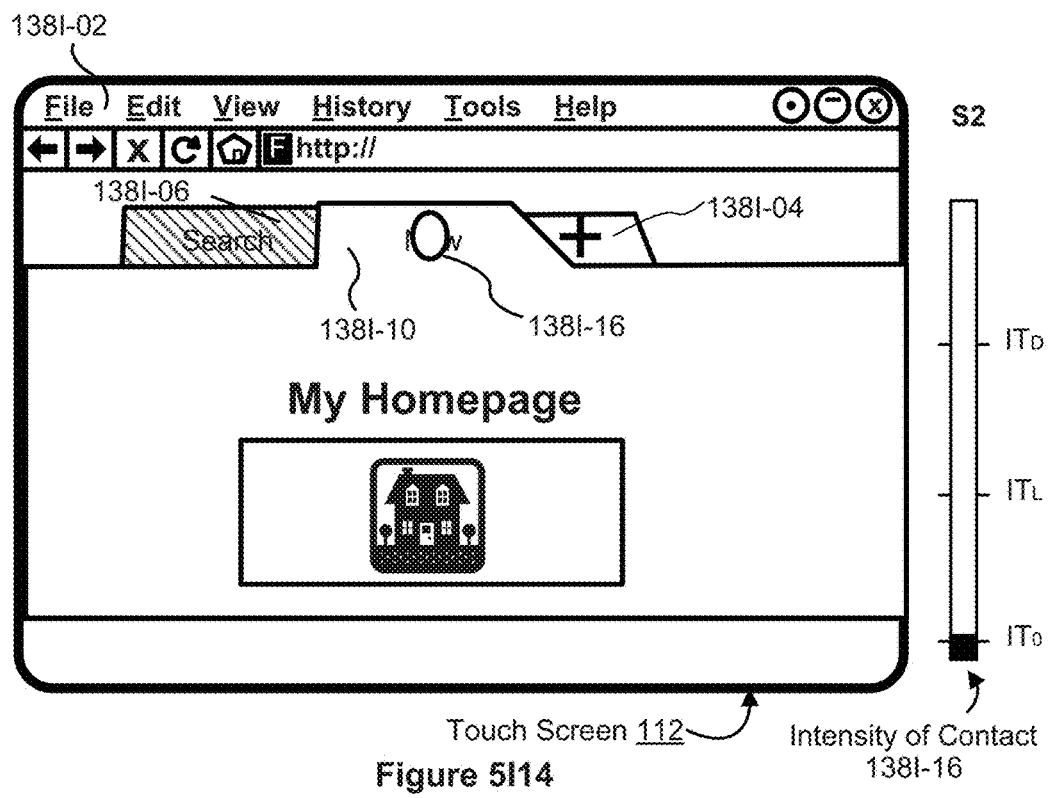
Figure 5I14

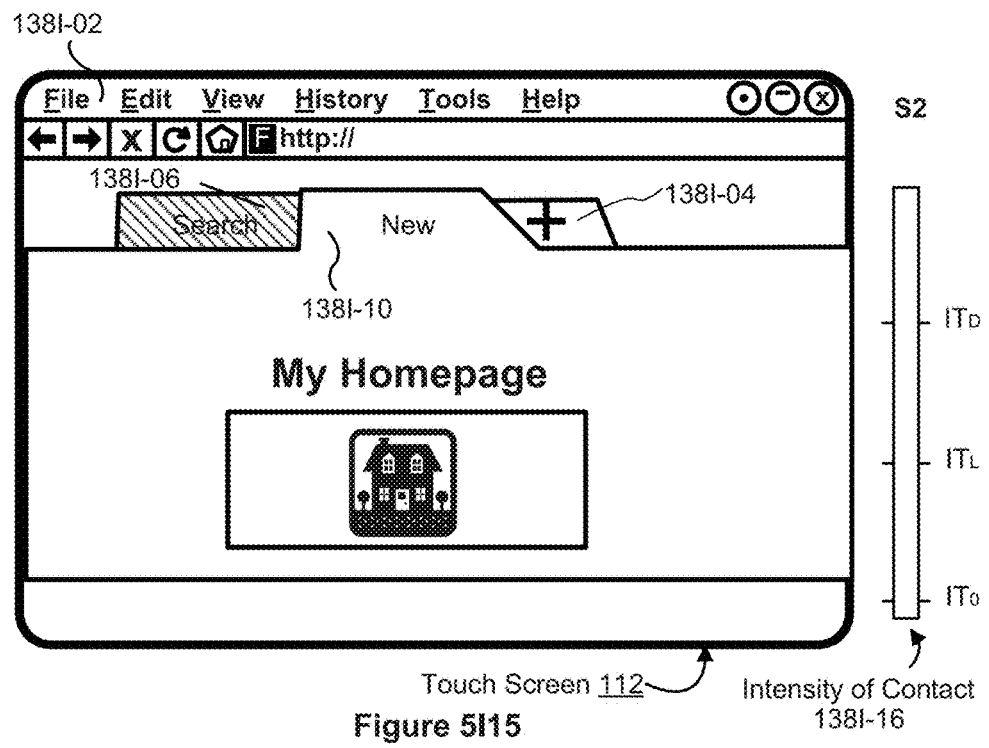
Figure 5I15
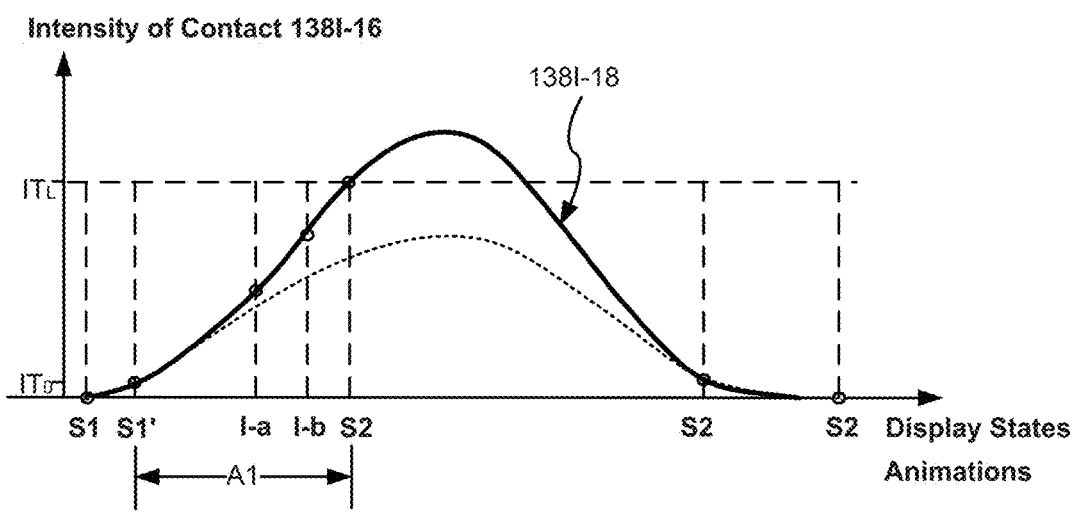
Figure 5I16

DEVICE, METHOD, AND GRAPHICAL USER INTERFACE FOR TRANSITIONING BETWEEN DISPLAY STATES IN RESPONSE TO A GESTURE

RELATED APPLICATIONS

This application is a continuation of U.S. patent application Ser. No. 14/536,203, filed Nov. 7, 2014, which is a continuation of PCT Patent Application Ser. No. PCT/US2013/040093, filed on May 8, 2013, entitled "Device, Method, and Graphical User Interface for Transitioning between Display States in Response to a Gesture," which claims the benefit of and priority to U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for providing visual feedback for operations performed on an electronic device with a touch-sensitive surface (e.g., a touchpad or touch screen). More specifically, there is a need for providing a preview of a new state in response to an initial portion of a gesture (e.g., a press input), and determining whether to return to a previous state or to enter the new state at the end of the gesture. Methods and interfaces described herein address such needs and provide various visual feedbacks based on an intensity of a contact used to perform the gesture. Such methods and interfaces may complement or replace conventional methods for responding to a gesture. Such methods and interfaces provide helpful information to the user, reduce the cognitive burden on a user, and produce a more efficient human-machine interface. For battery-operated devices, such methods and interfaces may conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a user interface on the display, where the user interface is in a first display state; detecting a first portion of a gesture on the touch-sensitive surface, including detecting intensity of a respective contact on the touch-sensitive surface; in response to detecting the first portion of the gesture, displaying an intermediate display state between the first display state and a second display state; detecting an end of the gesture; and in response to detecting the end of the gesture: in accordance with a determination that the intensity of the respective contact reached a predefined intensity threshold prior to detecting the end of the gesture, displaying the second display state; and in accordance with a determination that the intensity of the respective contact did not reach the predefined intensity threshold prior to detecting the end of the gesture, terminating display of the intermediate display state and redisplaying the first display state.

In accordance with some embodiments, an electronic device includes a display unit configured to display at least a user interface in a first display state; and a processing unit coupled to the display unit. The processing unit is configured to: detect a first portion of a gesture on the touch-sensitive surface unit, including detecting intensity of a respective contact on the touch-sensitive surface unit; in response to detecting the first portion of the gesture, cause the display unit to display an intermediate display state between the first display state and a second display state; detect an end of the gesture; and in response to detecting the end of the gesture: in accordance with a determination that the intensity of the respective contact reached a predefined intensity threshold prior to detecting the end of the gesture, cause the display unit to display the second display state; and in accordance with a determination that the intensity of the respective contact did not reach the predefined intensity threshold prior to detecting the end of the gesture, cause the display unit to terminate display of the intermediate display state and redisplay the first display state.

In accordance with some embodiments, a method is performed at an electronic device with a display, a touch-sensitive surface and one or more sensors to detect intensity of contacts with the touch-sensitive surface. The method includes: displaying a user interface on the display, where the user interface is in a first display state; detecting a first input that includes detecting an increase in intensity of a contact on the touch-sensitive surface; in response to detecting the first input, displaying a first animation of the user interface transitioning from the first display state to a second display state, where a rate of change from the first display state to the second display state is determined in accordance with an intensity of the contact included in the first input. The method further includes, after the user interface has transitioned to the second display state: detecting a second input that includes detecting an increase in intensity of a contact on the touch-sensitive surface; and in response to detecting the second input, displaying a second animation of the user interface transitioning from the second display state to a third display state, where the second animation is a continuation of the first animation and the third display state is determined in accordance with the intensity of the contact included in the second input on the touch-sensitive surface; detecting a reduction in the intensity of the contact included in the second input; and in response to detecting the reduction in the intensity of the contact included in the second input, displaying a third animation of the user interface transitioning from the third display state to the second display state.

In accordance with some embodiments, an electronic device includes a display unit configured to display at least a user interface in a first display state; and a processing unit coupled to the display unit. The processing unit is configured to: detect a first input that includes detecting an increase in intensity of a contact on the touch-sensitive surface unit; in response to detecting the first input, cause the display unit to display a first animation of the user interface transitioning from the first display state to a second display state, where a rate of change from the first display state to the second display state is determined in accordance with an intensity of the contact included in the first input. The processing unit is further configured to, after the user interface has transitioned to the second display state: detect a second input that includes detecting an increase in intensity of a contact on the touch-sensitive surface unit; and in response to detecting the second input, cause the display unit to display a second animation of the user interface transitioning from the second display state to a third display state, where the second animation is a continuation of the first animation and the third display state is determined in accordance with the intensity of the contact included in the second input on the touch-sensitive surface unit; detect a reduction in the intensity of the contact included in the second input; and in response to detecting the reduction in the intensity of the contact included in the second input, cause the display unit to display a third animation of the user interface transitioning from the third display state to the second display state.

Thus, electronic devices with displays, touch-sensitive surfaces and one or more sensors to detect intensity of contacts with the touch-sensitive surface are provided with faster, more efficient methods and interfaces for providing appropriate and informative visual feedbacks in response to a gesture, thereby increasing the effectiveness, efficiency, and user satisfaction with such devices. Such methods and interfaces may complement or replace conventional methods for responding to a gesture.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5A1-5I16 illustrate example user interfaces for providing visual feedback for a gesture in accordance with changes in intensity of a contact in accordance with some embodiments.

DESCRIPTION OF EMBODIMENTS

Figure 1A:
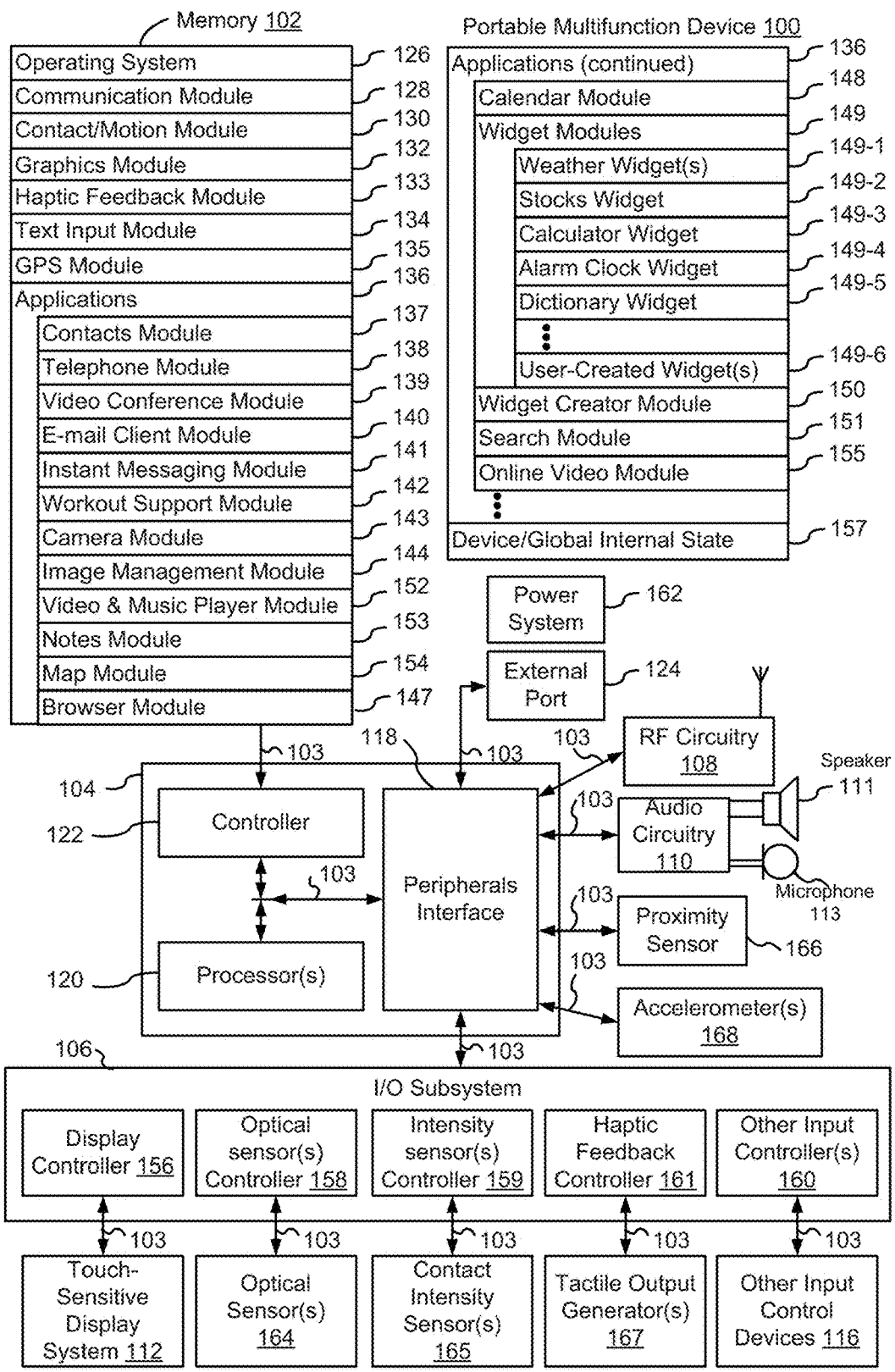
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Some methods for providing visual feedback in response to user input involve a binary switch between display states with a single trigger condition. Thus, in some embodiments, with these methods, no visual feedback is provided before the single trigger condition is reached, and an abrupt switch from a current display state to a new display state occurs as soon as the single trigger threshold is reached. In some embodiments described herein, an improved method for providing visual feedback in response to user input is achieved by providing a preview of an augmented display state (e.g., an animation including one or more intermediate display states between an initial display state and the augmented display state is displayed in accordance with an intensity of a contact). This method provides the user with an opportunity to preview the effect of a completed input before the user finally completes the input (e.g., providing a contact intensity above a pre-defined intensity threshold) and commits to the effect. Below, FIGS. 5A-5I illustrate exemplary user interfaces for providing visual feedback for a gesture in accordance with changes in intensity of a contact. FIGS. 6A-6G are flow diagrams illustrating a method 13900 of providing visual feedback for a gesture in accordance with changes in intensity of a contact. The user interfaces in FIGS. 5A-5I are used to illustrate the processes in FIGS. 6A-6G. FIGS. 6H-6M are flow diagrams illustrating a method 13950 of providing visual feedback for a gesture in accordance with changes in intensity of a contact. The user interfaces in FIGS. 5A-5I are also used to illustrate the processes in FIGS. 6H-6M.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
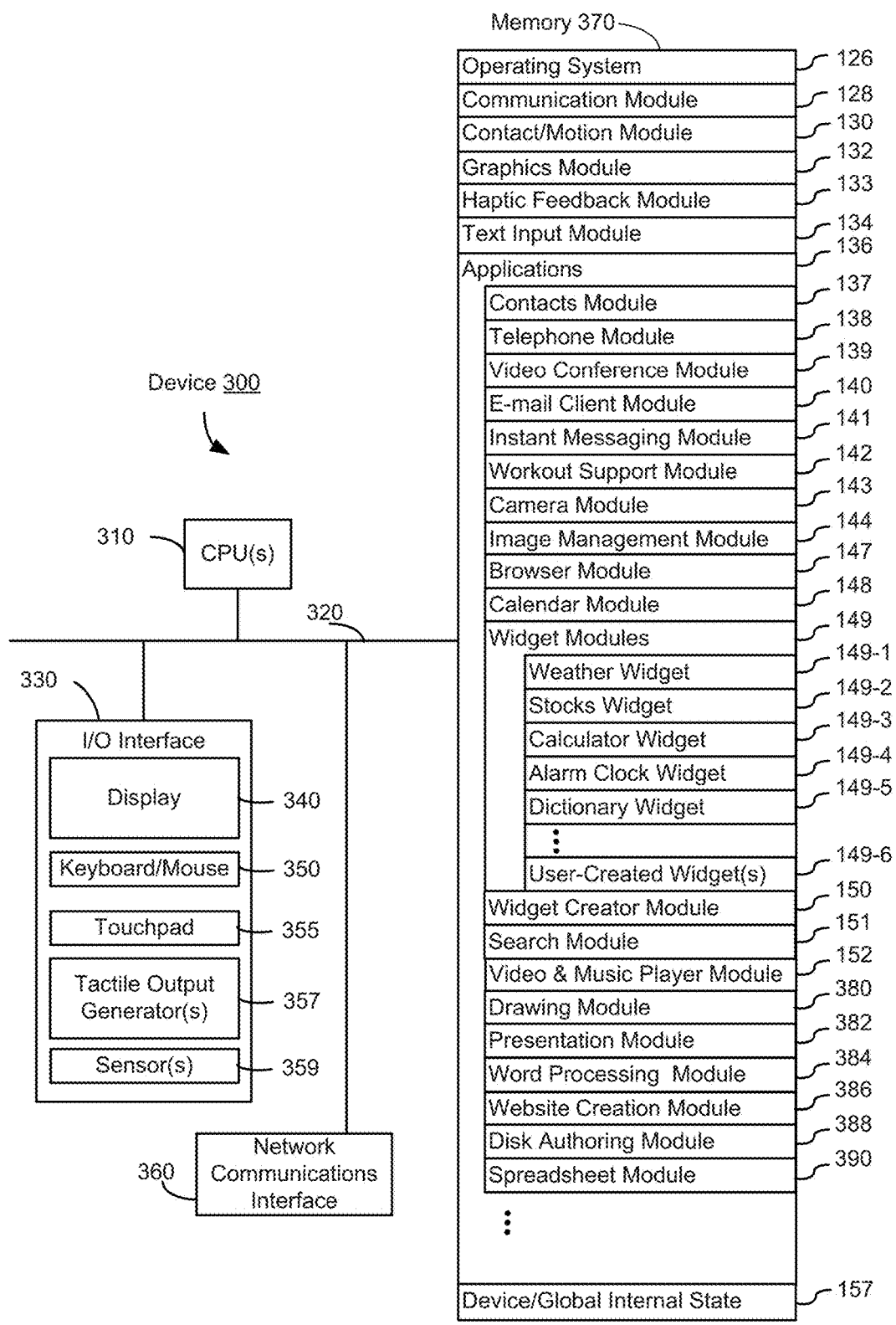
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, 1M 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
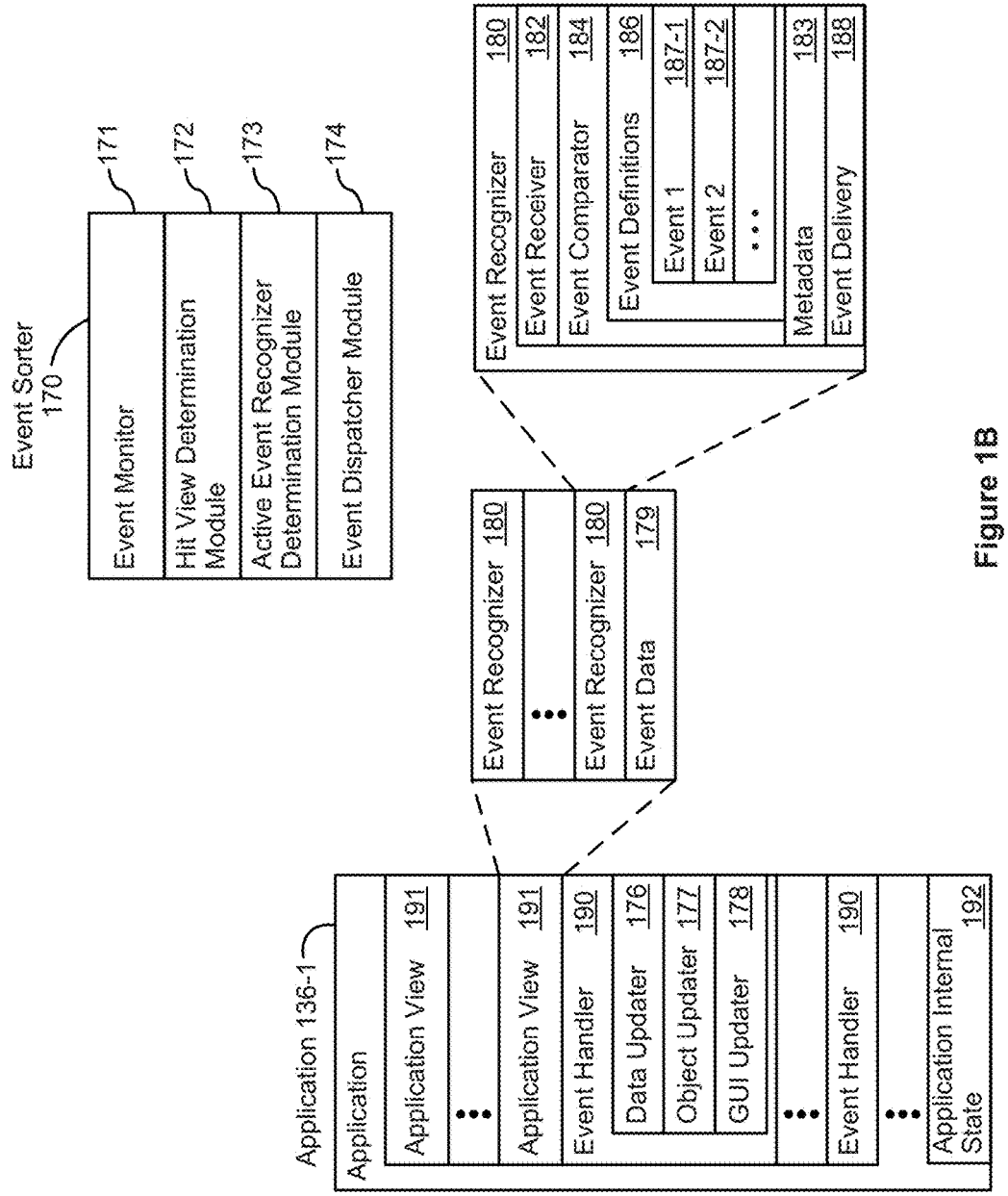
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
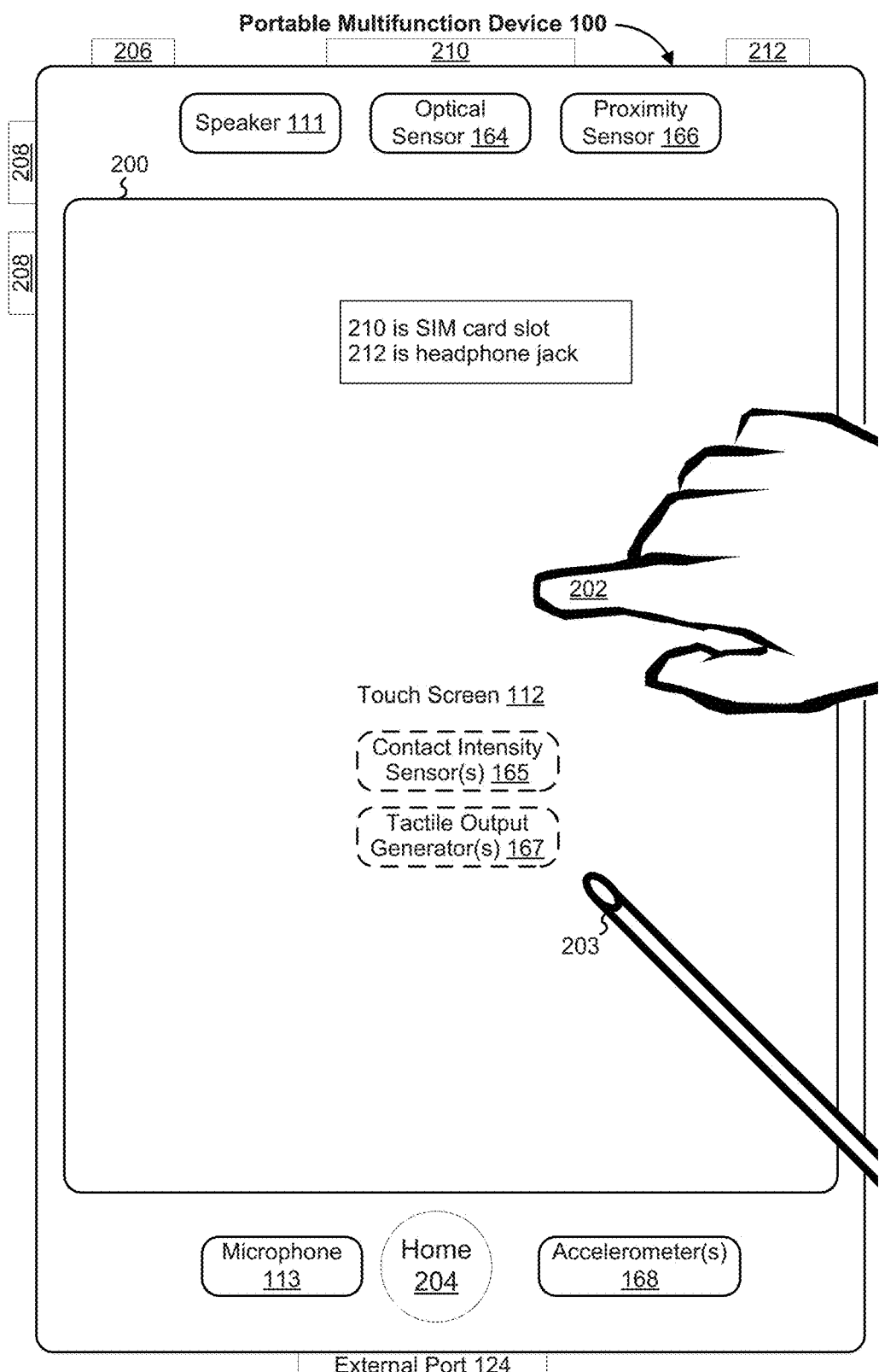
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
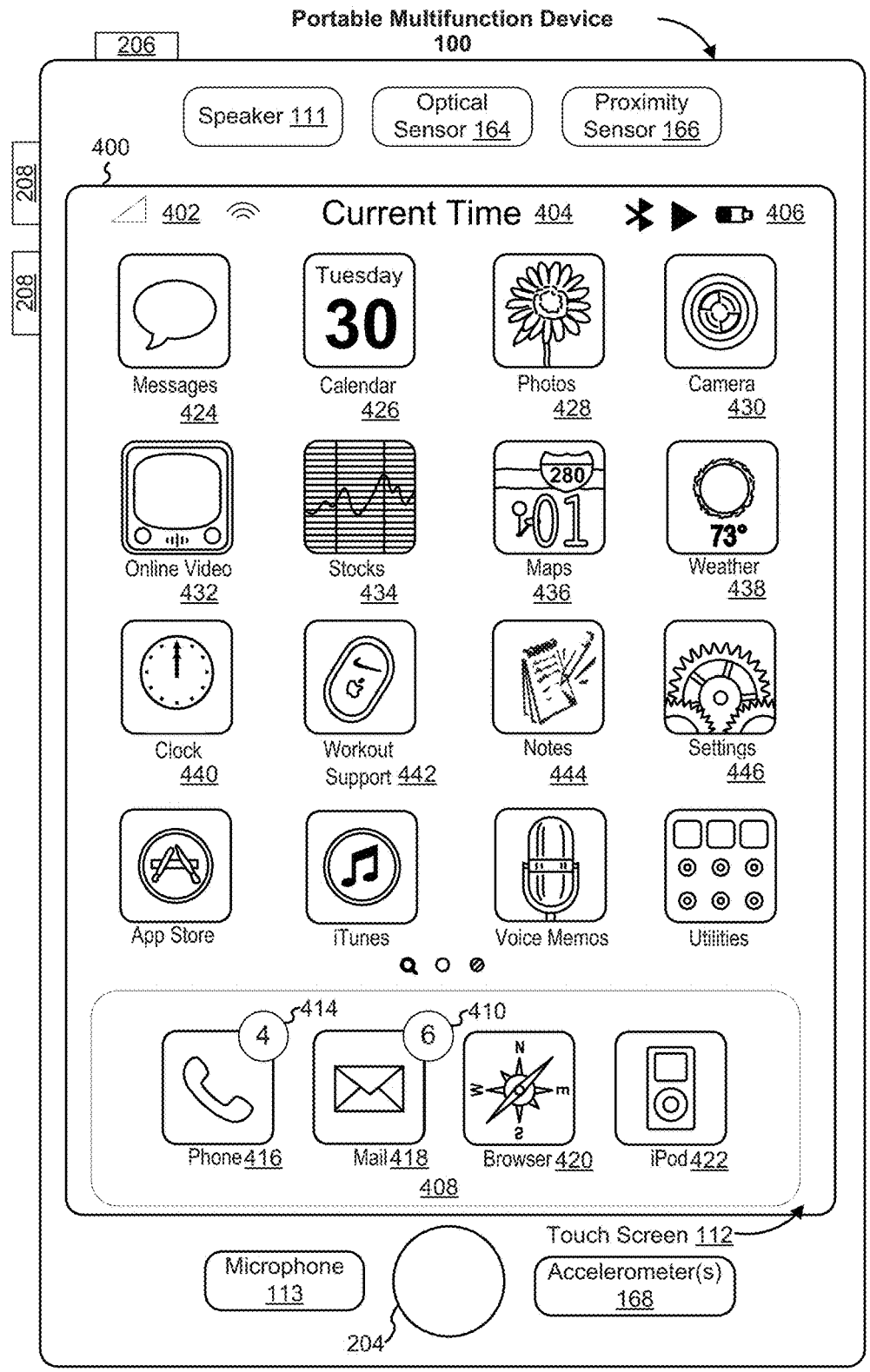
FIG. 4A illustrates an exemplary user interface for a menu of applications on a portable multifunction device in accordance with some embodiments.
Figure 6A:
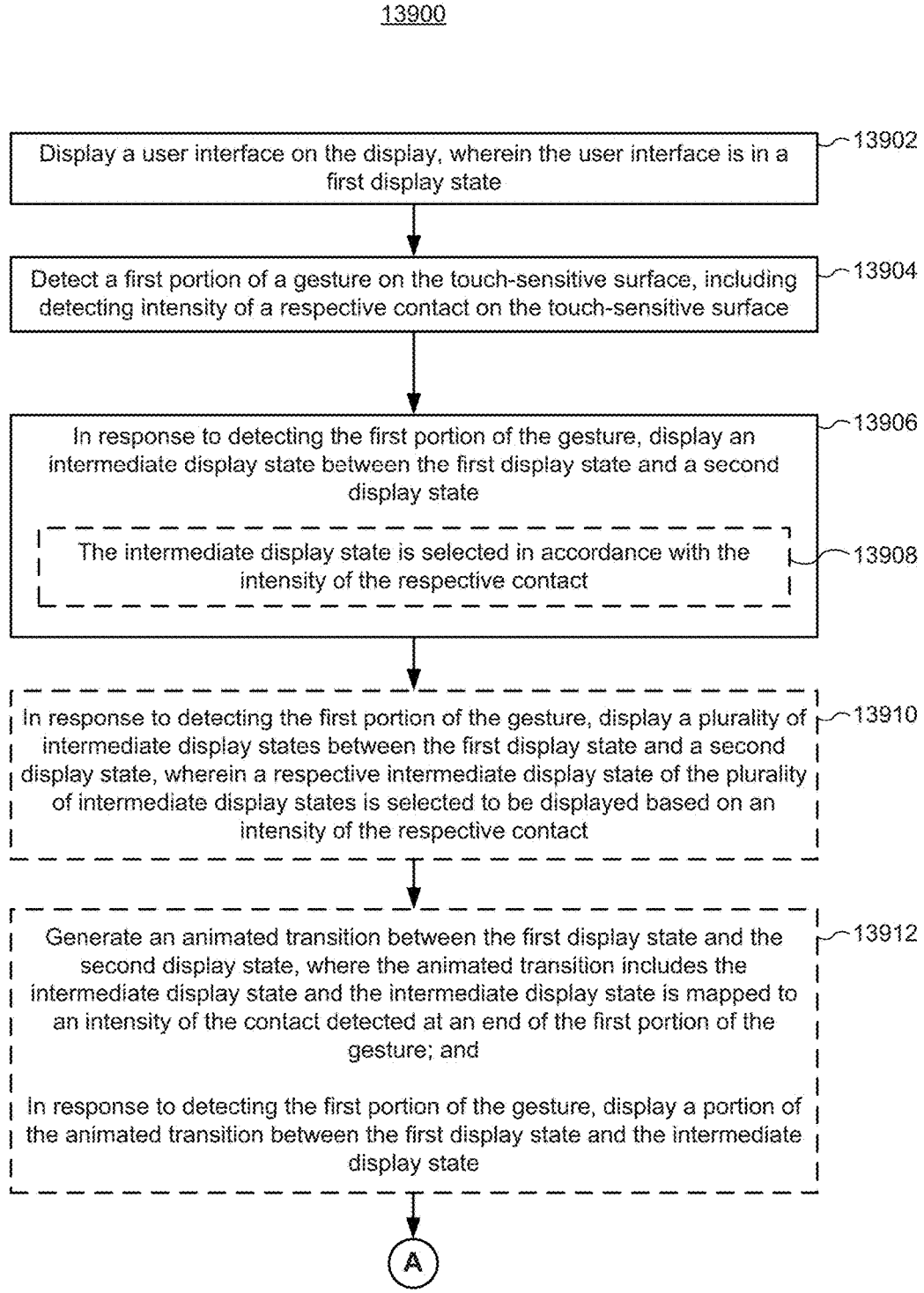
FIGS. 6A-6G are flow diagrams illustrating a method of providing visual feedback for a gesture in accordance with changes in intensity of a contact in accordance with some embodiments.
Figure 6B:
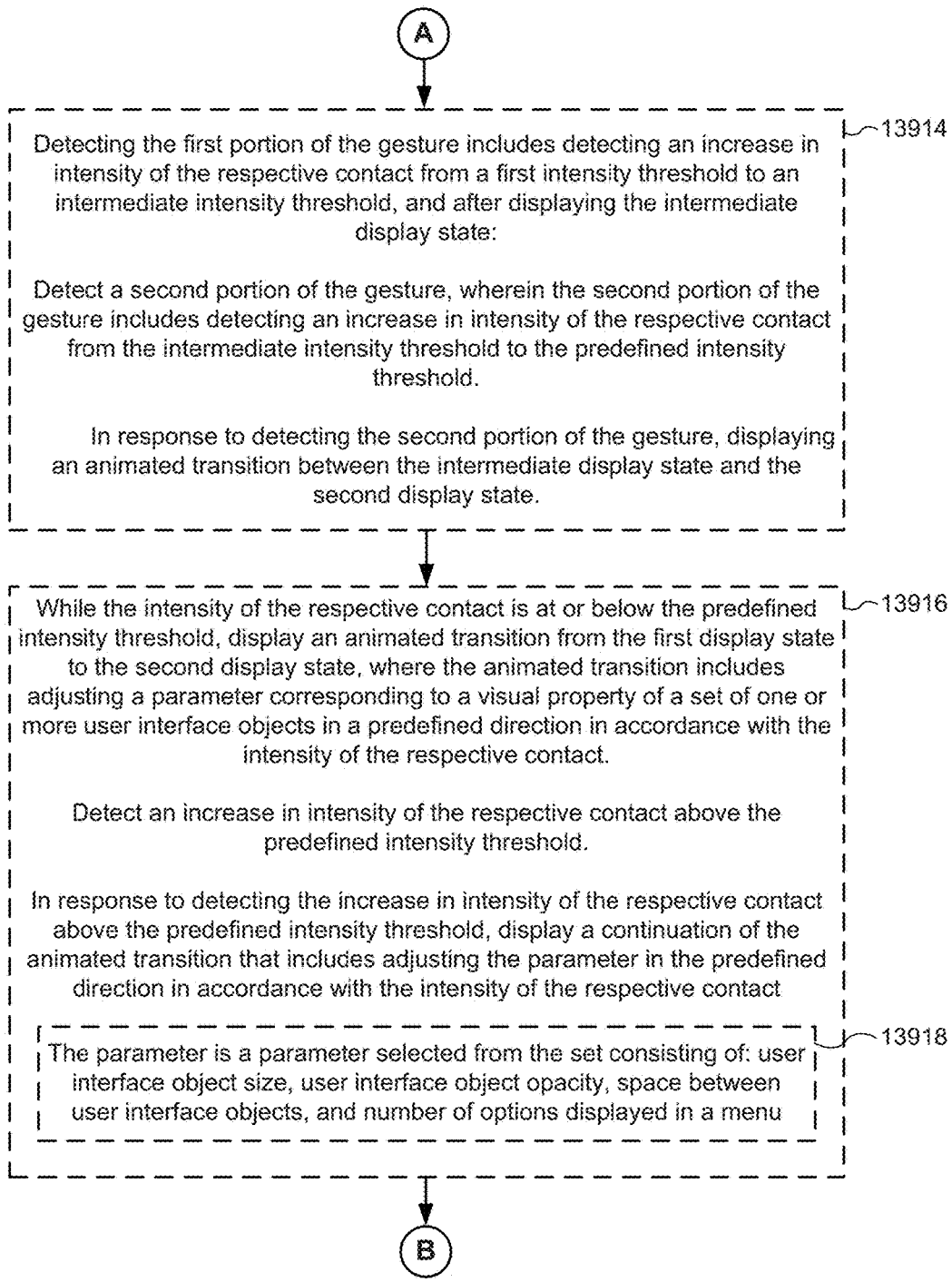
Figure 6C:
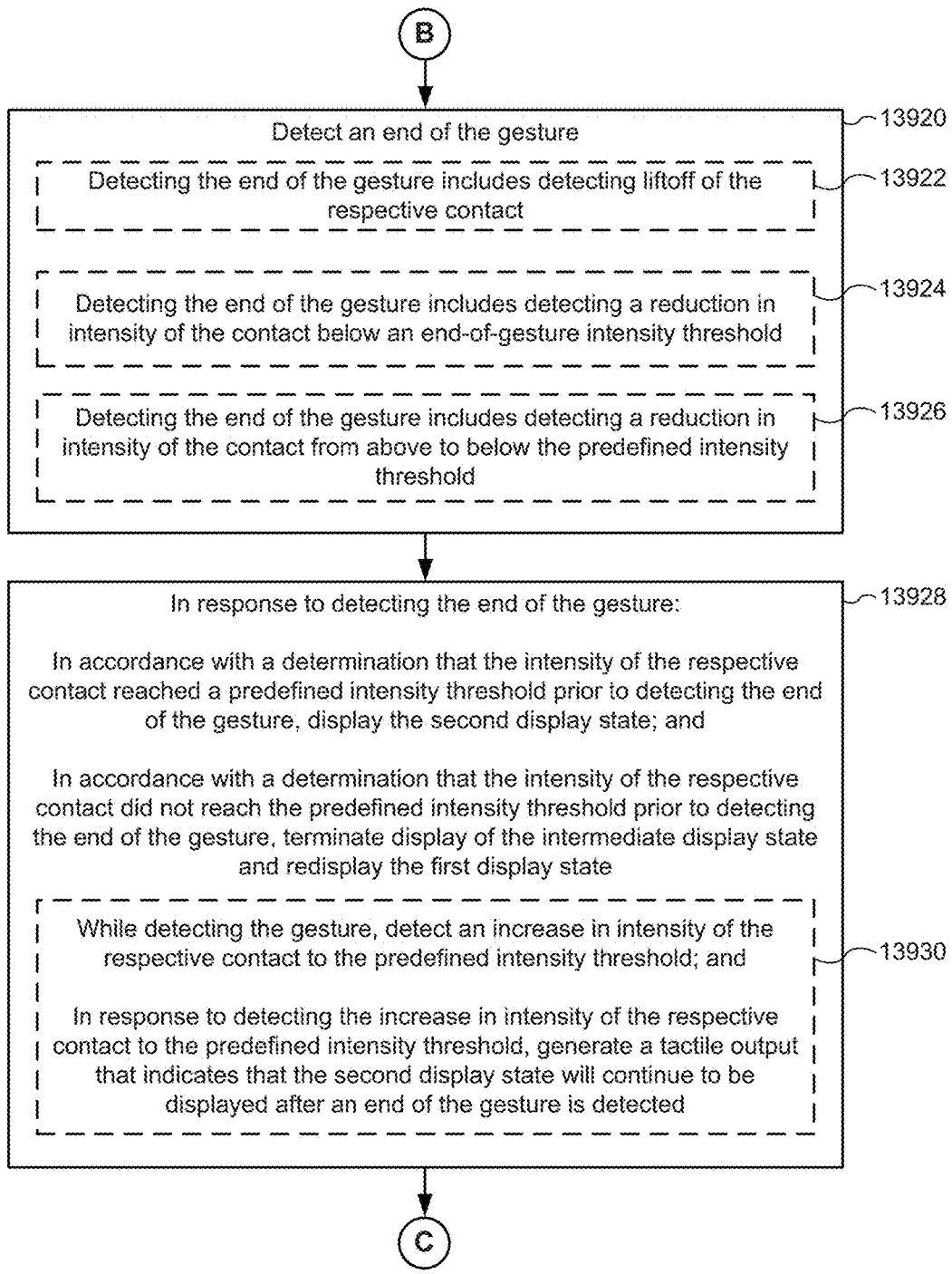
Figure 6D:
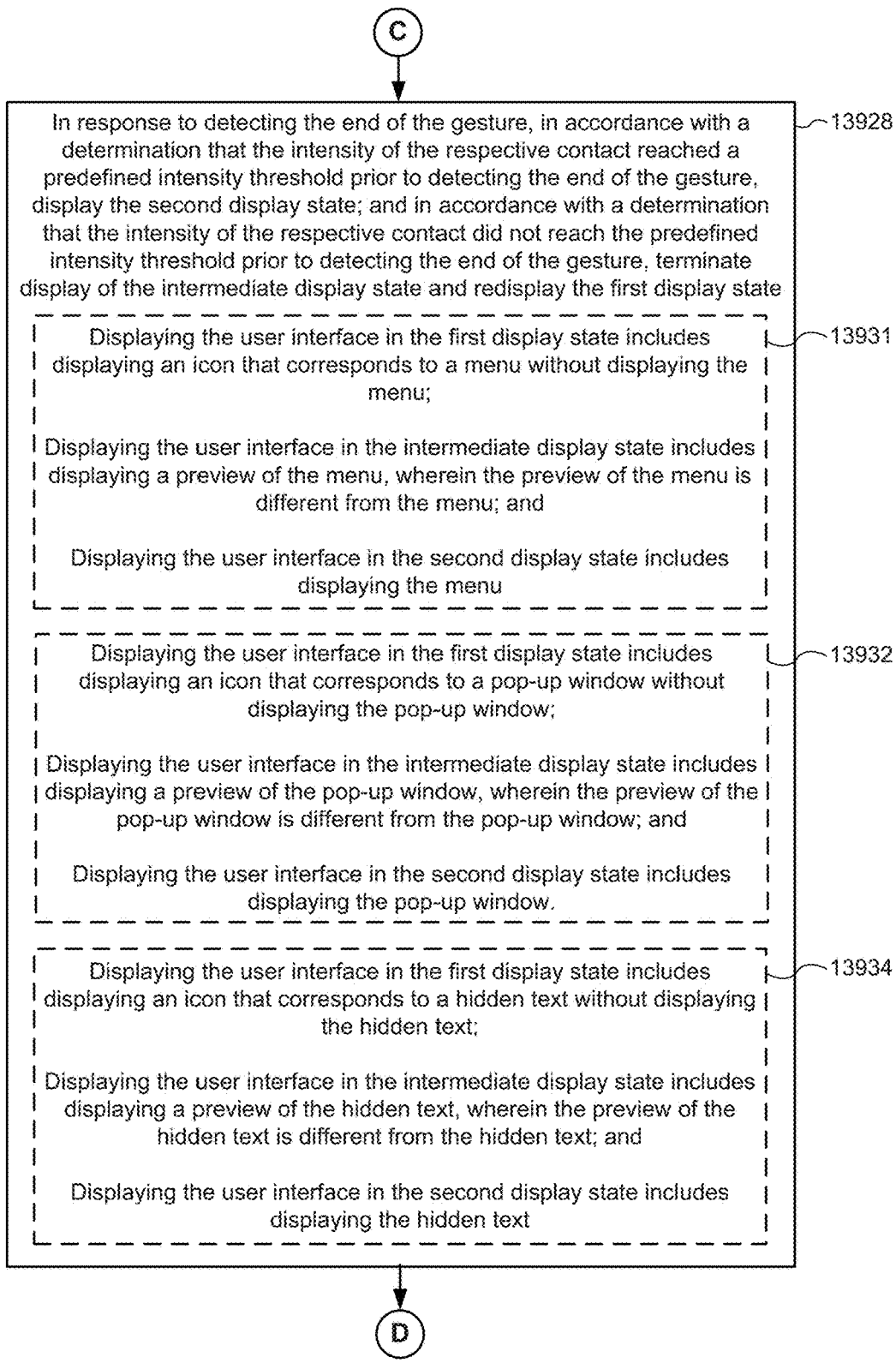
Figure 6E:
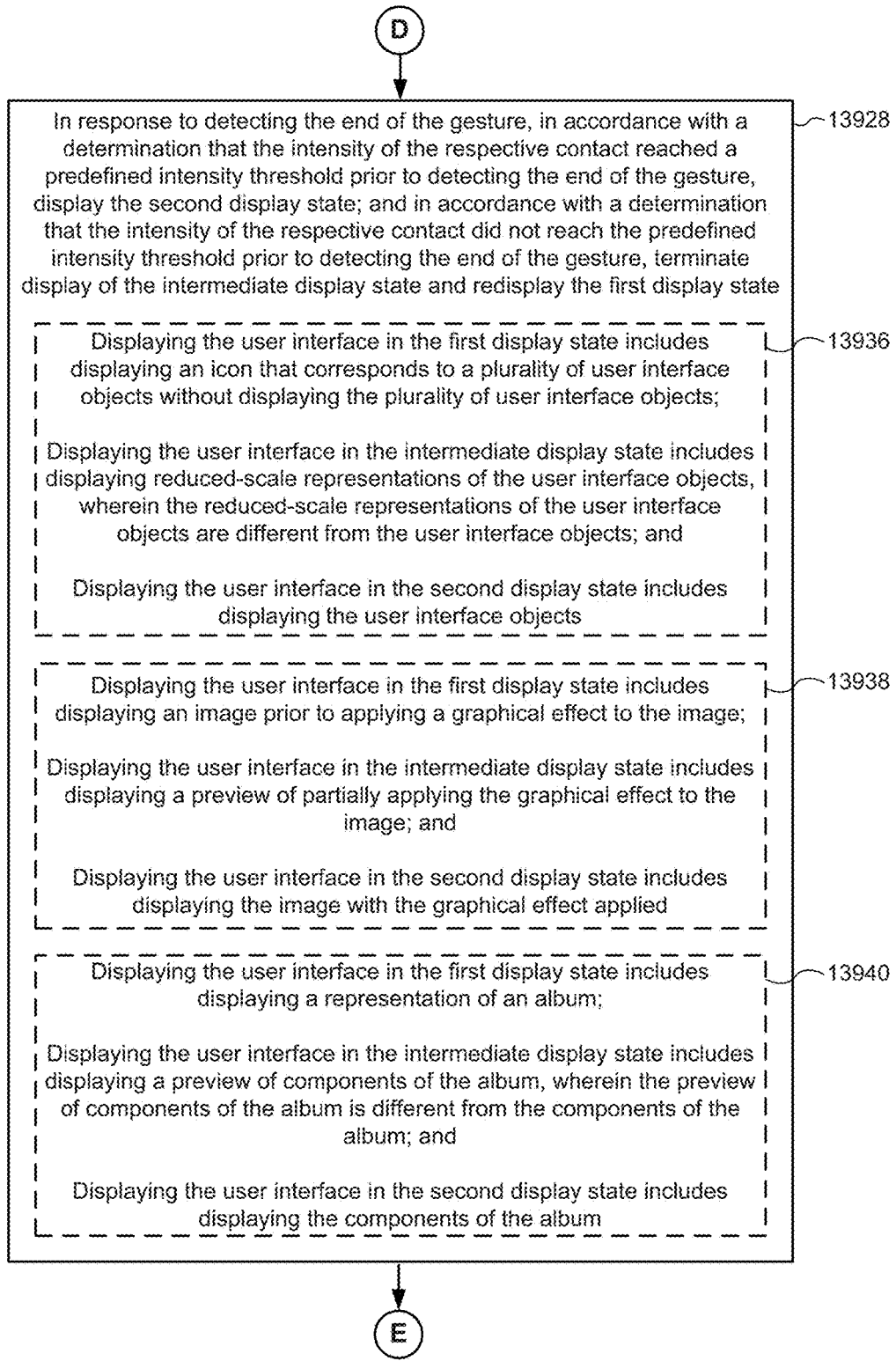
Figure 6F:
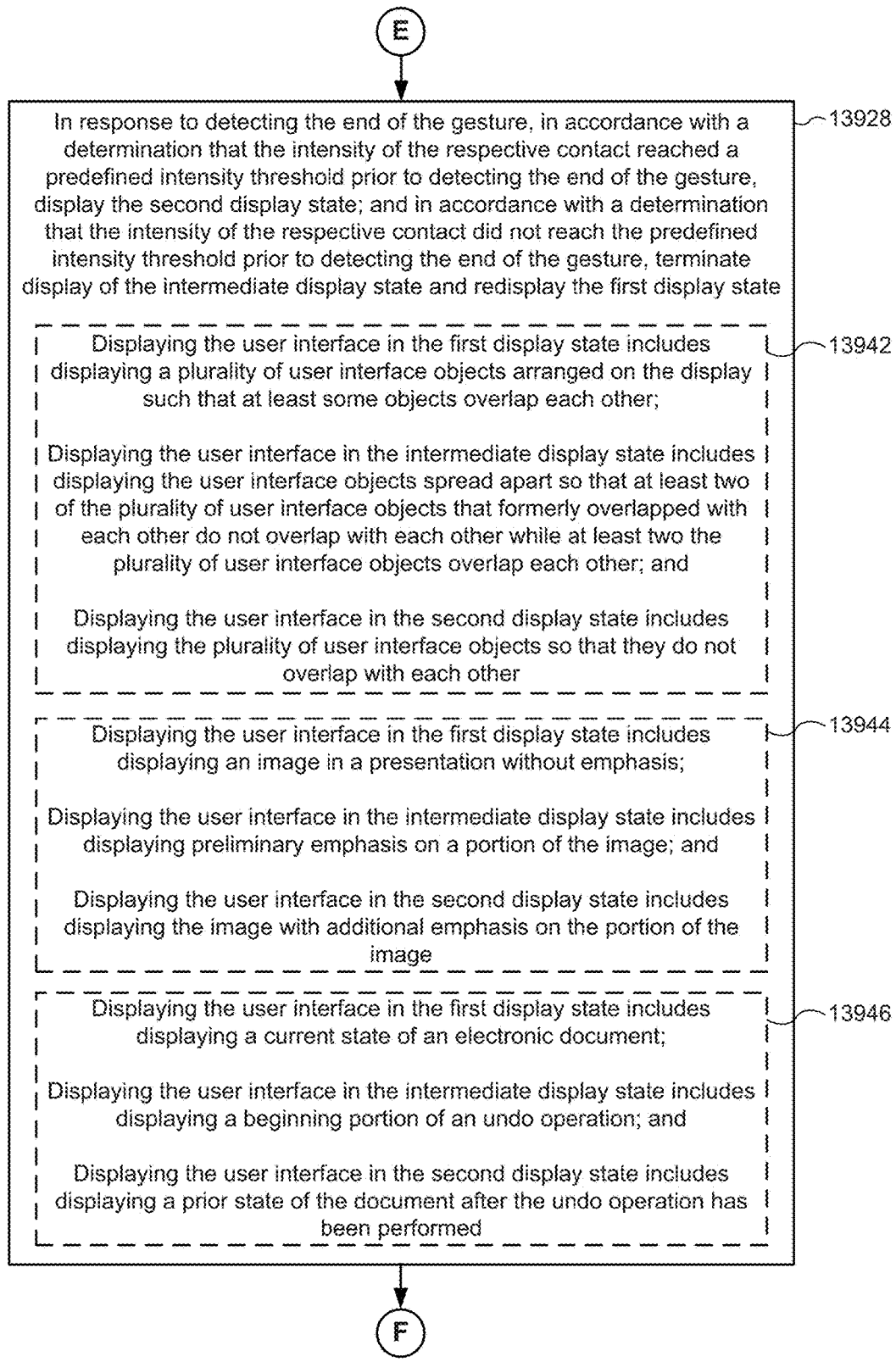
Figure 6G:
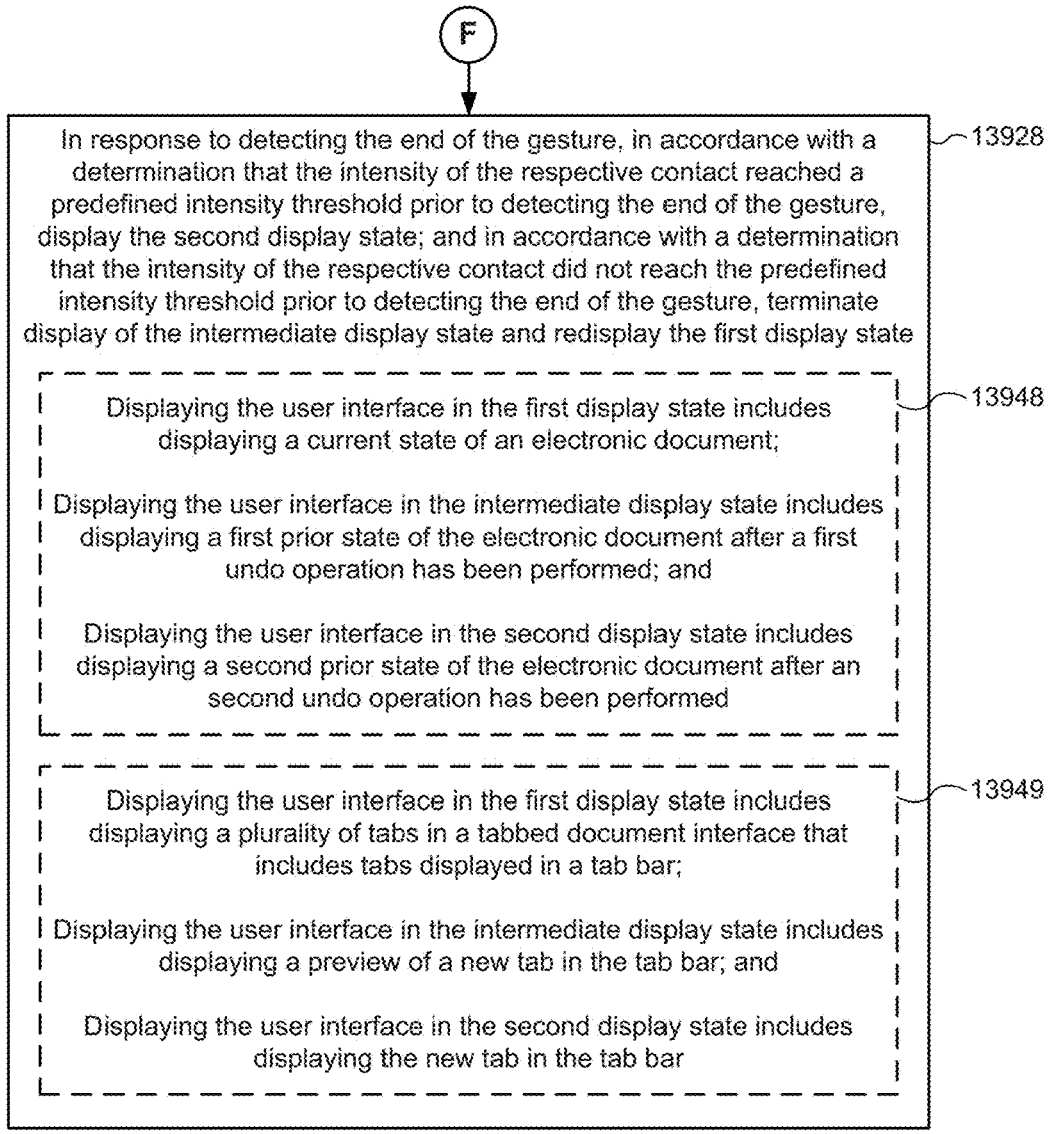
Figure 6H:
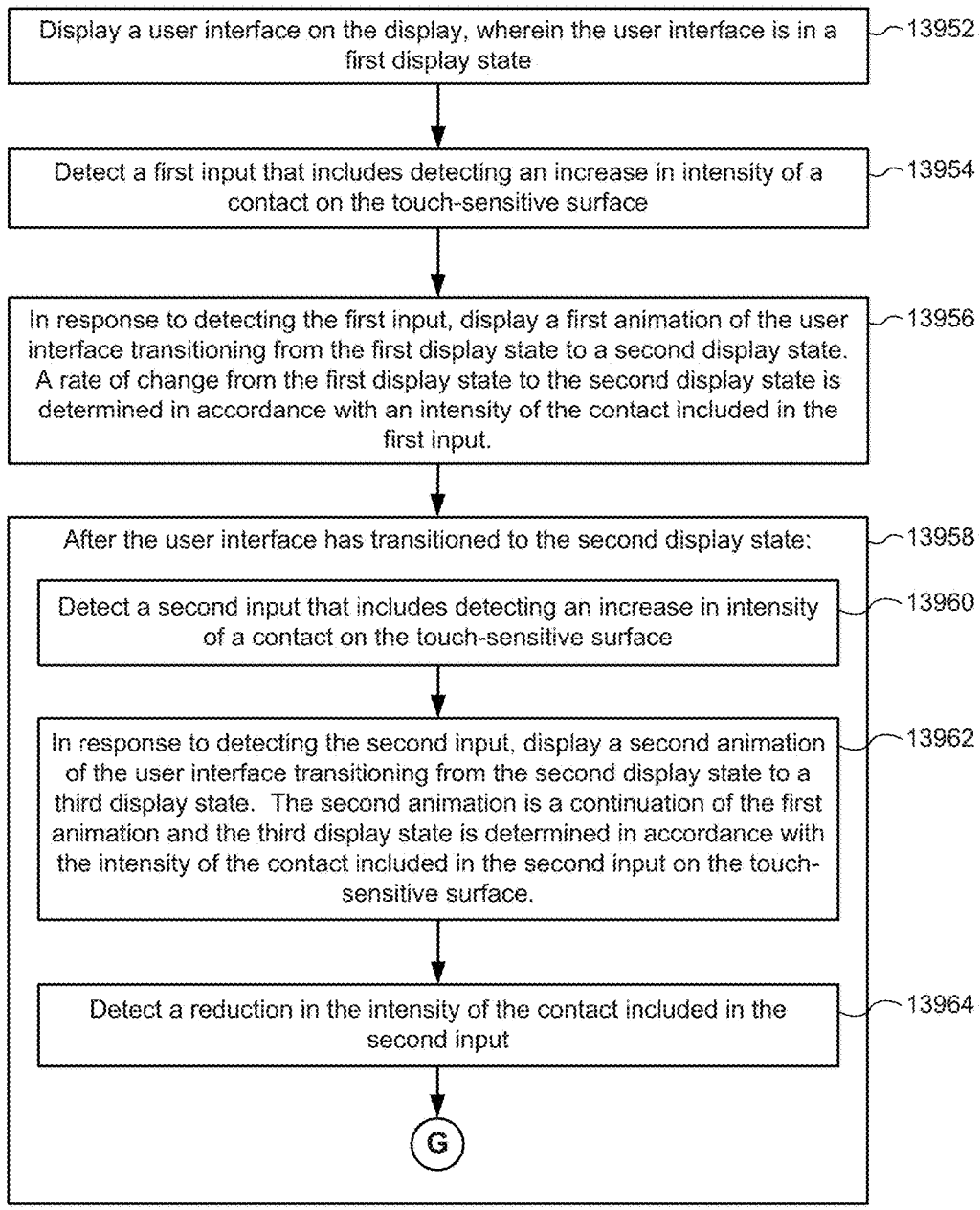
FIGS. 6H-6M are flow diagrams illustrating another method of providing visual feedback for a gesture in accordance with changes in intensity of a contact in accordance with some embodiments.
Figure 6I:
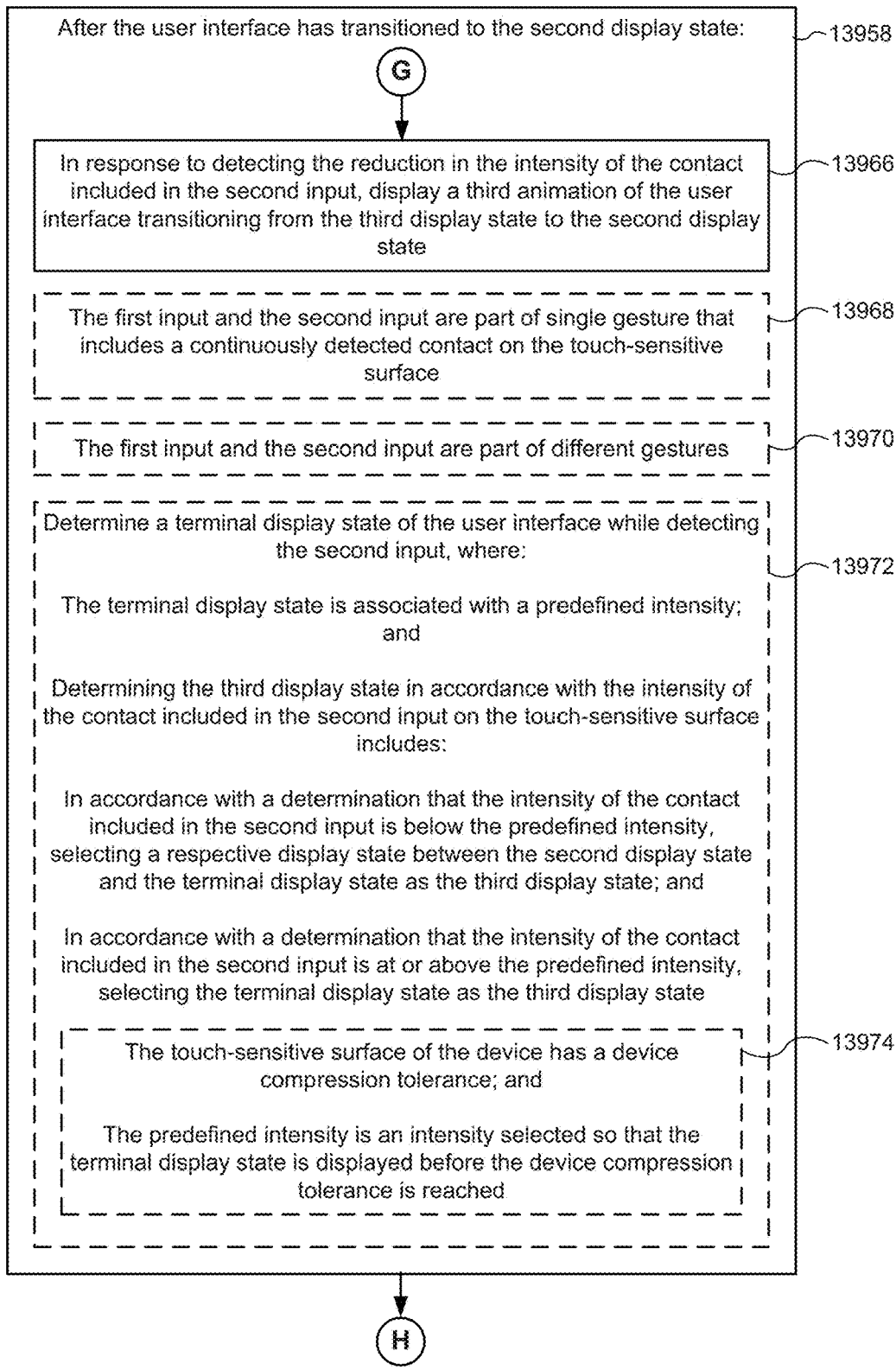
Figure 6J:
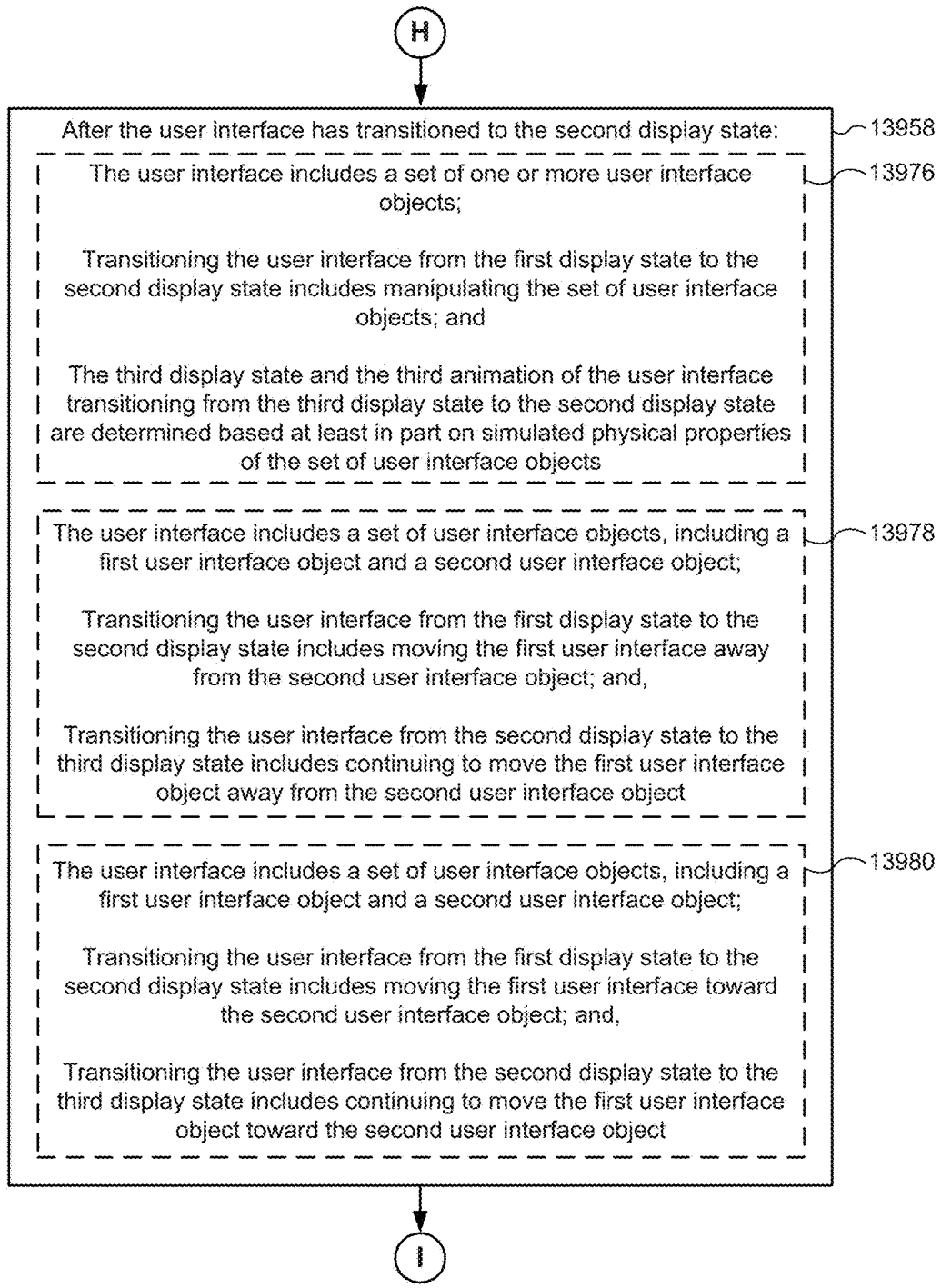
Figure 6K:
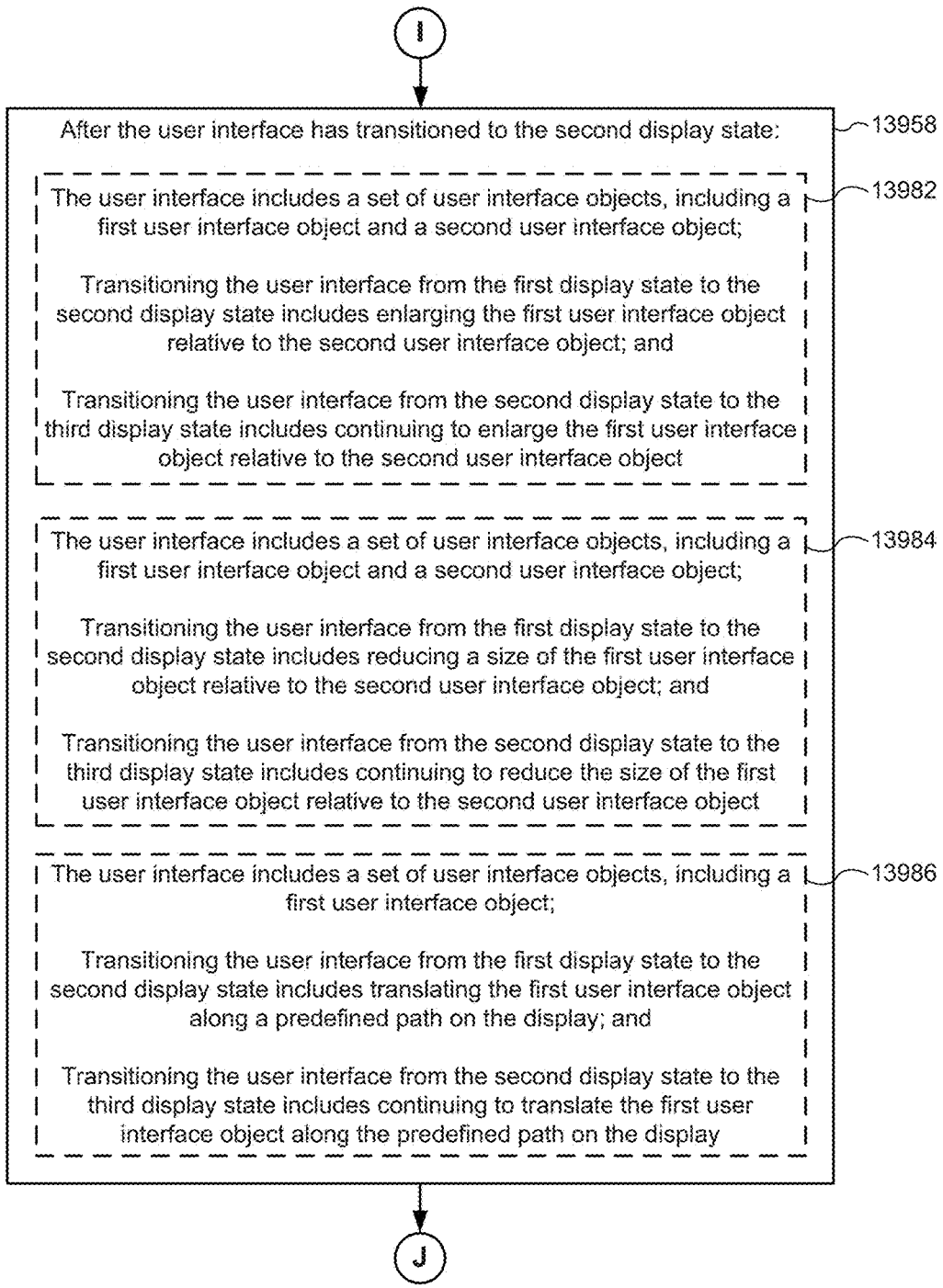
Figure 6L:
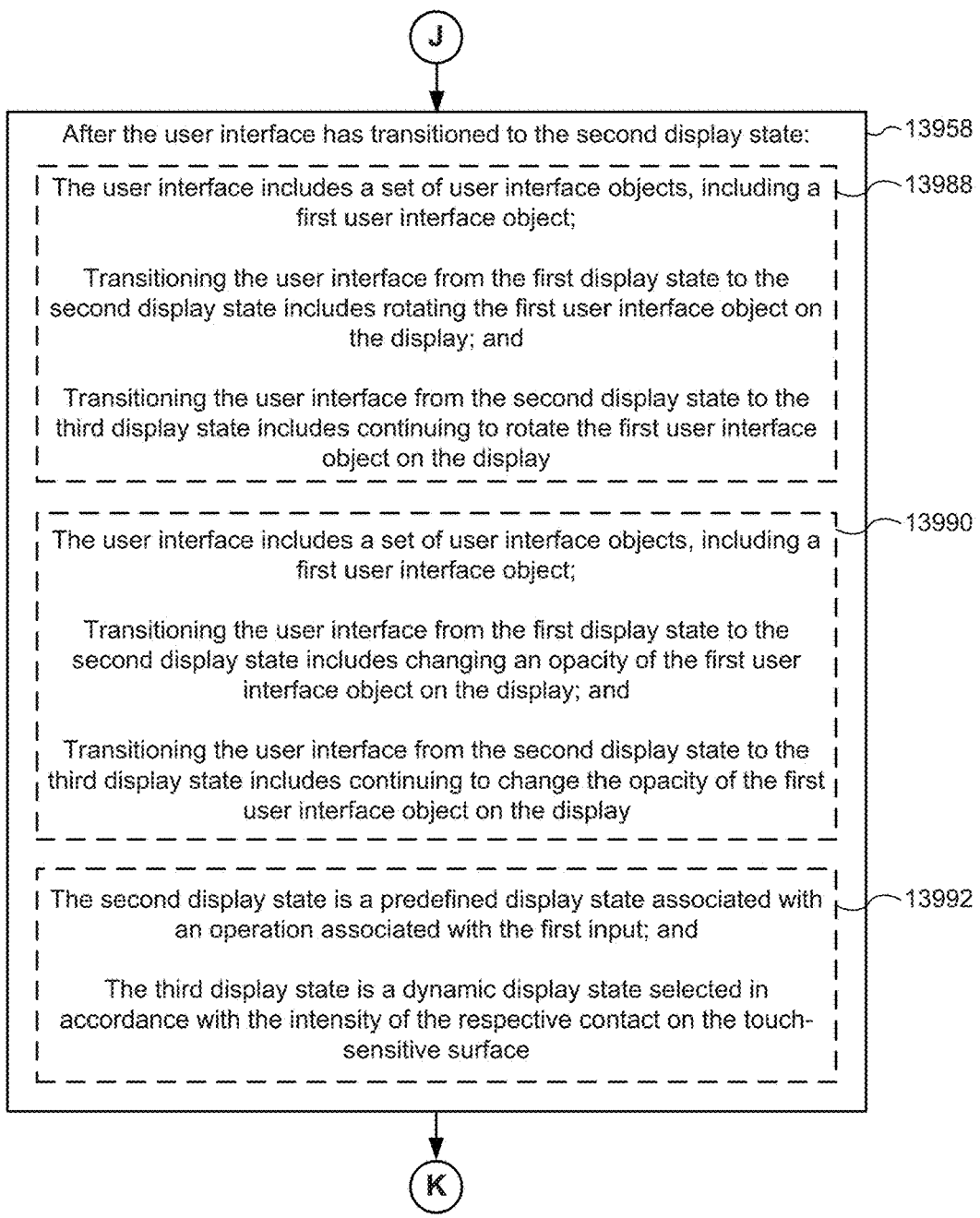
Figure 6M:
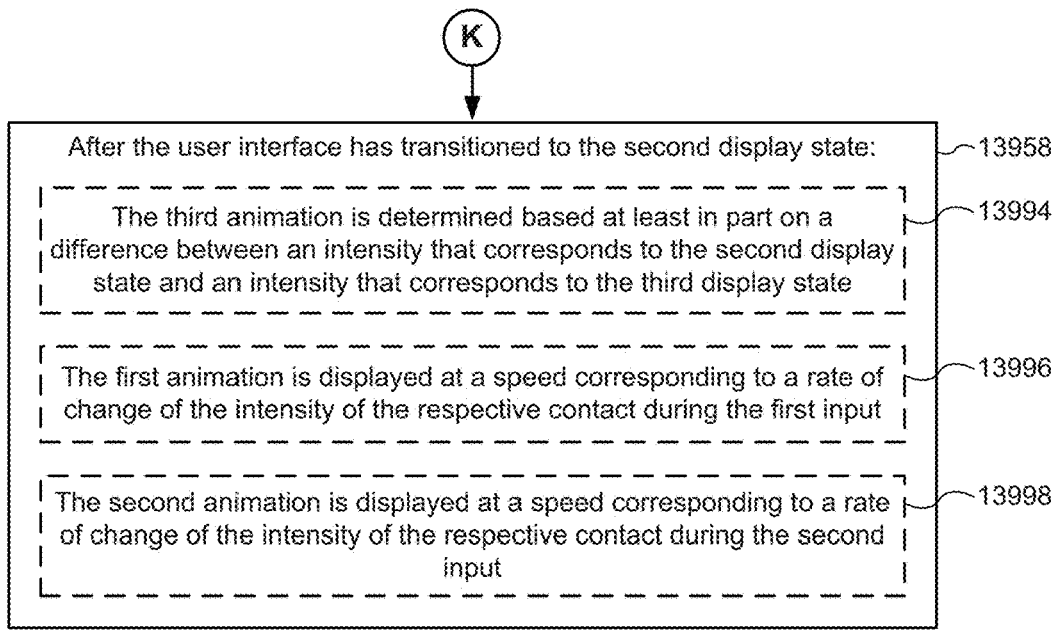

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357)

for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Transitioning Between Display States in Response to a Gesture

Many electronic devices have graphical user interfaces that provide visual feedback to operations performed by a user. For example, when a user invokes a user interface element (e.g., an icon, or a button, etc.) displayed on a graphical user interface using an input (e.g., a click or a gesture), the appearance of the user interface can change to indicate the effect of the operation performed by the input. Some methods for providing visual feedback in response to user input frequently involve a binary switch between display states with a single trigger threshold. Thus, in some embodiments, with these methods, no visual feedback is provided before the single trigger threshold is reached, and an abrupt switch from a current display state to a new display state occurs as soon as the single trigger threshold is reached. In addition, no subsequent visual feedback is provided after the user interface has switched to the new display state even if the user input causing the switch has not been terminated.

In some embodiments described herein, an improved method for providing visual feedback in response to user input is achieved by: providing a user interface in an initial display state; when a first portion of a gesture is detected, where the first portion of the gesture is indicative of a respective intended operation and completion of the operation is associated with a respective augmented display state, providing a preview of the augmented display state (e.g., an animation including one or more intermediate display states between the initial display state and the augmented display state); and when the end of the gesture is detected, displaying either the augmented display state or redisplaying the initial display state depending on whether an intensity of a contact of the gesture had reached a predefined intensity threshold prior to the end of the gesture. This method provides the user with an opportunity to preview (e.g., the intermediate display states) the effect of a completed gesture before the user finally completes the gesture (e.g., providing a contact intensity above the predefined intensity threshold) and commits to the effect. During the preview, the user is allowed to cancel the gesture before completing the gesture or to continue with the gesture and commit to the effect.

In addition, an improved method for providing visual feedback in response to user input is achieved by: after providing a first animation to represent a transition from an initial display state to an augmented display state in accordance with an increase in contact intensity of a first input (e.g., an initial portion of a gesture), if a second input (e.g., a latter portion of the same gesture) is detected and the second input includes an increase and a subsequent decrease in contact intensity, providing a second animation to represent a transition from the augmented display state to a terminal display state, and subsequently a third animation to represent a transition from the terminal display state back to the augmented display state in accordance with the increase and decrease in contact intensity of the second input, where the second animation is a continuation of the first animation. In this improved method, additional visual feedback is provided after the user interface has entered the augmented display state in response to an initial portion of a gesture, and the additional feedback imparts to the user interface or sub-components thereof a look and feel of some physical characteristic (e.g., elasticity, transparency, size, location, velocity, spin, coefficient of attraction or repulsion to another object, etc.) that changes in response to the continued changes in the intensity of the contact. This continued visual feedback adds visual interest to the user interface and provide a more natural and intuitive response to user input.

FIGS. 5A-5I illustrate example user interfaces for providing visual feedback for a gesture in accordance with changes in intensity of a contact in accordance with some embodiments. The user interfaces in these figures are used to illustrate the processes described below, including the processes in FIGS. 6A-6G, and 6H-6M. FIGS. 5A-5I include intensity diagrams that show the current intensity of the contact on the touch-sensitive surface relative to a plurality of intensity thresholds including a predefined intensity threshold (e.g., a light press intensity threshold "$IT_L$" or a deep press intensity threshold "$IT_D$"), a first intensity threshold (e.g., a contact detection intensity threshold "$IT_0$"), an intermediate intensity threshold (e.g., a light press intensity threshold "$IT_L$"), an end-of-gesture intensity threshold (e.g., a contact detection intensity threshold "$IT_0$"), and a squishiness plateau intensity threshold (e.g., a tolerance intensity threshold "$IT_T$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112 (e.g., a touch screen), and the touch-sensitive surface includes tactile output generators 167 on the touch screen (FIG. 1A). For convenience of explanation, some of the embodiments described with reference to FIGS. 5A-5I and 6A-6M will be discussed with reference to display 450 and a separate touch-sensitive surface 451, while others will be discussed with reference to a touch sensitive display system 112 with built-in tactile output generators to provide both the display and the touch-sensitive surface. However, for embodiments discussed with reference with display 450 and a separate touch-sensitive surface 451, analogous operations are, optionally, performed on a device with a touch-sensitive display system 112 in response to detecting the contacts described in FIGS. 5A-5I on the touch-sensitive display system 112 while displaying the user interfaces shown in FIGS. 5A-5I on the touch-sensitive display system 112. In embodiments where a touch screen 112 replaces display 450 and touch-sensitive surface 451, the focus selector is, optionally: a respective contact, a representative point corresponding to a contact (e.g., a centroid of a respective contact or a point associated with a respective contact), or a centroid of two or more contacts detected on the touch-sensitive display system 112, in place of a cursor (e.g., cursor 138A-06 or cursor 138B-06) or a spotlight (e.g., spotlight 138H-06). Likewise, for embodiments discussed with reference with a touch-sensitive display system 112, analogous operations are, optionally, performed on a device with display 450 and a separate touch-sensitive surface 451 in response to detecting the contacts described in FIGS. 5A-5I on the touch-sensitive surface 451 while displaying the user interfaces shown in FIGS. 5A-5I on the display 450. In embodiments where a display 450 and touch-sensitive surface 451 replace touch screen 112, the focus selector is, optionally: a cursor, a magnifying glass, or a spotlight, in place of a respective contact (e.g., contact 138C-08, contact 138C-12, contact 138C-16, contact 138D-16, and any other contact shown in FIGS. 5A-5I), a representative point corresponding to a contact, or a centroid of two or more contacts detected on the touch-sensitive display system 112.

Before more details of specific example user interfaces are provided in FIGS. 5C-5I, FIGS. 5A1-5A18 and FIGS. 5B1-5B16 provide conceptual illustrations of how visual feedback is provided in response to detected changes in the contact intensity of a gesture.

Specifically, in FIGS. 5A1-5A8, an example user interface 138A-02 goes through a series of changes in response to a first gesture, include displaying an animation showing a series of intermediate display states between an initial display state and an augmented display state of the user interface in accordance with changes in the intensity of the contact. During the first gesture, the intensity of the contact does not exceed a predefined intensity threshold (e.g., "$IT_L$") prior to the end of the gesture. As a result, the user interface is returned to its initial display state after the end of the gesture is detected. In FIGS. 5A10-5A17, the user interface 138A-102 responds to an initial portion of a second gesture in largely the same manner as illustrated in FIGS. 5A1-5A8, e.g., displaying an animation showing a series of intermediate display states between the initial display state and the augmented display state in accordance with changes in the contact intensity of the initial portion of the second gesture. However, in contrast to the scenario shown in FIGS. 5A1-5A8, during the second gesture, the intensity of the contact does exceed the predefined intensity threshold (e.g., "$IT_L$") before the end of the gesture is detected, as shown in FIG. 5A14. As a result, the user interface enters the augmented display state and remains in the augmented display state after the end of the gesture is detected. FIGS. 5A1-5A9 and FIGS. 5A10-5A18 together illustrate the concept of (1) providing a preview of the effect of an operation that would be performed upon completion of the gesture before the contact intensity of a user input reaches a predefined intensity threshold for committing to the operation is reached, and (2) allowing the user to (i) back out of said effect by ending the gesture before the intensity of the contact reaches the predefined intensity threshold or (ii) to commit to the effect by continuing with the gesture until the contact intensity reaches (or exceeds) the predefined intensity threshold.

In FIGS. 5B1-5B16, an example user interface 138B-02 goes through a series of changes in response to a gesture. The changes include (1) displaying a first animation showing a transition from an initial display state to an augmented display state of the user interface in accordance with the intensity of the contact increasing to a predefined intensity threshold (e.g., a light press intensity threshold $IT_L$) in FIG. 5B4, (2) displaying a second animation (which is a continuation of the first animation) showing a transition from the augmented display state to a terminal display state of the user interface in accordance with the intensity of the contact increasing beyond the predefined intensity threshold, and (3) displaying a third animation showing the user interface reverting from the terminal display state back to the augmented display state. In some embodiments, the method of providing visual feedback illustrated in FIGS. 5B1-5B16 is implemented in conjunction with the method illustrated in FIGS. 5A1-5A19, and used to provide feedback to a single user input. In some embodiments, the method of providing visual feedback illustrated in FIGS. 5B1-5B16 and FIGS. 5A1-5A19 are implemented independently of each other, and used to provide feedback to independent gestures.

As shown in FIG. 5A1, an example user interface (e.g., user interface 138A-02) is provided on a display (e.g., display 450) of an electronic device having a touch-sensitive surface (e.g., touch-sensitive surface 451 shown in FIG.

5A8) separate from the display. User interface 138A-02 includes various example user interface elements, such as the "Tickle" button 138A-04 and various elements figuratively represented by the eyes, nose, mouth, and face of the smiley face shown in user interface 138A-02. For illustrative purposes, visual changes made to the user interface 138A-02 in response to a gesture are figuratively shown as visual changes made to the smiley face and/or its components.

In FIG. 5A1, user interface 138A-02 is in an initial display state S1 (e.g., a first steady state before any input is detected) showing a calm-looking smiley face. Intensity diagram corresponding to FIG. 5A1 indicates that no gesture input has been detected and the intensity of contact is zero.

When the device subsequently detects a gesture (e.g., a press input) on the touch-sensitive surface 451, and a location of the contact on the touch-sensitive surface (e.g., contact 138A-08 shown in FIG. 5A8) corresponds to a location of the cursor 138A-06 over the "Tickle" button 138A-04 shown in the user interface 138A-02, the device provides an initial visual feedback (e.g., highlighting the smiley face shown in the user interface 138A-02) to indicate that the "Tickle" button has gained input focus, as shown in the modified display state S1' in FIG. 5A2. In some embodiments, the device provides the initial visual feedback when the detected contact intensity reaches above a contact detection intensity threshold $IT_0$ (e.g., when the contact is detected on the touch-sensitive surface while the focus selector is over button 138A-04). In some embodiments, the initial visual feedback is omitted.

When the intensity of the contact continues to increase in a range below the light press intensity threshold $IT_L$ (e.g., as indicated by the intensity diagrams in FIGS. 5A3-5A4), the device provides a series of intermediate display states (e.g., I-a and I-b) of the user interface 138A-102 on the display 450. Each intermediate display state is, optionally, selected according to a currently detected contact intensity, and represents a transitional state between the initial display state S1 and an augmented display state S2 of the user interface. Specifically, if the detected initial portion of the gesture is indicative of an intended operation accomplishable by a completed gesture having the same initial portion, then, the augmented display state is a steady display state of the user interface presented upon the completion of the operation. In this example, a completed operation associated with the "Tickle" button 138A-04 will cause the calm-looking smiley face shown in FIG. 5A1 to change into a laughing smiley face with a big open mouth (now shown in FIGS. 5A14-5A16). As illustrated in FIGS. 5A3-5A4, increasing contact intensities correspond to increasingly bigger smiles of the smiley face shown on the user interface 138A-02. In some embodiments, the series of intermediate states is provided as a continuous animation. In some embodiments, each intermediate display state between the initial display state and the augmented display state is mapped to a respective contact intensity value between the contact detection intensity threshold (e.g., "$IT_0$") or zero and the light press intensity threshold $IT_L$.

When the intensity of the contact decreases in the range below the light press intensity threshold $IT_L$ (e.g., as indicated by the intensity diagrams in FIGS. 5A4-5A6), the device provides a series of intermediate display states (e.g., I-c) of the user interface 138A-102 on the display 450 showing the transition back toward the initial display state S1. Again, each intermediate display state is selected according to a currently detected contact intensity, and represents a transitional state between the augmented display state S2 and the initial display state S1 of the user interface. In this example, as illustrated in FIGS. 5A4-5A5, decreasing contact intensities correspond to increasingly smaller smiles of the smiley face shown on the user interface 138A-02.

In the example shown in FIGS. 5A1-5A8, the intensity of the contact never exceeds the light press intensity threshold $IT_L$ required for invoking the augmented display state S2. Therefore, when the end of the gesture is detected (e.g., when the contact intensity drops below the contact detection intensity threshold $IT_0$), the device does not display the augmented display state S2, and returns the user interface 138A-02 to its initial display state S1 after displaying the one or more intermediate display states. As shown in FIG. 5A6, after the intensity of contact 138A-08 drops below the contact detection intensity threshold $IT_0$, the end-of-gesture is detected, and the user interface 138A-02 is returned to the initial display state S1. After the contact is removed completely (as shown in FIG. 5A8), the user interface 138A-02 remains in the initial display state S1.

FIG. 5A9 is a diagram showing how changes in the display states of the user interface 138A-02 correspond to changes in the intensity of the contact 138A-08. A solid curve 138A-10 represents the changes in the contact intensity of a detected gesture (e.g., contact 138A-08) over time, and the seven particular values marked by respective small circles on the solid curve 138A-10 correspond to the intensity values shown in FIGS. 5A1-5A7, respectively. Corresponding display states (e.g., S1, S1', I-a, I-b, and I-c) for the particular values, and an animation A1 showing the transition between display states are also indicated in the diagram. A dotted curve 138A-14 represents the changes in the contact intensity of a different gesture, which will cause a different outcome (as will be shown in FIGS. 5A10-5A18).

FIGS. 5A1-5A9 illustrate an example scenario in which a user started a gesture with an initial contact followed by a press input with intensity below $IT_L$. In response to the initial contact and press input with intensity below $IT_L$, a preview of the effect of a completed light press input (e.g., as a natural progression of the press input to the light press intensity threshold $IT_L$) is provided to the user. The preview is in the form of one or more intermediate display states between an initial display state of the user interface and an augmented display state evocable by a gesture containing a light press input. In this example scenario, the user, having seen the preview of the effect of the completed light press, terminated the gesture before the intensity of the contact reached the light press intensity threshold $IT_L$. As a result, the user interface is returned to the initial display state without entering the second display state. Correspondingly, the operation initiated by the gesture is reverted before completion.

FIGS. 5A10-5A18 illustrate a scenario alternative to that shown in FIGS. 5A1-5A9. In the scenario shown in FIGS. 5A10-5A18, a user started a gesture with an initial contact followed by a press input with intensity below $IT_L$. In response to the initial contact and press input with intensity below $IT_L$, a preview of the effect of a completed light press is provided to the user. In contrast to the previous scenario, here, the user, having seen the preview, continued to increase the intensity of the contact and did not terminate the gesture until the intensity of the contact had reached beyond the light press intensity threshold $IT_L$ (e.g., provided the light press input). As a result, the user interface 138A-02 enters the augmented display state and remains in the augmented display state after the gesture has been terminated. Correspondingly, the operation initiated by the gesture is completed.

In FIG. 5A10, the same user interface 138A-02 and user interface elements are shown in the initial display state S1 on the display 450, and the corresponding intensity diagram indicates that no gesture has been detected on the touch-sensitive surface 451.

When the device subsequently detects a gesture (e.g., a press input) on the touch-sensitive surface 451, and a location of the contact on the touch-sensitive surface (e.g., contact 138A-12 shown in FIG. 5A17) corresponds to a location of the cursor 138A-06 over the "Tickle" button 138A-04 shown in the user interface 138A-02, the device provides an initial visual feedback (e.g., highlighting the smiley face shown in the user interface 138A-02) to indicate that the "Tickle" button has gained input focus, as shown in the modified display state S1' in FIG. 5A11.

When the user continues to increase the intensity of the contact 138A-12 in a range below the light press intensity threshold $IT_L$, the device provides one or more intermediate states (e.g., I-a and I-b) of the user interface 138A-02 on the display 450, in the same manner as shown previously in FIGS. 5A3-5A4. For example, as illustrated by FIGS. 5A12 and 5A13, the devices shows bigger and bigger smiles on the smiley face in the user interface 138A-02 in response to the increasing contact intensity in a range below $IT_L$. When the intensity of the contact 138A-012 finally reaches an intensity at or above the light press intensity threshold $IT_L$ (as shown in FIG. 5A14), the user interface 138A-02 enters the augmented display state S2 showing the smiley with a big open mount laugh.

In this example, since the intensity of the contact 138A-12 does reach the light press intensity threshold $IT_L$ before the end of the gesture is detected by the device, the user interface 138A-02 not only enters, but also remains in the augmented display state when the intensity of the contact 138A-12 subsequently drops below the light press intensity threshold $IT_L$ again. Thus, in some embodiments, the augmented display state S2 is a second steady state of the user interface 138A-02, distinct from the initial display state (e.g., the first steady state) of the user interface 138A-02.

As shown in FIG. 5A15, when the intensity of the contact 138A-12 is reduced to the end-of-gesture intensity threshold (e.g., the contact detection intensity threshold $IT_0$ or some other intensity threshold value), the user interface 138A-102 does not exit the augmented display state S2 and does not return to the initial display state S1. Similarly, after the gesture is terminated and the intensity of contact 138A-12 becomes zero, the user interface 138A-02 remains in the augmented display state S2, as shown in FIG. 5A16.

FIG. 5A18 is a diagram showing how changes in the display states of the user interface 138A-02 correspond to changes in the intensity of the contact 138A-12. A solid curve 138A-14 represents the changes in the contact intensity of a detected gesture (e.g., contact 138A-12), and the seven particular values marked by respective small circles on the solid curve 138A-14 correspond to the intensity values shown in FIGS. 5A10-5A16, respectively. Corresponding display states (e.g., S1, S1', I-a, I-b, and S2) for the particular values, and an animation A1' showing the transition between display states are also indicated in the diagram.

FIGS. 5A10-5A18 illustrate an example scenario in which a user started a gesture with an initial contact followed by a press input with intensity below $IT_L$. In response to the initial contact and the press input with intensity below $IT_L$, a preview of the effect of a completed light press (e.g., as a natural progression of the press input with intensity below $IT_L$ to the light press intensity threshold $IT_L$) is provided to the user. The preview is in the form of one or more intermediate display states between an initial display state of the user interface and an augmented display state evocable by a gesture containing the light press. In this example scenario, the user, having seen the preview of the effect of the light press, continued with the gesture and increased the intensity of the contact to the light press intensity threshold $IT_L$ (e.g., provided the light press input) before terminating the gesture. As a result, the user interface enters into the augmented display state (e.g., the second steady state of the user interface 138A-02). Correspondingly, the operation initiated by the gesture is completed.

Although the contact intensities of the respective gestures shown in FIGS. 5A9 and 5A18 each have only a single local maximum, such is not required. In some embodiments, the contact intensity of a gesture will, in some circumstances, oscillate in the range between the contact detection intensity threshold $IT_0$ and the light press intensity threshold $IT_L$. In response to such an oscillating input, the device selects intermediate display states of the user interface 138A-02 in accordance with the magnitude of the currently detected contact intensity, and the animation presented on the display either goes in a first direction approaching the augmented display state S2 or in a second direction approaching the initial display state S1 depending on whether the currently detected intensity is increasing or decreasing.

FIGS. 5A10-5A18 do not show the display states of the user interface 138A-02 when the intensity of the contact is above the light press intensity threshold $IT_L$. In some embodiments, the user interface remains in the augmented display state S2 during the time that the intensity of the contact is above the light press intensity threshold $IT_L$. In some embodiments, additional display states (e.g., additional steady display states and/or squishiness display states to be discussed later) are presented in accordance with the contact intensity in the range above the light press intensity threshold $IT_L$. While the examples illustrated above with reference to FIGS. 5A1-5A18 have been described with respect to the light press intensity threshold $IT_L$, in some embodiments, analogous operations are performed with respect to the deep press intensity threshold $IT_D$ (e.g., operations performed in response to detecting a deep press input including a contact with an intensity that is above $IT_D$).

FIGS. 5B1-5B16 illustrate how a device provides additional visual feedback in response to continued changes (e.g., increases and decreases) of the contact intensity in a range above the light press intensity threshold $IT_L$, after the user interface has entered the augmented display state S2 from the initial display state S1 in response to the intensity of the contact having reached the light press intensity threshold $IT_L$. Sometimes, the additional visual feedback includes additional display states of the user interface that are intermediate display states between the augmented display state S2 and a non-steady display state (e.g., S3) distinct from the initial display state S1 and the augmented display state S2. In some embodiments, the device selects each of the additional display state based on the currently detected contact intensity between the light press intensity threshold $IT_L$ and the presents the additional display states in an animation that is a continuation of the animation used to show the transition from the initial display state S1 to the augmented display state S2. Sometimes, the detected contact intensity will, in some circumstances, oscillate in a range above the light press intensity threshold $IT_L$, and the device shows changes in the user interface in accordance with the oscillating contact intensity in a manner resembling a degree of "squishiness" of the user interface (as used herein, the term "squishiness" refers to the response of a user interface object or user interface to changes in intensity of a contact that mimic, simulate, or are evocative of the compression or decompression of an elastic physical object subjected to corresponding changes in pressure). Therefore, the additional display states of the user interface are sometimes referred to as the "squishiness display states" of the user interface. In some embodiments, the squishiness display states provides the user interface and/or one or more user interface elements thereof the appearance of possessing a physical property (e.g., size, shape, location, weight, elasticity, opacity, transparency, spring constant, velocity, spin, coefficient of attraction or repulsion, etc.) that responds to the changes in the contact intensity.

As shown in FIG. 5B1, an example user interface 138B-02 is provided on a display 450 of an electronic device having a touch-sensitive surface 451 (shown in FIG. 5B15) separate from the display 450. The user interface 138B-02 includes various example user interface elements, such as a "Tickle" button 138B-04 and various elements (e.g., buttons, objects, icons, windows, etc.) figuratively represented by the eyes, nose, mouth, and face of the smiley face show in user interface 138B-02. For illustrative purposes, the various kinds of visual changes made to the components of the smiley face in response to a gesture represent the various kinds of visual changes made to objects in an example user interface in response to the gesture.

FIGS. 5B1, the user interface 138B-02 is in an initial display state S1 showing a calm-looking smiley face. Intensity diagram corresponding to FIG. 5B1 indicates that no gesture input has been detected and the intensity of contact is zero.

FIGS. 5B2-5B4 illustrate that, in some embodiments, when the device subsequently detects a gesture (e.g., a press input) on the touch-sensitive surface 451 shown in FIG. 5B15, and a location of the contact on the touch-sensitive surface (e.g., contact 138B-08 shown in FIG. 5B15) corresponds to a location of the cursor 138B-06 over the "Tickle" button 138B-04 shown in the user interface 138B-02, the device provides a series of feedbacks in response to a first portion of the gesture. In the first portion of the gesture, the intensity of the contact 138B-08 gradually increases from the contact detection intensity threshold $IT_0$ to the light press intensity threshold $IT_L$, and in response, the device provides an animation including a series of intermediate display states (e.g., display state I-a shown in FIG. 5B3) between the initial display state S1 (e.g., FIG. 5B1 showing a calm-looking smiley face) and the augmented display state S2 (e.g., FIG. 5B4 showing a laughing smiley face with a big open mouth). The device determines the rate of change in the animation from the initial display state S1 and the augmented display state S2 in accordance with the intensity of the contact 138B-08 in the initial portion of the gesture. The initial display state S1 and the augmented display state S2 are both steady display states that the user interface 138B-02 is operable to maintain when no gesture is detected on the touch-sensitive surface 451.

As shown in FIGS. 5B5-5B6, once the user interface has entered the augmented display state S2, if the intensity of the contact continues to increase above the light press intensity threshold $IT_L$, the device displays one or more additional display states (e.g., display states I-b and I-c) of the user interface 138B-02. Each of the one or more additional display states corresponds to a respective current value of the contact intensity. In some embodiments, as the contact intensity increase from a value below the light press intensity threshold $IT_L$ to a value above the light press intensity threshold $IT_L$, the device provides the additional display states in a second animation that is a continuation of the first animation showing the transition from the initial display state S1 to the augmented display state S2.

In some embodiments, the second animation simulates some physical properties. As illustrated in this example, various physical properties of the objects in the user interface 138B-02 (e.g., the size of the smiley's face and mouth, the shape of the smiley's eyes, the color or opacity of the smiley's face, the length and elasticity of the smiley's tongue, etc.) change (e.g., increase and/or decrease) in response to the changes (e.g., increases) in the intensity of the contact beyond the light press intensity threshold $IT_L$. In addition, objects are, optionally, added or removed from the user interface 138B-02 (e.g., as illustrated by the addition of the smiley's tongue and the removal of the smiley's nose in FIGS. 5B5 and 5B6) in response to the changes (e.g., increases) in the intensity of the contact beyond the light press intensity threshold $IT_L$.

In contrast to the initial display state S1 and the augmented display state S2, the squishiness display states (e.g., I-b and I-c) shown in FIGS. 5B5 and 5B6 are non-steady display states. Thus, in some embodiments, the user interface 138B-02 is not operable to maintain these squishiness display states when the intensity of the contact is not maintained at a current level. For example, if the intensity of the contact had dropped below the light press intensity threshold $IT_L$ at this point, the user interface 138B-02 will not stay in the intermediate state I-c, but rather returns to the augmented display state S2.

Figure 7:
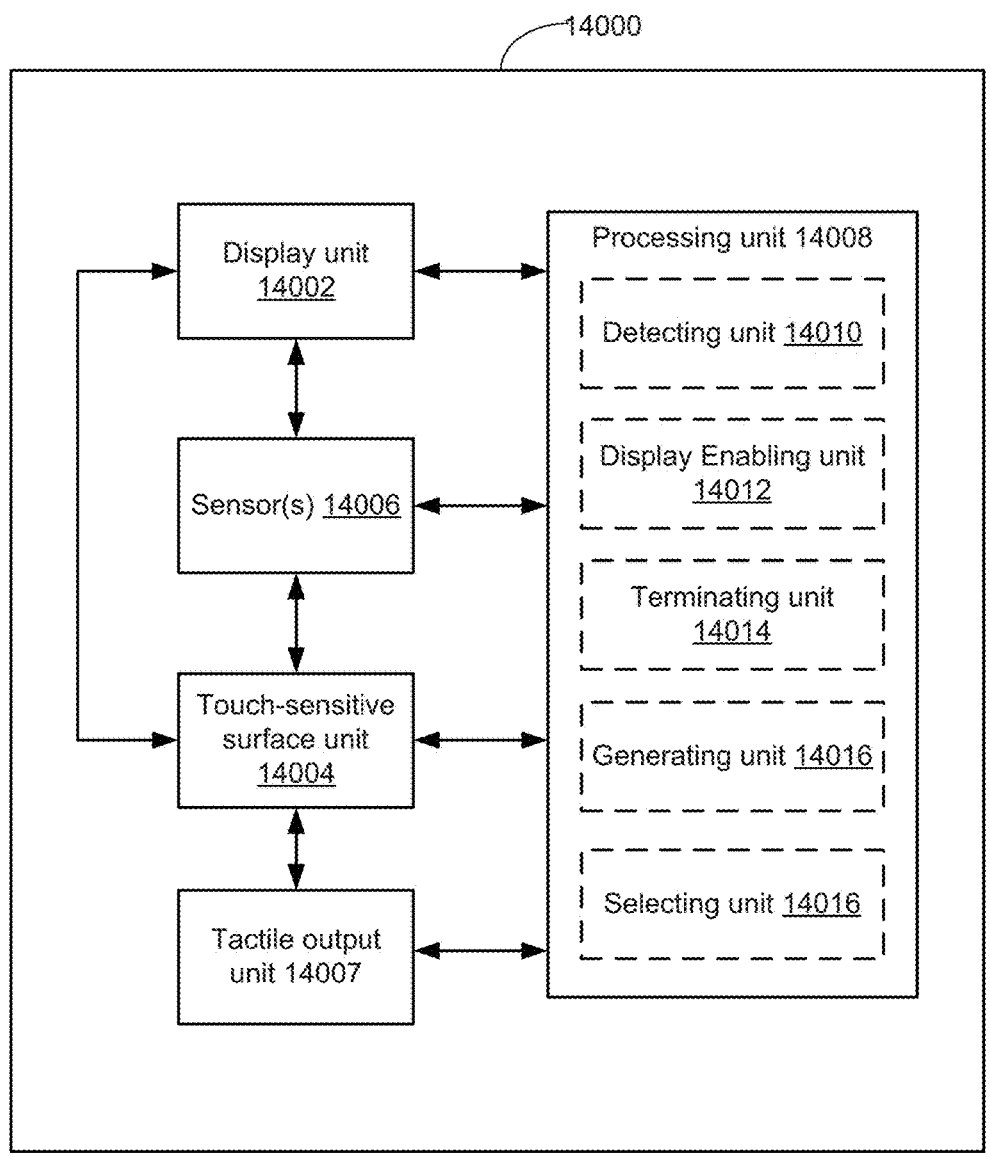
FIG. 7 is a functional block diagram of an electronic device in accordance with some embodiments.

In some embodiments, the device implements a tolerance intensity threshold $IT_T$ such that contact intensity reaching above the tolerance intensity threshold $IT_T$ does not cause additional changes to the user interface. The tolerance intensity threshold $IT_T$ serves to discourage the user from pressing on the touch-sensitive surface 451 with too much force so as to cause fatigue and damage to the touch-sensitive surface 451. As shown in FIG. 5B7-5B8, when the intensity of the contact has reached (as shown in FIG. 5B7) and subsequently exceeded (as shown in FIG. 5B8) the tolerance intensity threshold $IT_T$, the user interface 138B-02 reaches and remains in a terminal display state S3 (sometimes also referred to as the "squishiness plateau state"). As shown in FIG. 5B8, any continued increase in the contact intensity beyond the tolerance intensity threshold $IT_T$ causes no further visual feedback in the display 450.

When the contact intensity drops below the tolerance intensity threshold again, the user interface 138B-02 responds to the changes in contact intensity again. As shown in FIGS. 5B9-5B10, in response to the intensity of the contact decreasing in the range between the tolerance intensity threshold $IT_T$ and the light press intensity threshold $IT_L$, squishiness display states beyond the augmented display state are once again provided. The device selects each squishiness state in accordance with the currently detected contact intensity. In some embodiments, the rate of change in the animation presenting the squishiness states corresponds to the rate of change in the contact intensity.

When the intensity of the contact drops to the light press intensity threshold $IT_L$ from a value above $IT_L$ (as shown in FIG. 5B11), the device redisplays the augmented display state S2 of the user interface 138B-02 on the display 450. When the contact intensity is reduced to the end-of-gesture intensity threshold (e.g., the contact detection intensity threshold $IT_0$ or some other intensity threshold value), the user interface 138B-02 remains in the augmented display state S2, as shown in FIG. 5B13. Similarly, after the gesture is terminated and the intensity of contact 138B-08 becomes zero, the user interface 138B-02 remains in the augmented display state S2, as shown in FIG. 5A14.

FIG. 5B16 is a diagram showing how changes in the display states of the user interface 138B-02 correspond to changes in the intensity of the contact 138B-08. A solid curve 138B-10 represents the changes in the contact intensity of a detected gesture (e.g., the gesture providing the contact 138A-08), and the fourteen particular values marked by respective small circles on the solid curve 138B-10 correspond to the intensity values shown in FIGS. 5B1-5B14, respectively. Corresponding display states (e.g., S1, S1', I-a, S2, I-b, I-c, and S3) for the particular values, and animations A1 showing the transition from display state S1 to S2, A2 showing the transition from display state S2 to S3, and A2' showing the transition from display state S3 to S2 are also indicated in the diagram.

Although FIGS. 5B1-16 illustrate the transition from the initial display state to the augmented display state, and the provision of the squishiness display states in response to different portions of a single gesture (e.g., a gesture providing a continuous contact with the touch sensitive surface 451), such is not required. In some embodiments, the transition from the initial display state to the augmented display state is, optionally, accomplished in response to a first gesture, and the squishiness display states are provided in response to a second gesture while the user interface is in the augmented display state. While the examples illustrated above with reference to FIGS. 5B1-5B16 have been described with respect to the light press intensity threshold $IT_L$, in some embodiments, analogous operations are performed with respect to the deep press intensity threshold $IT_D$ (e.g., operations performed in response to detecting a deep press input including a contact with an intensity that is above $IT_D$).

FIGS. 5A and 5B provide an overview of how feedback is, optionally, provided in response to a gesture in accordance with various embodiments. FIGS. 5C-5H provides particular example embodiments that implements the methods described with reference to FIGS. 5A and 5B, and various augmentations of these methods.

FIGS. 5C1 through 5C32 illustrate example visual feedback provided in response to changes in contact intensity of a gesture when the gesture is directed to a menu button in an exemplar user interface, in accordance with some embodiments. The user interfaces in these figures are used to illustrate the processes described in this specification, including the processes in FIGS. 6A-6M.

FIGS. 5C1-5C8 illustrate the visual feedback provided in response to a gesture whose contact intensity does not ever exceeds the light press intensity threshold $IT_L$. FIGS. 5C9-5C16 illustrate the visual feedback provided in response to another gesture whose contact intensity does exceed the light press intensity threshold $IT_L$ before the end of the gesture is detected. The contrast between the feedbacks shown in FIGS. 5C1-5C8 and FIGS. 5C9-5C16 illustrate how a user is enabled to use a gesture to cause a preview of an augmented display state to be presented without committing to the augmented display state, and alternatively, how to cause the preview of the augmented display state to be present and eventually commit to the augmented display state.

FIG. 5C1 illustrates an example user interface (e.g., window 138C-02) having a selectable user interface element (e.g., "Tools" button 138C-04 in a menu bar of the window 138C-02). The "Tools" button 138C-04 is associated with an operation for opening a respective drop-down menu (e.g., a "Tools" menu) when selected or clicked on in a user interface 138C-04. For illustrative purposes, the window 138C-02 is displayed on a touch screen 112 of a device. Before any touch input is received (e.g., as indicated by the intensity diagram shown in FIG. 5C1), the window 138C-02 is in an initial display state showing all the buttons (including the "Tools" button 138C-04) in the menu bar in an unselected state.

FIG. 5C2 illustrates that, when a gesture is detected (e.g., the contact 138C-08 of the gesture has an intensity above the contact detection intensity threshold $IT_0$) and the contact 138C-08 of the gesture is over the "Tools" button 138C-04, the device modifies the appearance of the window 138C-02 to indicate selection of the "Tools" button 138C-04. For example, the "Tools" button 138C-04 changes from an un-highlighted state (shown in FIG. 5C1) to a highlighted state (shown in FIG. 5C2), indicating the selection of Tools button 138-104 caused by the contact of the gesture.

FIGS. 5C3-5C5 illustrate that, in some embodiments, when the intensity of the contact continues to change (e.g., increase and then decrease) in a range below the light press intensity threshold $IT_L$ after the initial contact was detected, the device provides an animation on the touch screen 112 in response to the changes in the contact intensity. The animation includes a series of intermediate display states (e.g., I-a, I-b) showing gradual expansion (e.g., revealing more and more menu items) of a drop-down menu 138C-06 associated with the "Tools" button 138C-04 when the intensity of the contact gradually increases toward the light press intensity threshold $IT_L$. The animation also includes a series of intermediate display states (e.g., I-b, I-c) showing gradual retraction (e.g., revealing fewer and fewer menu items) of the partially expanded drop-down menu 138C-06 when the intensity of the contact gradually decreases toward the contact detection intensity threshold $IT_0$. In some embodiments, the device determines how much of the drop-down menu is revealed based on the difference between the currently detected contact intensity and the light press intensity threshold $IT_L$. In some embodiments, the current rate of change in the animation is based on the current rate of change in the intensity of the contact. In some embodiments, the menu only approaches being fully expanded (e.g., showing all of its menu items that would have been shown when the "Tools" button was selected or clicked on in another interface) when the intensity of the contact approaches the light press intensity threshold $IT_L$. In some embodiments, before the contact intensity reaches the light press intensity threshold $IT_L$, the text portion of all the menu items in the drop-down menu 138C-06 is revealed (even though the drop-down menu itself is not completely expanded), such that the user can see all the menu items before deciding whether to continue the gesture to open the drop-down menu completely.

FIG. 5C6 illustrates that, when the intensity of the contact drops below the contact detection intensity threshold $IT_0$ before ever reaching the light press intensity threshold $IT_L$, the window 138C-02 is returned to the initial display state S1, in which the drop-down menu 138C-06 is completely closed, and the "Tools" button is no longer highlighted. In the end, as shown in FIG. 5C7, when the contact intensity drops to zero, the window 138C-02 remains in the initial display state S1.

In the scenario shown in FIGS. 5C1-5C7, a user pressed on the "Tools" button 138C-04 in the window 138C-02 with an intensity below $IT_L$, was shown a preview of the effect of a continued press (e.g., some or all of the menu items under the selected menu button), and released the "Tools" button 138C-04 without actually pressing hard enough (e.g., with an intensity above $IT_L$) to complete the operation for opening the drop-down menu 138C-06.

FIG. 5C8 is a diagram illustrating the changes in the intensity of the contact 138C-08 (as indicated by the solid line 138C-10), and the corresponding changes in the display states of the user interface over time. S1 represents the initial display state showing the unselected menu buttons. S1' represents the modified initial display state reflecting selection of the "Tools" button in the user interface. I-a, I-b, and I-c are representatives of a series of intermediate display states between the initial display state S1 and an augmented display state (not reached in FIGS. 5C1-5C7) shown during an animation A1.

FIGS. 5C9-5C12 illustrate the same visual feedback for an initial portion of a gesture containing a press input with an intensity below the light press intensity threshold $IT_L$. In FIG. 5C9, no gesture has been detected, and the window 138C-02 is in its initial display state S1. When the intensity of the contact 138C-12 reaches the contact detection intensity threshold $IT_0$, the device displays the window 138C-02 in a modified display state S1' (as shown in FIG. 5C10) to indicate the selection of the "Tools" button 138C-04. In FIGS. 5C11-5C12, when the contact intensity continues to increase in a range below the light press intensity threshold $IT_L$, the drop-down menu 138C-06 gradually expands to reveal more menu items in response to the increases in the intensity of the contact.

FIG. 5C13 shows that, in some embodiments, when the intensity of the contact finally reaches the light press intensity threshold $IT_L$, the drop-down menu 138C-06 is fully expanded, and the window 138C-02 is in the augmented display state S2. In some embodiments, the augmented display state S2 shows the drop-down menu in a fully expanded state showing all available menu items in the "Tools" menu. In some embodiments, the augmented display state S2 shows a selected subset (e.g., a set of favorite menu items, a set of most frequently used menu items, a set of first-level menu items, etc.) of all available menu items. In some embodiments, if only a subset of all available menu items are shown in the augmented displays state S2, a user can press anywhere or on a particular menu item in the expanded drop-down-menu to reveal some or all of the other menu items not currently shown in the expanded drop-down menu 138C-06. The augmented display state S2 is a steady open state for the drop-down menu 138C-06. In some embodiments, the device provides additional feedback to indicate that the contact intensity has reached the light press intensity threshold $IT_L$. For example, in some embodiments, the browser window will flicker, the drop-down menu will change color or opacity briefly, the animation will pause briefly, the device will provide an audio signal, or the device will provide a haptic feedback on the touch-sensitive surface (e.g., the touch screen 112), when the intensity of the contact first reaches the light press intensity threshold $IT_L$.

FIGS. 5C14-5C15 illustrate that, in some embodiments, after the intensity of the contact has reached the light press intensity threshold $IT_L$, the window 138C-02 will not return to the initial display state S1 and will remain in the augmented display state S2 when the contact intensity drops below the light press intensity threshold $IT_L$, and eventually below the contact detection intensity threshold $IT_0$ or zero.

In the scenario shown in FIGS. 5C9-5C15, a user pressed on the "Tools" button 138C-04 with an intensity below $IT_L$, and as the user continually increased the contact intensity of the press input, the device provides a preview of the effect of a continued press input. When the user continued to increase the contact intensity to and beyond the light press intensity threshold $IT_L$, the user completes the operation of displaying the drop-down menu 138C-06 in a steady open state. Once the drop-down menu entered the steady open state, it does not close again in response to the user terminating the contact. The user can subsequently use other input (e.g., a tap input or a light press input with an intensity above $IT_L$) to select individual items shown within the drop-down menu (e.g., if the focus selector is over one of the individual items) or to close the drop-down menu (e.g., if the focus selector is over "Tools" button 138C-04).

FIG. 5C16 is a diagram illustrating the changes in the intensity of the contact 138C-12 (as indicated by the solid line 138C-14), and the corresponding changes in the display states of the window 138C-02 over time. S1 represents the initial display state of the window 138C-02. S1' represents the modified initial display state reflecting selection of the Tools button 138C-04 in the window 138C-02. I-a and I-b are representatives of a series of intermediate display states between the initial display state S1 and the augmented display state S2. After the window 138C-02 enters the augmented display state S2 showing the drop-down menu 138C-06 in a steady open state, the window 138C-02 remains in the augmented display state S2 regardless of the subsequent decrease of the contact intensity. In some embodiments, in response to detecting a subsequent increase in intensity of contact 138C-12 above $IT_L$ followed by liftoff of contact 138C-12, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

FIGS. 5C17-5C32 illustrate the visual feedback provided in response to the changes in the intensity of the contact relative to multiple intensity thresholds (e.g., $IT_L$, $IT_D$ and/or $IT_T$), in accordance to some embodiments. In these figures, the light press intensity threshold $IT_L$ is an intensity threshold for entering a first augmented display state S2, the deep press intensity threshold $IT_D$ is an intensity threshold for entering a second augmented display state S3, and the tolerance intensity threshold $IT_T$ is an intensity threshold for reaching a non-steady terminal display state S4 of the user interface.

In FIGS. 5C17-5C32, the example user interface is a window 138C-02' containing a menu bar. The example user interface element invoked by a gesture is a "Tools" button 138C-04' in the menu bar. The gesture has a contact 138C-16 over the "Tools" button 138C-04' as shown in FIG. 5C18.

The window 138C-02' shown in FIGS. 5C17-5C32 behaves in the same manner as the window 138C-02 shown in FIGS. 5C1-5C7, when the intensity of the contact does not exceed the light press intensity threshold $IT_L$. Thus, in some embodiments, if the intensity of the contact never reaches the light press intensity threshold $IT_L$, the window 138C-02' eventually returns to the initial display state S1 after the end of gesture is detected.

FIG. 5C17-5C32 illustrate a scenario where the intensity of the contact reaches and goes beyond multiple intensity thresholds, including the contact detection intensity threshold $IT_0$ (as shown in FIGS. 5C18-5C19), the light press intensity threshold $IT_L$ (as shown in FIGS. 5C20 and 5C22), the deep press intensity threshold $IT_D$ (as shown in FIGS. 5C24-5C25), and the tolerance intensity threshold $IT_T$ (as shown in FIGS. 5C26-5C27). As shown in the intensity diagrams of FIGS. 5C17-5C31, the magnitudes of $IT_0$, $IT_L$, $IT_D$, and $IT_T$ increase monotonically in sequence.

FIGS. 5C17-5C18 illustrate that, in some embodiments, when a gesture is detected and the intensity of the contact increases from zero to the contact detection intensity threshold $IT_0$, the user interface 138C-02' changes from the initial display state S1 (e.g., "Tools" button 138C-04' being un-highlighted in FIG. 5C17) to the modified initial display state S1' (e.g., "Tools" button 138C-04' being highlighted to indicate its selection in FIG. 5C18).

FIGS. 5C19-5C20 illustrate that, in some embodiments, when the contact intensity continues to increase from the contact detection intensity threshold $IT_0$ to the light press intensity threshold $IT_L$, the device displays an animation showing the window 138C-02' going through a series of intermediate display states (e.g., the "Tools" menu 138C-06' gradually expanding with the increasing contact intensity, as shown in FIG. 5C19), and ultimately arriving at a first augmented display state S2 (as shown in FIG. 5C20). In the first augmented display state S2, the "Tools" menu 138C-06' is in a first steady open state showing a first subset (e.g., a set of most frequently used menu items, a set of favorite menu items, a set of first-level menu items, etc.) of all available menu items of the drop-down menu 138C-06'.

FIG. 5C21 illustrates that, when the intensity of the contact changes (e.g., increases or decreases) in a range below the light press intensity threshold $IT_L$ after having reached the light press intensity threshold $IT_L$ previously (e.g., shown in FIG. 5C20), the window 138C-02' will not return to the previously displayed intermediate display states (e.g., I-a) or the initial display state S1. Instead, the window 138C-02 remains in the first augmented display state S2, showing the drop-down menu 138C-06' in its first steady open state (containing a first subset of all available menu items under the Tools menu).

FIGS. 5C22-5C23 illustrate that, in some embodiments, once the window 138C-02' has reached the first augmented display state S2 (as shown in FIG. 5C20), when the intensity of the contact continue to change (e.g., increase) in a range between the light press intensity threshold $IT_L$ and the deep press intensity threshold $IT_D$, additional intermediate display states between the first augmented display state S2 and a second augmented display state S3 are shown as an animation. In some embodiments, the additional intermediate display states shows a preview of the second augmented display state S3. In this particular example, the second augmented display state S3 is shown in FIG. 5C24, and is a second steady open state of the drop-down menu 138C-06'. In the second open steady state, the drop-down menu 138C-06' displays a second subset of menu items (e.g., the previously un-displayed menu items under the "Tools" menu, or a set of second-level menu items) in addition to the first subset of menu items previously displayed in the first steady open state of the drop-down menu 138C-06'. As shown in FIG. 5C23, as the intensity of the contact gradually increases in the range between the light press intensity threshold $IT_L$ and the deep press intensity threshold $IT_D$, the device provides additional intermediate display state of the window 138C-02' in accordance with the currently detected contact intensity. The additional intermediate display states (e.g., I-c) show the gradual further expansion of the drop-down menu to reveal more and more of the second subset of menu items in addition to the first subset of menu items previously shown. In some embodiments, as shown in FIG. 5C23, the second subset of menu items are shown in a different color or shade from the first subset of menu items (e.g., so as to indicate that the second subset of menu items are newly displayed items that were previously hidden). In some embodiments, as shown in FIG. 5C22, the intermediate display states between the first augmented display state S2 and the second augmented display state S3 shows gradual magnification of the drop-down menu 138C-06' in response to the increasing contact intensity above $IT_L$. In some embodiments, the second augmented display state S3 is merely a steady magnified version of the first augmented display state S2.

As shown in FIG. 5C24, when the intensity of the contact reaches the deep press intensity threshold $IT_D$, the drop-down menu 138C-06' is further expanded to fully reveal the second subset of menu items in addition to the first subset of menu items under the "Tools" menu. Once the window 138C-02' has entered the second augmented display state S3, if the intensity of the contact drops below the deep press intensity threshold $IT_D$, the window 138C-02' will remain in the second augmented display state S3 shown in FIG. 5C24.

In some embodiments, when the window 138C-02' enters a steady display state (e.g., the first augmented display state S2 and/or the second augmented display state S3), the device provides an additional feedback (visual, audio, and/or haptic) to indicate that the intensity of the contact has just crossed a predetermined intensity threshold (e.g., $IT_D$) for completing a respective operation associated with the user interface element (e.g., the "Tools" button 138C-04') under the contact 138C-16. In some embodiments, the visual feedback is a flicker of the user interface or the drop-down menu 138C-06', a change in color, hue, or transparency of the drop-down menu, a discontinuity in the animation leading to and beyond the newly reached steady display state, etc.

In some embodiments, one additional level of feedback to an even higher level of contact intensity is implemented. This additional level of feedback involves displaying one or more "squishiness" display states, when the contact intensity reaches above the deep press intensity threshold $IT_D$. "Squishiness" display states are extensions of the last steady display state (e.g., the second augmented display state S3) of the user interface, and corresponds to the magnitudes of the currently detected contact intensity. In general, squishiness display states provides the user interface element that is being manipulated by the gesture with an appearance of a physical property (e.g., size, shape, elasticity, location, distance, coefficient of attraction or repulsion etc.) that changes in response to the changes in the contact intensity.

As shown in FIG. 5C25, when the intensity of the contact continues to increase above the deep press intensity threshold $IT_D$ after the user interface 138C-02' has reached the second augmented display state S3, the fully expanded "Tool" menu 138C-06' expands further in size in response to the increased contact intensity above $IT_D$. In some embodiments, the rate of expansion relative to the rate of increase in contact intensity is smaller as compared to the rate of change from S1 to S2 and from S2 to S3 relative to the increase in contact intensity. In some embodiments, the animation showing the changes in size in response to the changes in contact intensity in this range (e.g., from $IT_D$ to $IT_T$) is a continuation of the earlier animation showing the changes in the window 138C-02' in response to the changes in contact intensity in the range from the light press intensity threshold $IT_L$ to the deep press intensity threshold $IT_D$.

In some embodiments, when the contact intensity oscillates in a predetermined range above the deep press intensity threshold $IT_D$, e.g., a range between the deep press intensity threshold $IT_D$ and a tolerance intensity threshold $IT_T$, the size of the fully expanded drop-down menu 138C-06' oscillates synchronously with the oscillating contact intensity. In some embodiments, this change in size (sometimes, along with some other visual effects) affords the menu 138C-06' an appearance of being made of some flexible material (e.g., rubber) that is stretched or pressed by a force of oscillating magnitude.

FIGS. 5C26-5C27 illustrate that a tolerance intensity threshold $IT_T$ is implemented in accordance with some embodiments, and no further visual feedback is provided in the window 138C-02' when the intensity of the contact increases beyond the tolerance intensity threshold $IT_T$. The display state shown in FIGS. 5C26 and 5C27 are non-steady terminal display state S4 of the window 138C-02'. As shown in FIGS. 5C26-5C27, when the contact intensity increases in the range between the deep press intensity threshold $IT_D$ and the tolerance intensity threshold $IT_T$, the size of the fully expanded menu 138C-06' has been increased to a maximum level, further increases of the contact intensity beyond the tolerance intensity threshold $IT_T$ causes no further changes in the window 138C-02'.

In some embodiments, when the contact intensity subsequently drops below the tolerance intensity threshold $IT_T$ and continues to decrease in a range between the tolerance intensity threshold $IT_T$ and the deep press intensity threshold $IT_D$, the device will display an animation including squishiness display states that show the transition from the terminal display state S4 to the second augmented display state S2.

FIGS. 5C28-5C31 illustrate that, in some embodiments, when the intensity of the contact subsequently drops from a value above the tolerance intensity threshold $IT_T$ to various values below the tolerance intensity threshold $IT_T$, e.g., below the deep press intensity threshold $IT_D$ (as shown in FIG. 5C28), below the light press intensity threshold $IT_L$ (as shown in FIG. 5C29), below the contact detection intensity threshold $IT_0$ (as shown in FIG. 5C30), and eventually to zero (as shown in FIG. 5C31), the window 138C-102 re-enters the last steady display state S3 (e.g., the second augmented display state showing the fully expanded Tools menu 138C-06'), and then remains in the last steady display state S3.

FIG. 5C32 is a diagram illustrating the changes in intensity of the contact 138C-16 (as indicated by the solid line 138C-18), and the corresponding changes in the display states of the window 138C-02' over time. S1 represents the initial display state showing the unselected "Tools" menu button 138C-04', S1' represents the modified initial display state reflecting selection of the "Tools" menu button 138C-04', and I-a represents an intermediate display state between the initial display state S1 and a first augmented display state S2, showing expansion of the menu 138C-06' to a first steady open state. An animation A1 is presented to show the transitions between the initial display state S1 and the first augmented display state S2. I-b and I-c are additional intermediate display states between the first augmented display state S2 and a second augmented display state S3, showing expansion of the menu 138C-06' to a second steady open state. Animations A2 and A3 are used to present the intermediate display states between the first augmented display state S2 and the second augmented display state S3. Animations A2 and A3 are each a continuation of the animation A1. S4 is a non-steady display state showing the terminal squishiness state. I-d is a squishiness display state between the second augmented display state S3 and the terminal squishiness display state S4. An animation A4 is used to present the squishiness display states between the second augmented display state S3 and the plateau display state S4. Animation A4 is a continuation of the animation A3. Not all animations are indicated in the diagram.

FIGS. 5D1-5D42 illustrate how a device transforms a user interface (e.g., example user interfaces 138D-02, 138D-02', or 138D-02") from a first configuration to a second configuration in response to a gesture. In these figures, the first configuration shows an object (e.g., object 138D-04a, 138D-04' or 138D-04") in a grid view, and the second configuration shows the object in a different view (e.g., as a pop-up window, as the central component in a cover-flow view, or as a reversed view showing additional information about the object). In the description of these figures, the first configuration is an initial display state S1 of the user interface. The second configuration is an augmented display state S2 of the user interface. In some of the figures, an additional augmented state S3 and squishiness display states are also presented. The example user interfaces in these figures are used to illustrate the processes described in this specification, including the processes in FIGS. 6A-6M.

The following is a breakdown of the four different categories of embodiments illustrated in FIGS. 5D1-5D42:

(1) In FIGS. 5D1-5D8 illustrate the visual feedback provided in a user interface in response to a gesture whose contact intensity never exceeded the light press intensity threshold $IT_L$. FIGS. 5D9-5D16 illustrate the visual feedback provided in the same user interface in response to another gesture whose contact intensity does exceed the light press intensity threshold $IT_L$ before the end-of-gesture is detected. In FIGS. 5D1-5D16, the example user interface 138D-02 in the first configuration shows objects 138D-04a through 138D-04d (e.g., icons or thumbnails representing images, albums, playlists, or other documents or objects) in a grid view (as shown in FIGS. 5D1 and 5D9). The example user interface 138D-02 in the second configuration shows a selected object 138D-04a in an edit view (e.g., in a pop-up window). FIGS. 5D17-5D24 illustrate an alternative embodiment to that shown in FIGS. 5D9-5D16.

(2) In FIGS. 5D17-5D24, the example user interface 138D-02' in the first configuration shows objects 138D-04a' through 138D-04d' (e.g., icons or thumbnails representing images, albums, playlists, or other documents or objects) in a grid view (as shown in FIG. 5D7). The example user interface 138D-02' in the second configuration shows a selected object 138D-04' (or a transformed version thereof) as a central component in a cover-flow view.

(3) In FIGS. 5D25-5D32, the example user interface 138D-02" in the first configuration shows objects 138D-04a" through 138D-04d" (e.g., icons or thumbnails representing images, albums, playlists, or other documents or objects) in a grid view (as shown in FIG. 5D17). The example user interface 138D-02" in the second configuration shows a selected object 138D-04" as a central component in a cover-flow view and displaying additional information (e.g., track list of an album or playlist represented by the object 138D-04").

(4) FIGS. 5D33-5D42 can be viewed as a continuation of FIGS. 5D15-5D24, and implemented in the same embodiment. In FIGS. 5D33-5D42, the example user interface 138D-02' in the first configuration shows objects 138D-04a' through 138D-04d' (e.g., icons or thumbnails representing images, albums, playlists, or other documents or objects) in a grid view (as shown in FIG. 5D17). The example user interface 138D-02' in the second configuration shows a selected object 138D-04' as a central component in a cover-flow view. A third configuration is provided when the intensity of the contact increases to a deep press intensity threshold $IT_D$ after the user interface 138D-02' has reached the second configuration. In the third configuration, the central component in the cover-flow view is rotated and reversed to show additional information about the object 138D-04'. In FIGS. 5D33-5D42, additional squishiness states are also described when the intensity of the contact increases beyond the deep press intensity threshold $IT_D$.

More details of each of the above four categories of embodiments are provided below:

FIG. 5D1 illustrates an example user interface (e.g., a window 138D-02) containing a plurality of selectable user interface elements (e.g., selectable icons 138D-04a through 138D-04d). In some embodiments, the window 138D-02 is a window of an image editor application, and the selectable icons 138D-04a through 138D-04d each represent a respective image. In these embodiments, an operation associated with each selectable icon (e.g., icon 138D-04a) is to present a pop-up window for editing the image represented by the icon. In some embodiments, the window 138D-02 is a window of a music player application, and the selectable icons 138D-04a through 138D-04d each represent a respective music album or playlist. In these embodiments, an operation associated with each selectable icon (e.g., icon 138D-04a) is to present a pop-up window for displaying the track list of the respective music album or playlist represented by the icon. The user interface 138D-02 shown in FIG. 5D-02 is in an initial display state S1 when no gesture has been detected on the touch screen 112. The window 138D-02 is in a grid view, and a user is enabled to browse through the rows and/or columns of icons with a swiping gesture to the left and right and/or up and down in the window 138D-02. In some interfaces, selecting or clicking on the selectable icon (e.g., icon 138D-03a) would cause the corresponding pop-up window to be presented. In FIGS. 5D1-5D16, the visual feedback provided in the user interface is dependent on the changes in the intensity of the contact over a selected icon.

FIGS. 5D1-5D2 illustrate that, in some embodiments, when an icon 138D-04a representing an image (e.g., an image titled "Wedding") is selected by an initial contact of a gesture (e.g., contact 138D-08), and the contact intensity reaches above the contact detection intensity threshold $IT_0$, the user interface 138D-02 changes from an initial display state S1 (e.g., showing the image icons 138D-04a through 138D-04d uniformly in a grid view) to a modified initial display state S1' (e.g., showing the selected image icon 138D-04a in a highlighted manner different from other unselected icons).

FIGS. 5D3-5D6 illustrate that, in some embodiments, when the intensity of the contact changes (e.g., increases and decreases) in a range between the contact detection intensity threshold $IT_0$ and a light press intensity threshold $IT_L$, the device presents a pop-up window preview 138D-06 containing the selected image (e.g., the image titled "Wedding") in the user interface 138D-02. As shown in FIGS. 5D3-5D6, the size of the pop-up window preview 138D-06 increases and decreases synchronously with the increase and decrease of the contact intensity. In some embodiments, the pop-up window preview 138D-06 also moves toward or retreats from the center of the user interface 138D-02 in response to the contact intensity increasing toward or decreasing from the light press intensity threshold $IT_L$. The pop-up window preview 138D-06 shown in FIGS. 5D3-5D6 are in a series of non-steady, intermediate display states, and represents a preview of the pop-up window preview 138D-06 in the next steady state, namely, the augmented display state S2. The pop-up window preview 138D-06 in the intermediate display states is different (e.g., in size, position, color, opacity, and/or functionality) from the pop-up window preview 138D-06 in the augmented display state S2. As will be shown in FIG. 5D14, the augmented display state S2 shows a steady state pop-up window preview 138D-06 that includes editing tools, is displayed in either the full-screen mode or in the center of the user interface 138D-02.

In the scenario illustrated in FIGS. 5D1-5D7, the intensity of the contact never exceeds the light press intensity threshold $IT_L$ before the end of the gesture is detected. As shown in FIGS. 5D6-5D7, when the contact intensity subsequently drops to the contact detection intensity threshold again (as shown in FIG. 5D6), and eventually to zero (as shown in FIG. 5D7), the device returns the user interface 138D-02 to the modified display state S1' and eventually to the initial display state S1 again.

FIG. 5D8 is a diagram illustrating the changes in the intensity of the contact 138D-08 (as indicated by the solid line 138D-10), and the corresponding changes in the display states of the user interface over time. S1 represents the initial display state showing the icon 138D-04a in an unselected state. S1' represents the modified initial display state reflecting selection of the icon 138D-04 in the user interface 138D-02. I-a, I-b, and I-c are representatives of a series of intermediate display states between the initial display state S1 and an augmented display state S2 (not reached in FIGS. 5D1-5D7). The series of intermediate displays states are presented in an animation A1.

In contrast to the scenario shown in FIGS. 5D1-5D8, FIGS. 5D9-5D16 illustrate an alternative scenario in which the intensity of the contact does reach the light press intensity threshold $IT_L$. The gesture causes the user interface 138D-02 to enter and subsequently remain in the augmented display state S2 even after the end-of-gesture is detected. Thus, in some embodiments, the operation for putting the pop-up window into a steady open state is completed by the gesture.

FIGS. 5D9-5D12 illustrate that, in some embodiments, a pop-up window preview 138D-06 is presented in the user interface 138D-02 in response to a first portion of a gesture over the icon 138D-04a. During the first portion of the gesture, intensity of the contact 138D-12 over the icon 138D-04a increases from zero to a value below the light press intensity threshold $IT_L$. In response to the first portion of the gesture, the pop-up window preview 138D-06 containing the selected image is presented and the size of the pop-up window preview 138D-06 grows synchronously with the increase in the intensity of the contact. In addition, the pop-up window moves from the location of the selected icon 138D-04a toward the center of the window 138D-02 (or, optionally, toward the center of the touch screen 112) as it grows in size.

FIG. 5D13 illustrates that, in some embodiments, when the intensity of the contact finally increases to the light press intensity threshold $IT_L$, the pop-up window 138D-07 has expanded to occupy the entire central region of the window 138D-02, obscuring all the other icons previously displayed in the window 138D-02. In some embodiments similar to those described with reference to FIG. 5D13, the pop-up window 138D-07 will expand to occupy the entire touch screen 112. FIG. 5D13 illustrates the augmented display state S2 for the user interface 138D-02. In the fully-expanded pop-up window 138D-07 shown in FIG. 5D13, the selected image and various user interface elements for editing and otherwise manipulating the selected image are presented. In some embodiments, an animation is presented to show a smooth transition from the initial display state S1 shown in FIG. 5D9 to the augmented display state S2 of the user interface 138D-02 shown in FIG. 5D13.

FIG. 5D14-5D15 illustrate that, in some embodiments, once the pop-up window 138D-07 has fully expanded and the user interface 138D-02 has entered the augmented display state S2 in response to the contact intensity reaching the light press intensity threshold $IT_L$, even when the intensity of the contact subsequently decreases to the contact detection intensity threshold $IT_0$ (as shown in FIG. 5D14) and eventually to zero (as shown in FIG. 5D15), the fully expanded pop-up window 138D-07 remains fully expanded in the central region of the user interface 138D-02, and the user interface 138D-02 remains in the second display state S2.

FIG. 5D16 is a diagram illustrating the changes in the intensity of the contact 138D-12 (as indicated by the solid line 138D-14), and the corresponding changes in the display states of the user interface 138D-02 over time. S1 represents the initial display state showing the icons 138D-04a through 138D-04d in a grid view. S1' represents the modified initial display state reflecting selection of the icon 138D-04a. I-a and I-b are representatives of a series of intermediate display states showing a pop-up window preview 138D-06 containing the selected image being presented and gradually growing in size synchronously with the increased contact intensity. S2 is the augmented display state showing a fully expanded pop-up window 138D-07 containing the selected image and image editing tools, and occupying the center of the window 138D-02 or the touch screen 112. The pop-up window preview 138D-06 shown in the intermediate display states I-a and I-b represents a preview of the pop-up window 138D-07 shown in the augmented display state S2. In some embodiments, after reaching the augmented display state S2, the user interface 138D-02 remains in the augmented display state S2 regardless of the subsequent decrease of the contact intensity. An animation A1 shows the transition from the initial display state S1 to the augmented display state S2. In some embodiments, in response to detecting a subsequent increase in intensity of contact 138D-12 above $IT_L$ followed by liftoff of contact 138D-12, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

FIGS. 5D1-5D16 have largely been described in terms of an image editing application, with the icons representing images, and the pop-up window showing an image editing user interface. In an alternative embodiment, the user interface 138D-02 is a music player application, with icons representing albums and/or playlists, and the pop-up window showing the track list of a selected album or playlist.

FIGS. 5D17-5D23 illustrate an embodiment in which the augmented display state S2 of the user interface 138D-02 shows the selected icon 138D-04a as a central component in a cover-flow view, as opposed to a pop-up window. For ease of discussion, in the alternative embodiment shown in FIG. 5D17-5D23, the user interface is referenced as user interface 138D-02', the selected icon is referenced as 138D-04'. However, many previous descriptions of the user interface 138D-02 and icon 138D-04 still apply to the user interface 138D-02' and the icon 138D-04'.

As shown in FIGS. 5D17-5D18, a gesture is detected, and the contact 138D-16 of the gesture is over an icon 138D-04a' in a window 138D-02' shown on the touch screen 112. In response to the intensity of the contact reaching from zero to the contact detection intensity threshold $IT_0$, the icon 138D-04a' changes from an unselected state (e.g., as shown in FIG. 5D17) to a highlighted state (e.g., as shown in FIG. 5D18).

FIGS. 5D19-5D20 illustrate that, in some embodiments, as the intensity of the contact increases, the selected icon 138D-04a' is converted to an object 138D-18. In some embodiments, when the window 138D-02' is a window of an image editor, the object 138D-18 contains an image represented by the icon 138D-04a'. In some embodiments, when the window 138D-02' is a window of a music player, the object 138D-18 is an enlarged front cover of an album represented by the icon 138D-04a'. As shown in FIGS. 5D19-5D20, the object 138D-18 gradually grows in size and moves towards the center of the window 138D-02'. At the same time, other unselected icons (e.g., icons 138D-04b through 138D-04d) are also resized and rearranged around the selected icon 138D-04a'. The intermediate display states I-a and I-b shown in FIGS. 5D19-5D20 represent a preview of the window 138D-02 in a cover-flow view, with the object 138D-18 as the central component in the cover-flow view. The intermediate display states I-a and I-b shown in FIGS. 5D19 and 5D20 are non-steady states, and the window 138D-02' will return to the initial display state S1 shown in FIG. 5D17 if the gesture is terminated before it increases to the light press intensity threshold $IT_L$.

FIG. 5D21 illustrates that, in some embodiments, when the intensity of the contact continues to increase and finally reaches the light press intensity threshold $IT_L$, the window 138D-02' is rearranged into the cover-flow view. In the cover-flow view, the object 138D-18 occupies the central position of the cover-flow view, and transformed versions of two other unselected icons (e.g., icons 138D-04b' and 138D-04c') occupy the secondary positions to the left and right of the object 138D-18. In some embodiments, the device display an animation showing the smooth transition from the initial display state S1 shown in FIG. 5D17 to the augmented display state S2 shown in FIG. 5D21.

FIGS. 5D22-5D23 illustrate that, in some embodiments, the window 138D-02' remains in the augmented display state S2 (e.g., in the cover-flow view) even when the intensity of the contact subsequently decreased to the contact detection intensity threshold $IT_0$ (as shown in FIG. 5D22) and eventually to zero (as shown in FIG. 5D23).

In some embodiments, the user can subsequently use other input (e.g., a swipe gesture) to browse left and right to other icons in the cover-flow view. In some embodiments, the user can use another input (e.g., a flick gesture or tap gesture on the center object 138D-18) to flip over the center object 138D-18 in the cover-flow view. In some embodiments, when the center object 138D-18 is flipped over, track list of the album or playlist represented by the selected icon 138D-04a' is presented on the reverse side of the center object 138D-18.

In some embodiments similar to those shown in FIGS. 5D17-5D23, if a first portion of a gesture caused the user interface 138D-02' to transition into the cover-flow view shown in FIG. 5D21, and a second portion of the same gesture includes a deeper press reaching above the deep press threshold $IT_D$, the device causes the user interface 138D-02' to transition from the first augmented display state S2 into a second augmented display state S3. In the first augmented display state S2, the icons are shown in a cover-flow view as shown in FIG. 5D21. In the second augmented display state S3, the reverse side of the center object 138D-18 is shown in the cover-flow view. In some embodiments, the device displays an animation showing the flipping over of the center object 138D-18 in response to the increasing intensity of the contact from the light press intensity threshold $IT_L$ to the deep press intensity threshold $IT_D$. In some embodiments, the reverse side of the center object 138D-18 shows the track list of the album or playlist represented by the selected icon 138D-04a'. In some embodiments, if the selected icon 138D-04a' represents a photo album, the front side of the center object 138D-18 shows a front cover of the photo album, and the reverse side of the center-object 138D-18 will show a set of thumbnails of all or a subset of all images in the photo album.

FIG. 5D24 is a diagram illustrating the changes in the intensity of the contact 138D-16 (as indicated by the solid line 138D-20), and the corresponding changes in the display states of the user interface 138D-02' over time. S1 represents the initial display state showing icons in a grid view. S1' represents the modified initial display state reflecting selection of the icon 138D-04a'. I-a and I-b are representatives of a series of intermediate display states showing the transition from the grid view to a cover-flow view of the icons. An animation A1 shows the transition from the initial display state S1 (showing the unselected icons in the grid view) to the augmented display state (showing a transformed version 138D-18 of the selected icon 138D-04a' as the central component in a cover-flow view).

FIGS. 5D25-5D32 illustrate an alternative embodiment to that shown in FIGS. 5D17-5D24. In this alternative embodiment, when a gesture is detected on an icon 138D-04a" representing a music album or playlist in a window 138D-02", in addition to displaying intermediate display states transitioning from a grid view into a cover-flow view, a preview of the track list for the album or playlist represented by the selected icon 138D-04a" is also presented during the intermediate display states. In response to the intensity of the contact reaching the light press intensity threshold $IT_L$, the user interface transitions into an augmented display state S2 in which the track list is of the selected album or playlist is fully presented in the user interface.

FIGS. 5D25-5D26 illustrate that, in some embodiments, as the contact 138D-22 of a gesture is detected (e.g., as shown in FIG. 5D26) on an icon 138D-04a" representing an album or playlist, the icon 138D-04a" changes from an unselected state to a selected state.

As the intensity of the contact increases toward the light press intensity threshold $IT_L$, the selected album icon 138D-04a" transforms into an object 138D-24 which gradually expands and moves toward the center of the window 138D-02" synchronously with the increasing contact intensity, as shown in FIGS. 5D27-5D28. In some embodiments, other unselected icons are also transformed and rearranged in window 138D-02", such that the overall arrangement of the window 138D-02" gradually approaches a cover-flow configuration. In addition, as the object preview 138D-24 gradually expands, text showing the track list of the album represented by the selected icon 138D-04a" is displayed on the expanding object preview 138D-24. In some embodiments, the size of the text grows with the expanding icon, as shown in FIGS. 5D27-5D28. In some embodiments, when there is not enough space in the expanding object preview 138D-24 to show the entire track list, the track list is gradually rotated (e.g., scrolled) through the available space on the expanding object preview 138D-24, as shown in FIGS. 5D27-5D28. If the gesture is subsequently terminated before the contact intensity ever reached the light press intensity threshold $IT_L$, the user interface 138D-02" will revert to the initial display state S1 shown in FIG. 5D25.

FIG. 5D29 shows that the intensity of the contact has increased to the light press intensity threshold $IT_L$, and the track list of the album or playlist is fully displayed on the fully expanded object 138D-25 located at the center of the window 138D-02. In some embodiments, as shown in FIG. 5D29, the user interface 138D-02" has also completed the transition from the grid view to the cover-flow view, with the object 138D-25 as the center component of the cover-flow view, and transformed versions of two unselected icons 138D-04b" and 138D-04c" in the secondary positions. The display state shown in FIG. 5D29 is the augmented display state S2 of the user interface 138D-02".

FIG. 5D30-5D31 illustrate that, in some embodiments, once the user interface 138D-02" has transitioned into the augmented display state S2 (as shown in FIG. 5D29), the user interface 138D-02" remains in the augmented display state S2 even when the intensity of the contact subsequently drops to the contact detection intensity threshold $IT_0$ (as shown in FIG. 5D30) and eventually to zero (as shown in FIG. 5D31).

FIG. 5D32 is a diagram illustrating the changes in the intensity of the contact 138D-22 (as indicated by the solid line 138D-26), and the corresponding changes in the display states of the user interface 138D-02" over time. S1 represents the initial display state showing icons in a grid view. S1' represents the modified initial display state reflecting selection of the icon 138D-04a". I-a and I-b are representatives of a series of intermediate display states showing the transition from the grid view to a cover-flow view of the icons. In addition, I-a and I-b also shows a preview of the track list of an album or playlist represented by the selected icon 138D-04a". S2 is the augmented display state of the user interface 138D-02", showing the complete track list presented on a central component of the cover-flow view. An animation A1 shows the smooth transition from the initial display state S1 to the augmented display state S2. In some embodiments, in response to detecting a subsequent increase in intensity of contact 138D-22 above $IT_L$ followed by liftoff of contact 138D-22, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

FIGS. 5D33-5D42 illustrate a continuation of a scenario in which a first portion of a gesture has cause the user interface 138D-02' (also shown in FIGS. 5D17-5D23) to enter a first augmented display state S2. In the first portion of the gesture, a contact 138D-28 with a contact intensity reaching the light press intensity threshold $IT_L$ has been detected. In the first augmented display state S2 (shown in both FIG. 5D33 and FIG. 5D21), a selected icon 138D-04a' under the contact 138D-28 has been transformed into an object 138D-18, and presented as a center component in a cover-flow view of the user interface 138D-02'. The object shows a front cover image of an album or playlist represented by the selected icon 138D-04a'.

FIGS. 5D34-5D37 illustrates that, in some embodiments, after the user interface 138D-02' has reached the first augmented display state S2, if the second portion of the gesture includes further increases of the contact intensity beyond the light press intensity threshold $IT_L$, the device displays a series of additional intermediate display states between the first augmented display state S2 and a second augmented display state S3 (shown in FIG. 5D38). The series of additional intermediate display state (e.g., I-c, I-d, I-e, and I-f) shows the gradual rotation of the center object 138D-18 around a central axis (e.g., either a horizontal axis as shown in FIG. 5D34-5D37, or a vertical axis) in the plane of the object 138D-18. The second augmented display state S3 shows the reverse side of the center object 138D-18. As shown in FIGS. 5D37-5D38, the reverse side of the object 138D-18 displays the track list of the album or playlist represented by the selected icon 138D-04a'. In some embodiments, the rate of rotation of the object 138D-18 is selected based on the changes in the intensity of the contact 138D-28. If the intensity of the contact oscillate in the range between the light press intensity threshold $IT_L$ and the deep press intensity threshold $IT_D$, the object 138D-18 rotates forward and backward synchronously with the changing contact intensity.

FIG. 5D38 illustrates that, in some embodiments, when the intensity of the contact subsequently reaches the deep press intensity threshold $IT_D$, the reverse side of the object 138D-18 is shown front and center in the cover-flow view. The track list of the album or playlist represented by the selected icon 138D-04a' is presented on the reverse side of the object 138D-18. The user interface 138D-02' is now in the second augmented display state S3.

FIG. 5D39 shows that, in some embodiments, as the intensity of the contact continues to increase beyond the deep press intensity threshold $IT_D$, the device displays one or more squishiness display states (e.g., state I-g) of the user interface 138D-02'. In some embodiments, the squishiness display states show further rotation of the object 138D-18 in the same direction as before (e.g., the direction of rotation leading to the second augmented display state S3). When the contact intensity decreases in the range above the deep press intensity threshold $IT_D$, the object 138D-18 would rotate in the reverse direction (e.g., springs back) toward its position in the second augmented display state. In some embodiments, during the transition from the first augmented display state S2 to the second augmented display state S3, the rate of rotation is associated with the intensity of the contact 138D-18 by a first coefficient (e.g., a first torsion constant). In some embodiments, when displaying the squishiness display states, the rate of rotation is associated with the intensity of contact by a second coefficient (e.g., a second torsion constant). In some embodiments, the second coefficient is greater than the first coefficient. Thus, in some embodiments, a greater amount of change in contact intensity is required to rotate the object 138D-18 by a given amount in during the squishiness states than during the intermediate states between the augmented display states S2 and S3. In some embodiments, the second coefficient continues to diminish (e.g., at constant or growing rate) as the currently detected contact intensity increases. In such embodiments, a tolerance intensity threshold is set so that when the torsion intensity threshold is reached, the second coefficient is reduced to zero.

FIG. 5D40-5D41 illustrate that, in some embodiments, once the user interface 138D-02' has reached the second augmented display state S2, if the intensity of the contact subsequently drops below the deep press intensity threshold $IT_D$, the user interface 138D-02' will remain in the second augmented display state S3. FIG. 5D40 shows the user interface 138D-02' remaining in the second augmented display state S3 when the contact intensity has dropped to the contact detection intensity threshold $IT_0$. FIG. 5D41 shows the user interface 138D-02' remaining in the second augmented display state S3 when the contact intensity has dropped to zero.

FIG. 5D42 is a diagram illustrating the changes in intensity of the contact 138D-28 (as indicated by the solid line 138D-30), and the corresponding changes in the display states of the window 138D-02' over time. S1 represents the initial display state showing the unselected icons in a grid view. S1' represents the modified initial display state reflecting selection of the icon 138D-04a'. S2 is the first augmented display state of the user interface 138D-02', showing a transformed version (e.g., object 138D-18) of the selected icon 138D-04a' as the center component in a cover-flow view. I-a and I-b are representatives of a series of intermediate display states between the initial display state S1 and the first augmented display state S2. An animation A1 is presented to show the transitions between the initial display state S1 and the first augmented display state S2. Although a single gesture is shown by curve 138D-30, the part of the curve before S2 is, optionally, performed by a different gesture. I-c through I-f are additional intermediate display states between the first augmented display state S2 and the second augmented display state S3. The second augmented display state S3 shows the reversed side of the object 138D-18 displaying the track list of the album or play list represented by the selected icon 138D-04a'. Animation A2 shows the gradual rotation of the object 138D-18 in response to increasing contact intensity between the light press intensity threshold $IT_L$ and the deep press intensity threshold $IT_D$. I-g is a squishiness display state going beyond the second augmented display state. Animation A3 is used to present the squishiness display states beyond the second augmented display state S3. Animation A3 is a continuation of Animation A2, and animation A2 is a continuation of Animation A1. When the contact intensity drops to the deep press intensity threshold $IT_D$, the user interface 138D-02' returns to the second augmented display state S3, and remains in S3.

FIGS. 5E1-5E16 illustrate the visual feedback provided when a gesture is directed to a show/hide indicator (e.g., show/hide indicator 138E-04) in a user interface (e.g., window 138E-02). FIGS. 5E1-5E8 shows visual feedback provided in response to a gesture whose contact intensity never exceeded the light press intensity threshold $IT_L$. FIGS. 5E9-5E16 illustrate the visual feedback provided in response to another gesture whose contact intensity does exceed the light press intensity threshold $IT_L$ before the end-of-gesture is detected. The user interfaces in these figures are used to illustrate the processes described in this specification, including the processes in FIGS. 6A-6M.

The contrast between the feedbacks shown in FIGS. 5E1-5E8 and FIGS. 5E9-5E16 illustrate how a gesture on a show/hide indicator can cause a preview of the hidden text associated with the show/hide indicator without completing the operation to show the hidden text; and alternatively, how a gesture on the show/hide indicator can cause the preview of the hidden text to be present and eventually complete the operation to show the hidden text.

FIG. 5E1 illustrate an example user interface (e.g., window 138E-02) containing one or more selectable user interface elements (e.g., triangular show-hide indicators 138E-04 and 138E-10). The show-hide indicators 138E-04 and 138E-10 each have two configurations, one for showing its associated hidden text and the other for hiding its associated hidden text. As shown in FIG. 5E1, when the triangular show/hide indicator points to the right (e.g., as illustrated by the show/hide indicator 138E-04), its associated hidden text is hidden. In contrast, when the triangular show/hide indicator points downward (as illustrated by the show/hide indicator 138E-10), its associated hidden text is shown in a text presentation object (e.g., in a drop-down list or a text bubble). In various embodiments, the show/hide indicator optionally takes different forms. For example, in some embodiments, a show/hide indicator is a toggle button, and associated text (e.g., a tooltip, a list, a definition, a translation, or other snippet of information) is displayed in a pop-up text bubble or hidden depending on whether the toggle button is on or off. For another example, in some embodiments, a show/hide indicator is a plus/minus button ("+/−" button), and associated text is displayed in an expanded list or hidden depending on whether the button shows the plus sign or the minus sign. In FIGS. 5E1-5E16, the show/hide indicator is a triangular element, the hidden text is multiple text items (e.g., filenames) shown in a drop-down list.

FIG. 5E2 illustrates that, in some embodiments, a gesture has been detected, and the contact 138E-08 of the gesture is over the show/hide indicator 138-04 in its hide state (e.g., the state in which its associated hidden text is hidden). In some embodiments, no change is shown in the user interface 138E-02 at this point. In some embodiments, in response to the initial intensity of the contact reaching the contact detection intensity threshold $IT_0$, the device changes the appearance (e.g., transparency, size, color, etc.) of the show/hide indicator 138E-04 slightly to indicate the detection of the gesture.

FIGS. 5E3-5E4 illustrate that, in some embodiments, as the intensity of the contact continues to increase in a range from the contact detection intensity threshold $IT_0$ to the light press intensity threshold $IT_L$, the device presents a preview of the hidden text in response to the increasing contact intensity. The preview of the hidden text shows one or more text items in a gradually expanding drop-down list preview 138E-06 emerging from a location proximate to the show/hide indicator 138E-04. The amount of hidden text presented in the drop-down list preview 138E-06 corresponds to the currently detected contact intensity, as shown in FIGS. 5E3-5E4. In some embodiments, as shown in FIG. 5E4, when the gradually expanding drop-down list preview 138E-06 is about to obscure other items (e.g., a drop-down list 138E-12) in the user interface, the device rearranges these items (e.g., moves the drop-down list 138E-12 and associated show/hide indicator 138E-10) to make room for the gradually expanding drop-down list preview 138E-06.

FIG. 5E5 illustrates that, in some embodiments, in some embodiments, before the intensity of the contact ever reaches the light press intensity threshold $IT_L$, if the contact intensity decreases, the device reduces the amount of hidden text presented accordingly. The drop-down list preview 138E-06 is retracted back toward the show-hide indicator 138E-04.

In some embodiments, the device gradually rotates the triangular show/hide indicator from its hide state to its show state by an amount corresponding to the currently detect contact intensity when the contact intensity is below the light press intensity threshold $IT_L$. The rotating show/hide indicator would provide information to a user regarding how much more of the hidden text still remains hidden at any given time. The rotation of the triangular show/hide indicator would is suitable for device with a display separate from its touch-sensitive surface, where the view of the triangular show/hide indicator is not blocked by the contact 138E-08. In some embodiments, if the triangular show/hide indicator is likely to be blocked by the object (e.g., finger) making the contact 138E-08 on the touch screen 112, a floating dial is shown on the user interface to indicate how much more of the hidden text still remains hidden at any given time.

FIGS. 5E6-5E7 illustrate that, in some embodiments, when the intensity of the contact subsequently drops below the contact detection intensity threshold $IT_0$ (as shown in FIG. 5E6), and eventually to zero (as shown in FIG. 5E7), the device returns the user interface 138E-02 to its initial display state S1, so that the hidden text associated with the selected show/hide indicator 138E-04 is concealed from view again.

FIG. 5E8 is a diagram illustrating the changes in the intensity of the contact 138E-08 (as indicated by the solid line 138E-14), and the corresponding changes in the display states of the user interface 138E-02 over time. S1 represents the initial display state showing the show/hide indicator 138E-04 in the hide state. I-a, I-b, and I-c are representatives of a series of intermediate display states showing the preview of the hidden text associated with the show/hide indicator 138E-04. During the intermediate display states, the amount of hidden text presented in the user interface 138E-02 corresponds to the value of the currently detected contact intensity. The series of intermediate display states is shown in an animation A1 linking the initial display state S1 and the augmented display state (not reached in FIGS. 5E1-5E7). As will be shown later, the augmented display state shows some or all of the hidden text associated with the selected show/hide indicator 138E-04 in a steady state. In some embodiments, the rate of change in the animation corresponds to the rate of change in the contact intensity. In some embodiments, the rate of change in the animation slows down when the contact intensity approaches the light press intensity threshold $IT_L$.

FIGS. 5E9-5E16 illustrate an alternative scenario in which the intensity of the contact does exceed the light press intensity threshold $IT_L$ before the end of gesture is detected. In this alternative scenario, the device presents the augmented display state S2 showing some or all of the hidden text associated with the selected show/hide indicator 138E-04, and the user interface 138E-02 remains in the augmented display state S2 when the device detects the end of the gesture.

As shown in FIGS. 5E9-5E10, a gesture (with a contact 138E-16) directed to the show/hide indicator 138E-04 is detected. In FIG. 5E11, as the intensity of the contact continues to increase from the contact detection intensity threshold $IT_0$ toward the light press intensity threshold $IT_L$, the device displays more and more of the hidden text associated with the selected show/hide indicator 138E-04 in a drop-down list preview 138E-06. In some embodiments, the device also rearranges other items in the user interface 138E-02 to make room for the expanding drop-down list preview 138E-06, as shown in FIGS. 5E11-5E12.

FIG. 5E12 illustrates that, in some embodiments, when the intensity of the contact reaches the light press intensity threshold $IT_L$, the device displays all of the hidden text (e.g., all 6 items) associated with the selected show/hide indicator 138E-04 in a fully expanded drop-down list 138E-07 (although, in some circumstances only some of the hidden text is displayed). In some embodiments, a haptic feedback is provided on the touch-sensitive surface of the touch screen 112 to indicate that the augmented display state S2 of the user interface 138E-02 has been reached. In some embodiments, the animation showing the expansion of the drop-down list 138E-06 is paused briefly right before the fully expanded list 138E-07 is displayed to indicate the entry into the augmented display state S2. In some embodiments, an audio signal is played to indicate the entry into the augmented display state S2.

In some embodiments, when the contact intensity has reached the light press intensity threshold $IT_L$, the show/hide indicator 138E-04 is completely rotated such that it now points downward (e.g., in its "show" state). In some embodiments, if a floating dial was presented while the contact intensity is approaching the light press intensity threshold $IT_L$, the device removes the floating dial from the user interface 138E-02 once the user interface has entered the augmented display state S2.

FIG. 5E13 shows that, in some embodiments, subsequent increase of the contact intensity beyond the light press intensity threshold $IT_L$ leads to no further visual feedback in the user interface 138E-02. In some embodiments similar to those shown in FIG. 5E13, subsequent increase in intensity of the contact will cause the device to display one or more squishiness display states. For example, in some embodiments, in response to continued changes (e.g., increases and decreases) in the contact intensity above the light press intensity threshold $IT_L$, the device shows slight flexing (e.g., expansions and contractions) of the drop-down list 138E-07 without changing the amount of hidden text shown in the drop-down list 138E-07.

FIGS. 5E14-5E15 illustrate that, in some embodiments, after the device has caused the user interface 138E-02 to enter the augmented display state S2 in response to the contact intensity reaching the light press intensity threshold $IT_L$, the user interface 138E-02 remains in the augmented display state S2 with drop down list 138E-07 displayed, even after the intensity of the contact subsequently drops below the contact detection intensity threshold $IT_0$ (as shown in FIG. 5E14) and eventually to zero (as shown in FIG. 5E15).

In some embodiments similar to those described above with reference to FIGS. 5E14-5E15, while the user interface 138E-02 is in the augmented display state S2 (e.g., showing all the hidden text associated with the show/hide indicator 138D-04), a subsequent gesture (e.g., a tap gesture) on the show/hide indicator or the drop-down list 138D-07 will cause the show/hide indicator 138D-04 to return to the hide state and removal of the drop-down list 138D-07 from the user interface 138E-02.

In some embodiments, while the user interface 138E-02 is in the augmented display state S2, if the intensity of the same contact 138E-16 increases to the deep press intensity threshold, the device will return the show/hide indicator 138E-04 to its hide state and return the user interface to the initial display state S1 again.

FIG. 5E16 is a diagram illustrating the changes in the intensity of the contact 138E-16 (as indicated by the solid line 138E-18), and the corresponding changes in the display states of the user interface 138E-02 over time. S1 represents the initial display state showing the show/hide indicator 138E-04 in the hide state. S2 represents the augmented display state showing all of the hidden text associated with the selected show/hide indicator 138E-04. I-a is a representative of a series of intermediate display states showing the preview of the hidden text, where the amount of hidden text presented in the user interface 138E-02 corresponds to the value of the currently detected contact intensity. The series of intermediate display states is shown in an animation A1 linking the initial display state S1 and the augmented display state S2. Once the user interface 138E-02 enters the augmented display state S2, it remains in the augmented display state S2, regardless of the subsequent values of the contact intensity. In some embodiments, in response to detecting a subsequent increase in intensity of contact 138E-16 above $IT_L$ followed by liftoff of contact 138E-16, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

FIGS. 5F1-5F10 illustrate the visual feedback provided in response to a gesture directed to an icon associated with a plurality of documents or objects, where the intensity of the contact never exceeded the light press intensity threshold $IT_L$. FIGS. 5F11-5F22 illustrate the visual feedback provided in response to another gesture directed to the same icon, where the intensity of the contact does exceed the light press intensity threshold $IT_L$ before the end-of-gesture is detected. In addition, FIGS. 5F11-5F22 also illustrate the visual feedback provided in response to continued increase of contact intensity beyond the light press intensity threshold $IT_L$ and a tolerance intensity threshold $IT_T$. The user interfaces in these figures are used to illustrate the processes described in this specification, including the processes in FIGS. 6A-6M.

FIG. 5F1 illustrates a user interface (e.g., desktop 138F-02) containing a plurality of user interface elements (e.g., selectable icons 138F-04a through 138F-04d). The selectable icons 138F-04 each represent either an application or a folder. For example, the icon 138F-04a represents a folder containing one or more folder items (e.g., documents or images). The icon 138F-04d represents a document viewing/editing application associated with a set of documents (e.g., open documents, recent documents, or favorite document, etc.). The icons 138F-04b and 138F-04c each represent a document playing/editing application associated with a set of documents (e.g., open documents, recent documents, or favorite document). In general, when the icons 138F-04a through 138F-04d are clicked in some user interfaces, the device performs an operation to open the associated application or folder. FIG. 5F1 shows that desktop 138F-02 in an initial display state S1 in which all of the icons 138F-04a through 138F-04d resides in a dock, and none of the icons are currently selected.

FIG. 5F2 illustrate that, in some embodiments, when the device detects a gesture, and the contact 138F-08 of the gesture is over the icon 138F-04d (e.g., an application icon), the device displays a modified initial state S1' of the user interface 138F-02 indicating selection of the icon 138F-04d. For example, as shown in FIG. 5F2, the device highlights the selected icon 138F-04d in response to detecting the contact 138F-08.

FIGS. 5F3-5F6 illustrates that, in some embodiments, when the intensity of the contact continues to increase within a range between the contact detection intensity threshold $IT_0$ and the light press intensity threshold $IT_L$, the device presents a series of intermediate display states in which reduced-scale representations of the user interface objects associated with the selected icon 138F-04d are presented.

Specifically, in this example, the user interface objects associated with the application icon 138F-04d are a set of selectable document icons or selectable document previews for a collection of documents associated with the application. In some embodiments, the collection of documents include all or a subset of all documents currently open in the application, all or a subset of all previously open documents in the application, or all or a subset of all favorite documents for the application. The reduced-scaled representations of the set of selectable document icons or document previews are a set of preview icons (e.g., preview icons 138F-06a through 138F-06d). In some embodiments, before the contact reaches the light press intensity threshold $IT_L$, the additional icons are not selectable (e.g., the additional icons do not respond to selection inputs from the user). The appearance of the preview icons differs from the selectable document icons or previews they represent in various aspects (e.g., structure, color, size, opacity, etc.)

In the series of intermediate display states (e.g., the intermediate display states I-a, I-c, and I-c shown in FIGS. 5F3-5F6), the device shows the preview icons 138F-06a to 138F-06d gradually fly out in a sequence from the selected application icon 138F-04d. The preview icons 138F-06a to 138F-06d gradually spread out according to a predetermined arrangement in the user interface 138F-02. In some embodiments, the preview icons 138F-06a through 138F-04d moves along a trajectory. In some embodiments, the preview icons 138F-06a through 138F-04d move as if they were connected by a plurality of springs. In some embodiments, the movement (e.g., as reflected by one or more of speed, direction, current location, and acceleration, etc.) of the preview icons 138F-06a through 138F-06d is associated with the currently detected contact intensity as if a force dragging preview icons across the user interface 138F-02 is based on the contact intensity value of contact 138F-08. FIG. 5F5 also illustrates that, in some embodiments, when the contact intensity increases, the appearance of the preview icons 138F-06a through 138F-06d optionally also change. For example, FIG. 5F5 shows filename labels of the documents gradually sliding out of the preview icons 138F-06a through 138F-06d. In some embodiments, the appearance of the preview icons 138F-06a through 138F-06d gradually approaches the appearance of the selectable document icons or document previews they represent, as the intensity of the contact approaches the light press intensity threshold $IT_L$.

FIGS. 5F6-5F7 illustrate that, in some embodiments, before the intensity of the contact ever reached the light press intensity threshold $IT_L$, if the contact intensity decreases again, the device shows the preview icons 138F-06a 138F-06d gradually being pulled back toward the selected application icon 138F-04a along their, respective, original trajectories (or a different trajectory). The filename labels shown on the preview icons 138F-06a through 138F-06d are also gradually retracted back into the preview icons 138F-06a through 138F-06d.

FIGS. 5F8-5F9 illustrate that, in some embodiments, since the intensity of the contact never reached the light press intensity threshold $IT_L$, when the intensity of the contact subsequently drops below the contact detection intensity threshold $IT_0$ (as shown in FIG. 5F8) and eventually to zero (as shown in FIG. 5F9), the device displays the desktop 138F-02 in its initial display state S1. The desktop 138F-02 shows the unselected icons 138F-04a through 138F-04d on the desktop 138F-02 again without displaying any associated objects.

FIG. 5F10 is a diagram illustrating the changes in the intensity of the contact 138F-08 (as indicated by the solid line 138F-10), and the corresponding changes in the display states of the user interface over time. S1 represents the initial display state showing unselected icons 138F-04a through 138F-04d. S1' represents the modified initial display state reflecting selection of the application icon 138F-04d. I-a, I-b and I-c are representatives of a series of intermediate display states showing a preview of a collection of selectable document icons (or selectable document previews) associated with selected application icon 138F-04d. The preview of the selectable document icons (or selectable document previews) includes gradual spreading out of a set of preview representations of the selectable document icons (or document previews) along a trajectory originating from the selected application icon 138F-04d. The series of intermediate display states is shown in an animation A1 linking the initial display state S1 and an augmented display state S2 (not reached in FIGS. 5F1-5F9), where the augmented display state S2 shows the collection of selectable document icons (or document previews) associated with the selected application icon 138F-04d. Since the intensity of the contact never reaches the light press intensity threshold $IT_L$, the user interface 138F-02 returns to the initial display state S1 when the end of the gesture is detected.

FIGS. 5F11-5F22 illustrate an alternative scenario to that shown in FIGS. 5F1-5F10. In the scenario shown in FIGS. 5F11-5F22, the intensity of the contact does reach the light press intensity threshold $IT_L$ before the end of gesture is detected. As a result, the desktop 138F-02 enters the augmented display state S2 in which the preview document icons 138F-06a through 138F-06d have been fully spread out on the user interface 138F-02 and have transformed into respective selectable document icons (or document previews) associated with the selected application icon 138F-04. In addition, the desktop 138F-02 remains in this state after the end of gesture is detected.

In addition, FIGS. 5F11-5F22 also illustrate the implementation of a tolerance intensity threshold $IT_T$ above the light press intensity threshold $IT_L$. When the intensity of the contact changes (e.g., increases or decreases) in the range between the light press intensity threshold $IT_L$ and the tolerance intensity threshold $IT_T$, the device displays a series of squishiness display states. The squishiness display states represent further changes in the user interface 138F-02 in response to the changes in the contact intensity. The further changes are typically a continuation of the changes the user interface went through right before reaching the augmented display state. In addition, when the contact intensity reaches the tolerance intensity threshold $IT_T$ and above, the device displays a non-steady terminal display state (e.g., the final squishiness display state), and no longer responds to further increases in the contact intensity.

As shown in FIGS. 5F11-5F12, when the device detects a gesture with a contact 138F-12 over the application icon 138F-04d, the device changes the appearance of the selected application icon 138F-04d to indicate its selection.

FIGS. 5F13-5F14 illustrate that, in some embodiments, when the intensity of the contact increases to a value below the light press intensity threshold $IT_L$, the device displays an animation showing the collection of preview icons 138F-06a through 138F-06d gradually flying out of the selected application icon 138F-04d along a trajectory on the desktop 138F-02. Filename labels of the preview icons also gradually emerge from the preview icons 138F-06a through 138F-06d with increasing contact intensity. This is the same behavior as shown in FIGS. 5F1-5F5 above.

FIG. 5F15 illustrates that, in some embodiments, as the intensity of the contact continues to increase and reaches the light press intensity threshold $IT_L$, the desktop 138F-02 enters the augmented display state S2. Specifically, in the augmented display state S2, the previously preview icons 138F-06a through 138F-06d have been fully spread out along a trajectory according to a predetermined arrangement (e.g., along a straight line). In addition, the previously preview icons 138F-06a through 138F-06d have completed their transformation into respective selectable document icons (or document previews) they previously represented (e.g., during the intermediate display states). In some embodiments, the device provides some changes in the appearance of the now selectable icons 138F-06a through 138F-06d, such as making them appear more solid or opaque as compared to their appearance in the preview). Subsequent selection of each of the now selectable icons 138F-06a through 138F-06d will cause the device to open a corresponding document in the application represented by the application icon 138F-04. In some embodiments, if the user were to terminate the gesture now, the desktop 138F-02 will remain in the augmented display state S2 shown in FIG. 5F15, and the icons 138F-06a through 138F-06d will remain spread out and selectable.

FIG. 5F16 illustrates that, in some embodiments, when the intensity of the contact continues to increase beyond the light press intensity threshold $IT_L$, the device displays one or more squishiness display states to reflect the changes in the contact intensity. In some embodiments, the squishiness display state provides the appearance of some physical characteristics that are affected by the changes in the contact intensity above the light press intensity threshold $IT_L$. In this example, the icons 138F-06a through 138F-06d continues to spread out a little further along their previous trajectories, but at a much slower rate, in response to the increasing contact intensity above $IT_L$. The icons 138F-06a through 138F-06d appear to be held together with very stiff springs and moves in response to the changes (increases or decreases) in the contact intensity, as if the contact intensity corresponded to a force pulling on the icons.

FIG. 5F17 illustrates that, in some embodiments, when the contact intensity reaches to and beyond the tolerance intensity threshold $IT_T$, no further changes is provided in the desktop 138F-02. The icons 138F-06a through 138F-06d remain at their respective extreme positions that they arrived at right before the contact intensity reached the tolerance intensity threshold $IT_T$.

FIG. 5F18 illustrates that, in some embodiments, when the intensity of the contact drops to a range below the tolerance intensity threshold $IT_T$ but above the light press intensity threshold $IT_L$, the device displays the squishiness display states again according to the currently detected contact intensity. In the animation showing the squishiness display states, the icons 138F-06a through 138F-06d retreat along their previous trajectories slightly in response to the decreasing contact intensity, until the icons return to their respective positions in the augmented display state S2 again.

FIG. 5F19 illustrates that, in some embodiments when the contact intensity drops to the light press intensity threshold $IT_L$ again, the icons 138F-06a through 138F-06d are back to their respective positions in the augmented display state S2 of the user interface 138F-12. In some embodiments, in the squishiness display states, the device also changes the appearance of the icons 138F-06a through 138F-06d to indicate that the icons are not selectable in the squishiness display states. If the appearances of the icons 138F-06a through 138F-06d had been changed in the squishiness display states, the changes are reverted when the desktop returns to the augmented display state S2 again.

FIGS. 5F20-5F21 illustrate that, in some embodiments, since the intensity of the contact has previously reached the light press intensity threshold $IT_L$, when the contact intensity drops below the contact detection intensity threshold $IT_0$ (as shown in FIG. 5F20) and eventually to zero (as shown in FIG. 5F21), the device continues to display the desktop 138F-02 in the augmented display state S2. In the augmented display state S2, the icons (formerly 138F-06a through 138F-06d are fully spread out on the desktop 138F-02 in a predetermined arrangement and individually selectable and thus are now selectable user interface objects 138F-07a through 138F-07d.

FIG. 5F22 is a diagram illustrating the changes in the intensity of the contact 138F-12 (as indicated by the solid line 138F-112), and the corresponding changes in the display states of the desktop 138F-02 over time. S1 represents the initial display state showing unselected icons 138F-04a through 138F-04d. S1' represents the modified initial display state reflecting selection of the application icon 138F-04d. I-b and I-c are representatives of a series of intermediate display states showing the transition from the initial display state S1 and the augmented display state S2. The augmented display state S2 shows the icons 138F-06a through 138F-06d fully spread out according to a predetermined arrangement and individually selectable. The intermediate display states are presented in an animation A1. During the animation A1, the icons 138F-06a through 138F-06d are preview. I-c is a squishiness display state showing a transition between the augmented display state S2 and a non-steady terminal display state S3. The squishiness display states are presented in an animation A2 (and a reverse animation A2'). The animation A2 is a continuation of the animation A1 leading to the augmented display state S2. The desktop 138F-02 remains in the terminal display state S3 while the contact intensity is above the tolerance intensity threshold $IT_T$. Since the intensity of the contact does reach the light press intensity threshold $IT_L$ before the end-of-gesture is detected, the desktop 138F-02 returns to the augmented display state S2 and remains in S2 after the contact intensity drops below the light press intensity threshold $IT_L$. In some embodiments, in response to detecting a subsequent increase in intensity of contact 138F-12 above $IT_L$ followed by liftoff of contact 138F-12, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

Although the description of FIGS. 5F1-5F22 is focused on the feedback provided when an application icon (e.g., the application icon 138F-04d) is invoked by a gesture, it should be recognized that analogous visual feedback will be provided when a different icon (e.g., the folder icon 138F-04a) is invoked by a gesture in a similar manner. For example, for a selected folder icon 138F-04a, the collection of objects associated with the folder icon 138F-04a are selectable icons of folder items in a folder represented by the folder icon 138F-04a, and the reduced-scale representations of the selectable icons of folder items are preview icons that appear different from the selectable icons.

FIGS. 5G1-5G18 illustrate the visual feedback provided in response to gestures directed to a plurality of overlapping objects (e.g., images 138G-04a through 138G-04d) in an example user interface (e.g., an application window 138G-02).

FIGS. 5G1-5G6 illustrate the plurality of overlapping objects (e.g., the overlapping images 138G-04a through 138G-04d) being partially spread out (e.g., at least some of the objects are still overlapping) in the application window 138G-02 in response to a gesture whose contact intensity never exceeded the light press intensity threshold $IT_L$. FIGS. 5G7-5G18 illustrate the same plurality of overlapping objects being completely spread out (e.g., no two objects are still overlapping) in response to another gesture whose contact intensity does exceed the light press intensity threshold $IT_L$ before the end-of-gesture is detected. In addition, FIGS. 5FG-5G18 also illustrate the plurality of objects being further spread out slightly in response to continued increase of contact intensity beyond the light press intensity threshold $IT_L$. When the contact intensity further increases beyond the tolerance intensity threshold $IT_T$, the device presents a non-steady terminal display state and provides no further visual feedback until the contact intensity drops below the tolerance intensity threshold again. The user interfaces in these figures are used to illustrate the processes described in this specification, including the processes in FIGS. 6A-6M.

As shown in FIG. 5G1, the device presents a slide 138G-06 containing a plurality of images 138G-04a through 138G-04d in an application window 138G-02. The plurality of images 138G-04a through 138G-04d overlap with one another, and at least some objects obscure the view of other objects. In FIG. 5G1, no gesture has been detected on the user interface 138F-02.

FIG. 5G2 illustrate that, in some embodiments, when the device detects a gesture with a contact 138F-08 over the slide 138G-06, and the intensity of the contact gradually increases above the contact detection intensity threshold $IT_0$, the device shows the plurality of overlapping images 138G-04a through 138G-04d gradually spreading out from one another. As shown in FIG. 5G2, the plurality of overlapping images 138G-04a through 138G-04d have gradually moved away from their original positions (e.g., as indicated by the shaded areas), and at least some of the previously overlapping images (e.g., the pair of images 138G-04a and 138G-04b, the pair of images 138G-04c and 138G-04b, and the pair of objects 138G-04c and 138G-04d) are no longer overlapping. However, at least some of the previously overlapping images (e.g., the pair of objects 138G-04b and 138G-04d) are still overlapping, albeit to a lesser extent. In some embodiments, the shaded areas indicating the original positions of the images are not shown in the slide 138F-06.

FIGS. 5G3-5G4 illustrate that, in some embodiments, when the device detects increases (e.g., as shown in FIG. 5G3) or decreases (as shown in FIG. 5G4) of the contact intensity in the range below the light press intensity threshold $IT_L$, the device further spread out the plurality of images 138G-04a through 138G-04d (e.g., as shown in FIG. 5G3) or restores the plurality of images 138G-04a through 138G-04d toward their original positions (e.g., as shown in FIG. 5G4) according to the changes in the detected contact intensity.

FIG. 5G5 illustrates that, in some embodiments, the device restores the plurality of objects 138G-106a-d to their original positions (e.g., overlapping with one another), when the intensity of the contact subsequently drops below the contact detection intensity threshold $IT_0$ (as shown in FIG. 5G5) and eventually to zero. At the end of the gesture, the device returns the window 138G-02 to its initial display state S1.

FIG. 5G6 is a diagram illustrating the changes in the intensity of the contact 138G-08 (as indicated by the solid line 138G-10), and the corresponding changes in the display states of the user interface 138G-02 over time. S1 represents the initial display state showing the plurality of images 138G-04a through 138G-04d overlapping with one another. I-a and I-b are representatives of a series of intermediate display states showing the relative distances of the plurality of objects increase or decrease in accordance with the increase or decrease of the contact intensity. In at least some of the intermediate display states, some of the previously overlapping objects no longer overlap, while some other previously overlapping objects are still overlapping. In this scenario, the contact intensity never reaches the light press intensity threshold $IT_L$, and the user interface 138G-02 never enters the augmented display state in which the plurality of images have spread out to and remain in a completely non-overlapping configuration. The series of intermediate display states are shown in an animation A1. Since the intensity of the contact never reaches the light press intensity threshold $IT_L$, the user interface 138G-02 returns to the initial display state S1 when the end of the gesture is detected.

FIGS. 5G7-5G18 illustrate an alternative scenario to that shown in FIGS. 5G1-5G7. In the scenario shown in FIGS. 5G7-5G18, the intensity of the contact does reach the light press intensity threshold $IT_L$ before the end of gesture is detected. As a result, the user interface 138G-02 enters an augmented display state in which all of the previously overlapping images 138G-04a through 138G-04d in the slide 138G-04 are fully spread out and no longer overlapping. In addition, the plurality of images 138G-04a through 138G-04d remain in this completely non-overlapping configuration after the end-of-gesture is detected. In addition to the augmented display state, FIGS. 5G7-5G18 also illustrate the implementation of a tolerance intensity threshold $IT_T$ and a plurality of squishiness display states displayed when the contact intensity increases to a level above the light press intensity threshold $IT_L$.

As shown in FIGS. 5G7-5G9, when the device detects a gesture with a contact 138G-12 over the slide 138G-06, and the intensity of the contact increases in a range above the contact detection intensity threshold $IT_0$ and below the light press intensity threshold $IT_L$, the device displays the gradual spreading out of the plurality of overlapping images 138G-04a through 138G-04d shown in the slide 138G-06. This behavior is the same as that shown in FIGS. 5G1-5G3 above.

In FIG. 5G10, the device detects that the intensity of the contact has increased to the light press intensity threshold $IT_L$. In response to such detection, the device shows the plurality of overlapping objects completely spread out and laid out in a completely non-overlapping configuration. In some embodiments, if there is not enough space in the slide 138G-02 to show all of the images 138G-04a through 138G-04d in a completely non-overlapping configuration, the device shrinks the plurality of images such that they are, optionally, arranged in a completely non-overlapping configuration. FIG. 5G10 shows that the user interface 138G-02 has reached its augmented display state S2. Although FIGS. 5G7-5G10 shows the plurality of images spreading out from their original positions in a radiating fashion, in various embodiments, the device optionally rearranges the plurality of objects in other configurations (e.g., arranged in a grid view or in a ring) such that they no longer overlap. In some embodiments, the device selects the most suitable configuration to display the plurality of images 138G7-5G10 in a completely non-overlapping fashion in the slide 138G-06 as the augmented display state S2 for the user interface 138G-02. Once such a configuration has been determined, the device selects the intermediate display states (e.g., state I-a and I-b shown in FIGS. 5G8-5G9) for the user interface 138G-02 based on the relative magnitude between the currently detected contact intensity and the light press intensity threshold $IT_L$.

FIG. 5G11 shows that, in some embodiments, when the device detects further increases of the contact intensity above the light press intensity threshold $IT_L$, the device displays the user interface 138G-02 in a series of squishiness display states (e.g., state I-c). In the squishiness display states, the plurality of images 138G-04a through 138G-04d are further spread out from their respective positions in the augmented display state S2 (shown in FIG. 5G10) toward the edge of the display area containing the slide 138G-06. In some embodiments, the amount of further spreading corresponds to the amount that the currently detected contact intensity is above the light press intensity threshold $IT_L$. The animation showing the squishiness display states is a continuation of the animation leading to the augmented display state S2.

FIG. 5G12 illustrates that, in some embodiments, when the device detects that the intensity of the contact has increased to the tolerance intensity threshold $IT_T$, the device displays the user interface 138G-02 in a non-steady terminal display state S3. In the terminal display state S3, the plurality of images have been spread out to an extreme position (e.g., at least one of the images 138G-04a through 138G-04d has reached the edge of the display area containing the slide 138G-06.

FIG. 5G13 shows that, in some embodiments, further increases of the contact intensity beyond the tolerance intensity threshold $IT_T$ will not cause the device to provide further visual feedback in the user interface 138G-02. Thus, in some embodiments, the user interface 138G-02 remains in the terminal display state S3 for all contact intensity above the tolerance intensity threshold $IT_T$.

FIG. 5G14 shows that, in some embodiments, once the contact intensity drops back to a range between the tolerance intensity threshold $IT_T$ and the light press intensity threshold $IT_L$, the device displays the user interface in the squishiness display states again, and shows the plurality of images being retracted from their extreme positions toward their fully spread out positions in the augmented display state S2.

FIG. 5G15 illustrates that, in some embodiments, when the intensity of the contact drops back to the light press intensity threshold $IT_L$ again, the user interface 138G-02 returns to the augmented display state S2 again, and the plurality of images 138G-04a through 138G-04d return to the previous configuration in which they no longer overlap.

138G16-5G17 illustrate that, in some embodiments, when the intensity of the contact subsequently drops to the contact detection intensity threshold $IT_0$ (as shown in FIG. 5G16), and eventually to zero (as shown in FIG. 5G17), the device maintains the user interface 138G-02 in the augmented display state S2 (e.g., showing all of the images in the slide 138G-06 in a completely non-overlapping configuration).

FIG. 5G18 is a diagram illustrating the changes in the intensity of the contact 138G-12 (as indicated by the solid line 138G-14), and the corresponding changes in the display states of the user interface 138G-02 over time. S1 represents the initial display state showing the plurality of images 138G-06a through 138G-04d overlapping with one another. I-a and I-b are representatives of a series of intermediate display states showing the relative distances of the plurality of images increasing in accordance with the currently detected contact intensity. In this scenario, the contact intensity reaches the light press intensity threshold $IT_L$, and the user interface 138G-02 enters the augmented display state S2. In the augmented display state S2, the plurality of images are placed in a completely non-overlapping configuration. The series of intermediate display states between the initial display states S1 and the augmented display state S2 are shown in a continuous animation A1. Subsequent increase of the contact intensity beyond the light press intensity threshold $IT_L$ causes a series of squishiness display states (including I-c) to be presented. The series of squishiness display states are intermediate display states between the augmented display state S2 and a terminal display state S3. The series of squishiness display states are presented in an animation A2. Animation A2 is a continuation of the animation A1. The user interface 138G-02 stays in the terminal display state S3 when the contact intensity is above the tolerance intensity threshold $IT_T$. When the contact intensity drops from the tolerance intensity threshold $IT_T$ to the light press intensity threshold $IT_L$ again, a reverse animation A3 including the squishiness state I-c is presented. Since the intensity of the contact has previously reached the light press intensity threshold $IT_L$, the user interface returns to the augmented display state S2 and remains in the state S2, when the contact intensity drops below the light press intensity threshold $IT_L$ and eventually to zero. In some embodiments, in response to detecting a subsequent increase in intensity of contact 138G-12 above $IT_L$ followed by liftoff of contact 138G-12, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

FIGS. 5H1-5H21 illustrate a process to use a gesture to highlight a particular portion of a slide shown in a presentation mode. Particularly, FIGS. 5H1-5H12 illustrate that, in some embodiments, before the intensity of the contact reaches the light press intensity threshold $IT_L$, a spotlight highlights a portion of the slide to a moderate amount in accordance with the magnitude of the currently detected contact intensity. The spotlight is removed when the gesture is terminated. FIGS. 5H13-5H21 illustrate that, in some embodiments, when the intensity of the contact does reach the light press intensity threshold $IT_L$, the device displays the slide in an augmented display state in which the spotlight highlights a portion of the slide to an enhanced degree. The device also maintains the slide in the augmented display state even after the contact intensity drops below the light press intensity threshold $IT_L$. In the examples described in FIGS. 5H1-5H21, the contact of the gesture can be moved to different locations on a touch-sensitive surface 451 separate from a display 450, such that the spotlight moves to highlight different portions of the slide accordingly. FIGS. 5H13-5H21 also illustrates some squishiness display states displayed when the contact intensity reaches above the light press intensity threshold $IT_L$. The user interfaces in these figures are used to illustrate the processes described in this specification, including the processes in FIGS. 6A-6M.

In FIG. 5H1, a user interface 138H-02 is provided on a display 450, and shows a window of a presentation application in an editing mode. The window contains a slide 138H-05. Separate from the display 450 is a touch-sensitive surface 451 coupled to the display 450. Movement of a contact detected on the touch-sensitive surface 451 can cause a focus selector (e.g., cursor 138H-09) to move from location to location on the user interface shown in the display 450 accordingly.

When the device detects that a contact 138H-07 on the touch-sensitive surface 451 is directed to the user interface element 138H-05 for selecting the presentation mode for the application, and its contact intensity exceeds the light press intensity threshold $IT_L$ (or optionally upon a reduction in intensity of contact 138H-07 below $IT_L$ or a hysteresis intensity threshold associated with $IT_L$ or in response to liftoff of contact 138H-07), the device responds by changing the user interface 138H-02 from the editing mode shown in FIG. 5H1 to the presentation mode shown in 138H2.

As shown in FIG. 5H2, the user interface 138H-02 shows the slide 138H-05 in the presentation mode (e.g., shown in full-screen mode). When in the full-screen mode, the cursor 138H-09 is no longer displayed on the user interface 138H-02. As shown in FIG. 5H2, the slide 138H-05 contains various components (e.g., text components 138H-04a through 138H-04c, and image components 138H-04d through 138H-04g) in their respective positions. FIG. 5H2 also shows that the previous gesture has been terminated, and no new gesture has yet been received on the touch-sensitive surface 451. The user interface 138H-02 is in its initial display state S1 before the next gesture is detected.

FIG. 5H3 illustrates that, in some embodiments, a new gesture performed with a contact 138H-08 is detected on the touch-sensitive surface 451. In response to detecting the contact 138H-08, the device displays a small spotlight 138H-06 on the user interface 138H-02 in accordance with the initial contact intensity of the new gesture. In some embodiments, the device selects an unoccupied location on the slide 138H-05 to display the spotlight 138H-06. If the intensity of the contact 138H-08 increases while the contact 138H-08 is maintained at the same location on the touch-sensitive surface, the size and/or brightness of the spotlight optionally increase according to the increased contact intensity. In some embodiments, the spotlight 138H-06 also serves as a focus selector for the user interface 138H-02 in the presentation mode.

FIG. 5H4 shows that the contact 138H-08 has moved from its initial location on the touch-sensitive surface 451 to a new location. In response, the device moves the spotlight 138H-06 from its original location to a new location on the user interface 138H-02. The new location of the spotlight 138H-06 on the user interface 138H-02 corresponds to the new location of the contact 138H-08 on the touch-sensitive surface 451. As shown in FIG. 5H4, the spotlight 138H-06 has moved over the text component 138H-04c. In addition, the intensity of the contact 138H-08 has also increased from its initial value. In response to the increased contact intensity, the device increases the size and/or brightness of the spotlight 138H-06 according to the magnitude of the currently detected contact intensity. At its present size, the spotlight enhances the portion of the text component 138H-04c within the spotlight 138H-06 without enhancing other portions of the text component that are not within spotlight 138H-06.

FIG. 5H5 shows that, in some embodiments, as the intensity of the contact over the text component 138H-04c continues to increase, the size and/or brightness of the spotlight over the text component 138H-04c also continues to increase. As a result, the text component 138H-04c is visually emphasized to an increasingly greater degree.

FIG. 5H6 shows that, the contact 138H-08 is moved to yet another location on the touch-sensitive surface 451, and as a result, the spotlight 138H-06 moves to a location over a different text component 138H-04b. The intensity of the contact 138H-08 has not changed from its previous value after this move. Therefore, the spotlight 138H-06 has the same size and/or brightness as previously shown in FIG. 5H5.

FIG. 5H7 shows that, the spotlight 138H-06 has moved from its location over the text component 138H-04b to a new location over the image component 138H-04g, in accordance with the movement of the contact 138H-08 on the touch-sensitive surface 451. During the movement of the contact 138H-08, the contact intensity has also been reduced. As shown in FIG. 5H7, the spotlight 138H-06 highlights the image component 138H-04g to a less degree as that shown in FIGS. 5H5 and 5H6. The size and/or brightness of the spotlight 138H-06 has been reduced according to the reduction of the contact intensity.

FIG. 5H7 also shows that, in some embodiments, when the size of the spotlight 138H-06 is big enough to include the entire object under the spotlight 138H-06, the device presents the object in the spotlight 138H-06 as if it is floating above the surface of the slide 138H-05. For example, as shown in FIG. 5H7, the image 138H-04g fits entirely within the spotlight 138H-06, and appears to be lifted off of the surface of the slide 138H-05 away from the other images on the slide 138H-05. In some embodiments, the device also shows the image rotating slowly within the spotlight 138H-06.

FIG. 5H8 shows that, in some embodiments, when the intensity of the contact 138H-08 continues to increase toward the light press contact intensity $IT_L$, the spotlight 138H-06 further highlights and enhances the appearance of the image 138H-04g to an increasing degree. In some embodiments, the device changes various characteristics (e.g., saturation, opacity, color, hue, border width, etc.) of the image itself to visually enhance it further. In some embodiments, the size of the spotlight 138H-06 is maintained after it has reached a predetermined maximum size, and the spotlight 138H-06 continues to increase the level of visual enhancement for the object under the spotlight 138H-06 through other means, such as color, hue, brightness, animation effects, etc., before the light press intensity threshold $IT_L$ is reached.

FIGS. 5H9-5H10 show that when the intensity of the contact 138H-08 subsequently drops close to the contact detection intensity threshold $IT_0$, the spotlight 138H-06 diminishes in size and brightness, and the image component 138H-04g under the spotlight is only minimally highlighted by the spotlight. When the contact intensity is at the contact detection intensity threshold $IT_0$, the spotlight 138H-06 returns to its initial size and brightness as shown in FIG. 5H3.

FIG. 5H11 shows that, in some embodiments, when the intensity of the contact drops below the contact detection intensity threshold $IT_0$ and eventually to zero, the device removes the spotlight 138H-06 from the user interface 138H-02, and returns the user interface 138H-02 to its initial display state S1 previously shown in FIG. 5H2.

FIG. 5H12 is a diagram illustrating the changes in the intensity of the contact 138H-08 (as indicated by the solid line 138H-10), and the corresponding changes in the display states of the user interface 138H-02 over time. S1 represents the initial display state showing the plurality of components 138H-04a through 138H-04g un-highlighted. I-a, I-b, I-c, I-d, I-d, I-f, I-g, and I-h are representatives of a series of intermediate display states showing different levels of moderate visual enhancement for the component(s) currently under the focus of the contact 138H-08. The intermediate display states are presented in an animation A1. The animation A1 shows the continued change in the amount of visual enhancement provided to the component(s) in accordance with the currently detected contact intensity. In addition, the animation A1 also shows the movement of the spotlight on the user interface 138H-02 in accordance with the movement of the contact on the touch-sensitive surface 451. In this scenario, the intensity of the contact 138H-08 never reached the light press intensity threshold $IT_L$. Therefore, the user interface 138H-02 eventually returns to the initial display state S1 once the contact intensity drops below the contact detection intensity threshold $IT_0$ and eventually to zero.

FIGS. 5G13-5G21 illustrate that, in some embodiments, when the contact intensity does exceed the light press intensity threshold $IT_L$, the device displays and maintains the user interface 138H-02 in an augmented display state S2 after the end-of-gesture is detected. In the augmented display state S2, the spotlight 138H-06 is maintained on the object or a portion thereof that is currently under the spotlight 138H-06. In addition, the spotlight 138H-06 visually emphasizes the object or the portion thereof to a greater degree than previously shown in the intermediate display states (e.g., during the preview of the augmented display state S2).

As shown in FIG. 5H13, when a contact 138H-12 of a gesture is detected at a location of the touch-sensitive surface 451 corresponding to the image component 138H-04g in the slide 138H-05, a spotlight 138H-06 is shone on the image component 138H-04g. Since the initial size of the spotlight is small, only a portion of the image component 138H-04g is within the spotlight 138H-06. The spotlight 138H-06 visually enhances the portion of the image component 138H-04g to a moderate degree.

FIGS. 5H14-5H15 illustrate that, in some embodiments, as the intensity of the contact gradually increases in a range between the contact detection intensity threshold $IT_0$ and the light press intensity threshold $IT_L$, the spotlight 138H-06 grows in size and brightness and visually enhances the image component 138H-04g to an increasing degree. When the spotlight 138H-04g grows to a size that encompasses the image component 138H-04g, the device visually lifts the image component 138H-04g up from the surface of the slide 138H-05. In some embodiments, in response to the increasing contact intensity, the image component 138H-04g also grows in size within the spotlight 138H-06. In some embodiments, various other visual enhancement techniques (e.g., color variations, magnification, animation effects, bolded outlines, etc.) are also used to visually enhance the image component 138H-04g.

In FIG. 5H16, when the contact intensity finally reaches the light press intensity threshold $IT_L$, the spotlight 138H-06 reaches its maximum size and brightness as well. In addition, the image component 138H-04g under the spotlight 138H-06 is enlarged and visually emphasized to a greater degree than that shown in any of the intermediate display states displayed before the contact intensity reached the light press intensity threshold $IT_L$. When the contact intensity has reached the light press intensity threshold $IT_L$, the user interface 138H-02 has entered the augmented display state S2. If the gesture were to terminate at this moment, the user interface 138H-02 would remain in the augmented display state S2 shown in FIG. 5H17.

FIG. 5H17 illustrates that, in some embodiments, one or more squishiness display states are displayed if the intensity of the contact continues to increase beyond the light press intensity threshold $IT_L$. In the squishiness display states, the size of the spotlight 138H-06 changes (e.g., increases and decreases) synchronously with the changes (e.g., increases and decreases) in the contact intensity above the light press intensity threshold $IT_L$. In some embodiments, the size of the image component 138H-04g within the spotlight 138H-06 also changes with the size of the spotlight 138H-06. However, in some embodiments, the image component 138H-04g is not visually enhanced through other means in the squishiness display states.

FIGS. 5H18-5H20 illustrate that, in some embodiments, when the intensity of the contact subsequently drops below the light press intensity threshold $IT_L$ (as shown in FIG. 5H18), below the contact detection intensity threshold $IT_0$ (as shown in FIG. 5H19), and eventually to zero (as shown in FIG. 5H20), the device redisplays the augmented display state S2 and maintains the user interface 138H-02 in the augmented display state S2 (previously shown in FIG. 5H16).

FIG. 5H21 is a diagram illustrating the changes in the intensity of the contact 138H-12 (as indicated by the solid line 138H-14), and the corresponding changes in the display states of the user interface 138H-02 over time. S1 represents the initial display state showing un-highlighted components 138H-04a through 138H-04g in a slide 138H-05 in the presentation mode. I-a, I-e, and I-f are representatives of a series of intermediate display states showing gradually increased highlighting (and other visual enhancements) of the component(s) or portion(s) thereof currently under focus. S2 is the augmented display state in which the component(s) currently under focus is visually enhanced to a greater extent than that in any of the intermediate display states previously shown. I-i is a representative of a series of squishiness display states shown when the contact intensity increases above the light press intensity threshold $IT_L$. In the squishiness display states, the user interface 138H-02 (e.g., the spotlight 138H-06 and/or the component(s) under focus) are altered further from that shown in the augmented display state S2. The transition from the initial display state S1 to the augmented display state S2 is presented in an animation A1. The squishiness display states are shown in an animation A2. The animation A2 is a continuation of the animation A1 leading to the augmented display state S2. Since the intensity of the contact does reach the light press intensity threshold $IT_L$ before the end-of-gesture is detected, the user interface 138H-02 returns to the augmented display state S2 and remains in S2 after the contact intensity drops below the light press intensity threshold $IT_L$. In some embodiments, in response to detecting a subsequent increase in intensity of contact 138H-12 above $IT_L$ followed by liftoff of contact 138H-12, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

FIGS. 5I1-5I16 illustrate visual feedback provided in response to a gesture directed to activating a "new tab" element 138I-04 in a browser window 138I-02. Particularly, FIGS. 5I1-5I8 illustrate that, in some embodiments, before the intensity of the contact reaches the light press intensity threshold $IT_L$, the device presents a preview of the generation of a new tab in the browser window 138I-02. In some embodiments, generation of a new tab includes generating a new tabbed window in a tabbed document interface (e.g., the web browser window 138I-02). FIGS. 5I9-5I16 illustrate that, in some embodiments, when the intensity of the contact does reach the light press intensity threshold $IT_L$, the device completes the generation of the new tab and displays it in the browser window 138I-02. Once the new tab is generated, in this example, the new tab remains in the browser window 138I-02. The user interfaces in these figures are used to illustrate the processes described in this specification, including the processes in FIGS. 6A-6M.

FIG. 5I1 illustrates a browser window 138I-02 containing a "new tab" element 138I-04. The function of the "new tab" element 138I-04 is to generate a new tab for a webpage in the browser window 138I-02. In some browser windows, clicking or tapping on the "new tab" element would cause a new tab to be generated and presented in the browser window. As shown in FIG. 5I1, the "new tab" element 138I-04 is presented next to anexisting tab 138I-06 for a currently open webpage (e.g., a search engine homepage). Before the gesture including contact 138I-08 is detected on the touch screen 112, the browser window 138I-02 is in its initial display state S1, as shown in FIG. 5I1.

FIG. 5I2 shows that, in some embodiments, when a gesture is detected on the touch screen 112, and a contact 138I-08 of the gesture is over the "new tab" element 138I-04 in the browser window 138I-02, the device highlights the "new tab" element 138I-04 to indicate selection of the "new tab" element 138I-04.

FIGS. 5I3-5I4 illustrate that, in some embodiments, as the intensity of the contact increases in a range between the contact detection intensity threshold $IT_0$ and the light press intensity threshold $IT_L$, a new tab 138I-10 gradually emerges from behind the existing tab 138I-06 and expands toward the right side of the browser window 138I-02. In addition, the emerging new tab 138I-10 pushes the "new tab" element 138I-04 to the right as the new tab 138I-10 expands toward the right side of the window 138I-02. The amount of expansion 138I-10 undertaken by the new tab 138I-10 is based on how closely the currently detected contact intensity approaches the light press intensity threshold $IT_L$.

FIG. 5I5 illustrates that, in some embodiments, before the intensity of the contact ever reaches the light press intensity threshold $IT_L$, if the contact intensity decreases in the range between the contact detection intensity threshold $IT_0$ and the light press intensity threshold $IT_L$, the new tab 138I-10 gradually retracts back behind the existing tab 138I-06. In addition, the "new tab" element 138I-04 also retracts toward the left side of the window along with the new tab 138I-10.

FIGS. 5I6-5I7 illustrate that, in some embodiments, when the intensity of the contact continues to drop below the contact detection intensity threshold $IT_0$ (as shown in FIG. 5I6), and eventually to zero (as shown in FIG. 5I7), the device returns the browser window 138I-02 to its initial display state S1 in which the new tab 138I-10 is completely retracted behind the existing tab 138I-06, and the "new tab" element 138I-04 is restored to its original position next to the existing tab 138I-06. Thus, in some embodiments, a preview of the new tab 138I-10 that would be generated has been provided in response to the initial portion of gesture, however, since the intensity of the contact never reached the light press intensity threshold $IT_L$, the new tab is not fully generated and does not remain in the browser window 138I-02 when the gesture is terminated (e.g., the device forgoes generating a new tabbed window in the browser window 138I-02).

FIG. 5I8 is a diagram illustrating the changes in the intensity of the contact 138I-08 (as indicated by the solid line 138I-14), and the corresponding changes in the display states of the window 138I-02 over time. S1 represents the initial display state showing an existing tab and an unselected "new tab" element 138I-04. S1' is a modified initial state indicating selection of the "new tab" element 138I-04. I-a and I-b are representatives of a series of intermediate display states showing the new tab 138I-10 gradually emerging from behind the existing tab in response to increasing intensity of the contact, and gradually retracting behind the existing tab in response decreasing intensity of the contact. In this scenario, the contact intensity never reaches the light press intensity threshold $IT_L$. As a result, the generation of the new tab 138I-10 is not completed and the browser window 138I-02 returns to the initial display state S1 when the end of the gesture is detected. The series of intermediate display states are shown in an animation A1 linking the initial display state S1 to an augmented display state S2 described below with reference to FIGS. 5I9-5I16, but which is not reached in FIGS. 5I1-5I7.

FIGS. 5I9-5I16 illustrate an alternative scenario to that shown in FIGS. 5I1-5I7. In the scenario shown in FIGS. 5I9-5I16, the intensity of the contact does reach the light press intensity threshold $IT_L$, and the new tab 138I-10 is completely generated after a preview of the new tab 138I-10 has been shown. After the new tab 138I-10 is completely generated, it remains in the browser window 138I-02 even after the end of gesture is detected (e.g., the device generates a new tabbed window in the browser window 138I-02).

FIGS. 5I9-5I12 illustrate that, in some embodiments, when a gesture (with a contact 138I-16) is detected on the "new tab" element 138I-04, and the intensity of the contact increases in the range between the contact detection intensity threshold $IT_0$ and the light press intensity threshold $IT_L$, the device shows a new tab 138I-10 gradually emerging from behind the existing tab 138I-06 and extending toward the right side of the browser window 138I-02. As the new tab 138I-10 gradually emerges, the new tab 138I-10 pushes the "new tab" element 138I-04 toward the right side of the window as well. This is the same behavior as previously shown in FIGS. 5I1-5I4.

FIG. 5I13 illustrates that, in some embodiments, when the intensity of the contact reaches the light press intensity threshold $IT_L$, the new tab 138I-10 is completed generated, and emerges fully from behind the existing tab 138I-06. The new tab 138I-10 (or the new tabbed window associated with the new tab) replaces the existing tab as the currently active tab of the browser window 138I-02. The content of the new tab 138I-10 (e.g., "my home page") is brought to the foreground of the window 138I-02, and covers the content of the existing tab 138I-06 (e.g., the "search engine homepage"). FIG. 5I13 shows the augmented display state of the browser window 138I-02.

FIGS. 5I14-5I15 illustrate that, in some embodiments, once the contact intensity has reached the light press intensity threshold $IT_L$, the generation of the new tab 138I-10 is fully completed, and the new tab 138I-10 remains in the browser window 138I-02 even after the intensity of the contact drops to the contact detection intensity threshold $IT_0$ (as shown in FIG. 5I14) and eventually to zero (as shown in FIG. 5I15).

FIG. 5I16 is a diagram illustrating the changes in the intensity of the contact 138I-16 (as indicated by the solid line 138I-18), and the corresponding changes in the display states of the window 138I-02 over time. S1 represents the initial display state showing an existing tab and an unselected "new tab" element 138I-04. S1' is a modified initial state indicating selection of the "new tab" element 138I-04.

I-a and I-b are representatives of a series of intermediate display states showing a new tab 138I-10 gradually emerging from behind the existing tab in response to increasing intensity of the contact. In this scenario, the contact intensity does reach the light press intensity threshold $IT_L$, and the generation of the new tab 138I-10 is completed upon the contact intensity reaching the light press intensity threshold $IT_L$. S2 represents the augmented display state showing the completely generated new tab 138I-10. The browser window 138I-02 remains in the augmented display state S2 even when the contact intensity subsequently drops to the contact detection intensity threshold $IT_0$ and eventually to zero. The series of intermediate display states are shown in an animation A1 linking the initial display state S1 and the augmented display state S2. In some embodiments, in response to detecting a subsequent increase in intensity of contact 138I-16 above $IT_L$ followed by liftoff of contact 138I-16, the device ceases to display the augmented display state S2 and redisplays the initial display state S1. Additionally, in some embodiments, analogous operations are displayed with the deep press intensity threshold $IT_D$ taking the place of the light press intensity threshold $IT_L$ and the light press intensity threshold $IT_L$ taking the place of the contact detection intensity threshold $IT_0$ (e.g., the initial display state is displayed until contact reaches intensity at $IT_L$ and the augmented display state S2 is displayed when contact reaches an intensity at $IT_D$).

FIGS. 6A-6G are flow diagrams illustrating a method 13900 in accordance with some embodiments. The method 13900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. In some embodiments, the touch-sensitive surface includes one or more sensors to detect intensity of contacts with the touch-sensitive surface corresponding to a plurality of intensity levels (e.g., the sensors detects variations in intensity and not just binary ("on"/"off") intensity). Some operations in method 13900 are, optionally, combined and/or the order of some operations is, optionally, changed.

As described below, the method 13900 provides an intuitive way to provide feedback to a user in response to a gesture invoking a user interface element. Specifically, when the intensity of the contact does not reach a predefined intensity threshold (e.g., $IT_L$ or $IT_D$), the device only provides a preview of an augmented display state that would be caused by continued increase of the contact intensity to the predefined intensity threshold (e.g., $IT_L$ or $IT_D$). Alternatively, if the contact intensity does reach the predefined intensity threshold (e.g., $IT_L$ or $IT_D$), the device, after having presented the preview of the augmented display state, presents and maintains the augmented display state on the display even after the end-of-gesture is detected. The method 13900 allows the user to preview the effect of the gesture (e.g., a pressing gesture) with a press input that has a maximum intensity below the predefined intensity threshold (e.g., $IT_L$ or $IT_D$), and terminate the gesture before committing to that effect, or alternatively, to commit to that effect by providing the required contact intensity before terminating the gesture. The method reduces the cognitive burden on a user when operating a user interface element, thereby creating a more efficient human-machine interface. For battery-operated electronic devices, enabling a user to achieve a desired outcome using a user interface element faster and more efficiently conserves power and increases the time between battery charges.

In the method 13900, the device displays (13902) a user interface on a display, where the user interface is in a first display state. The device detects (13904) a first portion of a gesture on the touch-sensitive surface of the device, including detecting intensity of a respective contact (e.g., a finger contact) on the touch-sensitive surface. For example, the device detects the contact when the intensity of the contact reaches to and above the contact detection intensity threshold $IT_0$.

In response to detecting the first portion of the gesture, the device displays (13906) an intermediate display state between the first display state and a second display state. In some embodiments, the first display state is a steady display state (e.g., the display state S1 described above with reference to FIGS. 5A-5I and shown in FIGS. 5A1, 5A10, 5B1, 5C1, 5C9, 5D1, 5D9, 5D17, 5E1, 5E9, 5F1, 5F11, 5G1, 5G7, 5H1, 5H13, 5I1 and 5I9) of the user interface that the device is operable to maintain without requiring any input from a gesture. In some embodiments, the second display state is another steady display state (e.g., the display state S2 described above with reference to FIGS. 5A-5I and shown in FIGS. 5A14, 5B4, 5C13, 5C20, 5D13, 5D21, 5D29, 5D33, 5E12, 5E9, 5F15, 5G10, 5H16, and 5I13) of the user interface that the device is operable to maintain without requiring any input from a gesture. In some embodiments, the first display state represents the state of the user interface before an operation is performed, and the second display state represents a modified state of the user interface after the operation has been performed. In some embodiments, the device implements multiple steady display states, including an initial display state S1, a first augmented display state S2, and a second augmented display state S3. In some of such embodiments, the first display state is the first augmented display state S2 (e.g., the display state S2 shown in FIGS. 5C20 and 5D33), and the second display state is the second augmented display state S3 (e.g., the display state S3 shown in FIGS. 5C24 and 5D38).

In some embodiments, the intermediate display state between the first display state and the second display state represent a transition from the first display state and the second display state. In some embodiments, the intermediate display state is selected (13908) in accordance with the intensity of the respective contact of the gesture (e.g., the current intermediate display state corresponds to a current intensity of the respective contact). For example, when a series of intermediate display states are used to represent the gradual transition from the first display state and the second display state, the device selects the intermediate display state for display based on where the currently detected contact intensity is within the range between the contact detection intensity threshold $IT_0$ and the light press intensity threshold $IT_L$. In some embodiments, there are multiple intermediate display states between the first display state and the second display state, (e.g., the intermediate display states I-a, I-b, I-c, etc. shown FIGS. 5A-5I).

In some embodiments, in response to detecting the first portion of the gesture, the device displays (13910) a plurality of intermediate display states between the first display state and a second display state, where a respective intermediate display state of the plurality of intermediate display states is selected to be displayed based on an intensity of the respective contact, (e.g., the intermediate display states I-a and I-b described above with reference to FIGS. 5A-5I). Examples of intermediate display states are shown in FIGS. 5A3-5A5, 5A12-5A13, 5C3-5C5, 5C11-5C12, 5C22-5C23, 5D3-D5, 5D11-5D12, 5D19-5D20, 5D27-5D28, 5D35-5D36, 5E3-5E5, 5F3-5F7, 5F13-5F14, 5G2-5G4, 5G8-5G9, 5H4-5H9, 5H14-5H15, 5I3-5I5, and 5I11-5I12. In some embodiments, the device also takes into account of the movement of the contact when selecting the intermediate display state, (e.g., as illustrated in FIGS. 5H3-5H8).

In some embodiments, the device generates (13912) an animated transition (e.g., a continuous animation) between the first display state and the second display state, where the animated transition includes the intermediate display state and the intermediate display state is mapped to an intensity of the contact detected at an end of the first portion of the gesture. In response to detecting the first portion of the gesture, display a portion of the animated transition between the first display state and the intermediate display state (e.g., the device advances through the previously generated animation to a point that corresponds to a current intensity of the contact).

For example, in some embodiments, when the first portion of the gesture is an initial press input provided by a user, and the contact intensity of the press input monotonically increases from the contact detection intensity threshold $IT_0$ to a value below the light press intensity threshold $IT_L$, the intermediate display state displayed at the end of the press input is selected based on where the maximum contact intensity of the press input is mapped to in a range between the contact detection intensity threshold $IT_0$ and the light press intensity threshold $IT_L$. This is illustrated, for example, by the diagrams in FIGS. 5A18, 5C16, 5D16, 5D32, 5E16, 5F22, 5G18, 5H21, and 5I16, and associated user interface figures. In each of these diagrams, an animation A1 between the initial display state S1 and the augmented display state S2 is an example animated transition between the first display state and the second display state. In each of these diagrams, an example intermediate display state is an intermediate state (e.g., I-a or I-b) shown between S1 and S2, and an example first portion of the gesture is a portion of the gesture that ended at a point corresponding to the intermediate display state (e.g., I-a or I-b) along the solid intensity curve shown in these figures. Accordingly, the portion of the animated transition that is displayed by the device is the portion of A1 between the intermediated state (e.g., I-a or I-b) and S2 in these figures. In some embodiments, the mapping between the contact intensity and the animated transition is linear. In some embodiments, the mapping between the contact intensity and the animated transition is non-linear (e.g., a larger amount of change in contact intensity is required for each given amount of change in the animated transition, as the value of the contact intensity increases).

In some embodiments, detecting the first portion of the gesture includes (13914) detecting an increase in intensity of the respective contact from a first intensity threshold (e.g., an "animation-initiation" or "operation preview" threshold such as zero force, a nominal force, or the contact detection intensity threshold $IT_0$) to an intermediate intensity threshold (e.g., an intensity threshold that is between the first intensity threshold and the light press intensity threshold $IT_L$). After displaying the intermediate display state: the device detects a second portion of the gesture, where the second portion of the gesture includes detecting an increase in intensity of the respective contact from the intermediate intensity threshold to the predefined intensity threshold (e.g., an "activation" or "operation execution" intensity threshold associated with performing an operation corresponding to the second display state); and in response to detecting the second portion of the gesture, the device displays an animated transition between the intermediate display state and the second display state.

For example, in some embodiments, a gesture that includes an initial portion that does not reach the light press intensity threshold $IT_L$ and a later portion that does reach the light press intensity threshold $IT_L$ would cause an operation associated with an invoked user interface element (e.g., a button) to be completed and thus cause the user interface to enter an augmented display state S2 indicating completion of the operation. The initial portion of the gesture only causes a preview of the augmented display state S2 to be presented because its intensity does not reach the light press intensity threshold $IT_L$ required to complete the operation. In some embodiments, each intensity value between the "animation-initiation" or "operation preview" intensity threshold (e.g., zero or $IT_0$) and the "operation execution" intensity threshold (e.g., $IT_L$) has a corresponding intermediate state between the initial display state S1 and the augmented display state S2 of the user interface. Therefore, an intermediate intensity between the "animation-initiation" or "operation preview" intensity threshold (e.g., zero or $IT_0$) and the "operation execution" intensity threshold (e.g., $IT_L$) has a corresponding intermediate display state. This corresponding intermediate display state is the state displayed at the end of the first portion of the gesture. When the latter portion of the gesture is detected, and during the latter portion of the gesture, the contact intensity increases from the intermediate threshold to the light press intensity threshold $IT_L$, intermediate states that correspond to intensity values between the intermediate intensity and the light press intensity threshold $IT_L$ are now displayed according to the detected intensities. These later displayed intermediate states form the animated transition between the intermediate state (corresponding to the intermediate intensity) and the augmented display state S2. This is illustrated, for example, by the diagrams in FIGS. 5A18, 5C16, 5D16, 5D32, 5E16, 5F22, 5G18, 5H21, and 5I16, and associated user interface figures). In each of these diagrams, an example first portion of the gesture is the portion of the gesture leading to an intermediate display state (e.g., I-a or I-b) before the augmented display state S2. An example second portion of the gesture is the portion of the gesture that continues from the first point of the gesture to a point with an intensity above the light press intensity threshold $IT_L$. Although these figures show that the first portion of the gesture and the second portion of the gesture are continuous portions of the same gesture. In some embodiments, the first portion of the gesture and the second portion of the gesture need not be continuous portions of the same gesture. For example, in some scenarios, the first portion and the second portion is separated by an intermediate portion that varies in a range between the intermediate intensity and the "animation-initiation" or "operation preview" intensity threshold (e.g., zero or $IT_0$).

In some embodiments, while the intensity of the respective contact is at or below the predefined intensity threshold, the device displays (13916) an animated transition from the first display state to the second display state, where the animated transition includes adjusting a parameter corresponding to a visual property of a set of one or more user interface objects in a predefined direction in accordance with the intensity of the respective contact. In addition, the device detects an increase in intensity of the respective contact above the predefined intensity threshold; and in response to detecting the increase in intensity of the respective contact above the predefined intensity threshold, the device displays a continuation of the animated transition that includes adjusting the parameter in the predefined direction in accordance with the intensity of the respective contact (e.g., an animation that continues along a trajectory shown in the animation of the transition between the first display state and the second display state). For example, if an icon was enlarged to a respective size during the animation between the first display state and the second display state, the supplemental display state shows the icon even larger than the respective size. In some embodiments, the parameter is (13918) a parameter selected from the set consisting of: user interface object size, user interface object opacity, space between user interface objects, and number of options displayed in a menu (e.g., a pop-up contextual menu or a drop-down menu from a menu bar).

For an example, as shown in FIGS. 5B1-5B7, the device displays an animated transition to show the smiley's nose becoming increasingly opaque in response to increasing contact intensity reaching the light press intensity threshold $IT_L$. When the device detects continued increase in the contact intensity, the device displays a continuation of the animated transition to show further increase in the opacity of the smiley's nose.

For another example, as shown in FIGS. 5C17-5C23, the device displays an animated transition to illustrate the expansion of a drop-down menu 138C-06' from a first size including no menu items to a second size including a small number of menu items, in response to increasing contact intensity reaching the light press intensity threshold $IT_L$. When the device detects continued increase in the contact intensity, the device displays a continuation of the animated transition to show further expansion of the drop-down menu (e.g., as shown in FIG. 5C23) to include a greater number of menu items.

For another example, as shown in FIGS. 5C20-5C25, the device displays an animated transition to illustrate the expansion of a drop-down menu 138C-06' from a first size to a second size, in response to increasing contact intensity reaching the deep press intensity threshold $IT_D$. When the device detects continued increase in the contact intensity, the device displays a continuation of the animated transition to show further expansion of the drop-down menu (e.g., as shown in FIG. 5C25).

For another example, as shown in FIGS. 5D33-5D39, the device displays an animated transition to illustrate rotation of the center component 138D-18 from its front side to its backside, in response to increasing contact intensity reaching the deep press intensity threshold $IT_D$. When the device detects continued increase in the contact intensity, the device displays a continuation of the animated transition to show further rotation of the center component in the same direction (e.g., as shown in FIG. 5D39).

For another example, as shown in FIGS. 5F11-5F16, the device displays an animated transition to illustrate a plurality of icons 138F-06a through 138F-06d flying out of a selected application icon 138F-04d along a trajectory into a predetermined configuration, in response to increasing contact intensity reaching the light press intensity threshold $IT_L$. When the device detects continued increase in the contact intensity, the device displays further movement of the plurality of icons along their previous trajectory.

For another example, as shown in FIGS. 5G7-5G11, the device displays an animation transition to illustrate a plurality of images 138G-04a through 138G-04d spreading out from an overlapping state to a non-overlapping state, in response to increasing contact intensity reaching the light press intensity threshold $IT_L$. When the device detects continued increase in the contact intensity, the device displays a continuation of the animated transition to show further spreading out of the plurality of images.

The device detects (13920) an end of the gesture. In some embodiments, detecting the end of the gesture includes (13922) detecting liftoff of the respective contact. For example, in some embodiments, the end of the gesture is detected when the contact intensity drops to the contact detection intensity threshold $IT_0$. In some embodiments, detecting the end of the gesture includes (13924) detecting a reduction in intensity of the contact from above to below an end-of-gesture intensity threshold. For example, in some embodiments, the end-of-gesture is some other intensity value different from (e.g., greater than) the contact detection intensity threshold $IT_0$, some other nominal value, or zero. In some embodiments, detecting the end of the gesture includes (13926) detecting a reduction in intensity of the contact below the predefined intensity threshold. For example, in some embodiments, the device detects the end of the gesture immediately when the intensity of the contact reaches the predefined intensity threshold (e.g., the light press intensity threshold $IT_L$ or, alternatively, the deep press intensity threshold $IT_D$), regardless whether the contact of the gesture is maintained at a level above the contact detection intensity threshold $IT_0$. Sometime, the device implements this end-of-gesture criterion when no squishiness display states or further augmented display states exist for a particular user interface. Since there is no need to keep track of the contact intensity after the operation initiated by the gesture has been completed in response to the contact intensity reaching the predefined intensity threshold, the device treats the gesture as terminated at this point regardless of whether the contact of the gesture is removed.

In response to detecting the end of the gesture: (1) in accordance with a determination that the intensity of the respective contact reached a predefined intensity threshold prior to detecting the end of the gesture, the device displays (13928) the second display state; and (2) in accordance with a determination that the intensity of the respective contact did not reach the predefined intensity threshold prior to detecting the end of the gesture, the device terminates display of the intermediate display state and redisplays the first display state. This is illustrated in the overview shown in FIGS. 5A1 through 5A18 (e.g., FIGS. 5A1-5A9 illustrate the first scenario, and FIGS. 5A10-5A18 illustrate the second scenario). Various embodiments illustrating the different behaviors of the device in accordance with whether the contact intensity has reached the predefined intensity threshold (e.g., the light press intensity threshold $IT_L$ or the deep press intensity threshold $IT_D$) are also shown in FIGS. 5C through 5I.

In some embodiments, while detecting the gesture, the device detects (13930) an increase in intensity of the respective contact to the predefined intensity threshold. In response to detecting the increase in intensity of the respective contact to the predefined intensity threshold, the device generates a tactile output that indicates that the second display state will continue to be displayed after an end of the gesture is detected (e.g., the user feels a button "click" tactile sensation that includes that the second display state has been "locked in"). For example, the tactile output is a haptic feedback provided on the touch-sensitive surface of the device or a vibration of another part of the device that the user is touching. The tactile output will cause the user to have a sensation of a "click" or "tick" coming from the user interface element under the contact. In some embodiments, when the contact intensity increases beyond the predefined intensity threshold, and subsequently drops back to the predefined intensity threshold, another tactile output is also provided to indicate that the user interface has returned to the second display state and will remain in the second display state. The haptic feedback is described with respect to the examples shown in FIGS. 5C9-5C12, 5C17-5C32, and 5E9-5E16. However, it should be understood that the tactile output can be implemented in other embodiments as well when the press input meets or exceeds the predefined intensity threshold (e.g., the light press intensity threshold $IT_L$ or the deep press intensity threshold $IT_D$).

In some embodiments, displaying the user interface in the first display state includes (13931) displaying an icon that corresponds to a menu without displaying the menu (e.g., displaying an icon labeled "File," which corresponds to a File menu, without displaying items in the File menu). Displaying the user interface in the intermediate display state includes displaying a preview of the menu, where the preview of the menu is different from the menu. For example, the preview of the menu includes fewer options than the menu, the preview of the menu is more transparent than the menu, the preview of the menu is smaller than the menu, and/or the preview of the menu does not include selectable elements while the menu includes selectable elements. Displaying the user interface in the second display state includes displaying the menu. This is illustrated in FIGS. 5C1-5C32 and accompanying descriptions, with icons 138C-04, 138C-04' and menus 138C-06, 138C-06', respectively.

In some embodiments, displaying the user interface in the first display state includes (13932) displaying an icon that corresponds to a pop-up window without displaying the pop-up window. Displaying the user interface in the intermediate display state includes displaying a preview of the pop-up window, where the preview of the pop-up window is different from the pop-up window (e.g., the preview of the pop-up window includes fewer options than the pop-up window, the preview of the pop-up window is more transparent than the pop-up window, the preview of the pop-up window is smaller than the pop-up window, and/or the preview of the pop-up window does not include selectable elements while the pop-up window includes selectable elements). Displaying the user interface in the second display state includes displaying the pop-up window. This is illustrated in FIGS. 5D1-5D16 and accompanying descriptions with icon 138D-04a, pop-up window preview 138D-06 and pop-up window 138D-07.

In some embodiments, displaying the user interface in the first display state includes (13934) displaying an icon (e.g., a show/hide indicator such as a disclosure triangle) that corresponds to a hidden text without displaying the hidden text (e.g., displaying disclosure triangle 138E-04 in FIG. 5E1, which corresponds to hidden text in a drop-down list 138E-06 in FIG. 5E12, without displaying the hidden text). Displaying the user interface in the intermediate display state includes displaying a preview of the hidden text, where the preview of the hidden text is different from the hidden text. For example, the preview of the hidden text is more transparent than the hidden text, the preview of the hidden text is smaller than the hidden text, and/or the preview of the hidden text does not include selectable elements while the hidden text includes selectable elements. Displaying the user interface in the second display state includes displaying the hidden text. This is illustrated in FIGS. 5E1-5E16 and accompanying descriptions with icon 138E-04 as the icon, drop-down list preview 138E-06 as the preview of the hidden text, and drop down list 138E-07 as the hidden text.

In some embodiments, displaying the user interface in the first display state includes (13936) displaying an icon that corresponds to a plurality of user interface objects without displaying the plurality of user interface objects (e.g., displaying a folder icon for a folder that contains document/application icons, without displaying the document/application items). Displaying the user interface in the intermediate display state includes displaying reduced-scale representations of the user interface objects, where the reduced-scale representations of the user interface objects are different from the user interface objects (e.g., the reduced-scale representations of the user interface objects include representations of only a subset of the user interface objects, the reduced-scale representation of the user interface objects are more transparent than the user interface objects, the reduced-scale representation of the user interface objects are smaller than the user interface objects, and/or the reduced-scale representation are not selectable elements while the user interface elements are selectable elements of the user interface). For example, the reduced scale representations of the user interface objects are small versions of the document/application icons in a folder. Displaying the user interface in the second display state includes displaying the user interface objects (e.g., displaying an array of document/application icons). This is illustrated in FIGS. 5F1-522 and accompanying descriptions with icon 139F-04 as the icon, preview icons 138F-06 as the reduced-scale representations of the user interface objects, and selectable document icons 138F-07 as the user interface objects.

In some embodiments, displaying the user interface in the first display state includes (13938) displaying an image prior to applying a graphical effect to the image; (e.g., an image filter). Displaying the user interface in the intermediate display state includes displaying a preview of partially applying the graphical effect to the image (e.g., displaying contrast of an image increased by half a step. Displaying the user interface in the second display state includes displaying the image with the graphical effect applied (e.g., displaying contrast of the image increased by a full step).

In some embodiments, displaying the user interface in the first display state includes (13940) displaying a representation of an album (e.g., cover art of a music album or photo album). Displaying the user interface in the intermediate display state includes displaying a preview of components (e.g., tracks within a music album, or thumbnails of images in a photo album) of the album, where the preview of components of the album is different from the components of the album. For example, in some embodiments, the preview of the components of the album is more transparent than the components of the album. In some embodiments, the preview of the components of the album is smaller than the components of the album. In some embodiments, the preview of the components of the album does not include selectable elements while the components of the album include selectable elements. In some embodiments, the preview of the components of the album is rotated so that the components are not easily viewable, while the components are easily viewable in the second display state. For example, a music album cover slowly flips around to reveal tracks on the "back" of the album or a photo album cover slowly flips around to reveal thumbnails of images in the photo album. Displaying the user interface in the second display state includes displaying the components of the album. These are illustrated by various embodiments shown in FIGS. 5D1-5D16, 5D17-5D24, 5D25-5D32, and 5D33-5D42 and accompanying descriptions, with object 138D-04a" as the album, object preview 138D-24 as the preview of components of the album and object 138D-25 as the representation of the album.

In some embodiments, displaying the user interface in the first display state includes (13942) displaying a plurality of user interface objects arranged on the display such that at least some objects overlap each other. Displaying the user interface in the intermediate display state includes displaying the user interface objects spread apart so that at least two of the plurality of user interface objects that formerly overlapped with each other do not overlap with each other while at least two the plurality of user interface objects overlap each other (e.g., the user interface objects spread apart and shrink in size so that they can be simultaneously displayed in a non-overlapping arrangement on the display). Displaying the user interface in the second display state includes displaying the plurality of user interface objects so that they do not overlap with each other. This is illustrated in FIGS. 5G1-5G18 and accompanying descriptions with user interface objects 138G-04 as the user interface objects that at least partly overlap each other.

In some embodiments, displaying the user interface in the first display state includes (13944) displaying an image (e.g., a slide in a full-screen mode, or an image or text component within a slide) in a presentation without emphasis. Displaying the user interface in the intermediate display state includes displaying preliminary emphasis on a portion of the image (e.g., displaying low contrast highlighting or a slight increase in brightness of a respective region of the user interface that includes the image). Displaying the user interface in the second display state includes displaying the image with additional emphasis on the portion of the image (e.g., displaying high contrast highlighting or a significant increase in brightness of a respective region of the user interface that includes the image). This is illustrated in FIGS. 5H1-5H21 and accompanying descriptions with slide 138H-05 initially displayed without emphasis, and object 138H-04g initially displayed without emphasis, then with preliminary emphasis and then with additional emphasis.

In some embodiments, displaying the user interface in the first display state includes (13946) displaying a current state of an electronic document. Displaying the user interface in the intermediate display state includes displaying a beginning portion of an undo operation. For example, in some embodiments, displaying the beginning of an undo operation includes displaying a word that is being deleted partially faded out, displaying an image that is being resized at an intermediate size between the current size and the prior size, or displaying a word that is being replaced by another word as a superposition of the two words. Displaying the user interface in the second display state includes displaying a prior state of the document after the undo operation has been performed.

In some embodiments, displaying the user interface in the first display state includes (13948) displaying a current state of an electronic document. Displaying the user interface in the intermediate display state includes displaying a first prior state of the electronic document after a first undo operation has been performed. For example, when a plurality of words have been added, displaying the first prior state of the electronic document includes ceasing to display a most recently added word. Displaying the user interface in the second display state includes displaying a second prior state (prior to the first prior state) of the electronic document after a second undo operation has been performed. For example, when a plurality of words have been added, displaying the second prior state of the electronic document includes ceasing to display a second most recently added word. Thus, in some embodiments, a user can press harder on an undo affordance to undo operations further back in the undo order using a single press input, where the number of steps back into the undo order is determined by the intensity of the press input.

In some embodiments, displaying the user interface in the first display state includes (13949) displaying one or more tabs in a tabbed document interface (e.g., a browser window containing tabs for different web pages, or a document editing application containing tabs for different open documents). In some embodiments, the tabs are arranged in a linear fashion in the interface, either visibly contained in a linear tab bar or arranged in a single row. In some embodiments, the tabs are arranged in multiple rows or contained in multiple tab bars, if one row or tab bar is not sufficient to accommodate all tabs in the tabbed document interface. Displaying the user interface in the intermediate display state includes displaying a preview of a new tab in the tabbed document interface (e.g., displaying a portion of the new tab appearing on the tab bar from underneath other tabs, or gradually appearing from a bottom or top of the tab bar). Displaying the user interface in the second display state includes displaying the new tab in the tabbed document interface. For example, in some embodiments (e.g., where the gesture includes a press input on a new-tab affordance), the new tab springs out from under other tabs in the tab bar and slides back under the other tabs if the intensity of the respective contact did not reach the predefined intensity threshold prior to detecting the end of the gesture. This is illustrated in FIGS. 5I1-5I16 and accompanying descriptions. FIGS. 5I1-5I16 shows the new tab 138I-10 emerging from behind the existing tab 138I-06 toward the right side of the browser window 138I-02. However, in some embodiments, the new tab emerges and/or springs out from above or below the existing tab next to a new tab affordance, and gradually settles into its final position along a predetermined path when the contact intensity increases to the predefined intensity threshold. If the contact intensity reduces before it reaches the predefined intensity threshold, the new tab springs back to behind the existing tab along its original path, or fades out gradually.

It should be understood that the particular order in which the operations in FIGS. 6A-6G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 13900 described above with respect to FIGS. 6A-6G. For example, the contacts, gestures, user interface objects, tactile outputs, intensity thresholds, focus selectors, animations described above with reference to method 13900 optionally have one or more of the characteristics of the contacts, gestures, user interface objects, tactile outputs, intensity thresholds, focus selectors, animations described herein with reference to other methods described herein (e.g., those listed in the fifth paragraph of the Description of Embodiments). For brevity, these details are not repeated here.

FIGS. 6H-6M are flow diagrams illustrating a method 13950 in accordance with some embodiments. The method 13950 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 13950 are, optionally, combined and/or the order of some operations is, optionally, changed.

As described below, the method 13950 provides an intuitive way to provide feedback to a user in response to a gesture invoking a user interface element. Specifically, after displaying a first animation showing a transition from a first display state to a second display state in response to detecting an increasing in intensity of contact, the device displays, in response to detecting a further increasing in intensity of the contact, a second animation that is a continuation of the first animation. The method 13950 provides visual feedback in response to a later portion of a gesture after performance of an operation has been completed (e.g., as indicated by a transition from a first display state to a second display state) in response to an earlier portion of the gesture. The visual feedback provided for a sustained contact after the "operation-execution" portion of the gesture has been completed is more natural and intuitive to the user and provides visual interest on the user interface. The method reduces the cognitive burden on a user when operating a user interface element, thereby creating a more efficient human-machine interface. For battery-operated electronic devices, enabling a user to achieve a desired outcome using a user interface element faster and more efficiently conserves power and increases the time between battery charges.

In the method 13950, the device displays (13952) a user interface on a display, where the user interface is in a first display state. The device detects (13954) a first input, including detecting an increase in intensity of a contact (e.g., a finger contact) on a touch-sensitive surface. In response to detecting the first input, the device displays (13956) a first animation of the user interface transitioning from the first display state to a second display state (e.g., a transition from state S1 to state S2, as shown in FIGS. 5B1-5B4, 5C17-20, 5C23-5C24, 5D17-5D21, 5D33-5D38, 5F11-5F15, 5G7-5G10, and 5H13-5H16), wherein a rate of change from the first display state to the second display state is determined in accordance with an intensity of the contact included in the first input (e.g., as shown in FIGS. 5B16, 5C32, 5D24, 5D42, 5F22, 5G18, and 5H21).

After the user interface has transitioned (13958) to the second display state: the device performs operations 13960-666. The device detects (13960) a second input that includes detecting an increase in intensity of a contact on the touch-sensitive surface. In response to detecting the second input, the device displays (13962) a second animation of the user interface transitioning from the second display state to a third display state, where the second animation is a continuation of the first animation and the third display state is determined in accordance with the intensity of the contact included in the second input on the touch-sensitive surface (e.g., a state corresponding to an intensity greater than the intensity associated with state S2 or, alternatively state S3, as shown in FIGS. 5B4-5B6, 5B16, 5C22-23, 5C25-5C26, 5C32, 5D33-5D37, 5D38-5D39, 5D42, 5F15-5F17, 5F22, 5G10-5G12, 5G18, 5H16-5H17, and 5H21). The device detects (13964) a reduction in the intensity of the contact included in the second input. For example, the reduction is a reduction in intensity or lift of the respective contact. In response to detecting the reduction in the intensity of the contact included in the second input, the device displays (13966) a third animation of the user interface transitioning from the third display state to the second display state. For example, after detecting a reduction in intensity of the contact included in the second input (e.g., to an intensity greater than the intensity associated with state S2 or, alternatively state S3), the user interface "springs back" to the second display state (e.g., state S2 or, alternatively state S3). This is illustrated in FIGS. 5B11-5B14, 5B16, 5C25-5C26, 5C27-5C31, 5C32, 5D39-5D41, 5D42, 5F17-5F21, 5F22, 5G14-17, 5G18, 5H17-5H20, and 5H21, and accompanying descriptions.

In some embodiments, the first input and the second input are (13968) part of single gesture that includes a continuously detected contact on the touch-sensitive surface. For example, the initial portion of the gesture (e.g., a light press with a maximum contact intensity reaching the light press intensity threshold $IT_L$) causes the transition from the first display state to the second display state, while a later portion of the gesture (a deeper press with a peak contact intensity above the light press intensity threshold $IT_L$ followed by reduction in intensity and lift-off). The gestures shown in FIGS. 5B16, 5C32, 5D42, 5F22, 5G18, and 5H21 provides examples of the single gesture.

In some embodiments, the first input and the second input are (13970) part of different gestures. In some embodiments, the second display state is a steady augmented display state that is maintained in the user interface without requiring a sustained input from the user. Therefore, a single gesture need not provide both the first input to make the transition from the first display state to the second display state, and the second input to cause display of further squishiness display states (e.g., included the second animation and the third animation). Once a first gesture has provided the input to cause the transition into the second display state, a second gesture can be provided at a later time to cause display of the squishiness display states (e.g., included the second animation and the third animation). For example, a second input detected after detecting a first input corresponding to changing the display state from S1 to S2, examples of such a first input are shown in FIGS. 5A9-5A17, 5B1-5B15 and 5C9-5C16).

In some embodiments, the device determines (13972) a terminal display state of the user interface while detecting the second input, where: the terminal display state is associated with a predefined intensity; and determining the third display state in accordance with the intensity of the contact included in the second input on the touch-sensitive surface includes: in accordance with a determination that the intensity of the contact included in the second input is below the predefined intensity, selecting a respective display state between the second display state and the terminal display state as the third display state; and in accordance with a determination that the intensity of the contact included in the second input is at or above the predefined intensity, selecting the terminal display state as the third display state. Thus, in some embodiments, after a certain point, no matter how much the intensity of the contact included in the second input increases, the user interface object(s) stop changing in response to further increases in the intensity of the contact.

For example, in some embodiments, the predefined intensity is the tolerance intensity threshold $IT_T$. When the intensity of the contact varies in a range between the predefined intensity (e.g., the tolerance intensity threshold $IT_T$) and the intensity threshold (e.g., the light press intensity threshold $IT_L$ or the deep press intensity threshold $IT_D$) required for the transition from the first display state to the second display state (e.g., from an initial display state S1 to an augmented display state S2, or from a first augmented display state S2 to a second augmented display state S3), the device presents a respective display state between the second display state and the terminal display state according to the currently detected contact intensity. If the intensity reaches beyond the tolerance intensity threshold $IT_T$, changes in the contact intensity above the tolerance intensity threshold causes no further feedback in the user interface, and the device maintains the last displayed state (e.g., the terminal display state) until the contact intensity drops below the tolerance intensity threshold again. This is illustrated in FIGS. 5B4-5B11, 5B16, 5C24-5C28, 5C32, 5F15-5F19, 5F22, 5G10-5G15, and 5G18, and accompanying descriptions.

In some embodiments, the touch-sensitive surface of the device has (13974) a device compression tolerance. The predefined intensity is an intensity selected so that the terminal display state is displayed before the device compression tolerance is reached. For example, the device allows a certain amount of additional "squishiness" animation (e.g., further changes in display states) in response to further changes above the operation-execution threshold (e.g., $IT_L$ or, alternatively, $IT_D$). However, the "squishiness" has a limit, so that the animation stops before the user presses hard enough on the touch-sensitive surface to cause fatigue or damage to the device or a component of the device (e.g., the touch-sensitive surface or intensity sensors attached to the touch-sensitive surface).

In some embodiments, the user interface includes (13976) a set of one or more user interface objects. Transitioning the user interface from the first display state to the second display state includes manipulating the set of user interface objects (e.g., changing a location and/or appearance of user interface objects in the set of user interface objects, such as menu icons, folder icons, document icons, application icons, images icons, album icons, show/hide indicators, images, text, components, etc.). The third display state and the third animation of the user interface transitioning from the third display state to the second display state are determined based at least in part on simulated physical properties. For example, simulated physical properties include elasticity, spring coefficient, magnetic attraction or repulsion, gravitational attraction, electrostatic attraction/repulsion, brightness, color, hue, weight, and/or structural integrity of the set of user interface objects. For example, when there is a plurality of user interface objects (e.g., documents), they are treated as though they are attached to each other by springs with a predefined spring coefficient and the intensity of the respective contact is treated as a force on the edges of one or more of the documents in the set of documents. The manipulation of the user interface objects, and the simulated physical properties are illustrated in FIGS. 5B1-5B16, 5C17-5C32, 5D17-D21, 5D33-5D42, 5F11-5F22, and 5G7-5G22, and accompanying descriptions.

In some embodiments, user interface includes (13978) a set of user interface objects, including a first user interface object and a second user interface object. Transitioning the user interface from the first display state to the second display state includes moving the first user interface away from the second user interface object. Transitioning the user interface from the second display state to the third display state includes continuing to move the first user interface object away from the second user interface object. This is illustrated in FIGS. 5G7-5G22 and accompanying descriptions. In FIGS. 5G7-5G22, the user interface objects 138G-04 are overlapping images in the first display state, and non-overlapping images in the second display state. In some embodiments, the objects in the first display state need not be overlapping. For example, in some embodiments, the objects in the first display state are objects distributed in a grid view having a first spacing, and the objects in the second display state are the objects distributed in a grid view with a second spacing greater than the first spacing.

In some embodiments, the user interface includes (13980) a set of user interface objects, including a first user interface object and a second user interface object. Transitioning the user interface from the first display state to the second display state includes moving the first user interface toward the second user interface object. Transitioning the user interface from the second display state to the third display state includes continuing to move the first user interface object toward the second user interface object. For example, in some embodiments, the objects in the first display state are objects distributed in a grid view having a first spacing, the objects in the second display state are the objects distributed in a grid view with a second spacing smaller than the first space, and the objects in the third display state are the objects distributed in a grid view without any spacing.

In some embodiments, the user interface includes (13982) a set of user interface objects, including a first user interface object and a second user interface object. Transitioning the user interface from the first display state to the second display state includes enlarging the first user interface object relative to the second user interface object; and Transitioning the user interface from the second display state to the third display state includes continuing to enlarge the first user interface object relative to the second user interface object. This is illustrated in FIGS. 5B1-5B8 (e.g., face of the smiley increases in size), 5C20-5C27 (e.g., size of the drop-down menu increases), 5H13-5H17 (size of image component 138H-04g increases relative to the size of image components 138H-04d, 138H-04e and 138H-04f), and accompanying descriptions.

In some embodiments, the user interface includes (13984) a set of user interface objects, including a first user interface object and a second user interface object. Transitioning the user interface from the first display state to the second display state includes reducing a size of the first user interface object relative to the second user interface object; and Transitioning the user interface from the second display state to the third display state includes continuing to reduce the size of the first user interface object relative to the second user interface object. This is illustrated in FIGS. 5B1-5B8 (e.g., eyes of the smiley decrease in size), and accompanying descriptions.

In some embodiments, the user interface includes (13986) a set of user interface objects, including a first user interface object. Transitioning the user interface from the first display state to the second display state includes translating the first user interface object along a predefined path on the display. Transitioning the user interface from the second display state to the third display state includes continuing to translate the first user interface object along the predefined path on the display. In some embodiments, the predefined path is a straight line. In some embodiments, the predefined path is a curve or other non-straight path. This is illustrated in FIGS. 5F11-5F21 (e.g., preview icons 138F-06 fly out of a selected application icon along a predefined trajectory), and accompany descriptions.

In some embodiments, the user interface includes (13988) a set of user interface objects, including a first user interface object. Transitioning the user interface from the first display state to the second display state includes rotating the first user interface object on the display. Transitioning the user interface from the second display state to the third display state includes continuing to rotate the first user interface object on the display. This is illustrated in FIGS. 5D33-5D39 (e.g., object 138D-18 showing the front cover of an album flips over and rotates further in response to increasing contact intensity), and accompanying descriptions.

In some embodiments, the user interface includes (13990) a set of user interface objects, including a first user interface object. Transitioning the user interface from the first display state to the second display state includes changing an opacity of the first user interface object on the display. Transitioning the user interface from the second display state to the third display state includes continuing to change the opacity of the first user interface object on the display. This is illustrated in 138B1-5B8 (e.g., face of the smiley increases in opacity), and accompanying descriptions.

In some embodiments, the second display state is (13992) a predefined display state associated with an operation associated with the first input. For example, the second display state is an open folder, an expanded menu, or an expanded list, that is displayed in response to the first input (e.g., open menu 138C-06' in FIG. 5C22 or expanded menu 138C-06' in FIG. 5C24). The third display state is a dynamic (e.g., non-steady) display state selected in accordance with the intensity of the respective contact on the touch-sensitive surface (e.g., open menu 138C0-06' in FIG. 5C26). For example, the third display state is dependent on the maximum intensity of the respective contact during the second input, so that there is a bit of elastic "give" or "squishiness" at the end of the animation. In some embodiments, the bit of elastic "give" or "squishiness" is proportional to the additional detected intensity of the respective contact that exceeds the intensity necessary to reach the second display state.

In some embodiments, the third animation is determined (13994) based at least in part on a difference between an intensity that corresponds to the second display state and an intensity that corresponds to the third display state. For example, if a maximum intensity of the respective contact is much greater than the intensity threshold needed to reach the second display state, then there is a relatively bigger difference between the second display state and the third display state and consequently there is a relatively bigger animation to transition from the third display state back to the second display state. In contrast, if a maximum intensity of the respective contact is only slightly greater than activation intensity threshold, then there is a relatively smaller difference between the second display state and the third display state and consequently there is a relatively smaller animation to transition from the third display state back to the second display state. Thus, in some embodiments, the amount by which the user interface springs back after the respective contact is lifted depends on how far the user interface was "stretched" prior to detecting liftoff of the respective contact (e.g., an animation directly from state I-c in FIG. 5B6 to state S2 in FIG. 5B14 in response to detecting a liftoff of contact 138B-08 while state I-c is displayed is smaller than an animation directly from state S3 in FIG. 5B7 to state S2 in FIG. 5B14 in response to detecting a liftoff of contact 138B-08 while state S3 is displayed).

In some embodiments, the first animation is displayed (13996) at a speed corresponding to a rate of change of the intensity of the respective contact during the first input. For example, intermediate display states in between the first display state and the second display state are mapped to particular intensity levels of the respective contact. Thus, if the intensity of the respective contact increases more quickly, then the animation will progress more quickly. Conversely, if the intensity of the respective contact increases more slowly, then the animation will progress more slowly (e.g., if the intensity of contact 138B-08 increases on touch-sensitive surface 451 slowly, then the animation shown in the sequence of FIGS. 5B1 through 5B4 occurs more slowly than if the intensity of contact 138B-08 increases on touch-sensitive surface 451 quickly).

In some embodiments, the second animation is displayed (13998) at a speed corresponding to a rate of change of the intensity of the respective contact during the second input. For example, intermediate display states in between the second display state and the third display state are mapped to particular intensity levels of the respective contact. Thus, if the intensity of the respective contact increases more quickly, then the animation will progress more quickly. Conversely, if the intensity of the respective contact increases more slowly, then the animation will progress more slowly (e.g., if the intensity of contact 138B-08 increases on touch-sensitive surface 451 slowly, then the animation shown in the sequence of FIGS. 5B5 through 5B7 occurs more slowly than if the intensity of contact 138B-08 increases on touch-sensitive surface 451 quickly).

It should be understood that the particular order in which the operations in FIGS. 6H-6M have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 13950 described above with respect to FIGS. 6H-6M. For example, the contacts, gestures, user interface objects, tactile outputs, intensity thresholds, focus selectors, animations described above with reference to method 13950 optionally have one or more of the characteristics of the contacts, gestures, user interface objects, tactile outputs, intensity thresholds, focus selectors, animations described herein with reference to other methods described herein (e.g., those listed in the fifth paragraph of the Description of Embodiments). For brevity, these details are not repeated here.

In accordance with some embodiments, FIG. 7 shows a functional block diagram of an electronic device 14000 configured in accordance with the principles of the various described embodiments. The functional blocks of the device are, optionally, implemented by hardware, software, or a combination of hardware and software to carry out the principles of the various described embodiments. Therefore, the description herein optionally supports any possible combination or separation or further definition of the functional blocks described herein.

As shown in FIG. 7, an electronic device 14000 includes a display unit 14002 configured to display a plurality of user interface objects in a graphical user interface, a touch-sensitive surface unit 14004 configured to receive user contacts, one or more sensor units 14006 configured to detect intensity of the user contacts with the touch-sensitive surface unit 14004 and a tactile output unit 14007; and a processing unit 14008 coupled to the display unit 14002, the touch-sensitive surface unit 14004 and the one or more sensor units 14006. In some embodiments, the processing unit 14008 includes a detecting unit 14010, a display enabling unit 14012, a terminating unit 14014, a generating unit 14016, and a selecting unit 14018.

The display unit 14002 is configured to display a user interface, where the user interface is in a first display state.

The processing unit 14008 is configured to: detect a first portion of a gesture on the touch-sensitive surface unit 14004, including detecting intensity of a respective contact on the touch-sensitive surface unit 14004 (e.g., with the detecting unit 14010); in response to detecting the first portion of the gesture, enable display of an intermediate display state between the first display state and a second display state (e.g., with the display enabling unit 14012); detect an end of the gesture (e.g., with the detecting unit 14010); and in response to detecting the end of the gesture: in accordance with a determination that the intensity of the respective contact reached a predefined intensity threshold (e.g., $IT_L$ or $IT_D$) prior to detecting the end of the gesture, enable display of the second display state (e.g., with the display enabling unit 14012); and in accordance with a determination that the intensity of the respective contact did not reach the predefined intensity threshold prior to detecting the end of the gesture, terminate display of the intermediate display state and enable redisplay of the first display state (e.g., with the terminating unit 14014).

In some embodiments, the intermediate display state is selected (e.g., by the processing unit 14008) in accordance with the intensity of the respective contact.

In some embodiments, in response to detecting the first portion of the gesture, the processing unit 14008 enables display of a plurality of intermediate display states between the first display state and a second display state (e.g., with the display enabling unit 14012), where a respective intermediate display state of the plurality of intermediate display states is selected to be displayed based on an intensity of the respective contact.

In some embodiments, the processing unit 14008 is configured to: generate (e.g., with the generating unit 14016) an animated transition between the first display state and the second display state, wherein the animated transition includes the intermediate display state and the intermediate display state is mapped to an intensity of the contact detected (e.g., with the detecting unit 14010) at an end of the first portion of the gesture; and in response to detecting the first portion of the gesture, enable display of a portion of the animated transition between the first display state and the intermediate display state (e.g., with the display enabling unit 14012).

In some embodiments, detecting the first portion of the gesture includes detecting (e.g., with the detecting unit 14010) an increase in intensity of the respective contact from a first intensity threshold to an intermediate intensity threshold; and the processing unit is further configured to: after displaying the intermediate display state (e.g., with the display unit 14002): detect a second portion of the gesture (e.g., with the detecting unit 14010), where the second portion of the gesture includes detecting an increase in intensity of the respective contact from the intermediate intensity threshold to the predefined intensity threshold; and in response to detecting the second portion of the gesture, enable display of an animated transition between the intermediate display state and the second display state (e.g., with the display enabling unit 14012).

In some embodiments, the process unit 14008 is further configured to: while the intensity of the respective contact is at or below the predefined intensity threshold, enable display of an animated transition from the first display state to the second display state (e.g., with the display unit 14002 and the display enabling unit 14012), where the animated transition includes adjusting a parameter corresponding to a visual property of a set of one or more user interface objects in a predefined direction in accordance with the intensity of the respective contact (e.g., with the display enabling unit 14012); detect an increase in intensity of the respective contact above the predefined intensity threshold (e.g., with the detecting unit 14010); and in response to detecting the increase in intensity of the respective contact above the predefined intensity threshold, enable display of a continuation of the animated transition that includes adjusting the parameter in the predefined direction in accordance with the intensity of the respective contact (e.g., with the display enabling unit 14012).

In some embodiments, the processing unit 14008 is configured to select the parameter from the set consisting of: user interface object size, user interface object opacity, space between user interface objects, and number of options displayed in a menu.

In some embodiments, the processing unit 14008 is configured to detect the end of the gesture by detecting liftoff of the respective contact (e.g., with the detecting unit 14010).

In some embodiments, the processing unit 14008 is configured to detect the end of the gesture by detecting a reduction in intensity of the contact below an end-of-gesture intensity threshold (e.g., with the detecting unit 14010).

In some embodiments, the processing unit 14008 is configured to detect the end of the gesture by detecting a reduction in intensity of the contact from above the predefined intensity threshold to below the predefined intensity threshold (e.g., with the detecting unit 14010).

In some embodiments, the processing unit 14008 is configured to: while detecting the gesture, detect an increase in intensity of the respective contact to the predefined intensity threshold (e.g., with the detecting unit 14010); and in response to detecting the increase in intensity of the respective contact to the predefined intensity threshold, generate a tactile output that indicates that the second display state will continue to be displayed after an end of the gesture is detected (e.g., with tactile output unit 14007).

In some embodiments, the processor unit 14008 is configured to: enable display of the user interface in the first display state by enabling display of an icon that corresponds to a menu without displaying the menu; enable display of the user interface in the intermediate display state by enabling display of a preview of the menu, wherein the preview of the menu is different from the menu; and enable display of the user interface in the second display state by enabling display of the menu (e.g., with the display enabling unit 14012).

In some embodiments, the processor unit 14008 is configured to: enable display of the user interface in the first display state by enabling display of an icon that corresponds to a pop-up window without displaying the pop-up window; enable display of the user interface in the intermediate display state by enabling display of a preview of the pop-up window, where the preview of the pop-up window is different from the pop-up window; and enable display of the user interface in the second display state by enabling display of the pop-up window (e.g., with the display enabling unit 14012).

In some embodiments, the processing unit 14008 is configured to: enable display of the user interface in the first display state by enabling display of an icon that corresponds to a hidden text without displaying the hidden text; enable display of the user interface in the intermediate display state by enabling display of a preview of the hidden text, wherein the preview of the hidden text is different from the hidden text; and enable display of the user interface in the second display state by enabling display of the hidden text (e.g., with the display enabling unit 14012).

In some embodiments, the processing unit 14008 is configured to: enable display of the user interface in the first display state by enabling display of an icon that corresponds to a plurality of user interface objects without displaying the plurality of user interface objects; enable display of the user interface in the intermediate display state by enabling display of reduced-scale representations of the user interface objects, where the reduced-scale representations of the user interface objects are different from the user interface objects; and enable display of the user interface in the second display state by enabling display of the user interface objects (e.g., with the display enabling unit 14012).

In some embodiments, the processing unit 14008 is configured to: enable display the user interface in the first display state by enable display of an image prior to applying a graphical effect to the image; enable display of the user interface in the intermediate display state by enabling display of a preview of partially applying the graphical effect to the image; and enable display of the user interface in the second display state by enabling display of the image with the graphical effect applied (e.g., with the display enabling unit 14012).

In some embodiments, the processing unit 14008 is configured to: enable display of the user interface in the first display state by enabling display of a representation of an album; enable display of the user interface in the intermediate display state by enabling display of a preview of components of the album, where the preview of components of the album is different from the components of the album; and enabling display of the user interface in the second display state by enabling display of the components of the album (e.g., with the display enabling unit 14012).

In some embodiments, the processing unit 14008 is configured to: enable display of the user interface in the first display state by enabling display of a plurality of user interface objects arranged on the display such that at least some objects overlap each other; enable display of the user interface in the intermediate display state by enabling display of the user interface objects spread apart so that at least two of the plurality of user interface objects that formerly overlapped with each other do not overlap with each other while at least two the plurality of user interface objects overlap each other; and enable display of the user interface in the second display state by enabling display of the plurality of user interface objects so that they do not overlap with each other (e.g., with the display enabling unit 14012).

In some embodiments, the processing unit 14008 is configured to: enable display of the user interface in the first display state by enabling display of an image in a presentation without emphasis; enable display of the user interface in the intermediate display state by enabling display of preliminary emphasis on a portion of the image; and enable display of the user interface in the second display state by enabling display of the image with additional emphasis on the portion of the image (e.g., with the display enabling unit 14012).

In some embodiments, the processing unit 14008 is configured to: enable display of the user interface in the first display state by enabling display of a current state of an electronic document; enable display of the user interface in the intermediate display state by enabling display of a beginning portion of an undo operation; and enable display of the user interface in the second display state by enabling display of a prior state of the document after the undo operation has been performed (e.g., with the display enabling unit 14012).

In some embodiments, the processing unit 14008 is configured to: enable display of the user interface in the first display state enabling display of a current state of an electronic document; enable display of the user interface in the intermediate display state by enabling display of a first prior state of the electronic document after a first undo operation has been performed; and enable display of the user interface in the second display state enabling display of a second prior state of the electronic document after an second undo operation has been performed (e.g., with the display enabling unit 14012).

In some embodiments, the processing unit 14008 is configured to: enable display of the user interface in the first display state by enabling display of one or more tabs in a tabbed document interface; enable display of the user interface in the intermediate display state by enabling display of a preview of a new tab in the tabbed document interface; and enable display of the user interface in the second display state enable display of the new tab in the tabbed document interface (e.g., with the display enabling unit 14012).

When implementing the processes 13950 shown FIGS. 6H-6M, in some embodiments, the display unit 14002 is configured to display a user interface, where the user interface is in a first display state. The processing unit 14008 is configured to: detect a first input that includes detecting an increase in intensity of a contact on a touch-sensitive surface (e.g., with the detecting unit 14010); in response to detecting the first input, enable display of a first animation of the user interface transitioning from the first display state to a second display state (e.g., with the display enabling unit 14012), where a rate of change from the first display state to the second display state is determined in accordance with an intensity of the contact included in the first input; after the user interface has transitioned to the second display state: detect a second input that includes detecting an increase in intensity of a contact on the touch-sensitive surface (e.g., with the detecting unit 14010); and in response to detecting the second input, enable display of a second animation of the user interface transitioning from the second display state to a third display state (e.g., with the display enabling unit 14012), where the second animation is a continuation of the first animation and the third display state is determined in accordance with the intensity of the contact included in the second input on the touch-sensitive surface; detect a reduction in the intensity of the contact included in the second input (e.g., with the detecting unit 14010); and in response to detecting the reduction in the intensity of the contact included in the second input, enable display of a third animation of the user interface transitioning from the third display state to the second display state (e.g., with the display enabling unit 14012).

In some embodiments, the first input and the second input are part of single gesture that includes a continuously detected contact on the touch-sensitive surface.

In some embodiments, the first input and the second input are part of different gestures.

In some embodiments, the processing unit 14008 is further configured to: determine a terminal display state of the user interface while detecting the second input (e.g., with the display enabling unit 14012), wherein: the terminal display state is associated with a predefined intensity; and the processing unit 14008 is configured to determine the third display state in accordance with the intensity of the contact included in the second input on the touch-sensitive surface unit 14004 by: in accordance with a determination that the intensity of the contact included in the second input is below the predefined intensity, selecting a respective display state between the second display state and the terminal display state as the third display state (e.g., with the selecting unit 14018); and in accordance with a determination that the intensity of the contact included in the second input is at or above the predefined intensity, selecting the terminal display state as the third display state (e.g., with the selecting unit 14018).

In some embodiments, the touch-sensitive surface of the device has a device compression tolerance; and the predefined intensity is an intensity selected so that the terminal display state is displayed before the device compression tolerance is reached.

In some embodiments, the user interface includes a set of one or more user interface objects. The processing unit 14008 is configured to enable display of a transition of the user interface from the first display state to the second display state by manipulating the set of user interface objects (e.g., with the display enabling unit 14012). The processing unit 14008 is further configured to determine the third display state and the third animation of the user interface transitioning from the third display state to the second display state based at least in part on simulated physical properties of the set of user interface objects (e.g., with the detecting unit 14010).

In some embodiments, the user interface includes a set of user interface objects, including a first user interface object and a second user interface object. The processing unit 14008 is configured to enable display of a transition of the user interface from the first display state to the second display state by moving the first user interface away from the second user interface object (e.g., with the display enabling unit 14012). The processing unit 14008 is further configured to enable display of a transition of the user interface from the second display state to the third display state by continuing to move the first user interface object away from the second user interface object (e.g., with the display enabling unit 14012).

In some embodiments, the user interface includes a set of user interface objects, including a first user interface object and a second user interface object. The processing unit 14008 is configured to enable display of a transition of the user interface from the first display state to the second display state by moving the first user interface toward the second user interface object (e.g., with the display enabling unit 14012). The processing unit 14008 is further configured to enable display of a transition of the user interface from the second display state to the third display state by continuing to move the first user interface object toward the second user interface object (e.g., with the display enabling unit 14012).

In some embodiments, the user interface includes a set of user interface objects, including a first user interface object and a second user interface object. The processing unit 14008 is configured to enable display of a transition of the user interface from the first display state to the second display state by enlarging the first user interface object relative to the second user interface object (e.g., with the display enabling unit 14012). The processing unit 14008 is further configured to enable display of a transition of the user interface from the second display state to the third display state by continuing to enlarge the first user interface object relative to the second user interface object (e.g., with the display enabling unit 14012).

In some embodiments, the user interface includes a set of user interface objects, including a first user interface object and a second user interface object. The processing unit 14008 is configured to enable display of a transition of the user interface from the first display state to the second display state by reducing a size of the first user interface object relative to the second user interface object (e.g., with the display enabling unit 14012). The processing unit 14008 is further configured to enable display of a transition of the user interface from the second display state to the third display state by continuing to reduce the size of the first user interface object relative to the second user interface object (e.g., with the display enabling unit 14012).

In some embodiments, the user interface includes a set of user interface objects, including a first user interface object. The processing unit 14002 is configured to enable display of a transition of the user interface from the first display state to the second display state by translating the first user interface object along a predefined path on the display (e.g., with the display enabling unit 14012). The processing unit 14008 is further configured to enable display of a transition of the user interface from the second display state to the third display state by continuing to translate the first user interface object along the predefined path on the display (e.g., with the display enabling unit 14012).

In some embodiments, the user interface includes a set of user interface objects, including a first user interface object. The processing unit 14008 is configured to enable display of a transition of the user interface from the first display state to the second display state by rotating the first user interface object on the display (e.g., with the display enabling unit 14012). The processing unit 14008 is further configured to enable display of a transition of the user interface from the second display state to the third display state by continuing to rotate the first user interface object on the display (e.g., with the display enabling unit 14012).

In some embodiments, the user interface includes a set of user interface objects, including a first user interface object. The processing unit 14008 is configured to enable display of a transition of the user interface from the first display state to the second display state by changing an opacity of the first user interface object on the display (e.g., with the display enabling unit 14012). The processing unit 14008 is further configured to enable display of a transition of the user interface from the second display state to the third display state by continuing to change the opacity of the first user interface object on the display (e.g., with the display enabling unit 14012).

In some embodiments, the second display state is a predefined display state associated with an operation associated with the first input. The third display state is a dynamic display state selected in accordance with the intensity of the respective contact on the touch-sensitive surface.

In some embodiments, the third animation is determined based at least in part on a difference between an intensity that corresponds to the second display state and an intensity that corresponds to the third display state.

In some embodiments, the first animation is displayed at a speed corresponding to a rate of change of the intensity of the respective contact during the first input.

In some embodiments, the second animation is displayed at a speed corresponding to a rate of change of the intensity of the respective contact during the second input.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 6A-6M are, optionally, implemented by components depicted in FIGS. 1A-1B or FIG. 7. For example, detection operations 13904, 13954, 13960, and 13964, display operations 13906, 13910, 13912, 13952, 13956, 13962, 13966 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190, optionally, utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions which, when executed by an electronic device with a display, a touch-sensitive surface and one or more sensors to detect intensities of contacts with the touch-sensitive surface, cause the electronic device to:

display a user interface on the display, wherein the user interface is in a first display state;

detect a first portion of a gesture on the touch-sensitive surface, including detecting an increase in intensity of a respective contact on the touch-sensitive surface to a first intensity value;

in response to detecting the first portion of the gesture, display a plurality of intermediate display states between the first display state and a second display state, including displaying a first intermediate display state followed by a second intermediate display state;

after displaying the second intermediate display state and while continuing to detect the respective contact on the touch-sensitive surface, detect a second portion of the gesture that includes detecting a decrease in intensity of the respective contact below the first intensity value; and while detecting the second portion of the gesture:
in accordance with a determination that the intensity of the respective contact reached a predefined intensity threshold that is higher than the first intensity value during the second portion of the gesture, display the second display state, and maintain display of the second display state as the intensity of the respective contact decreases during the second portion of the gesture; and in accordance with a determination that the intensity of the respective contact did not reach the predefined intensity threshold that is higher than the first intensity value during the second portion of the gesture, replace display of the second intermediate display state with display of the first intermediate display state as the intensity of the respective contact decreases during the second portion of the gesture; and in response to detecting liftoff of the contact:
in accordance with a determination that the intensity of the respective contact reached the predefined intensity threshold that is higher than the first intensity value during the second portion of the gesture, maintain display of the second display state; and in accordance with a determination that the intensity of the respective contact did not reach the predefined intensity threshold that is higher than the first intensity value during the second portion of the gesture, redisplay the first display state.

2. The storage medium of claim 1, including instructions which, when executed by the electronic device, cause the electronic device to:

in response to detecting the first portion of the gesture, display the plurality of intermediate display states between the first display state and the second display state, wherein a respective intermediate display state of the plurality of intermediate display states is selected to be displayed based on an intensity of the respective contact.

3. The storage medium of claim 1, wherein:
detecting the first portion of the gesture includes detecting an increase in intensity of the respective contact from a first intensity threshold to an intermediate intensity threshold;

detecting the second portion of the gesture includes detecting an increase in intensity of the respective contact from the intermediate intensity threshold to the predefined intensity threshold; and the storage medium includes instructions which, when executed by the electronic device, cause the electronic device to, after displaying an intermediate display state in the plurality of intermediate display states:
in response to detecting the second portion of the gesture, display an animated transition between the intermediate display state in the plurality of intermediate display states and the second display state.

4. The storage medium of claim 1, including instructions which, when executed by the electronic device, cause the electronic device to:
while the intensity of the respective contact is at or below the predefined intensity threshold, display an animated transition from the first display state to the second display state, wherein the animated transition includes adjusting a parameter corresponding to a visual property of a set of one or more user interface objects in a predefined direction in accordance with the intensity of the respective contact;
detect an increase in intensity of the respective contact above the predefined intensity threshold; and,
in response to detecting the increase in intensity of the respective contact above the predefined intensity threshold, display a continuation of the animated transition that includes adjusting the parameter in the predefined direction in accordance with the intensity of the respective contact.

5. The storage medium of claim 4, wherein the parameter is a parameter selected from the set consisting of: user interface object size, user interface object opacity, space between user interface objects, and number of options displayed in a menu.

6. The storage medium of claim 1, including instructions which, when executed by the electronic device, cause the electronic device to:
while detecting the gesture, detect an increase in intensity of the respective contact to the predefined intensity threshold; and,
in response to detecting the increase in intensity of the respective contact to the predefined intensity threshold, generate a tactile output that indicates that the second display state will continue to be displayed after an end of the gesture is detected.

7. The storage medium of claim 1, wherein:
displaying the user interface in the first display state includes displaying an icon that corresponds to a menu without displaying the menu;
displaying the user interface in the intermediate display state includes displaying a preview of the menu, wherein the preview of the menu is different from the menu; and
displaying the user interface in the second display state includes displaying the menu.

8. The storage medium of claim 1, wherein:
displaying the user interface in the first display state includes displaying an icon that corresponds to a pop-up window without displaying the pop-up window;
displaying the user interface in the intermediate display state includes displaying a preview of the pop-up window, wherein the preview of the pop-up window is different from the pop-up window; and
displaying the user interface in the second display state includes displaying the pop-up window.

9. The storage medium of claim 1, wherein the second portion begins whilst the second intermediate display state is displayed.

10. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
displaying a user interface on the display, wherein the user interface is in a first display state;
detecting a first portion of a gesture on the touch-sensitive surface, including detecting an increase in intensity of a respective contact on the touch-sensitive surface to a first intensity value;
in response to detecting the first portion of the gesture, displaying a plurality of intermediate display states between the first display state and a second display state, including displaying a first intermediate display state followed by a second intermediate display state;
after displaying the second intermediate display state and while continuing to detect the respective contact on the touch-sensitive surface, detecting a second portion of the gesture that includes detecting a decrease in intensity of the respective contact below the first intensity value; and
while detecting the second portion of the gesture:
in accordance with a determination that the intensity of the respective contact reached a predefined intensity threshold that is higher than the first intensity value during the second portion of the gesture, displaying the second display state, and maintaining display of the second display state as the intensity of the respective contact decreases during the second portion of the gesture; and
in accordance with a determination that the intensity of the respective contact did not reach the predefined intensity threshold that is higher than the first intensity value during the second portion of the gesture, replacing display of the second intermediate display state with display of the first intermediate display state as the intensity of the respective contact decreases during the second portion of the gesture; and
in response to detecting liftoff of the contact:
in accordance with a determination that the intensity of the respective contact reached the predefined intensity threshold that is higher than the first intensity value during the second portion of the gesture, maintaining display of the second display state; and
in accordance with a determination that the intensity of the respective contact did not reach the predefined intensity threshold that is higher than the first intensity value during the second portion of the gesture, redisplaying the first display state.

11. The device of claim 10, including instructions for:
in response to detecting the first portion of the gesture, displaying the plurality of intermediate display states between the first display state and the second display state, wherein a respective intermediate display state of the plurality of intermediate display states is selected to be displayed based on an intensity of the respective contact.

12. The device of claim 10, wherein:
  detecting the first portion of the gesture includes detecting an increase in intensity of the respective contact from a first intensity threshold to an intermediate intensity threshold;
  detecting the second portion of the gesture includes detecting an increase in intensity of the respective contact from the intermediate intensity threshold to the predefined intensity threshold; and
  the device includes instructions for, after displaying an intermediate display state in the plurality of intermediate display states:
    in response to detecting the second portion of the gesture, displaying an animated transition between the intermediate display state in the plurality of intermediate display states and the second display state.

13. The device of claim 10, including instructions for:
  while the intensity of the respective contact is at or below the predefined intensity threshold, displaying an animated transition from the first display state to the second display state, wherein the animated transition includes adjusting a parameter corresponding to a visual property of a set of one or more user interface objects in a predefined direction in accordance with the intensity of the respective contact;
  detecting an increase in intensity of the respective contact above the predefined intensity threshold; and,
  in response to detecting the increase in intensity of the respective contact above the predefined intensity threshold, displaying a continuation of the animated transition that includes adjusting the parameter in the predefined direction in accordance with the intensity of the respective contact.

14. The device of claim 13, wherein the parameter is a parameter selected from the set consisting of: user interface object size, user interface object opacity, space between user interface objects, and number of options displayed in a menu.

15. The device of claim 10, including instructions for:
  while detecting the gesture, detecting an increase in intensity of the respective contact to the predefined intensity threshold; and,
  in response to detecting the increase in intensity of the respective contact to the predefined intensity threshold, generating a tactile output that indicates that the second display state will continue to be displayed after an end of the gesture is detected.

16. The device of claim 10, wherein:
  displaying the user interface in the first display state includes displaying an icon that corresponds to a menu without displaying the menu;
  displaying the user interface in the intermediate display state includes displaying a preview of the menu, wherein the preview of the menu is different from the menu; and
  displaying the user interface in the second display state includes displaying the menu.

17. The device of claim 10, wherein:
  displaying the user interface in the first display state includes displaying an icon that corresponds to a pop-up window without displaying the pop-up window;
  displaying the user interface in the intermediate display state includes displaying a preview of the pop-up window, wherein the preview of the pop-up window is different from the pop-up window; and
  displaying the user interface in the second display state includes displaying the pop-up window.

18. The device of claim 10, wherein the second portion begins whilst the second intermediate display state is displayed.

19. A method, comprising:
  at an electronic device with a touch-sensitive surface and a display, wherein the device includes one or more sensors to detect intensities of contacts with the touch-sensitive surface:
    displaying a user interface on the display, wherein the user interface is in a first display state;
    detecting a first portion of a gesture on the touch-sensitive surface, including detecting an increase in intensity of a respective contact on the touch-sensitive surface to a first intensity value;
    in response to detecting the first portion of the gesture, displaying a plurality of intermediate display states between the first display state and a second display state, including displaying a first intermediate display state followed by a second intermediate display state;
    after displaying the second intermediate display state and while continuing to detect the respective contact on the touch-sensitive surface, detecting a second portion of the gesture that includes detecting a decrease in intensity of the respective contact below the first intensity value; and
    while detecting the second portion of the gesture:
      in accordance with a determination that the intensity of the respective contact reached a predefined intensity threshold that is higher than the first intensity value during the second portion of the gesture, displaying the second display state, and maintaining display of the second display state as the intensity of the respective contact decreases during the second portion of the gesture; and
      in accordance with a determination that the intensity of the respective contact did not reach the predefined intensity threshold that is higher than the first intensity value during the second portion of the gesture, replacing display of the second intermediate display state with display of the first intermediate display state as the intensity of the respective contact decreases during the second portion of the gesture; and
    in response to detecting liftoff of the contact:
      in accordance with a determination that the intensity of the respective contact reached the predefined intensity threshold that is higher than the first intensity value during the second portion of the gesture, maintaining display of the second display state; and
      in accordance with a determination that the intensity of the respective contact did not reach the predefined intensity threshold that is higher than the first intensity value during the second portion of the gesture, redisplaying the first display state.

20. The method of claim 19, including:
  in response to detecting the first portion of the gesture, displaying the plurality of intermediate display states between the first display state and the second display state, wherein a respective intermediate display state of the plurality of intermediate display states is selected to be displayed based on an intensity of the respective contact.

21. The method of claim 19, wherein:
- detecting the first portion of the gesture includes detecting an increase in intensity of the respective contact from a first intensity threshold to an intermediate intensity threshold;
- detecting the second portion of the gesture includes detecting an increase in intensity of the respective contact from the intermediate intensity threshold to the predefined intensity threshold; and
- the method includes, after displaying an intermediate display state in the plurality of intermediate display states:
  - in response to detecting the second portion of the gesture, displaying an animated transition between the intermediate display state in the plurality of intermediate display states and the second display state.

22. The method of claim 19, including:
- while the intensity of the respective contact is at or below the predefined intensity threshold, displaying an animated transition from the first display state to the second display state, wherein the animated transition includes adjusting a parameter corresponding to a visual property of a set of one or more user interface objects in a predefined direction in accordance with the intensity of the respective contact;
- detecting an increase in intensity of the respective contact above the predefined intensity threshold; and,
- in response to detecting the increase in intensity of the respective contact above the predefined intensity threshold, displaying a continuation of the animated transition that includes adjusting the parameter in the predefined direction in accordance with the intensity of the respective contact.

23. The method of claim 22, wherein the parameter is a parameter selected from the set consisting of: user interface object size, user interface object opacity, space between user interface objects, and number of options displayed in a menu.

24. The method of claim 19, including:
- while detecting the gesture, detecting an increase in intensity of the respective contact to the predefined intensity threshold; and,
- in response to detecting the increase in intensity of the respective contact to the predefined intensity threshold, generating a tactile output that indicates that the second display state will continue to be displayed after an end of the gesture is detected.

25. The method of claim 19, wherein:
- displaying the user interface in the first display state includes displaying an icon that corresponds to a menu without displaying the menu;
- displaying the user interface in the intermediate display state includes displaying a preview of the menu, wherein the preview of the menu is different from the menu; and
- displaying the user interface in the second display state includes displaying the menu.

26. The method of claim 19, wherein:
- displaying the user interface in the first display state includes displaying an icon that corresponds to a pop-up window without displaying the pop-up window;
- displaying the user interface in the intermediate display state includes displaying a preview of the pop-up window, wherein the preview of the pop-up window is different from the pop-up window; and
- displaying the user interface in the second display state includes displaying the pop-up window.

27. The method of claim 19, wherein the second portion begins whilst the second intermediate display state is displayed.

* * * * *